US005508911A

United States Patent [19]

Vanko et al.

[11] Patent Number: 5,508,911

[45] Date of Patent: Apr. 16, 1996

[54] ELECTRONIC DATA ENTRY AND ANALYSIS SYSTEM

[75] Inventors: John C. Vanko, Timonium; Leo M. Kahl, Baltimore; Jeffrey A. Kaufman, Baltimore; Mark C. d'Agostino, Baltimore, all of Md.

[73] Assignee: Fawn Industries, Inc., Hunt Valley, Md.

[21] Appl. No.: 268,650

[22] Filed: Jun. 30, 1994

[51] Int. Cl.[6] .................................................. G06F 19/00

[52] U.S. Cl. ......................... 364/188; 345/113; 345/173; 364/507

[58] Field of Search .................................... 364/188, 189, 364/550, 551.01, 507; 371/29.1; 340/524, 525; 395/155–161; 345/4–6, 113, 114, 173, 129, 169, 904, 905

[56] References Cited

U.S. PATENT DOCUMENTS

| | | | |
|---|---|---|---|
| 2,216,102 | 9/1940 | Scherbak | 177/311 |
| 3,233,217 | 2/1966 | Bost, Jr. | 340/33 |
| 3,803,581 | 4/1974 | Luger | 340/324 R |
| 4,378,217 | 3/1983 | Wilson et al. | 434/228 |
| 4,492,952 | 1/1985 | Miller | 340/52 F |
| 4,639,881 | 1/1987 | Zingher | 345/173 X |
| 4,697,231 | 9/1987 | Boytor et al. | 364/188 |
| 4,727,353 | 2/1988 | Ruhter | 340/52 F |
| 4,821,030 | 4/1989 | Batson et al. | 345/173 |
| 4,851,822 | 7/1989 | Barnett | 340/635 |
| 4,916,699 | 4/1990 | Ohashi | 345/113 X |
| 5,057,818 | 10/1991 | Tennefoss | 340/525 |
| 5,083,117 | 1/1992 | Hoigaard | 340/649 |
| 5,159,328 | 10/1992 | Albrecht | 340/815.03 |
| 5,249,121 | 9/1993 | Baum et al. | 345/113 X |

OTHER PUBLICATIONS

Quality Measurement Systems, Genesis QA 3000/QA 3300 Catalog, Jun. 1993.

Quality Measurement Systems, Anstat™ SPC Software Catalog, Sep. 1993.

IRD Mechanalysis, Inc., dataPAC™ 1000 Advanced Data Collector, Catalog, 1993.

IRD Mechanalysis, Inc., IQ 2000™ Condition Monitoring Software, Catalog, 1993.

*Primary Examiner*—Joseph Ruggiero

*Attorney, Agent, or Firm*—Leonard Bloom

[57] ABSTRACT

An electronic system for entering and analyzing data relating to at least one attribute of an object includes a data entry means displaying a pictorial image of the object and providing a plurality of first indicia for identifying a location of the attribute in the object, and a plurality of additional indicia for identifying a parameter of the attribute. The data identifying the attribute are entered in the system when one of the first indicia in combination with at least one of the additional indicia are activated. A controlling means within the data entry means controls the data entry means in response to the entered data, which are processed by a processing means. When installed on a workstation on a production line, the electronic system and the data entry means find particular utility in entering and processing data relating to location and nature of a defect occurring in a workplace, thereby providing in-depth readily-usable information on the status of the production process, such that effective corrective actions can be undertaken immediately. A unique software operates the system.

36 Claims, 46 Drawing Sheets

| | | | | | | | | | | | |
|---|---|---|---|---|---|---|---|---|---|---|---|
| 1 | 0 | 0 | 0 | 0 | 0 | 0 | 0 | 0 | 1 | 2 | FADE/BASS/TREBLE REGION |
| 0 | 1 | 0 | 0 | 0 | 0 | 0 | 0 | 1 | 0 | 2 | BAL/VOL/SEL REGION |
| 0 | 0 | 1 | 0 | 0 | 0 | 0 | 1 | 0 | 0 | 2 | SEEK BUTTON |
| 0 | 0 | 0 | 1 | 0 | 0 | 1 | 0 | 0 | 0 | 2 | AM/FM BUTTON |
| 0 | 0 | 0 | 0 | 1 | 1 | 0 | 0 | 0 | 0 | 2 | UPPER CENTRAL REGION |
| 0 | 0 | 0 | 0 | 1 | 1 | 0 | 0 | 0 | 0 | 2 | UPPER RIGHT REGION |
| 200 | 0 | 0 | 1 | 0 | 0 | 1 | 0 | 0 | 0 | 202 | 1 BUTTON |
| 0 | 0 | 1 | 0 | 0 | 0 | 0 | 1 | 0 | 0 | 2 | 2 BUTTON |
| 0 | 1 | 0 | 0 | 0 | 0 | 0 | 0 | 1 | 0 | 2 | 3 BUTTON |
| 1 | 0 | 0 | 0 | 0 | 0 | 0 | 0 | 0 | 1 | 2 | 4 BUTTON |
| 0 | 1 | 0 | 0 | 0 | 0 | 0 | 0 | 1 | 0 | 2 | 5 BUTTON |
| 0 | 0 | 1 | 0 | 0 | 0 | 0 | 1 | 0 | 0 | 2 | LOWER RIGHT REGION |
| 0 | 0 | 0 | 1 | 0 | 0 | 1 | 0 | 0 | 0 | 2 | LOWER CENTRAL REGION |
| 0 | 0 | 0 | 0 | 1 | 1 | 0 | 0 | 0 | 0 | 2 | SET BUTTON |
| 0 | 0 | 0 | 0 | 1 | 1 | 0 | 0 | 0 | 0 | 2 | LOWER LEFT REGION |
| 0 | 0 | 0 | 1 | 0 | 0 | 1 | 0 | 0 | 0 | 2 | BASS/TREBLE GRAPHIC OR PLASTIC |
| 0 | 0 | 1 | 0 | 0 | 0 | 0 | 1 | 0 | 0 | 2 | FADE GRAPHIC OR PLASTIC |
| 0 | 1 | 0 | 0 | 0 | 0 | 0 | 0 | 1 | 0 | 2 | VOL/POWER GRAPHIC |
| 1 | 0 | 0 | 0 | 0 | 0 | 0 | 0 | 0 | 1 | 2 | SEL/PUSH GRAPHIC |
| 0 | 1 | 0 | 0 | 0 | 0 | 0 | 0 | 1 | 0 | 1 | BAL/L/R GRAPHIC |
| 203 | 5 | 4 | 4 | 4 | 4 | 4 | 4 | 5 | 3 | 240 | GRAND TOTAL |

START
03-16-1994
10:36:53

END
03-16-1994
10:55:39

TRASH IN PAINT
BAD GRAPHIC
BROKEN PIN/USDB
SCRATCH
OFF LOCATION GRAPHIC
SHORT SHOT
LIGHT LEAK
BUTTON FAILURE
BROKEN LEG/BAD OPTIC
POOR HEAT STAKE/LONG GATE

FIG. 15A

10 MOST NUMEROUS DEFECTS

| POSITION | TYPE OF ERROR | NUMBER |
|---|---|---|
| 1 BUTTON | TRASH IN PAINT | 200 |
| FADE/BASS/TREBLE REGION | TRASH IN PAINT | 1 |
| FADE/BASS/TREBLE REGION | POOR HEAT STAKE/LONG GATE | 1 |
| BAL/VOL/SEL REGION | BAD GRAPHIC | 1 |
| BAL/VOL/SEL REGION | BROKEN LEG/BAD OPTIC | 1 |
| SEEK BUTTON | BROKEN PIN/USDB | 1 |
| SEEK BUTTON | BUTTON FAILURE | 1 |
| AM/FM BUTTON | SCRATCH | 1 |
| AM/FM BUTTON | LIGHT LEAK | 1 |
| UPPER CENTRAL REGION | OFF LOCATION GRAPHIC | 1 |

```
0,1,3,6,0,0,5,0,3,0,                   ,18
8,3,1,6,0,0,5,0,0,0,                   ,23
1,4,0,1,0,0,0,0,0,0,                   ,6
0,6,3,0,5,0,1,0,0,0,                   ,15
1,0,0,2,0,0,0,0,0,0,                   ,3
0,0,0,4,0,0,0,0,0,0,                   ,4
1,0,1,0,0,0,3,0,0,0,                   ,5
1,0,3,0,0,0,0,5,0,0,                   ,9
0,0,0,1,0,0,2,6,0,0,                   ,9
1,1,2,0,0,0,2,3,0,0,                   ,9
0,1,0,1,0,0,0,1,0,0,                   ,3
0,0,0,0,0,0,0,0,2,0,                   ,2
0,0,0,0,0,0,0,2,0,0,                   ,2
0,7,1,0,0,0,1,0,0,0,                   ,9
0,0,0,0,0,0,0,0,0,0,                   ,0
0,0,0,0,0,0,0,0,0,0,                   ,0
0,0,0,0,0,0,0,0,0,0,                   ,0
0,0,0,0,0,0,0,0,0,0,                   ,0
0,0,0,0,0,0,0,0,0,0,                   ,0
0,3,0,0,0,0,0,0,0,0,                   ,3

13,26,14,21,5,0,19,17,5,0,                   ,120

"START,,,END"
"05-02-1994",,,"05-03-1994"
"23:10:33",,,"06:03:05"
```

```
1482:0100  20 20 20 30 20 20 20-30 20 20 20 30 20 20 20      0   0   0   0
1482:0110  20 20 20 30 20 20 20-30 20 20 20 30 20 20 20      0   0   0   0
1482:0120  20 20 20 30 20 20 20-30 20 20 20 20 30 20 20      0   0    0
1482:0130  30 20 20 20 30 20 20-20 30 20 20 20 30 20 20   0   0   0   0
1482:0140  30 20 20 20 30 20 20-20 30 20 20 20 30 20 20   0   0   0   0
1482:0150  30 20 20 20 20 30 20-20 20 30 20 20 20 30 20   0    0   0   0
1482:0160  20 30 20 20 20 30 20-20 20 30 20 20 20 30 20    0   0   0   0
1482:0170  20 30 20 20 20 30 20-20 20 30 20 20 20 20 30    0   0   0    0
1482:0180  20 20 30 20 20 20 30-20 20 20 30 20 20 20 30     0   0   0   0
1482:0190  20 20 30 20 20 20 30-20 20 20 30 20 20 20 30     0   0   0   0
1482:01A0  20 20 30 20 20 20 20-30 20 20 20 30 20 20 20     0    0   0   0
1482:01B0  20 20 20 30 20 20 20-30 20 20 20 30 20 20 20      0   0   0   0
1482:01C0  20 20 20 30 20 20 20-30 20 20 20 30 20 20 20      0   0   0
1482:01D0  30 20 20 20 30 20 20-20 30 20 20 20 30 20 20   0   0   0   0
1482:01E0  30 20 20 20 30 20 20-20 30 20 20 20 30 20 20   0   0   0   0
1482:01F0  30 20 20 20 30 20 20-20 20 30 20 20 20 30 20   0   0    0   0
1482:0200  20 30 20 20 20 30 20-20 20 30 20 20 20 30 20    0   0   0   0
1482:0210  20 30 20 20 20 30 20-20 20 30 20 20 20 30 20    0   0   0   0
1482:0220  20 20 30 20 20 20 30-20 20 20 30 20 20 20 30     0   0   0   0
1482:0230  20 20 30 20 20 20 30-20 20 20 30 20 20 20 30     0   0   0   0
1482:0240  20 20 30 20 20 20 30-20 20 20 20 30 20 20 20     0   0    0   0
1482:0250  20 20 20 30 20 20 20-30 20 20 20 30 20 20 20      0   0   0   0
1482:0260  20 20 20 30 20 20 20-30 20 20 20 30 20 20 20      0   0   0   0
1482:0270  20 20 20 20 30 20 20-20 30 20 20 20 30 20 20       0   0   0
-
```

```
1482:0280  30 20 20 20 30 20 20-20 30 20 20 20 30 20 20   0   0   0   0
1482:0290  30 20 20 20 30 20 20-20 30 20 20 20 20 30 20   0   0   0    0
1482:02A0  20 30 20 20 20 30 20-20 20 30 20 20 20 30 20    0   0   0   0
1482:02B0  20 30 20 20 20 30 20-20 20 30 20 20 20 30 20    0   0   0   0
1482:02C0  20 30 20 20 20 20 30-20 20 20 30 20 20 20 30    0    0   0   0
1482:02D0  20 20 30 20 20 20 30-20 20 20 30 20 20 20 30     0   0   0   0
1482:02E0  20 20 30 20 20 20 30-20 20 20 30 20 20 20 20     0   0   0    0
1482:02F0  20 20 20 30 20 20 20-30 20 20 20 30 20 20 20      0   0   0   0
1482:0300  20 20 20 30 20 20 20-30 20 20 20 30 20 20 20      0   0   0   0
1482:0310  20 20 20 30 20 20 20-20 30 20 20 20 30 20 20      0    0   0
1482:0320  30 20 20 20 30 20 20-20 30 20 20 20 30 20 20   0   0   0   0
1482:0330  30 20 20 20 30 20 20-20 30 20 20 20 30 20 20   0   0   0   0
1482:0340  20 30 20 20 20 30 20-20 20 30 20 20 20 30 20    0   0   0   0
1482:0350  20 30 20 20 20 30 20-20 20 30 20 20 20 30 20    0   0   0   0
1482:0360  20 30 20 20 20 30 20-20 20 20 30 20 20 20 30    0   0    0   0
1482:0370  20 20 30 20 20 20 30-20 20 20 30 20 20 20 30     0   0   0   0
1482:0380  20 20 30 20 20 20 30-20 20 20 30 20 20 20 30     0   0   0   0
1482:0390  20 20 20 30 20 20 20-30 20 20 20 30 20 20 20      0   0   0   0
1482:03A0  20 20 20 30 20 20 20-30 20 20 20 30 20 20 20      0   0   0   0
1482:03B0  20 20 20 30 20 20 20-30 20 20 20 20 30 20 20      0   0    0
1482:03C0  30 20 20 20 30 20 20-20 30 20 20 20 30 20 20   0   0   0   0
1482:03D0  30 20 20 20 30 20 20-20 30 20 20 20 30 20 20   0   0   0   0
1482:03E0  30 20 20 20 20 30 20-20 20 30 20 20 20 30 20   0    0   0   0
1482:03F0  20 30 20 20 20 30 20-20 20 30 20 20 20 30 20    0   0   0   0
-
```

```
1482:0400  20 30 20 20 20 30 20-20 20 30 20 20 20 20 30    0   0   0    0
1482:0410  20 20 30 20 20 20 30-20 20 20 30 20 20 20 30     0   0   0   0
1482:0420  20 20 30 20 20 20 30-20 20 20 30 20 20 20 30     0   0   0   0
1482:0430  20 20 30 0D 0A 20 20-20 30 20 20 20 30 20 20     0..   0   0
1482:0440  30 20 20 20 30 20 20-20 30 20 20 20 30 20 20   0   0   0   0
1482:0450  30 20 20 20 30 20 20-20 30 20 20 20 30 20 0D   0   0   0   0 ..
1482:0460  20 20 20 30 20 20 20-20 30 20 20 20 20 30 20      0    0    0
1482:0470  20 20 30 20 20 20 20-30 20 20 20 20 30 20 20     0    0    0
1482:0480  20 30 20 20 20 20 30-20 20 20 20 30 20 20 20    0    0    0
1482:0490  30 20 20 20 20 30 20-20 20 20 30 20 20 20 20   0    0    0    0
1482:04A0  20 20 20 20 30 20 20-20 20 30 20 20 20 20 30       0    0    0
1482:04B0  20 20 20 30 20 20 20-20 30 20 20 20 20 30 20      0    0    0
1482:04C0  20 20 30 0D 0A 20 20-20 20 30 0D 0A 30 35 2D     0..     0..05-1
1482:04D0  30 2D 31 39 39 34 0D-0A 31 34 3A 33 35 3A 31   0-1994..14:35:17
1482:04E0  0D 0A                                           ..
```

TRASH IN PAINT
BAD GRAPHIC
BROKEN PIN/USDB
SCRATCH
OFF LOCATION GRAPHIC
SHORT SHOT
LIGHT LEAK
BUTTON FAILURE
BROKEN LEG/BAD OPTIC
POOR HEAT STAKE/LONG GATE
FADE/BASS/TREBLE REGION
BAL/VOL/SEL REGION
SEEK BUTTON
AM/FM BUTTON
UPPER CENTRAL REGION
UPPER RIGHT REGION
1 BUTTON
2 BUTTON
3 BUTTON
4 BUTTON
5 BUTTON
LOWER RIGHT REGION
LOWER CENTRAL REGION
SET BUTTON
LOWER LEFT REGION
BASS/TREBLE GRAPHIC OR PLASTIC
FADE GRAPHIC OR PLASTIC
VOL/POWER GRAPHIC
SEL/PUSH GRAPHIC
BAL/L/R GRAPHIC

FIG. 25

ELECTRONIC DATA ENTRY AND ANALYSIS SYSTEM

FIELD OF THE INVENTION

The present invention relates to the field of data entry and analysis, and more particularly, to an apparatus and method employed on a production line for the automatic entry of data and for the further processing of said data.

BACKGROUND OF THE INVENTION

In today's manufacturing environment, monitoring a production process and collecting statistical information on the status of the production process is considered essential in achieving world class quality standards.

Usually, in order to register a defect occurring in a workpiece, an operator fills out a tally sheet where a brief written identification of each occurred defect should be included. At the end of a shift, a quality engineer enters data taken from all tally sheets into a computer system for computation and graphing in order to analyze the entered data and to undertake needed corrective actions.

Unfortunately, many manufacturing companies may find little benefit from data thus collected. Sometimes, the vague nature of the data collected does not provide causal clues, and the difficulty in collecting the data slows down the production process itself and leads to both errors in the data content and decreases productivity effectiveness.

Contemporary data collectors like, for example, Genesis models QA3000/QA8300, are intended, among many other functions, for structuring a data-base on the basis of user-defined identifiers of the defect occurred, such as model, serial number, location of the defect, severity, disposition and so on. The Genesis collectors accept inspection input from keyboard, bar code wand, cases scanner, CCD wand and/or voice recognition circuits. However, these collectors are expensive, and sometimes provide much more functions than the manufacturing company either expects or wants.

Therefore, it would be highly desirable to devise an easy-to-use and inexpensive system for data entry and analysis which would provide in-depth readily-useable information on the status of the production process without slowing the production process itself.

SUMMARY OF THE INVENTION

In an attempt to overcome the disadvantages of the prior art, the present invention uses an electronic system and method for data entry and analysis, which bridges the gap between the need for complete inspection information and the reality of amassing data in the production environment.

This is achieved by employment of a unique, easy-to-use, and extremely inexpensive apparatus for entering data, completely identifying the defect, wherein tallying, checking or written description are not required, in combination with real-time computer based data evaluation, such that effective corrective actions can be undertaken immediately.

It is, therefore, an object of the present invention to provide an electronic system for entering data completely describing the defect occurring in the workpiece in combination with means for further processing said data in order to effectively monitor the production process.

It is another object of the present invention to provide an apparatus and method for entering data relating to location and nature of the defect occurring in the workpiece.

It is still another object of the present invention to provide an electronic system for entering data relating to an attribute of an object, and further processing said data.

The present invention finds particular utility if installed on a work station on a production line in order to monitor a production process.

In accordance with the teachings of the present invention, a system for entering and analysis of data relating to a defect occurring in a workpiece includes a data entry means for displaying a pictorial image of the workpiece and for providing a plurality of first and second indicia, respectively. A defect is identified by its position in the workpiece and by a type-of-error. Each of the first indicia identifies the position of the defect in the Workpiece, and each of the second indicia identifies the type-of-error in the workpiece. In the preferred embodiment, the data entry means includes a front screen, a sketch board and a keyboard disposed behind the sketch board and providing a controlling means and first and second keys corresponding to first and second indicia.

Once data relating to the defect are entered by activating one of the first indicia in combination with one of the second indicia, the controlling means provides delivering of said data (in real-time and/or periodically) to a processing means, including a computer, for collecting, processing, and outputting said data to the computer display or printer. Data are also displayed on a display, which can be implemented as a stand-alone display or as a display integral with the data entry means.

The present invention also finds utility as a system for entry and analysis data relating to any attribute of any object.

A data entry means displays a pictorial image of the object, and provides a plurality of first indicia thereon in juxtaposition to the pictorial image of the object {or located directly on it), each first indicia for identifying a position of the attribute of the object. The data entry means also provides at least one group of second indicia, each second indicia for identifying a required characteristic of the attribute of the object. The data identifying the attribute are entered in the system when one of the first indicia in combination with at least one of the second indicia are activated.

The present invention also may find application as an apparatus for entering and analysis of one data associated with an object.

These and other objects of the present invention will become apparent from a reading of the following specification taken in conjunction with the enclosed drawings.

BRIEF DESCRIPTION OF THE DRAWINGS

FIG. 15A and 15B are examples of a printout from MATRIXP or MULTIP.

FIG. 23 is a printout of the LATEST.DAT file.

FIGS. 24A, B, C are printout of the BACKUP.DAT, BACKUP.OLD, and BACKUP.BAK files.

FIG. 25 is a data file PANDE.DAT.

DETAILED DESCRIPTION OF THE INVENTION

Figure 1:
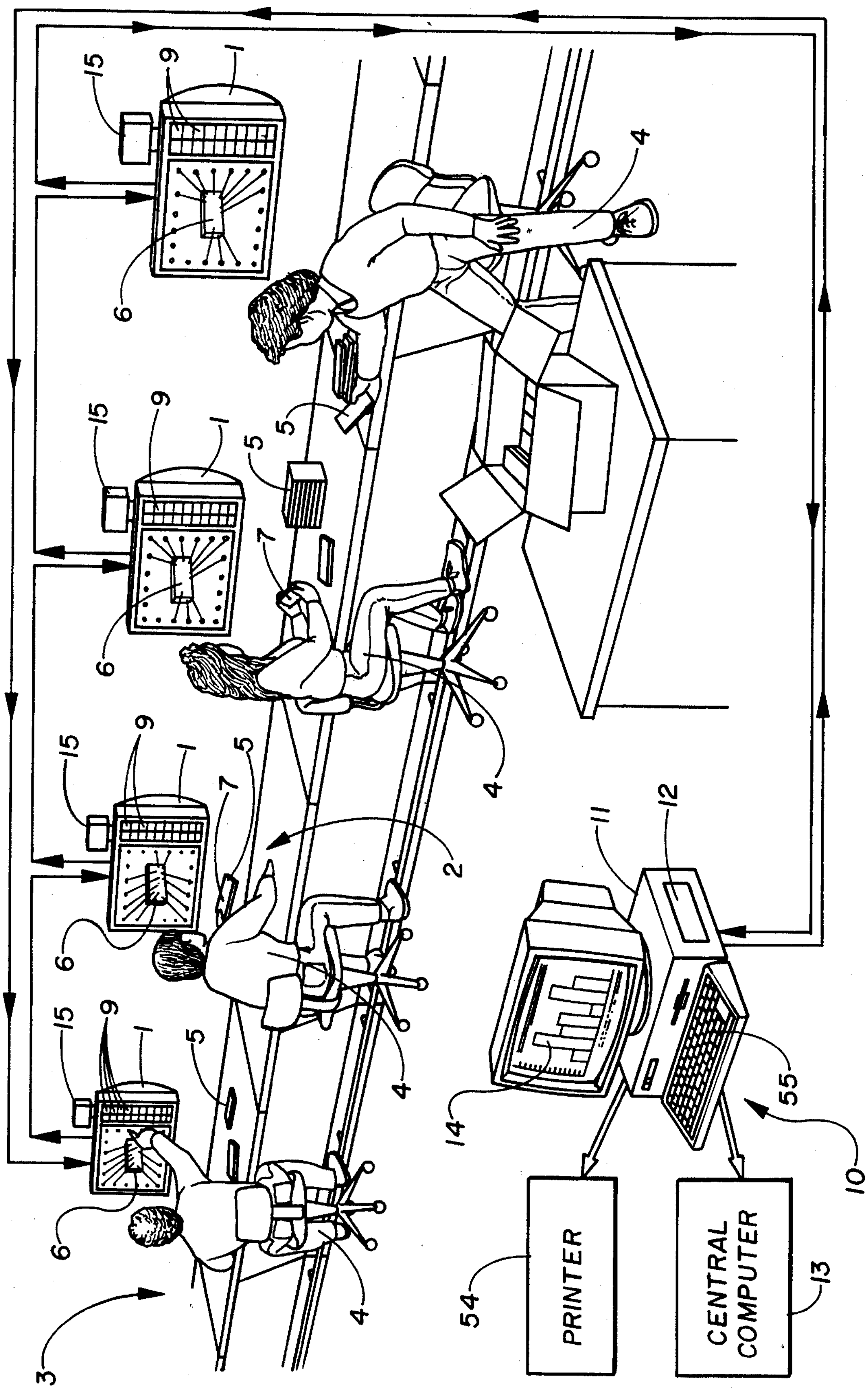
FIG. 1 is a pictorial view of a preferred embodiment of the present invention installed on a production line.
Figure 2:
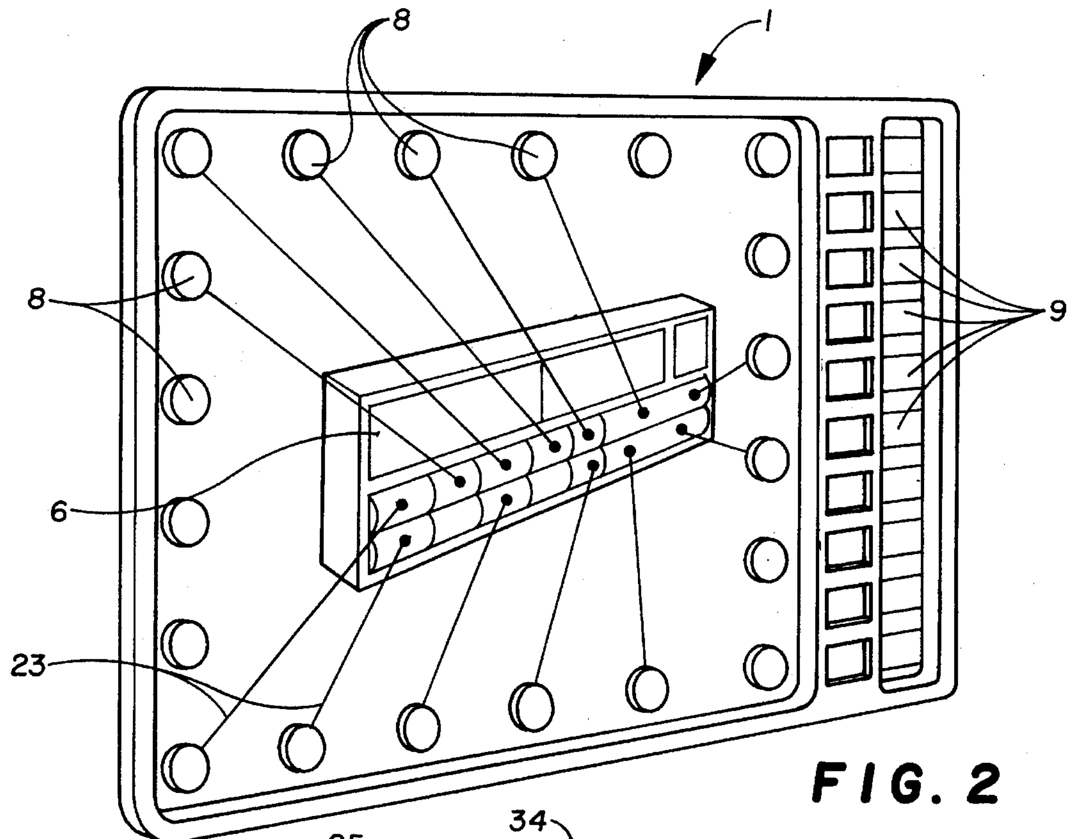
FIG. 2 is a perspective view of the data entry means of the present invention.
Figure 3:
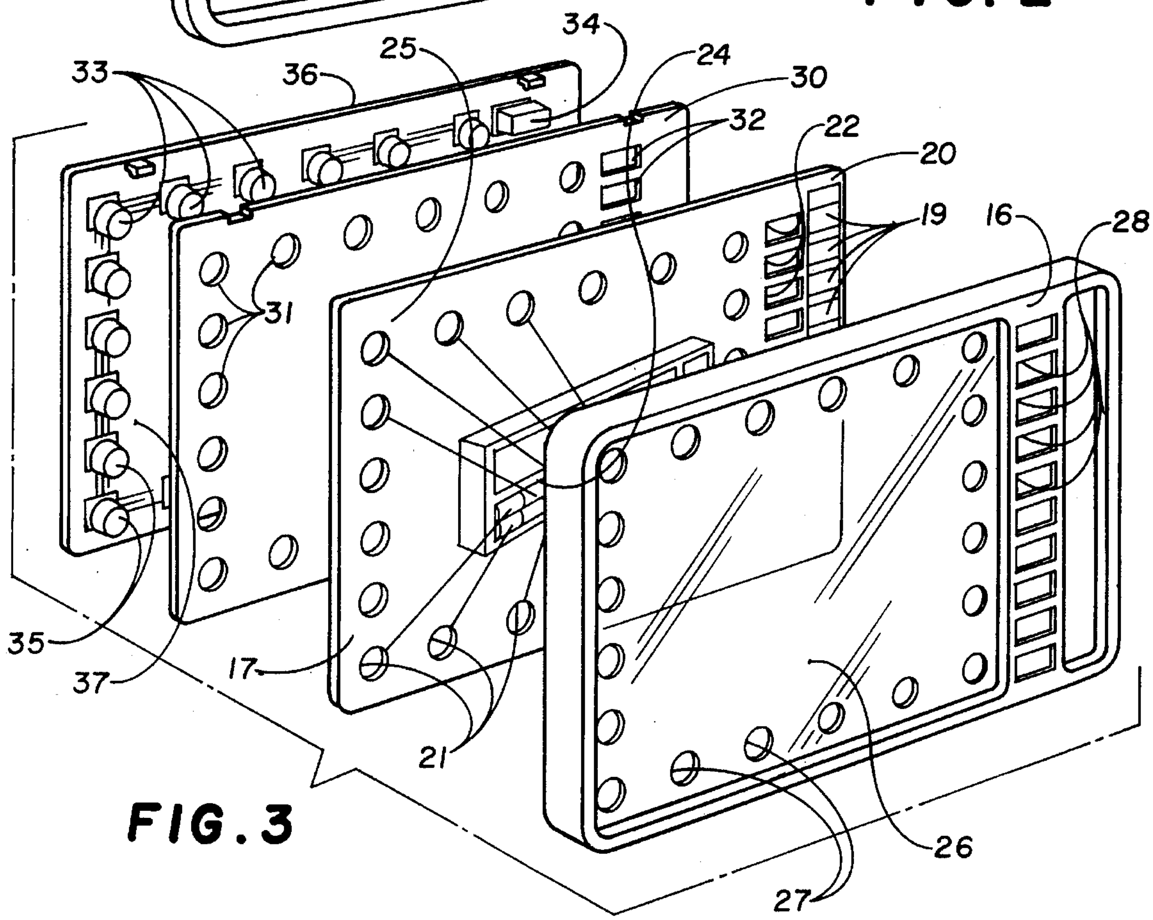
FIG. 3 is a perspective exploded view of the data entry means of the present invention.

Referring to FIGS. 1–3, data entry means 1 of the present invention are installed on work stations 2 of a production line 3. Each operator 4 inspects a workpiece 5. A pictorial image 6 of the workpiece 5 is displayed on the data entry means 1. When the operator 4 finds a defect 7 in the workpiece 5, he (or she) touches (or presses) one of indicia 8, related to a position of the defect 7 in the workpiece 5, and one of indicia 9 related to a type-of-error.

It will be appreciated that there are a plurality of possible defect positions in the workpiece, and that there are different types-of-errors which may occur in the workpiece. Availability of a plurality of indicia 8 and a plurality of indicia 9 allow the operator 4 to register significant combinations of information, thereby covering practically any defect situation by a simple pushing (or touching) of the position indicia 8 in combination with the type-of-error indicia 9.

Being entered, the data are processed by a processing means 10. The processing means 10 includes a computer 11 operated by software 12. A central computer 13 can be used, if desired. The computer 11 can be any commonly available personal computer ("PC"), preferably with a computer display 14, to perform analytical and data transmissions functions and to display the collected data.

The software 12 executes four basic functions: (1) displays the data transmitted from the data entry means 1 in a matrix format on the computer display 14 as it is received; (2) provides a simple histogram of accumulated defects for all positions and the histogram for all types-of-errors; (3) writes the data in a file for transfer to other programs and/or computers or writes the data directly to another computer; and (4), if a printer is connected, prints the entire defect matrix as well as the ten (10) most numerous defects arranged sequentially. In addition, the software 12 may allow the user to configure multiple data entry means 1 in a different communication network, as well as provide meaningful labels to the various locations and types-of-errors related to defect 7.

Each data entry means 1 also may be implemented with a display 15, which may be a stand-alone display or may be integral with the data entry means 1.

By having the knowledge of position and nature of the defect 7, the quality engineer can determine wherein the process and by what means the defect 7 was created. Rapidly, corrective action can take place, and the effects can be learned in a real-time fashion as the data can be accessed anytime during or after the production process, and the information is available immediately on the computer display 14.

Figure 4:
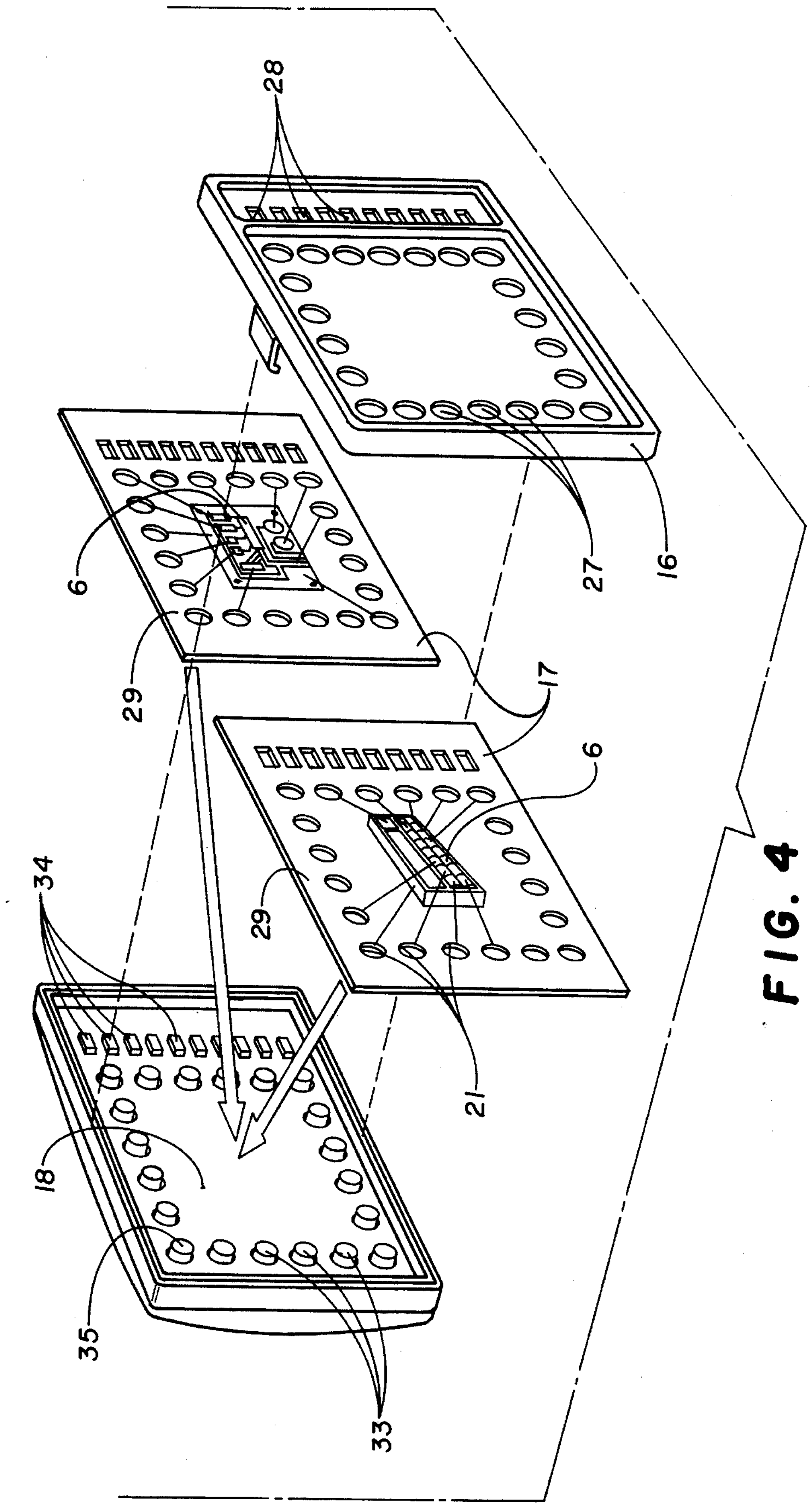
FIG. 4 is a perspective exploded view of the data entry means including a plurality of sketch boards, each sketch board for a particular workpiece.

The data entry means 1, as shown in FIGS. 2, 3 and 4, is a device for automatic entry of data, and actually provides a structural electronic alternative to a tally sheet.

Figure 5:
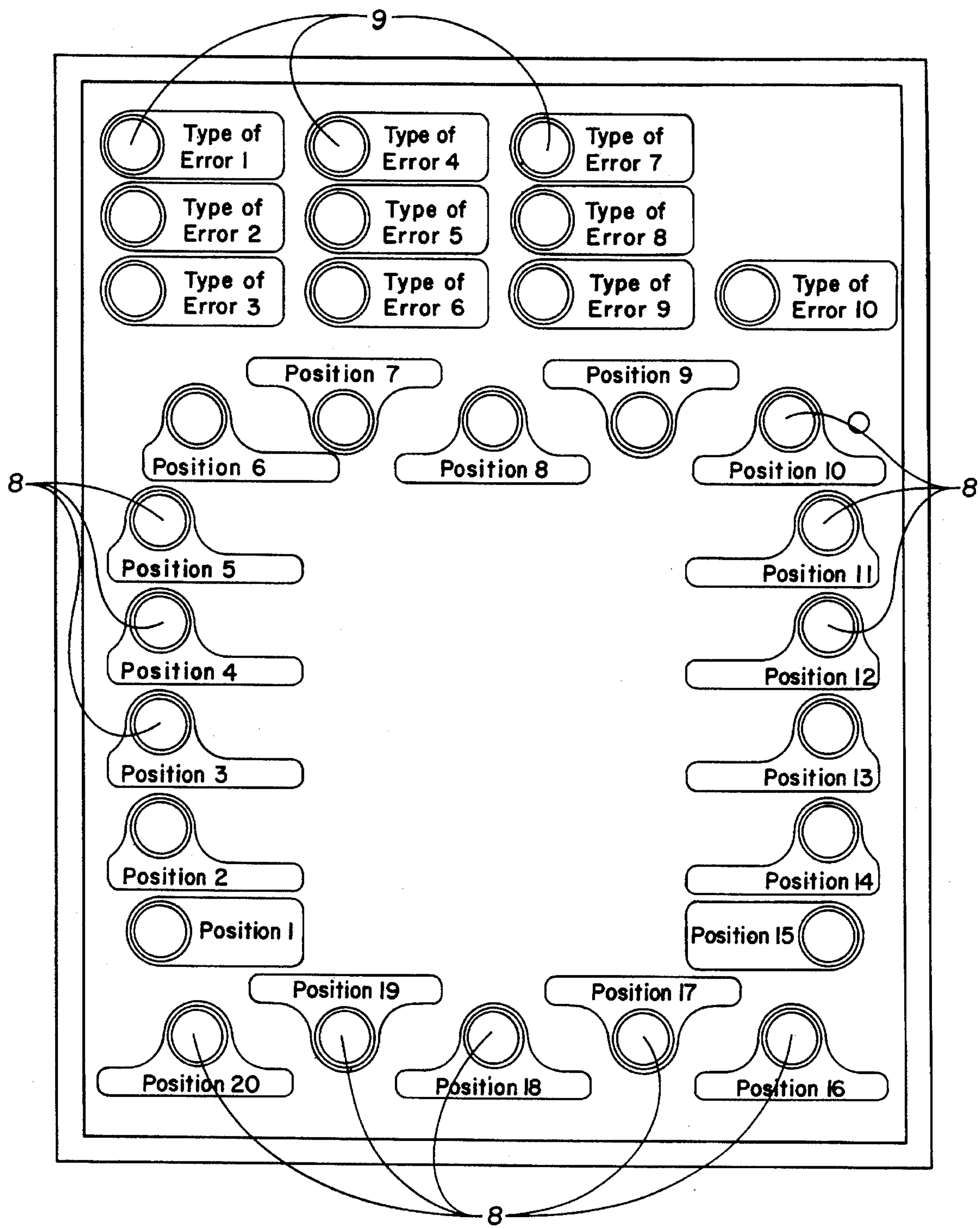
FIGS. 5 and 6 are top plan views of two alternative dispositions of indicia, respectively.
Figure 6:
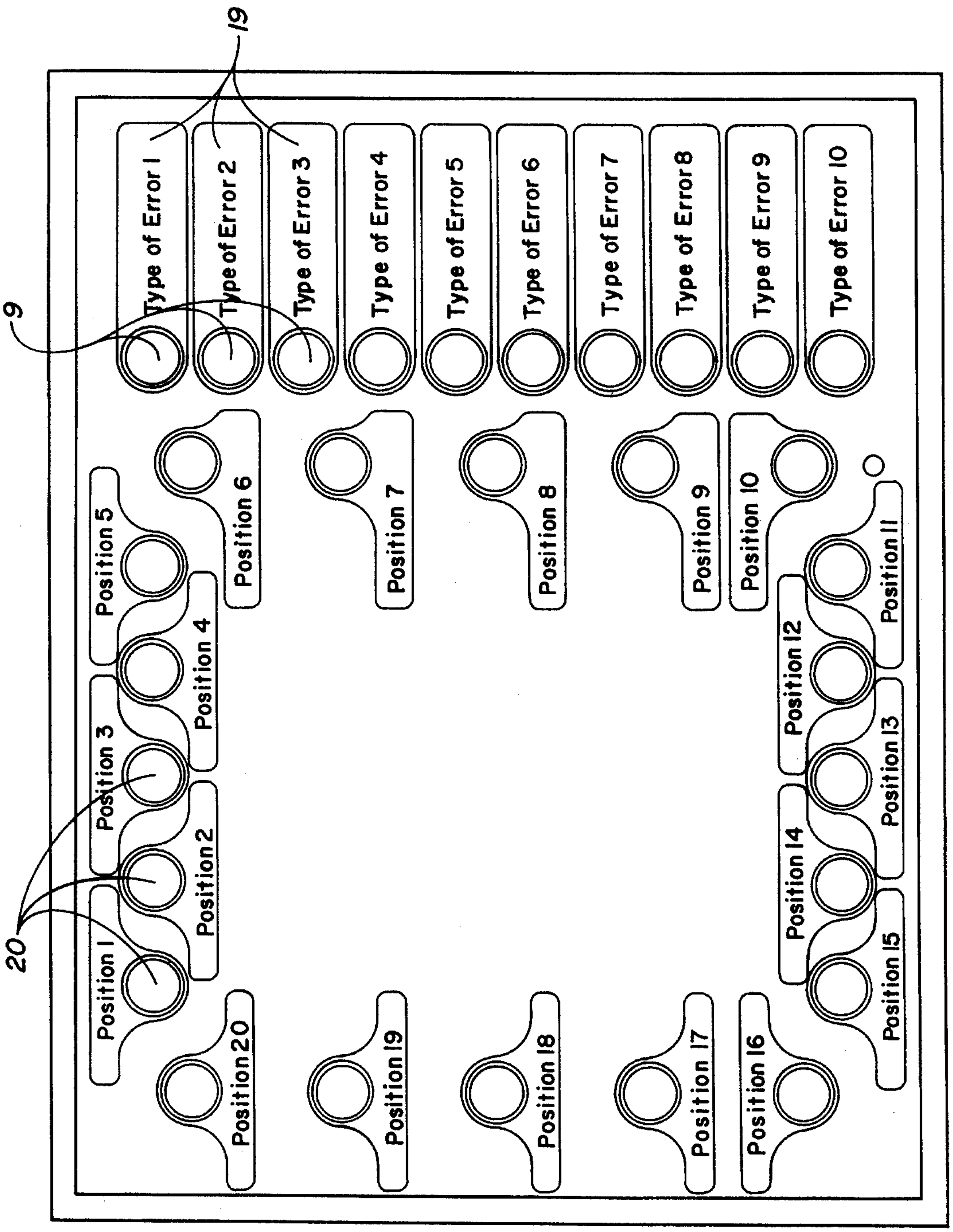

In one embodiment, the data entry means 1 is an approximate 12"×18" tablet, which consists of a front screen 16, a sketch board 17 disposed behind the front screen 16 and a key board 18 behind the sketch board 17. The data entry means 1 provides multiple position indicia 8 (in the present embodiment, twenty) for identification of locations of the defects in the workpiece 5, and multiple type-of-error indicia 9 (in the present embodiment, ten). The indicia 8, 9 may be implemented as buttons to be pressed or as tactile membranes to be touched. Their disposition on the front screen 16 can be different, for example, as shown in FIGS. 5 and 6. Also, the indicia 8 can be disposed directly on the pictorial image 6.

The sketch board 17 is a pre-printed die cut paper sheet. On this sheet a manufacturing manager will dispose a pictorial image 6 of the workpiece 5 or a portion thereof, and also a description of the workpiece 5 with illustrations, photos, etc. In addition, each type-of-error possible for the workpiece 5 can be described in the numbered column 19 close to the right side 20 of the sketch board 17. The sketch board 17 has a plurality of apertures 21 corresponding to position indicia 8 and a plurality of apertures 22 corresponding to type-of-error indicia 9. Each aperture 21 can be connected by a reference line 23 to the area 24 of possible location of the defect 7. The apertures 21 are disposed along the perimeter 25 of the sketch board 17. However, if the indicia 8 are disposed directly on the pictorial image 6, each of indicia 8 on the respective area 24, the apertures 21 will be disposed in precise registration with said indicia 8.

The front screen 16 has a transparent portion 26, through which the sketch board with all sketched thereon information is displayed. The front screen 16 has also a plurality of apertures 27 and 28, respective to the apertures 21 and 22. Apertures 21, 27 and position indicia 8 are in precise registration with each other, as well as the apertures 22, 28 and type-of-error indicia 9.

The data entry means 1 may include a plurality of sketch boards 17, each for a particular workpiece 5. The sketch boards 17 will accompany the data entry means 1 in a tear-off pad arrangement 29 (FIG. 4) to be removably interchangeable. Each sketch board 17 will include a detailed pictorial description including the pictorial image 6 of each particular workpieces 5, and also a numbered column of types-of-errors possible for this particular workpiece 5.

Supporting the die-cut sketch board 17 is some sort of light-weight, inexpensive backing support board 30, which provides apertures 31 corresponding to apertures 21, 27 and indicia 8, and apertures 32 corresponding to apertures 22, 28 and indicia 9, and being in precise registration with the corresponding apertures and the indicia.

The keyboard 18 is disposed behind the support board 30 and contains 20 position keys 33 and 10 type-of-error keys 34. Keys 33 and 34 each includes a contact portion 35, such that the contact portions 35 of keys 33 are protruded through the apertures 21, 27 31, and the contact portions 35 of the keys 34 are protruded through the apertures 22, 28, 36, respectively.

The contact portions 35 may be implemented as buttons to be pressed, or as a tactile membranes to be touched by fingers or by a probe, thus activating the respective keys 33, 34. It will be appreciated by those skilled in the art that many other implementations are also allowable, for example, the keys 33, 34 can be activated by laser means, or by another means providing a focused beam.

The keyboard 18 may be a single Printed Circuit Board (PCB) 36, or a combination of PCBs hard-wired together. The PCB 36 includes an electronic circuitry 37.

Assembled together, the front screen 16, the sketch board 17, the keyboard 18 and the support board 30 are fastened together by means well known by those skilled in the art, such that to provide protrusion of each contact members 35 through the respective apertures.

Figure 7:
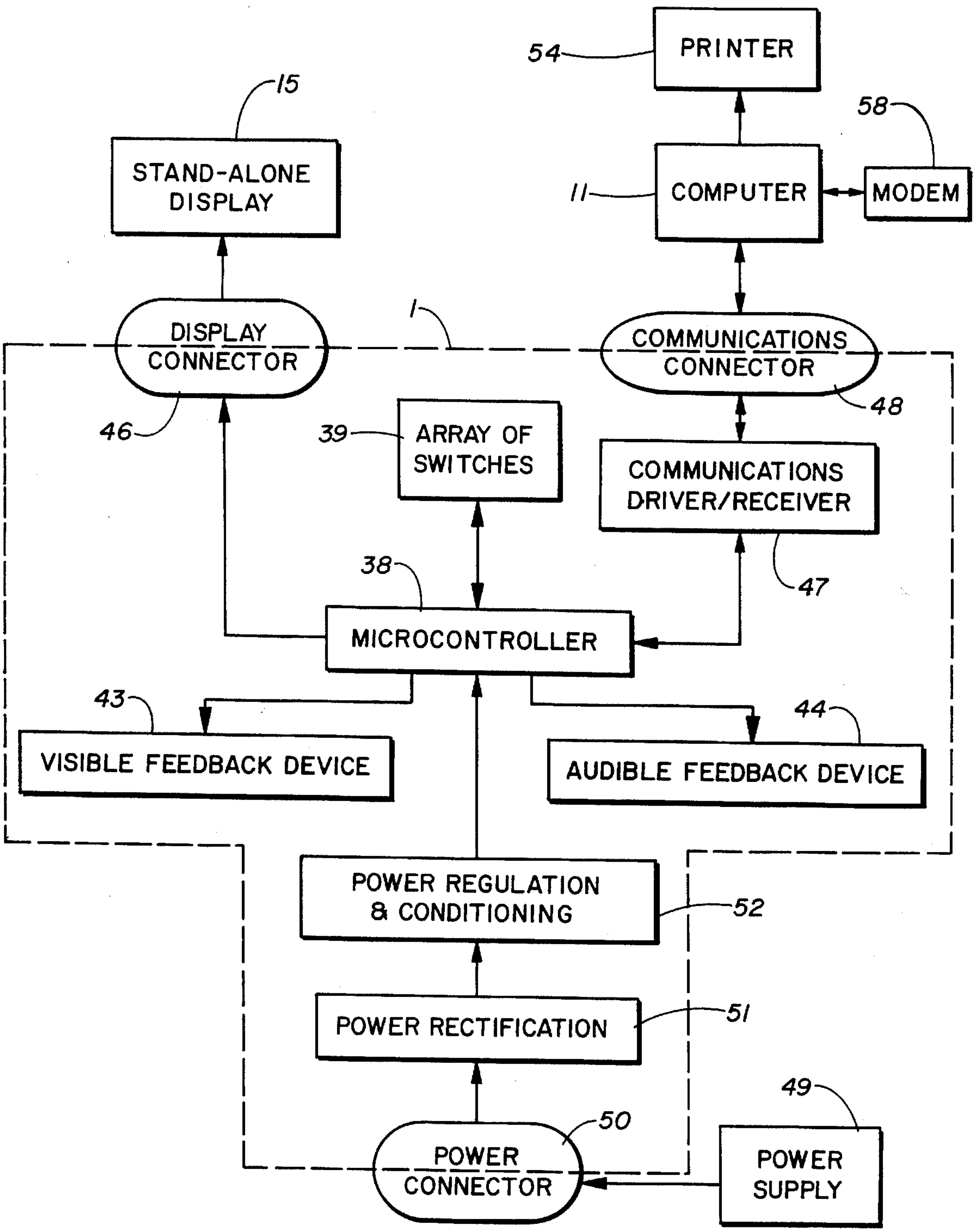
FIG. 7 is a schematic block diagram of the present system.
Figure 8:
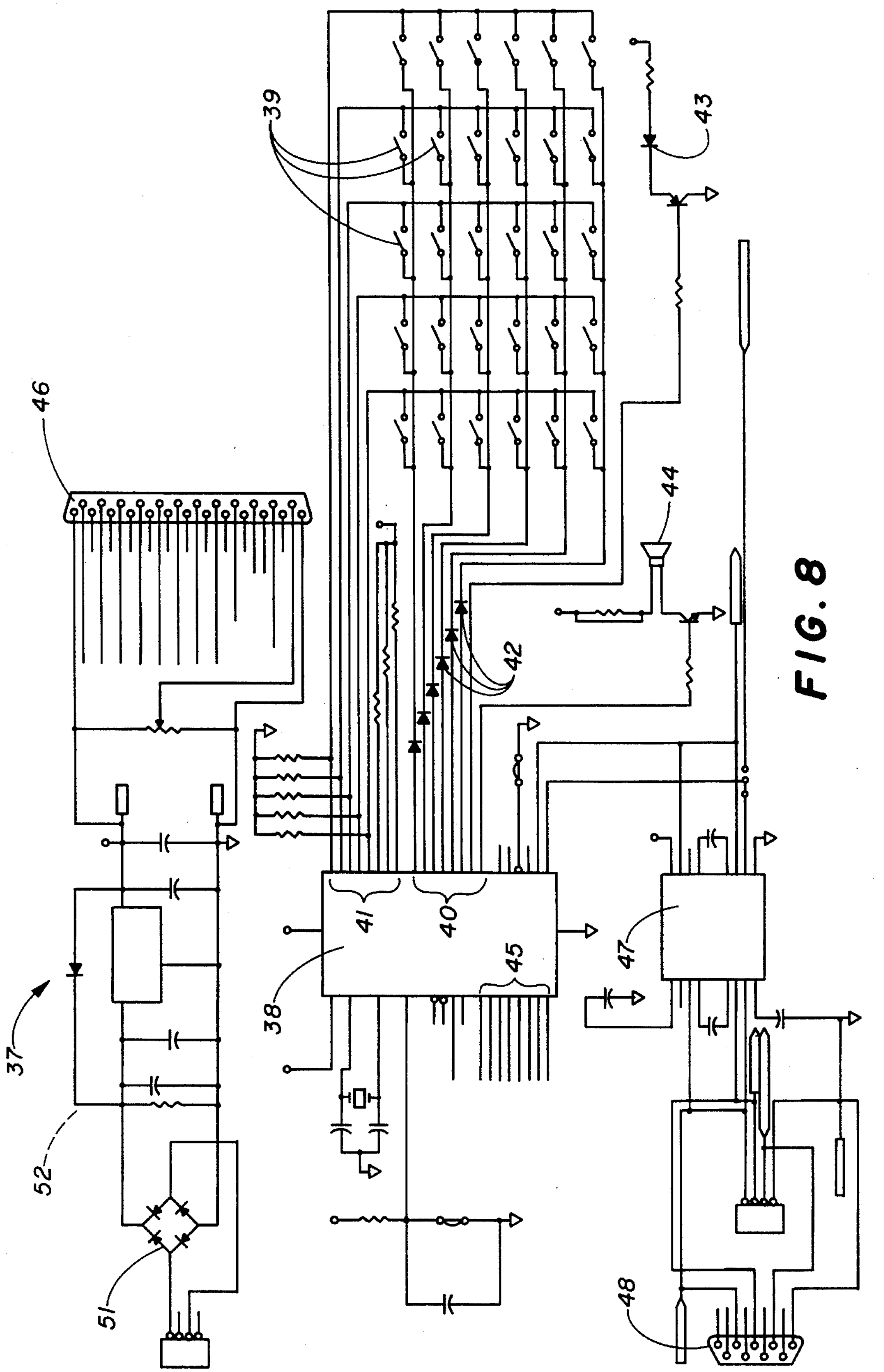
FIG. 8 is an electrical wiring diagram of the circuit disposed on a PCB within the data entry means.
Figure 9A:
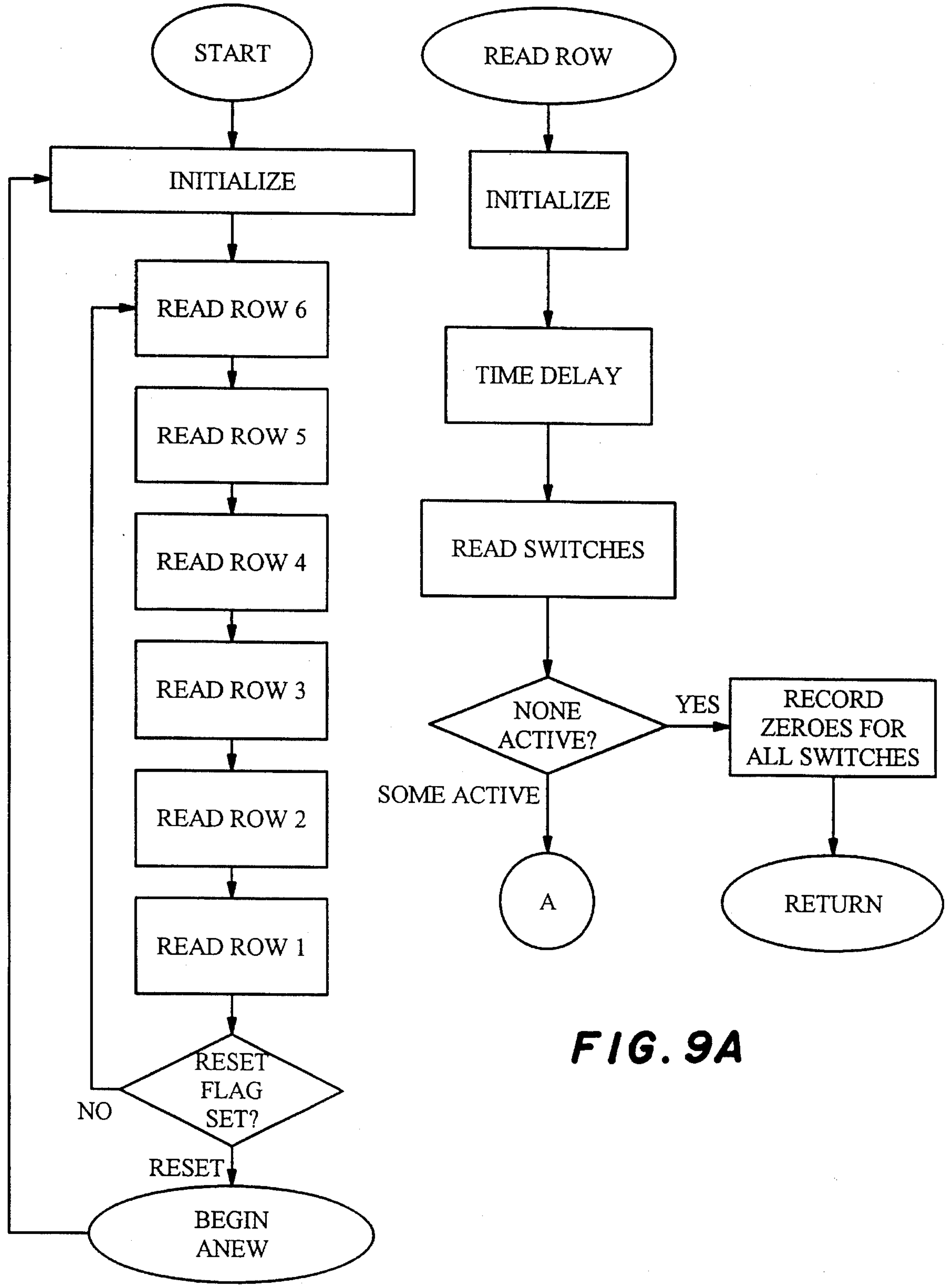
FIGS. 9A–9I are flowcharts of the PADD program.
Figure 9B:
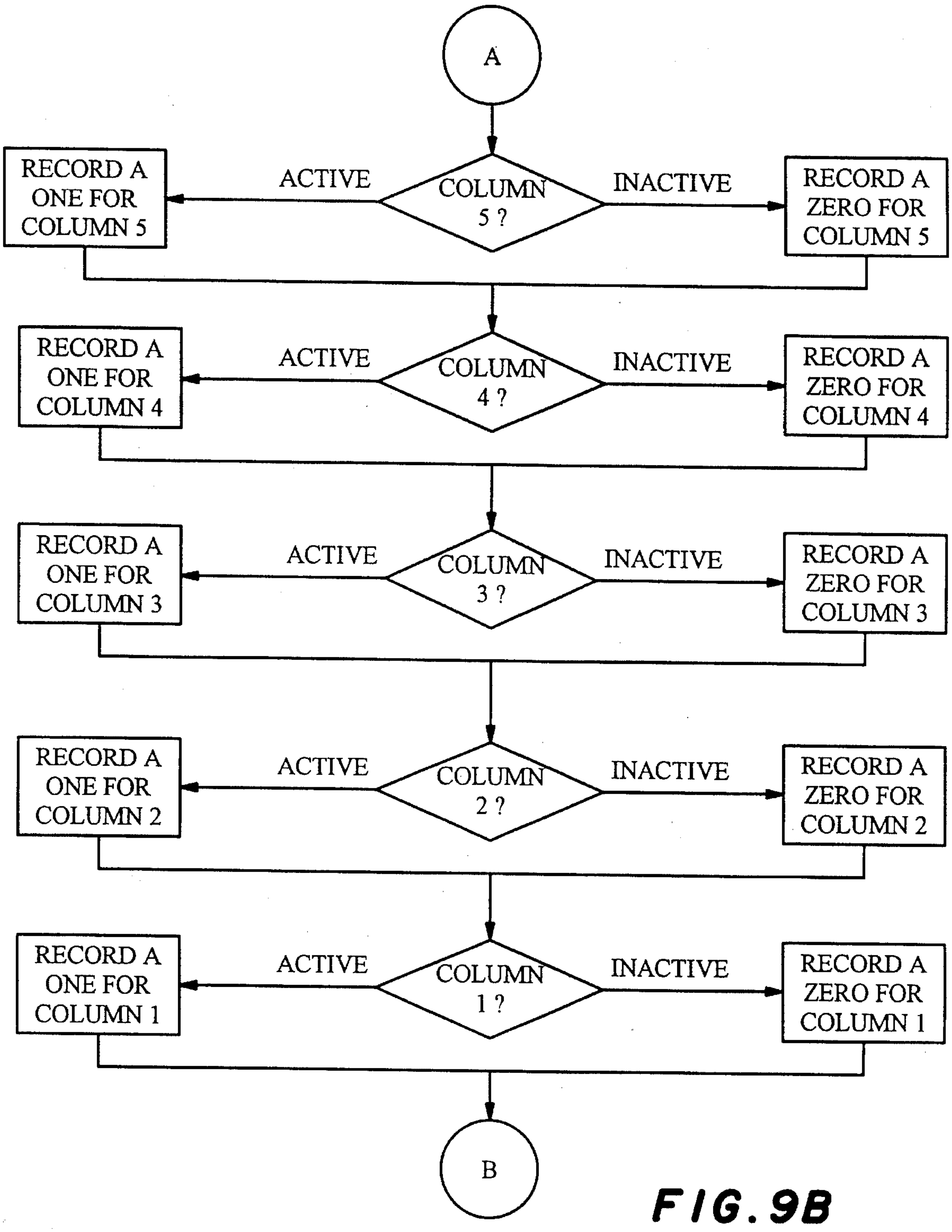
Figure 9C:
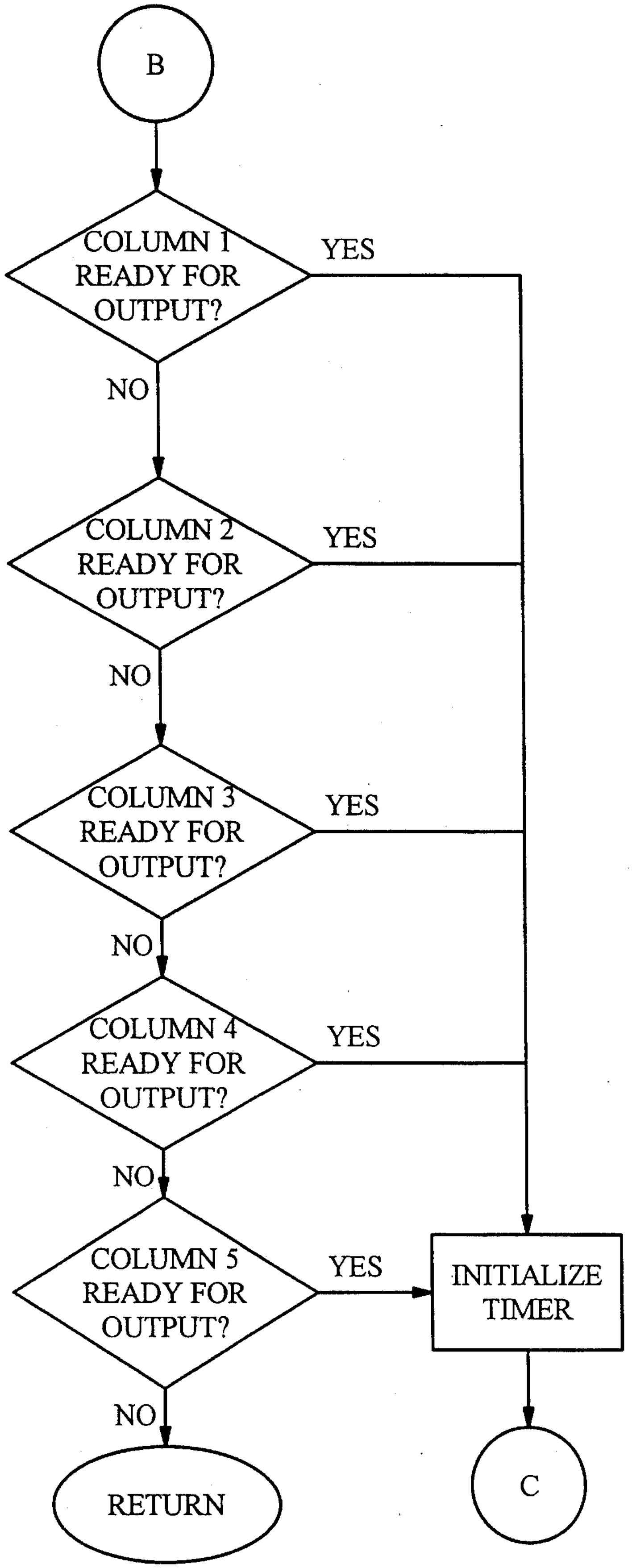
Figure 9D:
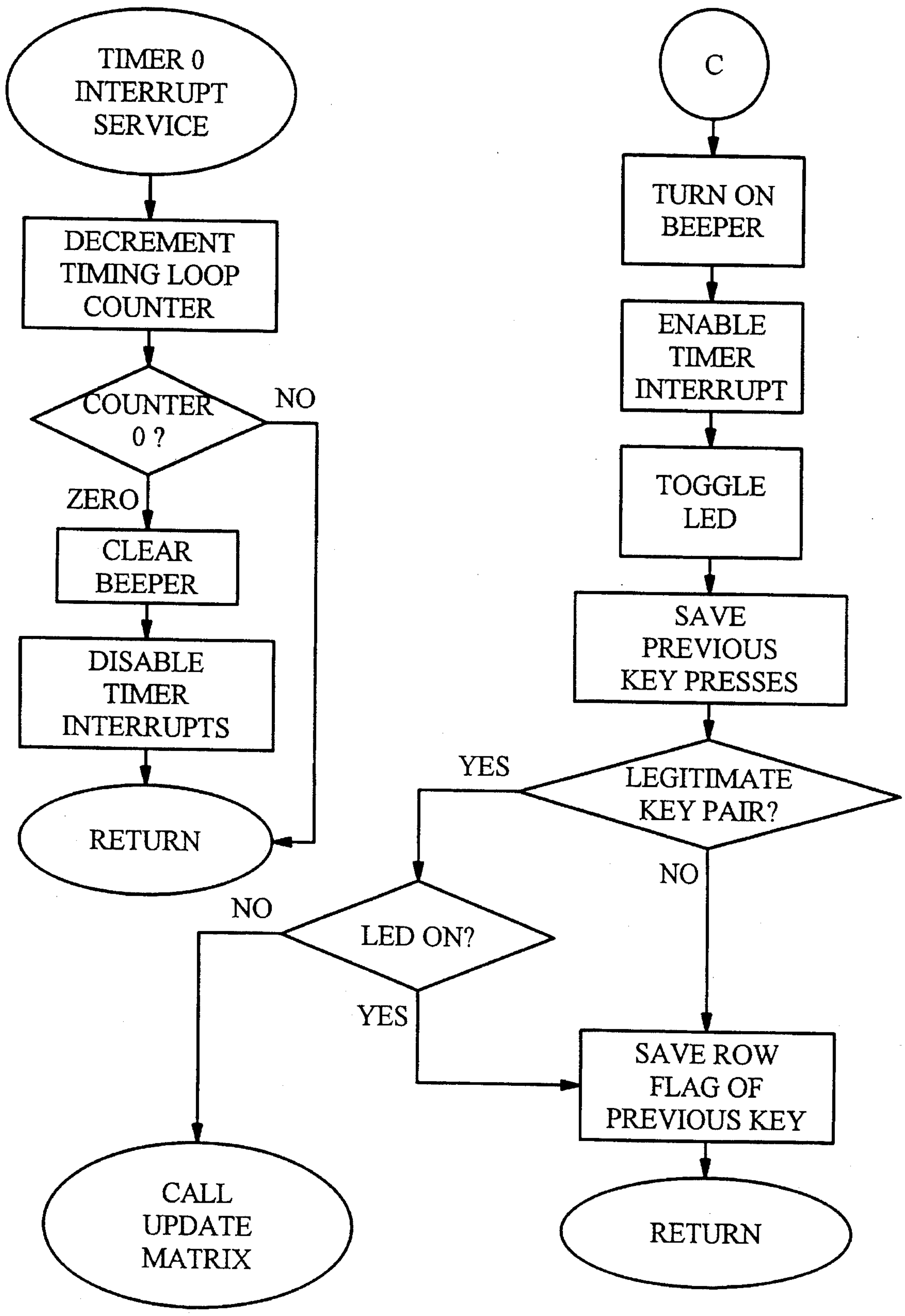
Figure 9E:
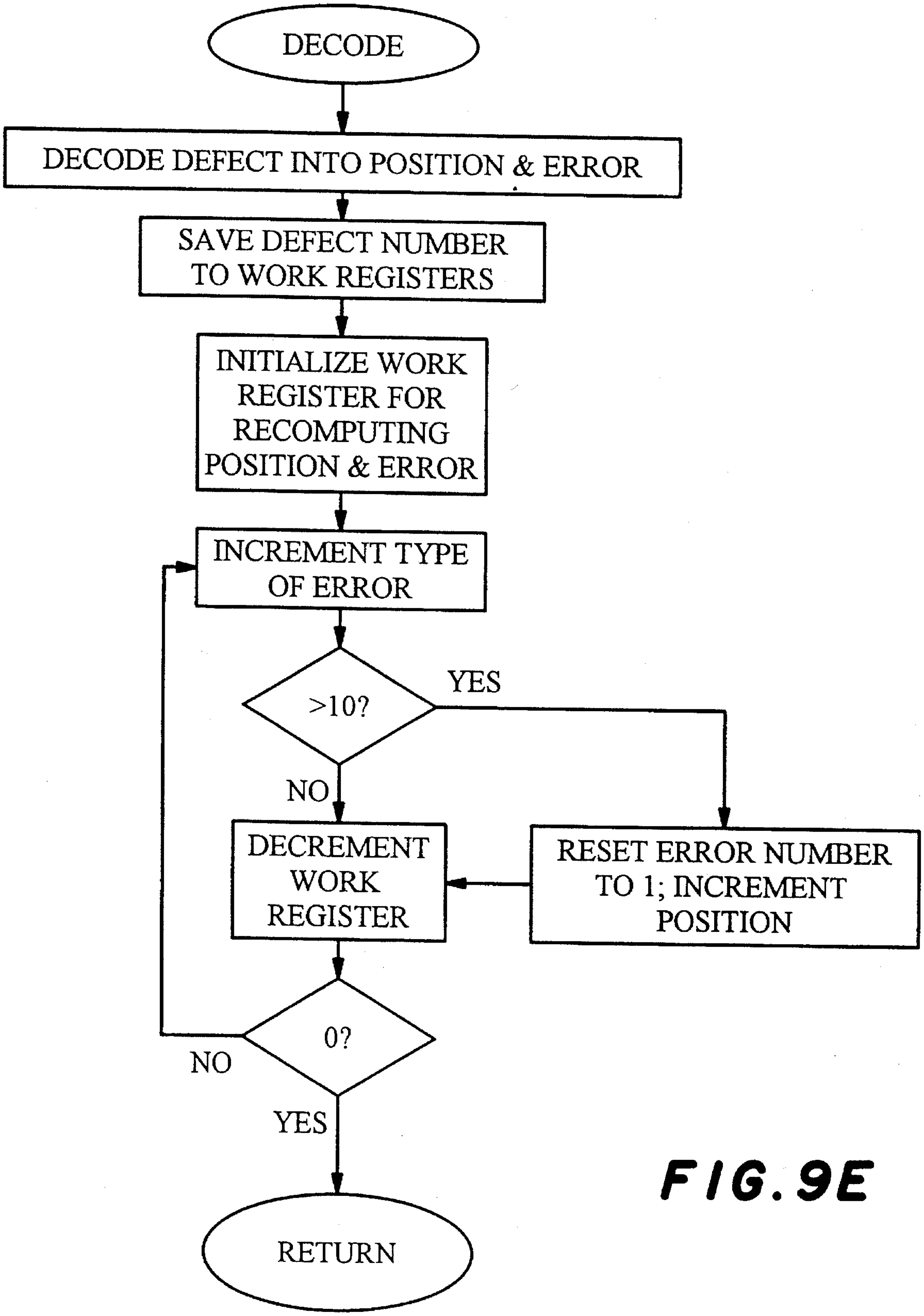
Figure 9F:
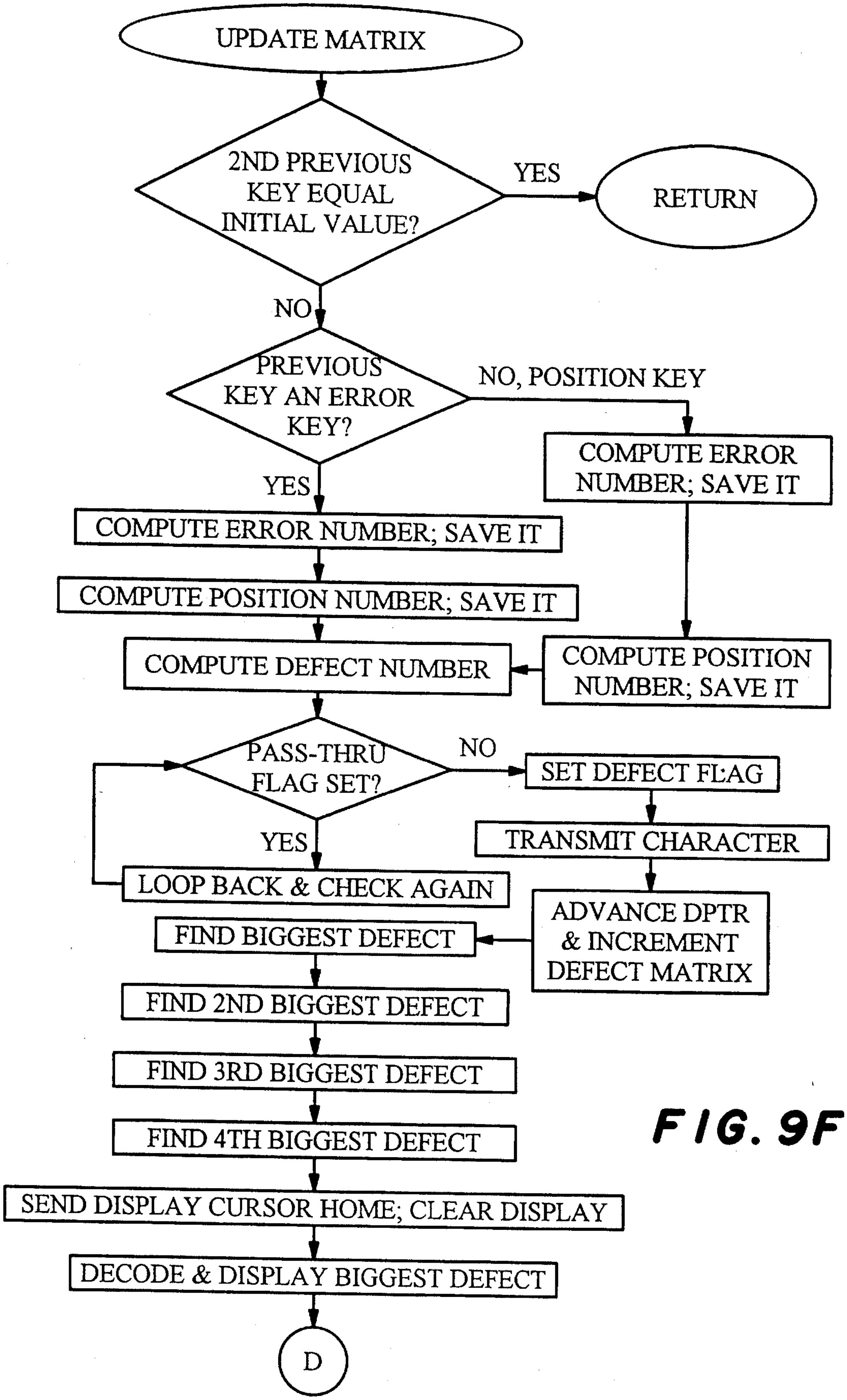
Figure 9G:
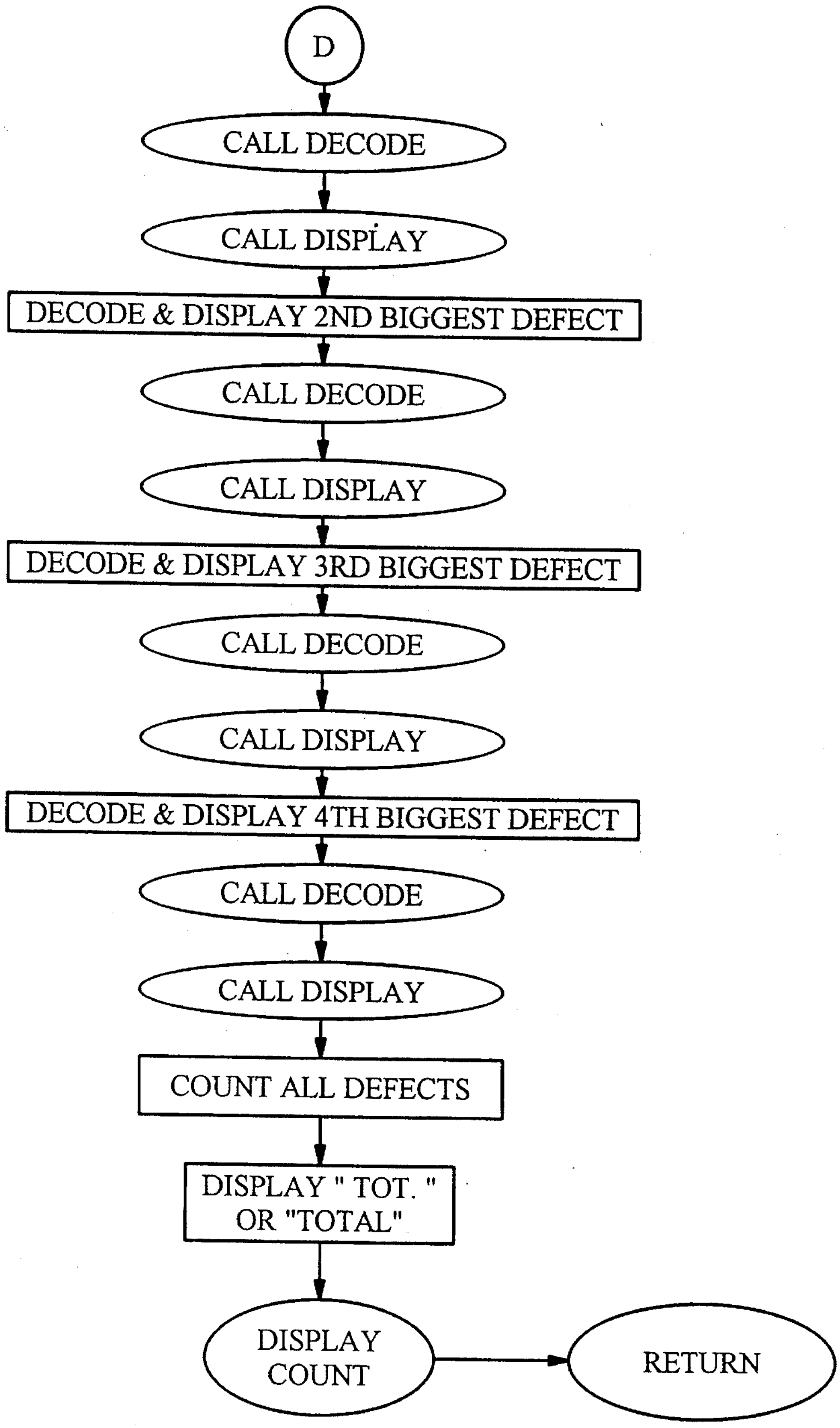
Figure 9H:
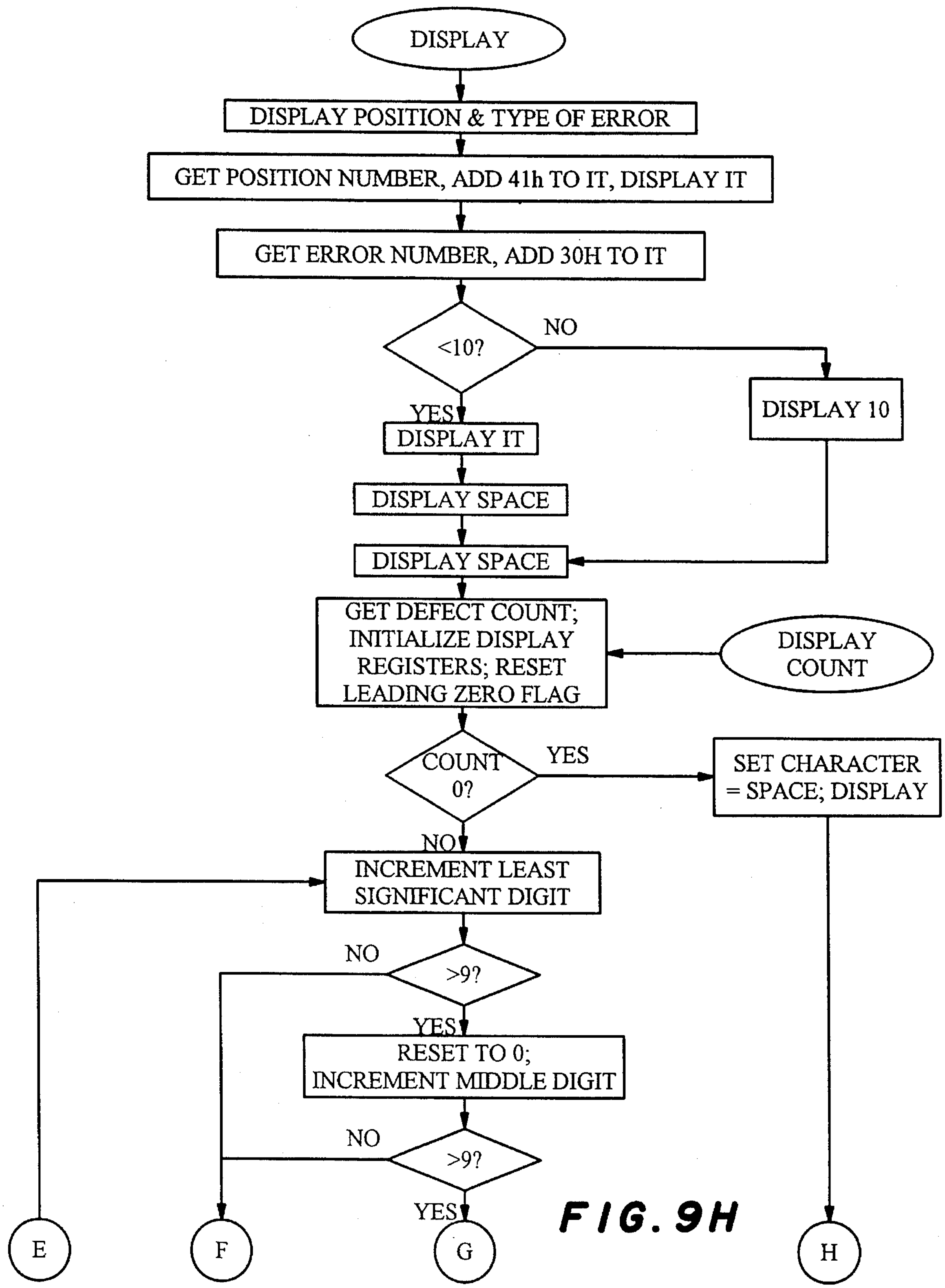
Figure 9I:
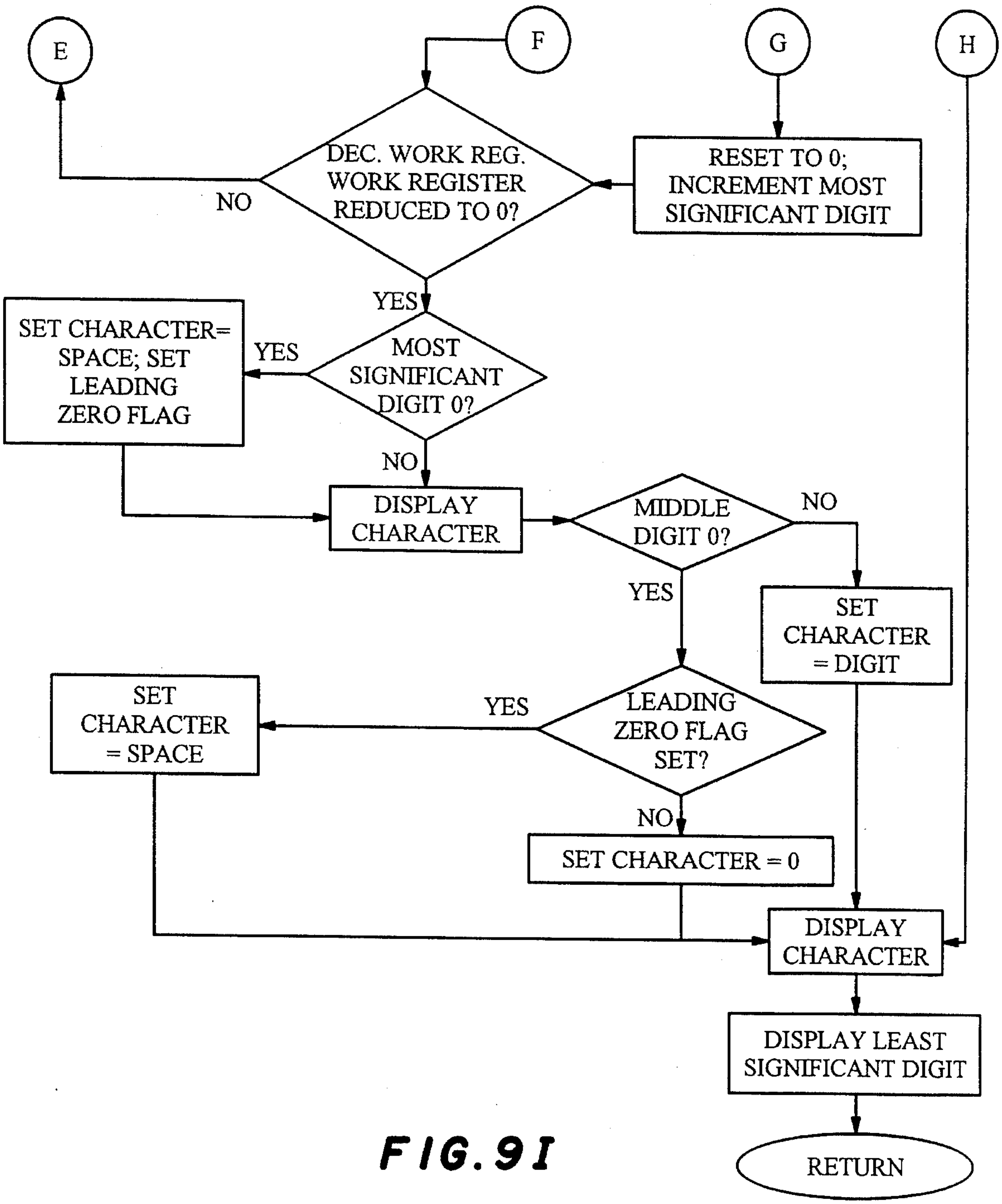
Figure 9J:
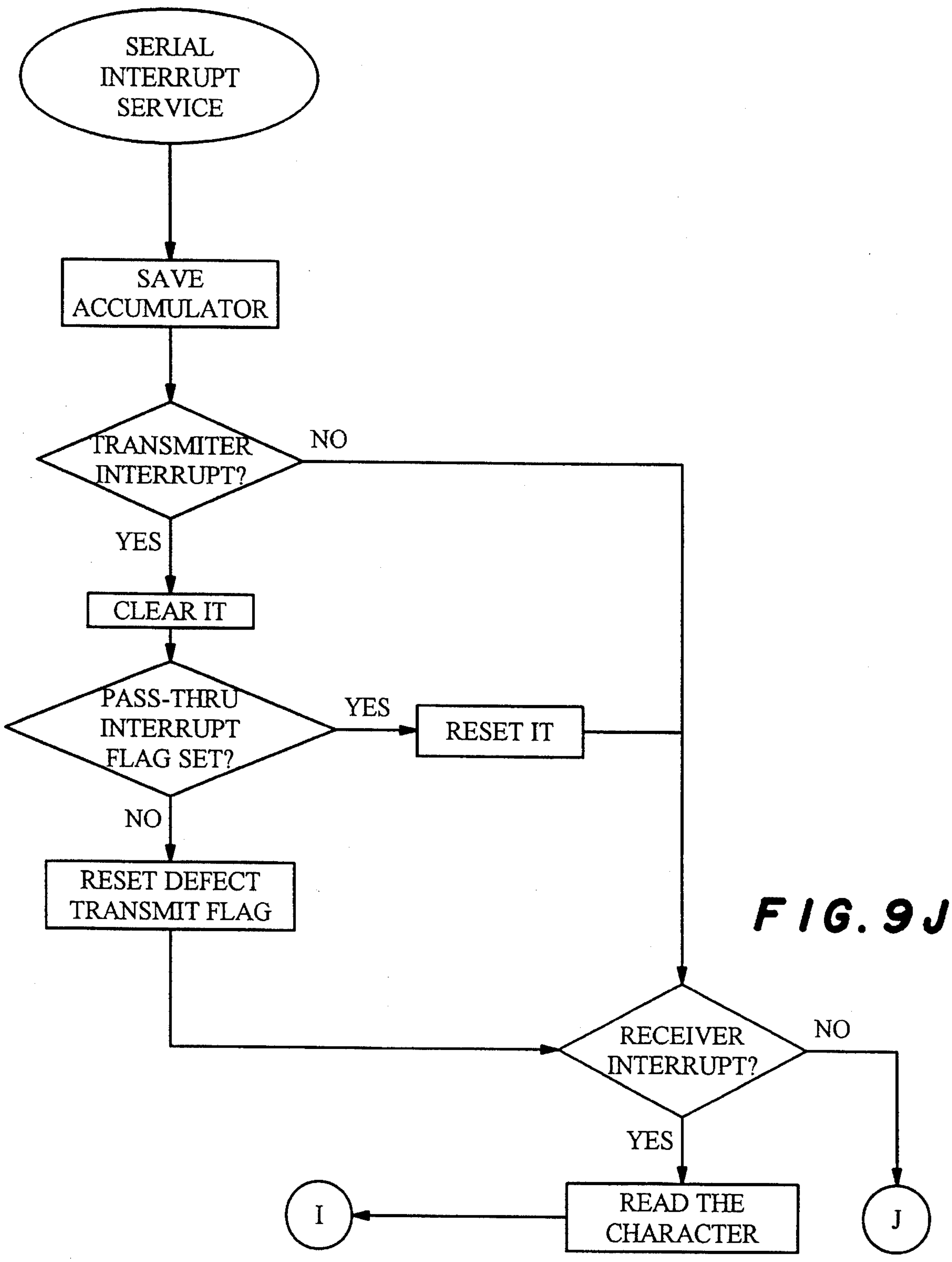
FIGS. 9J–9K are flowcharts of interrupt service used in PADD program.
Figure 9K:
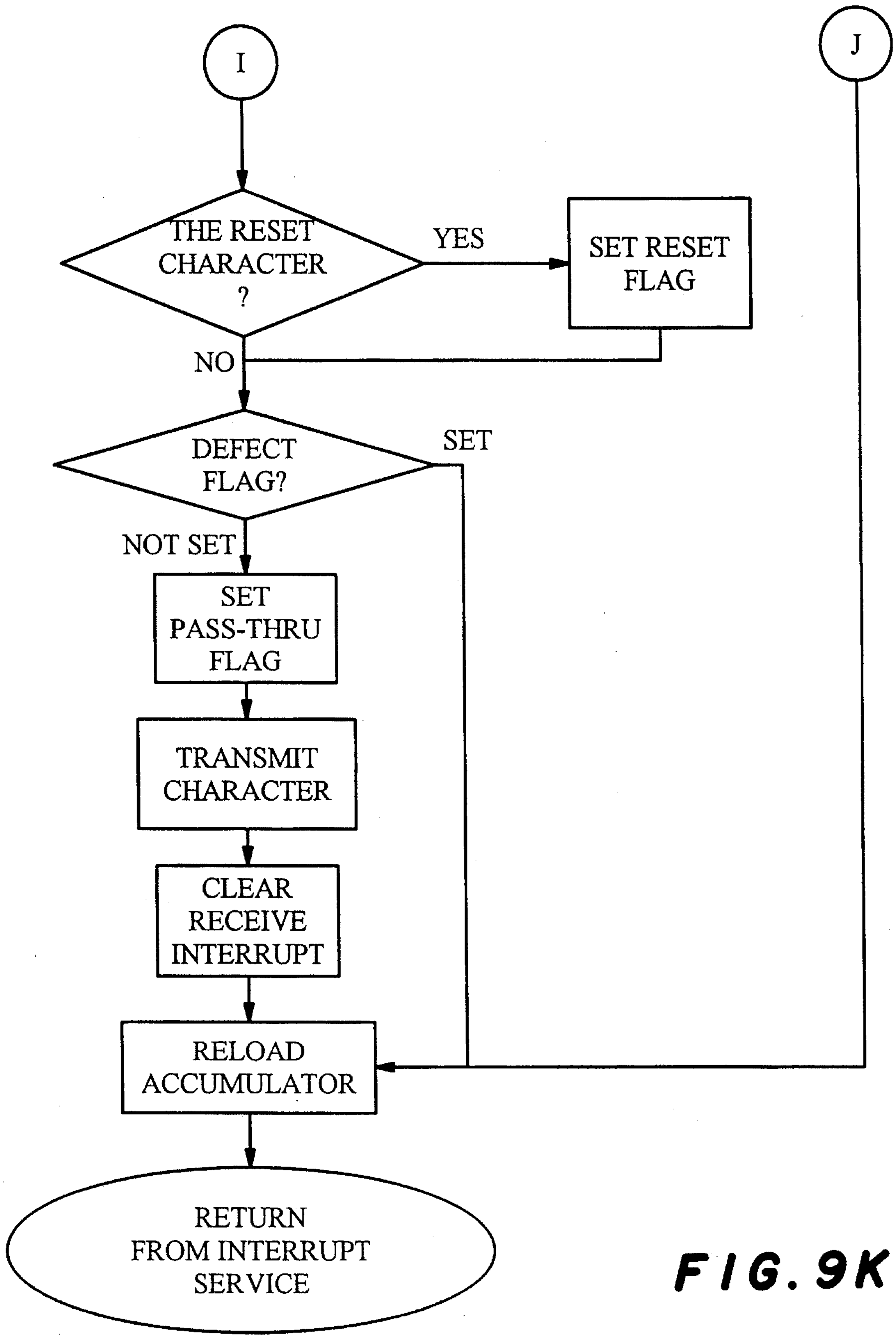

Referring to FIGS. 7, 8 the electronic circuitry 37, which implements the data entry means 1, includes a microcontroller 38, disposed on the PCB 36, and central to the operation of the system. The micro-controller 38 is connected directly to the array of switches 39 by means of rows and columns of switches 39 connected to two 8-bit parallel ports 40, 41 of the microcontroller 38, respectively. Switches 39 correspond to respective keys 33, 34 and are energized when the respective keys 33, 34 are activated. Port 40 drives 6 rows of the switches 39 through steering diodes 42. The remaining two pins of the port 40 are used for the light emitting diode (LED) 43, which serves as a visual feed-back means, and for the audible feed-back means 44. The LED 43 lights when the first key (33 or 34) of the possible pair of keys 33 and 34, is pressed, touched or somehow else is activated. The LED 43 extinguishes when the second key of this pair of keys (33 and 34) is activated.

The audible means 44 beeps a long beep for the defect position key 33, and a short beep for the defect type-of-error key 34. The LED 43 alerts the operator 4 that the first key of the pair of keys (33, 34) has been activated, and that the second key needs to be activated to complete the defect 7 indication. The audible beep is supplemental feedback that informs the operator 4 that his (or her) intentions have been registered.

The operator must press both a defect position key 33 and a defect type-of-error key 34 to register one defect 7. The sequence (position-then-type-of-error or type-of-error-then-position) is unimportant, although the operator is encouraged to establish a habit of one sequence or the other.

If the operator presses a key (33 or 34) incorrectly for the first key, there is a way to correct it. Simply press the same first key or the correct key (of the same kind, i.e. position or type-of-error) to clear the LED 43. Then press the correct key of the same kind and the LED 43 will illuminate again.

To correct an error in the second key, the operator must report the error to the production line manager, and the manager will remove that incorrect defect report from the tally displayed on the computer 11.

Port 41 is used to read 5 columns of switches 39. The remaining three pins are used to control the stand-alone display 15. The microcontroller 38 delivers data to the display 15 through port 45. All communication to the stand-alone display 15 are accomplished via the display connector 46. Any technology of display 15 can be used; however, for this particular system two types, a vacuum fluorescent display and a liquid crystal display, have been chosen. One signal (DB25-3) is used by the microcontroller 38 to distinguish between these two types of displays 15. This signal is hard-wired to either ground or +5 Volts to indicate the type of the display 15.

The microcontroller 38 uses the driver/receiver 47 to communicate with the computer 11, and, particularly, to deliver entered data to the computer 11. The driver/receiver 47 can be any means of communication; however, in the this implementation is either RS-232C or Frequency Shift Keying ("FSK") for the PCB 36. The communication of the microcontroller passes through a communication connector 48, preferably a DB-9 connector.

The electronic circuitry 37 on the PCB 36 is fed by a power supply 49. Raw power enters the PCB 36 by means of a power connector 50. It is then rectified by a bridge rectifier 51, and conditioned and regulated by power regulating and conditioning means 52.

The embodiments of the invention, described herein by figures and by flowcharts, record defects as the coincidence of two different attributes corresponding to two different kinds of indicia. In this case, the attribute and indicia of the first kind represent the defect position on the workpiece. The attribute and indicia of the second kind represent the defect type-of-error on the workpiece. The data being recorded is a defect specified by a position and a type-of-error. However, it could be any kind of data, not necessarily a defect, specified by any number of attributes, not necessarily two. Furthermore, a given attribute may have any number of instances, and may relate to any object.

In the examples described herein, the instances of the attribute and indicia of the first kind (indicia 8) number twenty, and have the following names: FADE/BASS/TREBLE region, BAL/VOL/SEL region, SEEK button, AM/FM button, upper central region, upper right region, 1 button, 2 button, 3 button, 4 button, 5 button, lower right region, lower central region, SET button, lower left region, BASS/TREBLE graphic & plastic, FADE graphic & plastic, VOL/POWER graphic, SEL/PUSH graphic, and BAL/L/R graphic.

The instances of the attribute and indicia of the second kind (indicia 9) number ten, and have the following names: trash in paint, bad graphic, broken pin/USDB, scratch, off location graphic, short, light leak, button failure, broken leg/bad optic, and poor heat stake/long gate. In this case, the third instance of the indicia of the second kind, broken pin/USDB, combines two types-of-errors, namely a broken pin and an up-side-down button, that can never occur together in the same position, being mutually exclusive so far as the attribute and indicia of the first kind is concerned. Thus, in combination with the attribute and indicia of the first kind, namely the position (indicia 8), the type-of-error can be uniquely determined. This method of combining mutually exclusive instances is valuable when more instances exist than buttons are available on the data entry means. Other occurrences of mutually exclusive instances, in this example, are broken leg/bad optic and poor heat stake/long gate.

The three embodiments of the invention serve different requirements. The first requirement is that of a single data entry means 1 which accumulates data throughout an entire shift or throughout an entire day. At the end of that shift, or day, a computer 11 is connected, and the data is uploaded from the data entry means 1 to the computer 11. The data can be examined, printed, analyzed, and plotted. Then the computer 11 is turned-off (to await the conclusion of another day or another shift), or perhaps taken to another production line for the uploading of more data of a different type (this requires either that the personal computer program be restarted or that the RESET PAD button on the computer screen be activated to clear the defect matrix), or taken to another production line for the uploading of more data of the same (in which case this new data is accumulated onto the existing defect matrix). The entire process begins again at the commencement of the next shift or next day. Data printing, analysis and plotting are accomplished, in this case, with the spreadsheet PRTDSCHR.WQ2, designed to operate with the commercial spreadsheet package Quattro® Pro (registered trademark of Borland International, Inc.).

The first embodiment uses the program PAD8 in the microcontroller, and either MATRIXP or MATRIXNP in the personal computer (for computers connected to printers or not connected to printers, respectively).

The second requirement is that of multiple data entry means 1 continuously connected to a computer 11. The computer 11 is used to continuously display defect data in real-time. At the end of a shift, the OUTPUT button on the computer display 14 is activated with the mouse (or alternatively by the computer keyboard 55), and the data files are written. Then those files are either transferred to another computer for off-line processing so as not to interrupt or delay the next shift, or if processing is speedy then processing can be accomplished immediately after the files are written and just before the next shift begins. This processing is, as before, data printing, analysis and plotting with the spreadsheet PRTDSCHR.WQ2, designed to operate with the commercial spreadsheet package Quattro® Pro.

This second embodiment uses the program PADD in the microcontroller 38, and either MULTIP or MULTINP in the personal computer 11 (for computers connected to printers or not connected to printers, respectively).

The third embodiment of the invention uses a display 15 (stand-alone or integral), and never needs to be connected to a computer 11. In this case, the display 15 can be any of several types, including, but not limited to, Liquid Crystal Display (LCD), Vacuum Fluorescent (V/F) display, Field Emission Device display, Light Emitting Diode display, Cathode Ray Tube display, and Plasma Discharge display. Program PADD incorporates code to sense one of two particular displays (one is an LCD; the other is a V/F display), determine the four defects with the greatest counts, and display those four most numerous defects. Realizations of the invention with stand-alone Or integral display 15 need not make use of data processing.

A fourth embodiment, not described by flowcharts or figures herein, would incorporate the features of PAD8 and PADD into a single microcontroller program, and incorporate the features of MATRIXP and MULTIP, or MATRIXNP and MULTINP, into a single personal computer program. This personal computer program would appear much the same as MULTIP or MULTINP, but would include an additional button on the same screen that includes the RESET PAD button. This button would be named UPLOAD, and would cause a command to be sent from the computer 11 to each of the data entry means 1. This command would cause each data entry means 1 to send its defect data back to the computer 11.

Thus, the battery back-up feature of the microcontroller 38 would be put to good use, allowing recovery from a manufacturing plant-wide power failure. In this case, the computer operator would, after initiation of the personal computer program, activate the SETUP button to display the screen that exhibits the RESET PAD and UPLOAD buttons. Then they would activate the UPLOAD button. Then all defect data from all the data entry means 1 connected to the computer 11 would be accumulated in the defect matrix on the DefectMatrix screen, effecting a complete recovery from the power failure.

The procedure to begin a new shift would be slightly different. Upon initiating the personal computer program, the operator would have to activate the RESET PAD button in order to clear the defect matrix in the memory of the microcontroller. Otherwise, in the event of a future UPLOAD, the defect matrix would be contaminated by data from earlier shifts.

Data processing is the same as for the first two embodiments described above.

The microcontroller 38 uses the PADD program inside the data entry means 1 to communicate with the computer 11 and the computer display 14 continually, and also to deliver data to the display 15 (stand-alone or integral) continually. Referring to FIGS. 9A–9K and Appendix A, PADD consists of an outer loop that begins by initializing pertinent registers, variables, and workspaces. Then each row of the switches 39 is interrogated. After the last row is interrogated, determination is made of the state of a flag called the reset flag. If the reset flag is set, the process begins again with initialization. Otherwise, if the reset flag is not set, the process begins again with the reading of the next row of switches 39.

The subroutine, which reads a row of switches 39, begins by initializing necessary variables, registers, and workspaces. Next, a time delay is introduced to slow the rate of scan of the array of switches 39. Then the switches 39 within the given row are read.

A determination is made of whether any switch 39 is active. If none is active, then a sequence of zeroes are written into memory for each column of this row. If some column is active, then the program proceeds to determine which column is active. As each column is examined, a zero or a one is written into memory for that column.

Then the recent history of column one is examined for a condition that indicates a valid key (33, 34) press. If column one has a valid key (33, 34) press, then the program initializes timer 0. Otherwise, the recent history of column two is examined for a valid key ( 33, 34 ) press, and so forth through column 5.

If no valid key (33, 34) presses are detected, then the subroutine returns. If a valid key (33, 34) press is detected, then timer 0 is initialized, the timing loop counter is initialized, and a determination is made of the necessity of a double-length beep. If a double-length beep is required (because the key pressed was a defect position key 33) then the timing loop counter is doubled.

Next, the beeper is turned on. Then timer 0 interrupts are enabled. The LED 43 is toggled. The previous key pressed is stored in memory as the "2nd previous key". The present key press is stored as the "previous key".

Next, a determination is made of whether the "previous key" and the "2nd previous key" constitute a legitimate key press pair, i.e. a combination of a defect position key 33 and a defect type-of-error key 34 or a combination of a defect type-of-error key 34 and a defect position key 33. If the pair is legitimate, then a determination is made of the state of the LED 43. If the LED 43 is not turned on, then the program goes on to update the defect matrix in memory. If the LED 43 is off, the program saves the row flag of the previous key, and returns. If the pair of key (33, 34) presses is not legitimate, the program saves the row flag of the previous key, and returns. The row flag is set in one state for defect type-of-error keys 34, and in another state for defect position keys 33.

The update of the defect matrix begins with an inspection of the "2nd previous key". If it equals the initial value it means that only one key has been pressed since the data entry means 1 has been turned on, and no further action is required other than returning from this subroutine.

Then a determination is made of whether the "2nd previous key" was a defect position key 33 or a defect type-of-error key 34. If it was a defect position key 33, then the previous key was a type-of-error key 34, and the pair are processed appropriately to produce a defect type-of-error number (from 1 to 10) and a defect position number (from 1 to 20), corresponding to A to T.

If the "2nd previous key" was a defect type-of-error key 34, then the previous key was a defect position key 33, and the pair are processed appropriately to produce a defect type-of-error number and a defect position number.

Next, the unique defect number is computed.

A determination is made to see if the serial transmitter is occupied with the chore of transmitting a defect character received from another data entry means 1 or a reset character or other command character received from the computer 11. In this case, the pass-through transmission flag is set. If not, then the defect transmission flag is set in order to claim the resources of the serial transmitter. Then the defect character is transmitted. The data pointer is advanced to the appropriate memory cell, and the data in this memory cell is incremented by 1 count.

If the pass-through transmission flag is set, then the program loops back to test it again until it becomes inactive.

After the defect character is transmitted, and the defect matrix is incremented, the program searches the defect matrix for the biggest defect. This defect and its location, or defect number, is recorded. Then the defect count is replaced with zero.

Next the second biggest defect is found. Likewise, it and its location are recorded, and it is replaced with zero.

The third and fourth biggest defects are found.

Now the display 15 is initialized by sending the cursor to the home position, and the display 15 is cleared.

The biggest defect is decoded and then displayed on the display 15.

The decoding subroutine breaks the defect location into a position number and a type-of-error number. It begins by saving the defect location to work registers. Then other registers are initialized. Now a loop begins with the incrementing of the defect type-of-error. If it is greater than 10, it is reset to 0 and the position number is incremented. The loop counter work register is decremented, tested for zero, in which case the subroutine returns, otherwise the loop begins again.

The display subroutine begins by obtaining the position number, and then displaying it. Next it obtains the defect type-of-error number and determines whether it is less than 9. If it is, then it is displayed along with two spaces. If not, then 10 is displayed followed by a single space.

Next is the entry point to display a defect count. It begins by obtaining the count, initializing the display registers and resetting the leading zero flag.

Then if the count is zero, two spaces are displayed before displaying the 0. If it is not zero, then the least significant digit character is incremented. If this is not greater than the 9 character, then the work register is decremented and tested for zero. If it has not been reduced to zero, then the loop begins again with the incrementing of the least significant digit character.

If this character is great than the 9 character, then it is reset to the 0 character and the middle digit character is incremented. If this character is not greater than the 9 character, then the work register is decremented and tested for zero, as above. If the middle digit character is greater that the 9 character, it is reset to the 0 character and the most significant digit character is incremented. Then the work register is decremented and tested for zero, as above.

When the work register is reduced to zero, the most significant digit character is tested for the 0 character. If it is the 0 character, then the character to be displayed is set to the space character and the leading zero flag is set and the space character is displayed. If the most significant digit character is not the 0 character, then it is displayed.

Next the middle digit character is tested for the 0 character. If it is not, then it is the character to be displayed, otherwise the leading zero flag is tested. If it is set, then the character to be displayed is set to the space character. If it is not set, then the character to be displayed is set to the 0 character. The character is displayed.

Finally, the least significant digit character is displayed, and the display subroutine ends with a return.

The serial interrupt service routine begins by saving the accumulator onto the stack.

Then a determination is made about the serial transmitter interrupt flag. If it is set, then this is a serial transmitter interrupt, and the serial transmitter interrupt flag is cleared. Then the serial pass-through flag is tested. If it is set, then it is cleared, and interrupt service moves on to test for serial receiver interrupt tests. Otherwise, if the serial pass-through flag was not set then the serial defect transmission flag is set, and interrupt service moves on to test for serial receiver interrupt tests.

The serial interrupt flag is tested. If it is not set, then this is not a serial interrupt, and interrupt service terminates after the accumulator is reloaded from the stack.

If the serial interrupt flag is set, then a character is read from the received serial data buffer. This character is tested for the special reset character. If it is the reset character, then the reset flag is set. If it is not, then the serial defect transmission flag is tested.

If the serial transmission flag is set, then interrupt service jumps ahead to reload the accumulator and return from interrupt service. If the serial transmission flag is not set, then the serial pass-through transmission flag is set. The appropriate character is transmitted. The serial receiver interrupt flag is cleared, and finally the accumulator is reloaded before returning from interrupt service.

Timer 0 interrupt service is executed only upon receipt of a timer 0 interrupt. These interrupts are generated internally by timer 0, the rate depending upon constants previously loaded when timer 0 was initialized.

Interrupt service begins by decrementing the timing loop counter. If this counter is now zero, then the beeper is turned off, timer 0 interrupts are disabled, and interrupt service terminates with a return. Otherwise, if the timing loop counter is not zero, the program returns from interrupt service.

The microcontroller 38 uses the PAD 8 program inside the data entry means 1 for implementations of the system of the present invention, that utilize the DUMP key 53 to output data to the computer 11 and to the computer display 14. This program also includes back-up procedures to protect the system against data loss from power failure. In this version, the DUMP key 53 is activated periodically for example at the end of the shift, and data are up-loaded into the computer 11. It is possible, in other embodiments, to activate the communication from the data entry means 1 to the computer 11 in other ways besides by pressing a DUMP key 53. If desired, activation by telephone modem 58 (shown in FIG.7) is possible. This telephone modem 58 connects directly to the computer 11, which upon receipt of appropriate commands, queries the data entry means 1 for its data. Another possibility of initiating this communication has been discussed earlier in reference to the UPLOAD button in a personal computer program of the fourth embodiment of the present invention.

Figure 10A:
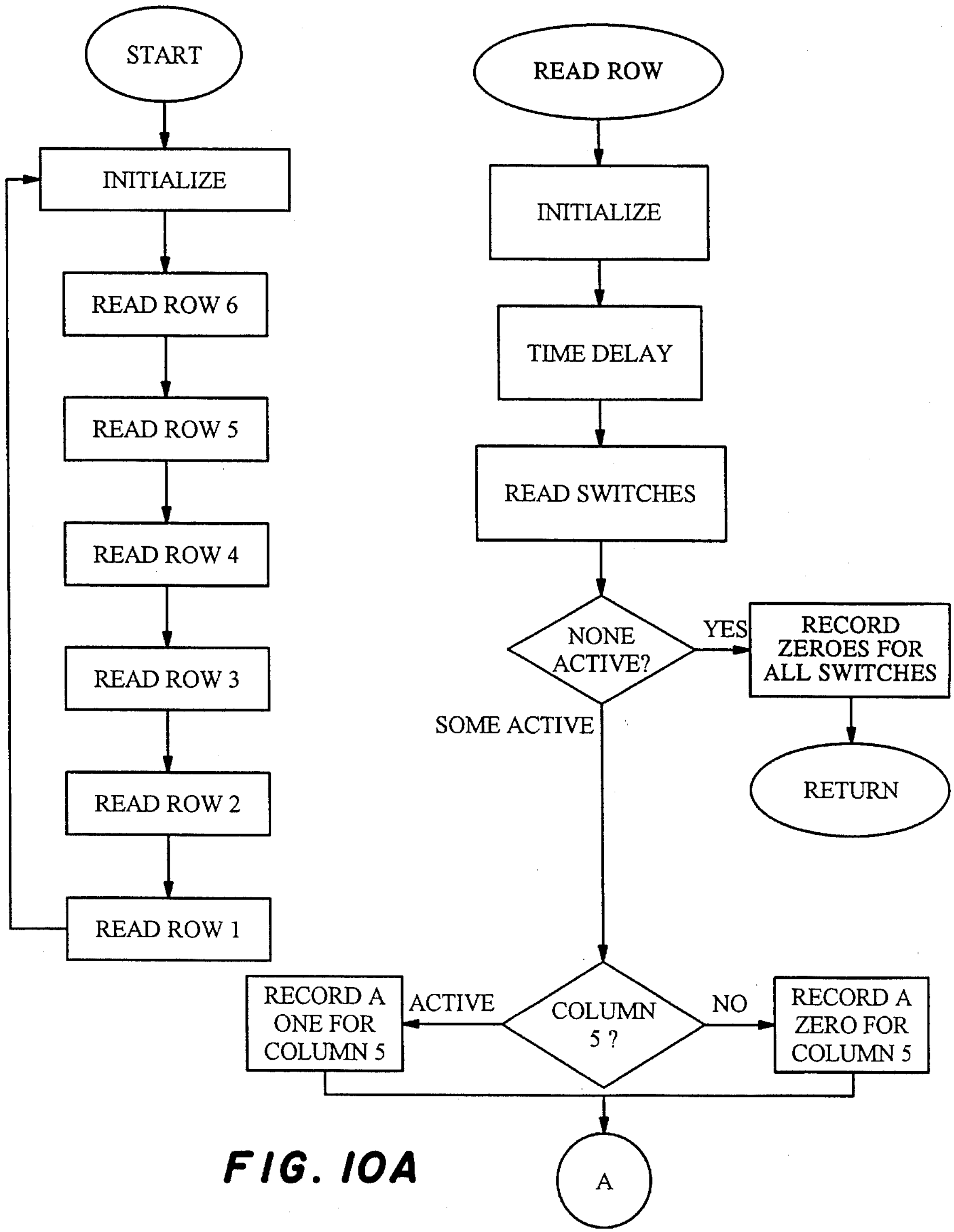
FIGS. 10A–10D are flowcharts of the PAD8 program.
Figure 10B:
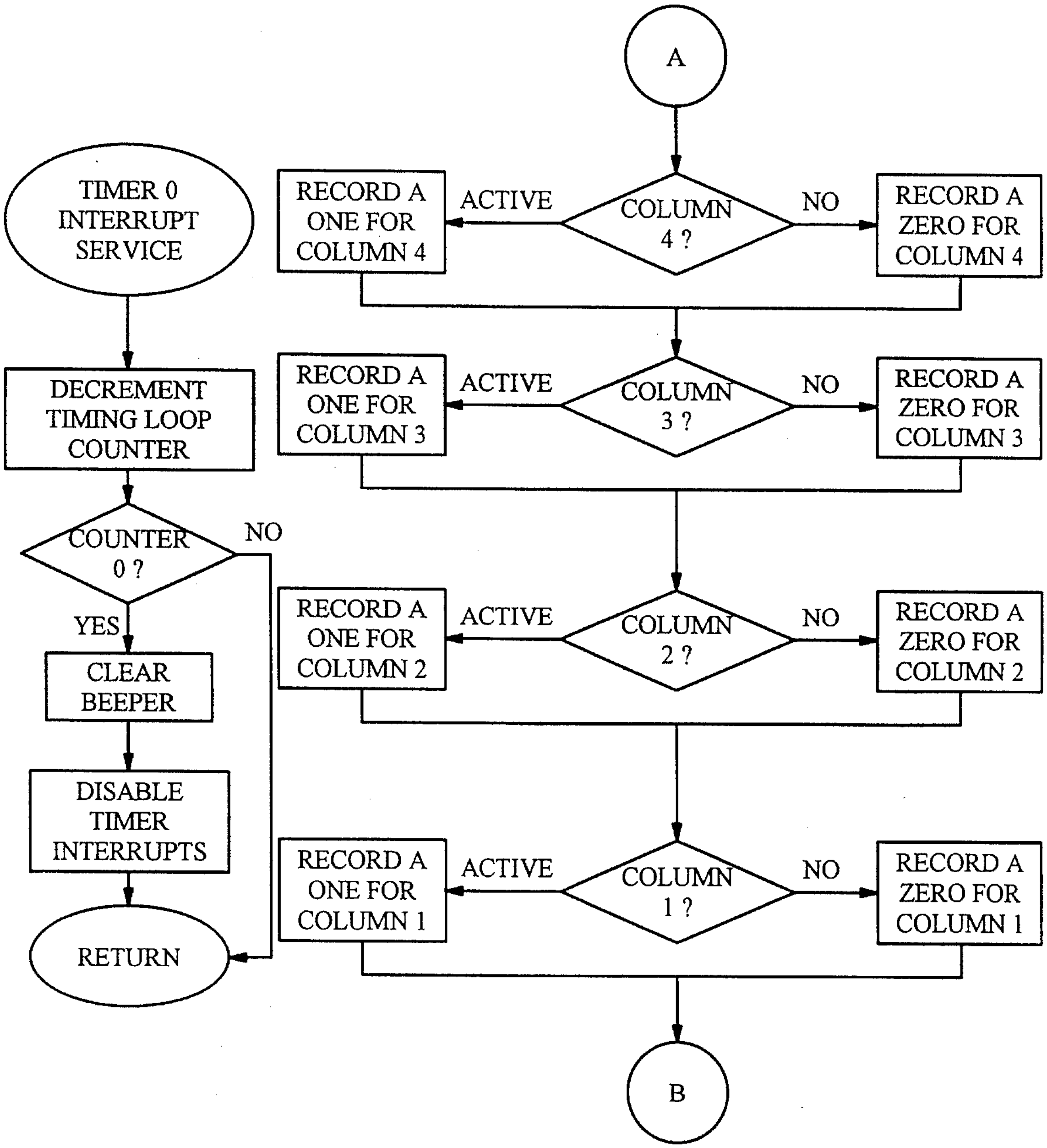
Figure 10C:
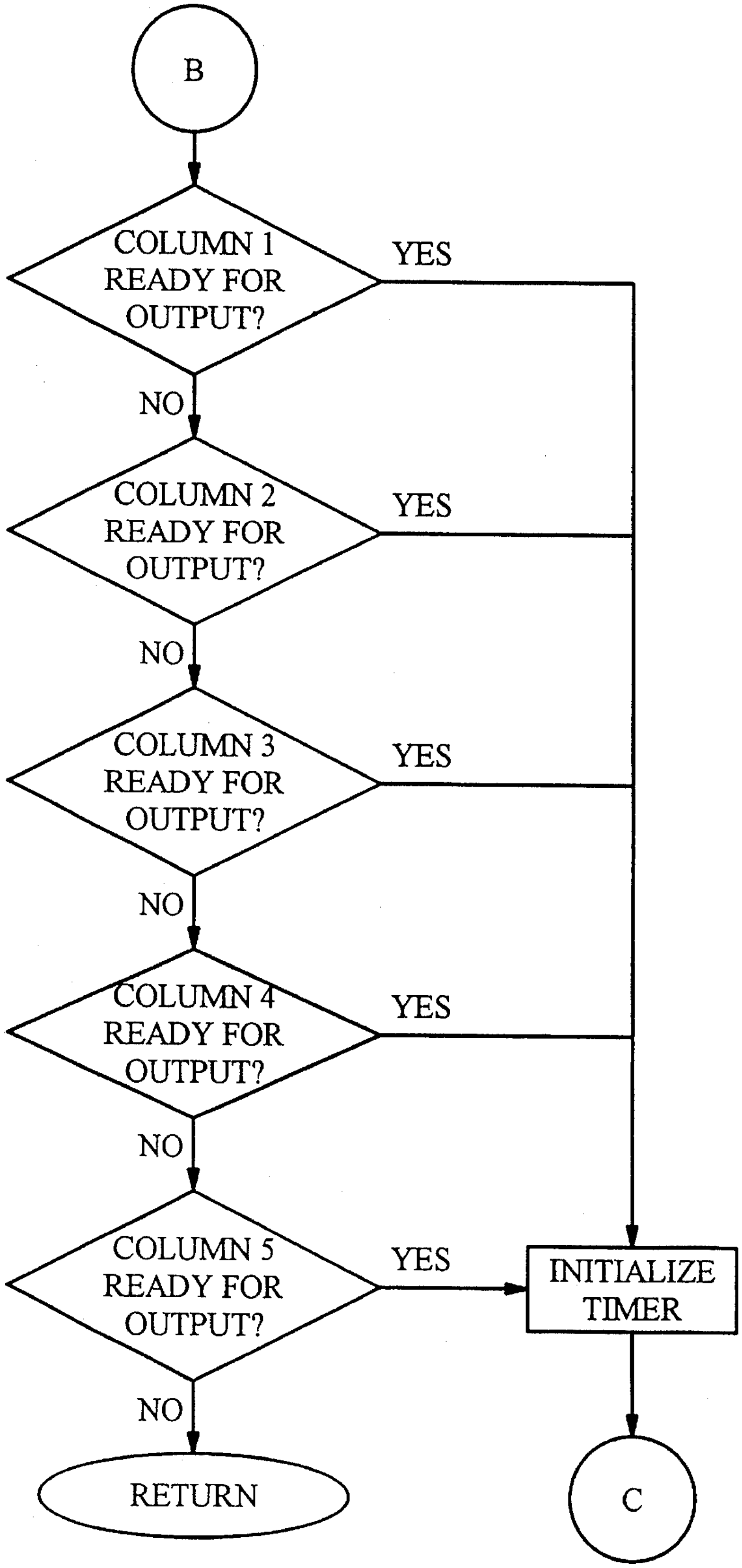
Figure 10D:
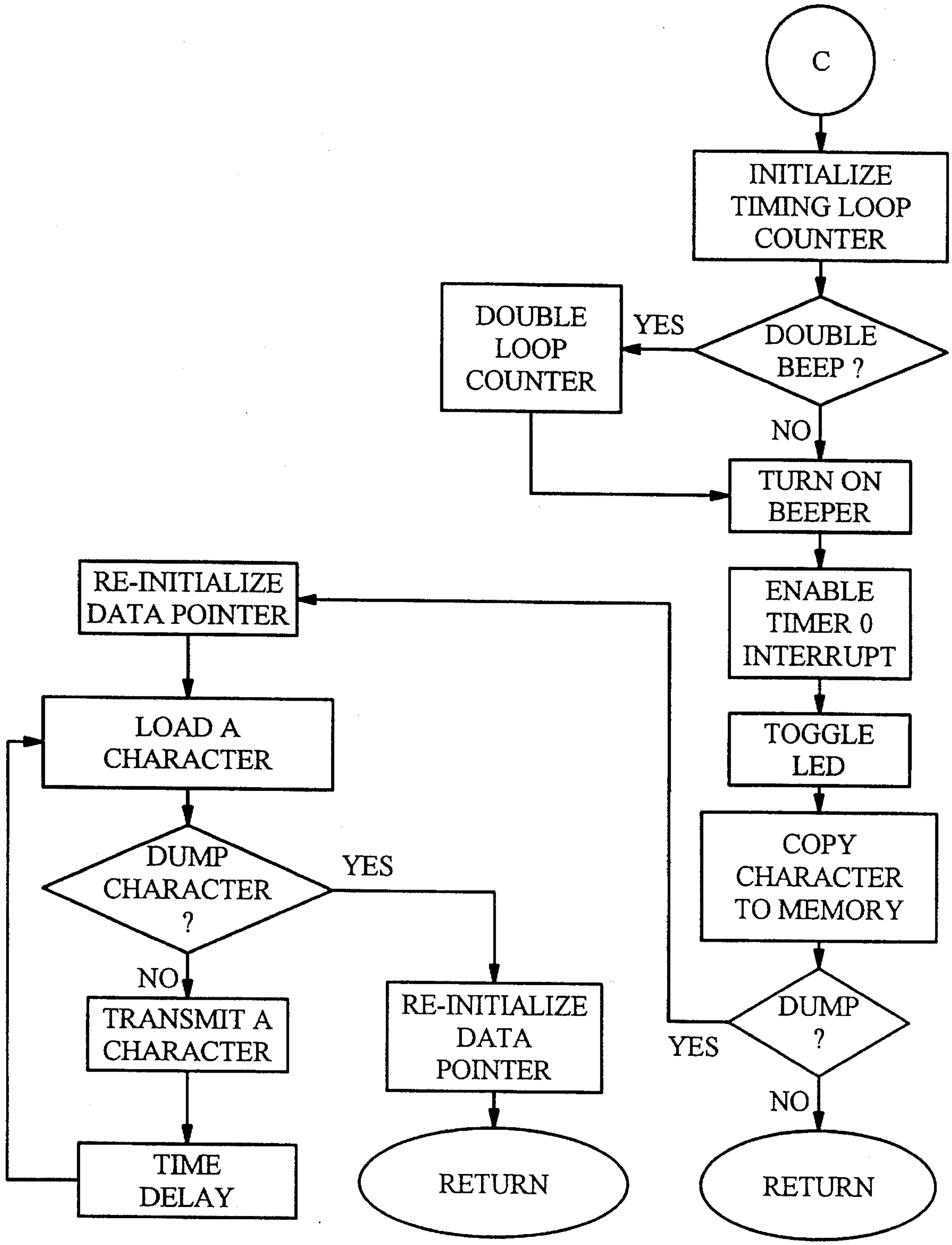
Figure 11A:
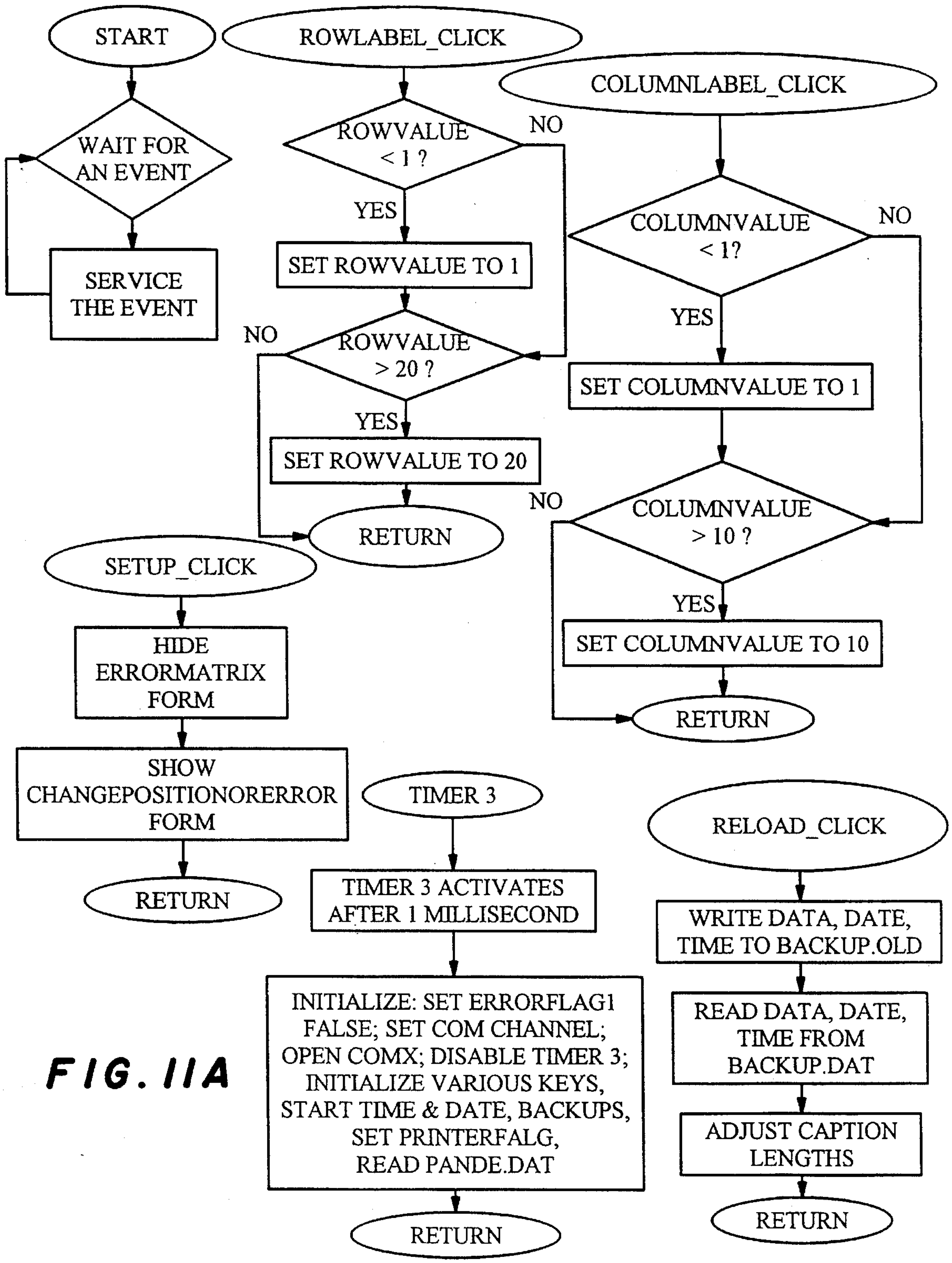
FIGS. 11A, 11B, 11C and 11D are flowcharts of the MULTIP& MULTINP programs.
Figure 11B:
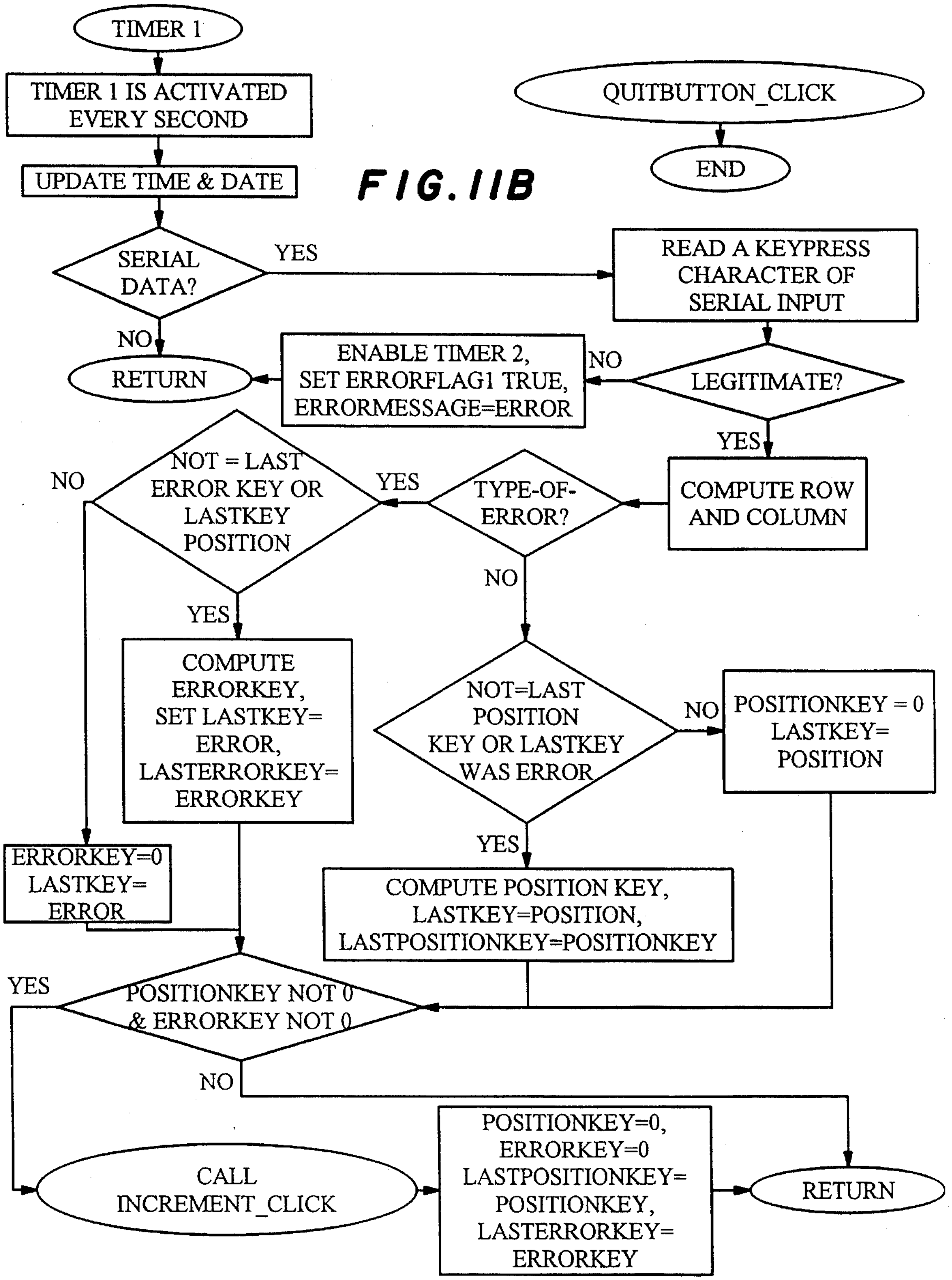
Figure 11C:
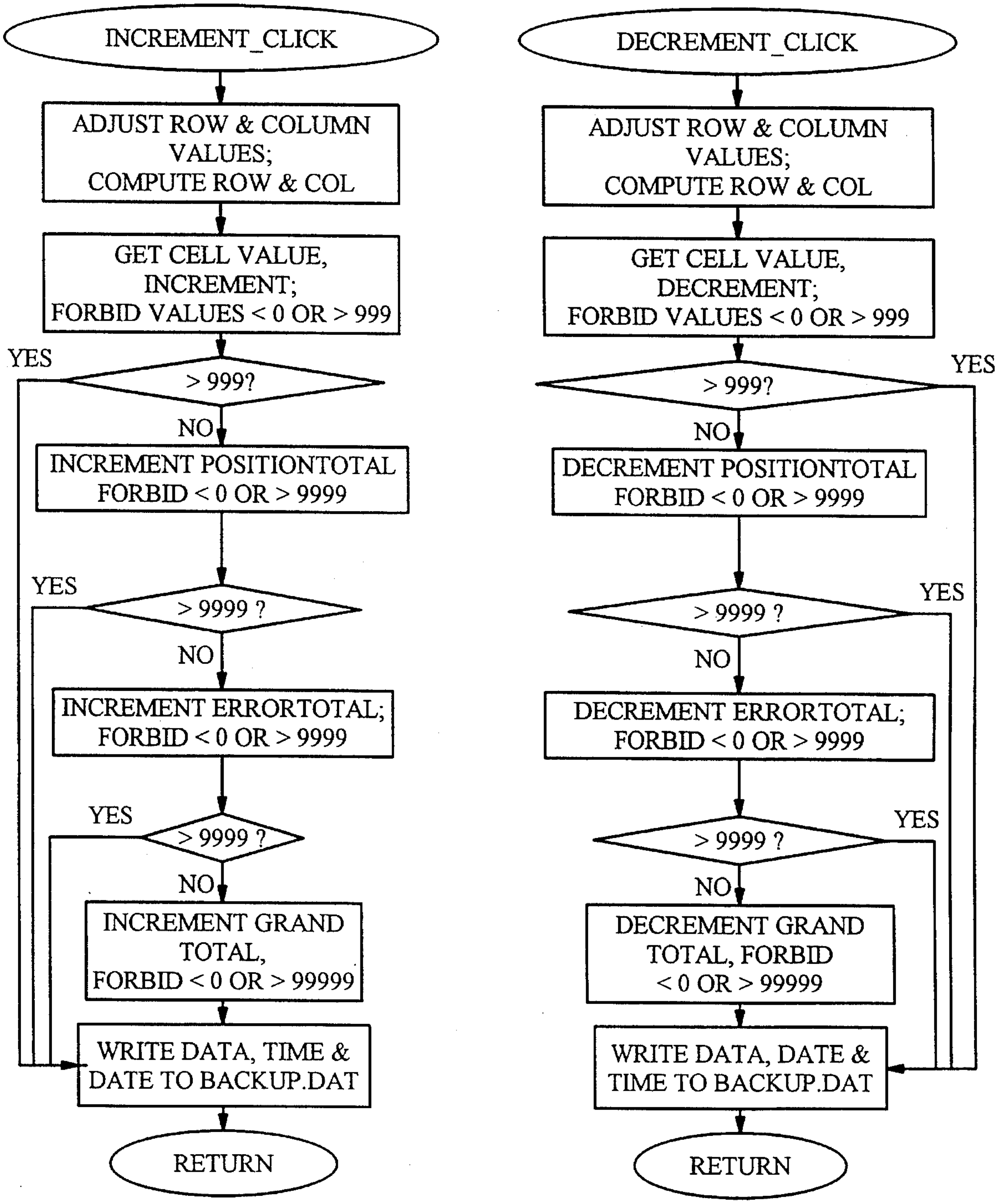
Figure 11D:
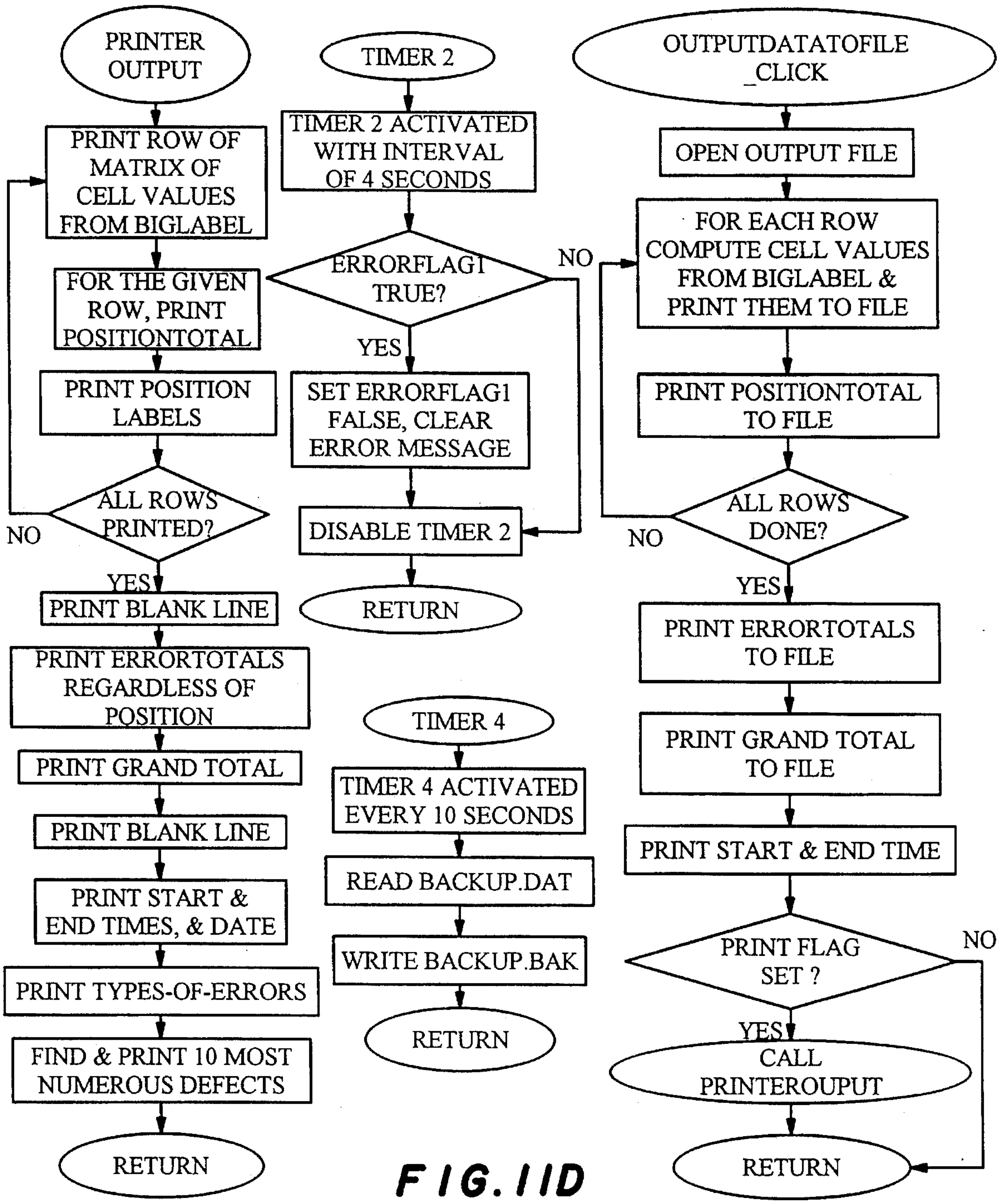

Referring to FIGS. 10A, 10D and Appendix B, PAD8 program consists of an outer loop that begins by initializing pertinent registers, variables, and workspaces. Then each row of the switches 39 is interrogated. After the last row is interrogated, the process begins again with initialization.

The subroutine which reads a row of switches 39 begins by initializing necessary variables, registers, and workspaces. Next, a time delay is introduced to slow the rate of scan of the array of switches 39. Then the switches 39 within the given row are read.

A determination is made of whether any switches 39 are active. If none are active, then a sequence of zeroes are written into memory for each column of this row. If some column is active, then the program proceeds to determine which column is active. As each column is examined, a zero or a one is written into memory for that column.

Then the recent history of column one is examined for a condition that indicates a valid key (33,34) press. If column one has a valid key press, then the program initializes timer 0. Otherwise, the recent history of column two is examined for a valid key press, and so forth through column 5.

If no valid key presses are detected, then the subroutine returns. If a valid key press is detected, then timer 0 is initialized, the timing loop counter is initialized, and a determination is made of the necessity of a double-length beep. If a double-length beep is required (because the key pressed was a position key as opposed to a type-of-error key) then the timing loop counter is doubled.

Next the beeper is turned on. Then timer 0 interrupts are enabled. The LED 43 is toggled. The appropriate character, that represents the key pressed, is stored in memory.

A determination is made of the key pressed. If it was not the DUMP key 53, then the subroutine returns. If it was the DUMP key 53, then the data pointer is initialized, and a character is loaded from memory. If this character is not the DUMP character, then it is transmitted out the serial port (to be captured by the computer 11 if it is present). Then some time delay is introduced to allow the computer to receive the transmission. Then a new character is loaded from memory. This loop continues until the DUMP character is loaded from memory. At this point, the data pointer is initialized, and the subroutine returns to them main loop of the program.

Timer 0 interrupt service is executed only upon receipt of a timer 0 interrupt. These interrupts are generated internally by timer 0, the rate depending upon constants previously loaded when timer 0 was initialized.

Interrupt service begins by decrementing the timing loop counter. If this counter is now zero, then the beeper is turned off, timer 0 interrupts are disabled, and interrupt service terminates with a return. Otherwise, if the timing loop counter is not zero, the program returns from interrupt service.

Two kinds of interrupt service are used in PADD (FIG. 9J–9K), and one kind is used in PAD8 (FIG. 10B).

Both use Timer 0 interrupt service, and PADD uses Serial Input/Output interrupt service. If Timer 0 and Serial Input/Output interrupts are enabled, then they can interrupt the execution of PAD8 or PADD at any point of execution and at any time.

Upon receipt of the interrupt, either because Timer 0 has Overflowed or because Serial Input data is available in the serial input buffer or because Serial Output data has finished shifting out of the shift register, PADD or PAD8 completes its currently executing instruction. Then the Program Counter is incremented to the next instruction. The Stack Pointer is incremented to the next memory location. The low byte of the Program Counter is stored at memory pointed to by the Stack Pointer. Then the Stack pointer is incremented again. Now the high byte of the Program Counter is stored in memory pointed to by the Stack Pointer. Now the Program Counter is loaded with the starting address of the appropriate interrupts service routine and interrupt service commences.

At the conclusion of this interrupt service routine, the final instruction, RETI—return from interrupt, reverses the above procedure. First the high byte of the future value of the Program Counter is loaded from memory pointed to by the Stack Pointer. Next the Stack Pointer is decremented. Then the low byte of the future value of the Program Counter is loaded from memory pointed to by the Stack Pointer. Now the Stack Pointer is decremented again. Finally,the Program Counter is replaced with the future value, just retrieved from the Stack, and program execution continues where it left off before the interrupt.

Timer 0 generates an interrupt when it overflows. It overflows when it increments to its limit from its initial count. It is set to some convenient value that generates a single length beep of acceptable length. A flag in the PAD8 or PADD program, whose value depends of which type of key has been pressed (position or type-of-error), determines whether the beep is lengthened to a double-length beep.

Referring to FIG. 11A, 11B, 11C, 11D and Appendixes C and D, MULTIP and MULTINP are printing and non-printing versions of programs for systems of multiple data entry means 1 which execute the PADD program that require the computer 11 to be connected continually in order to provide data collection and data display in real-time.

The displayed form is the same for both programs. MULTIP and MULTINP are event driven programs.

Clicking the Position (row) label causes the Row Value displayed in the Row Value Text box to be tested. Values less than one (1) are set to one (1). Values greater than twenty (20) are set to twenty (20). Then execution returns to await another event.

Clicking the Error (column) label causes the Column Value displayed in the Column Value Text box to be tested. Values less than one (1) are set to one (1). Values greater than ten (10) are set to ten (10).

Clicking in the Row Value Text box or Column Value Text box allows keyboard 55 editing of those values. Subsequent clicking of the Increment button or Decrement button then adjusts the defect count specified by the Row Value and Column Value displayed in the defect matrix (shown in FIG. 12).

Increment and Decrement, but especially Decrement, provide the computer operator (or the quality engineer) the means to correct the operator's 4 mistakes.

Clicking the Output button activates the Output Date To File Click subroutine. First, an output file is opened. Its name reflects the date and time. For each row, defect data is written to file, then the sum of that row is written to file. After all twenty (20) rows are completed, the sums of each column are written to file along with the grand total. Finally the start and end times and dates are written to file. If the print flag is set, then PrinterOutput is called to output data to the printer 54.

Figure 12:
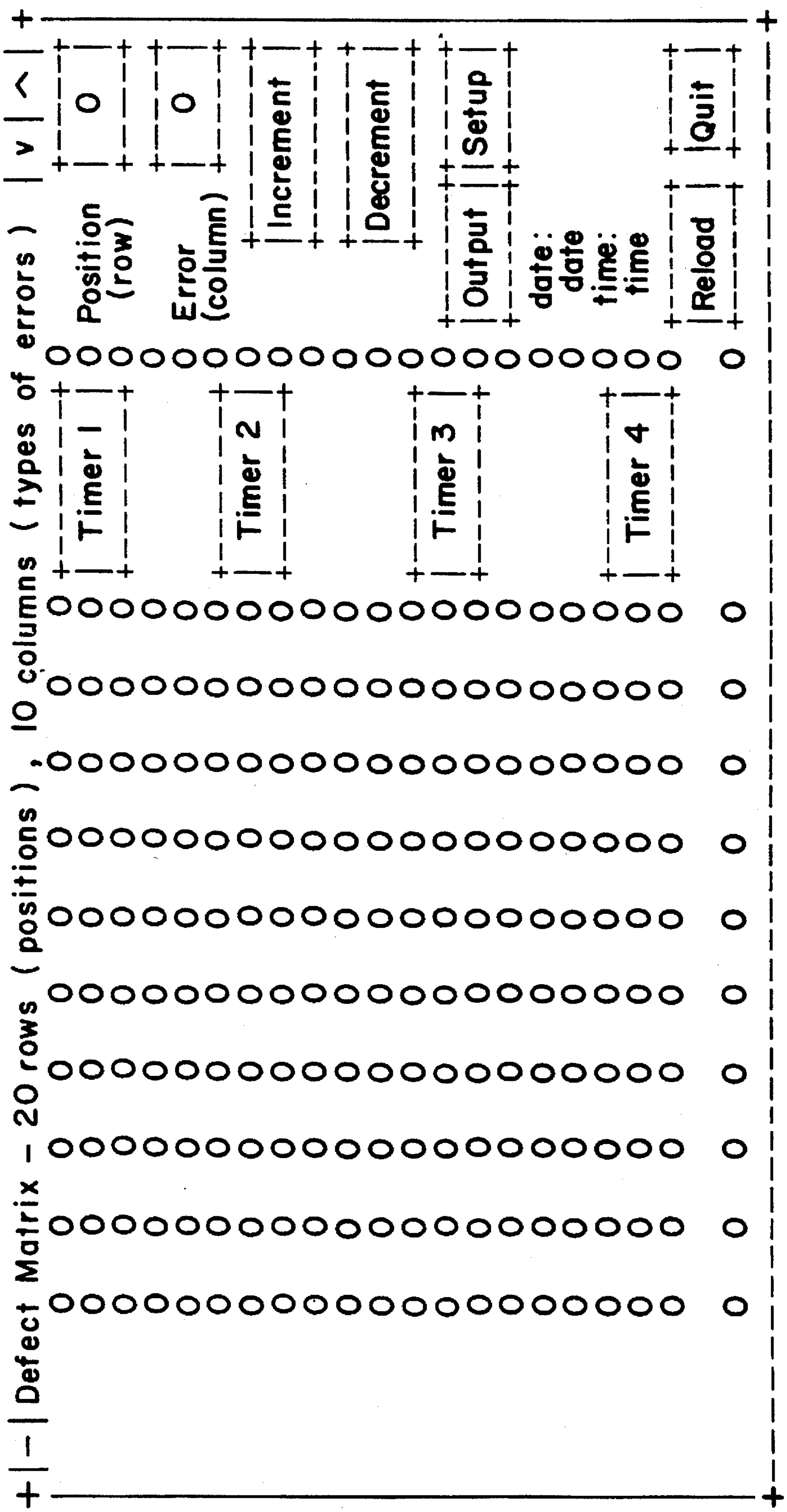
FIG. 12 is an example of the defect matrix form.
Figure 13:
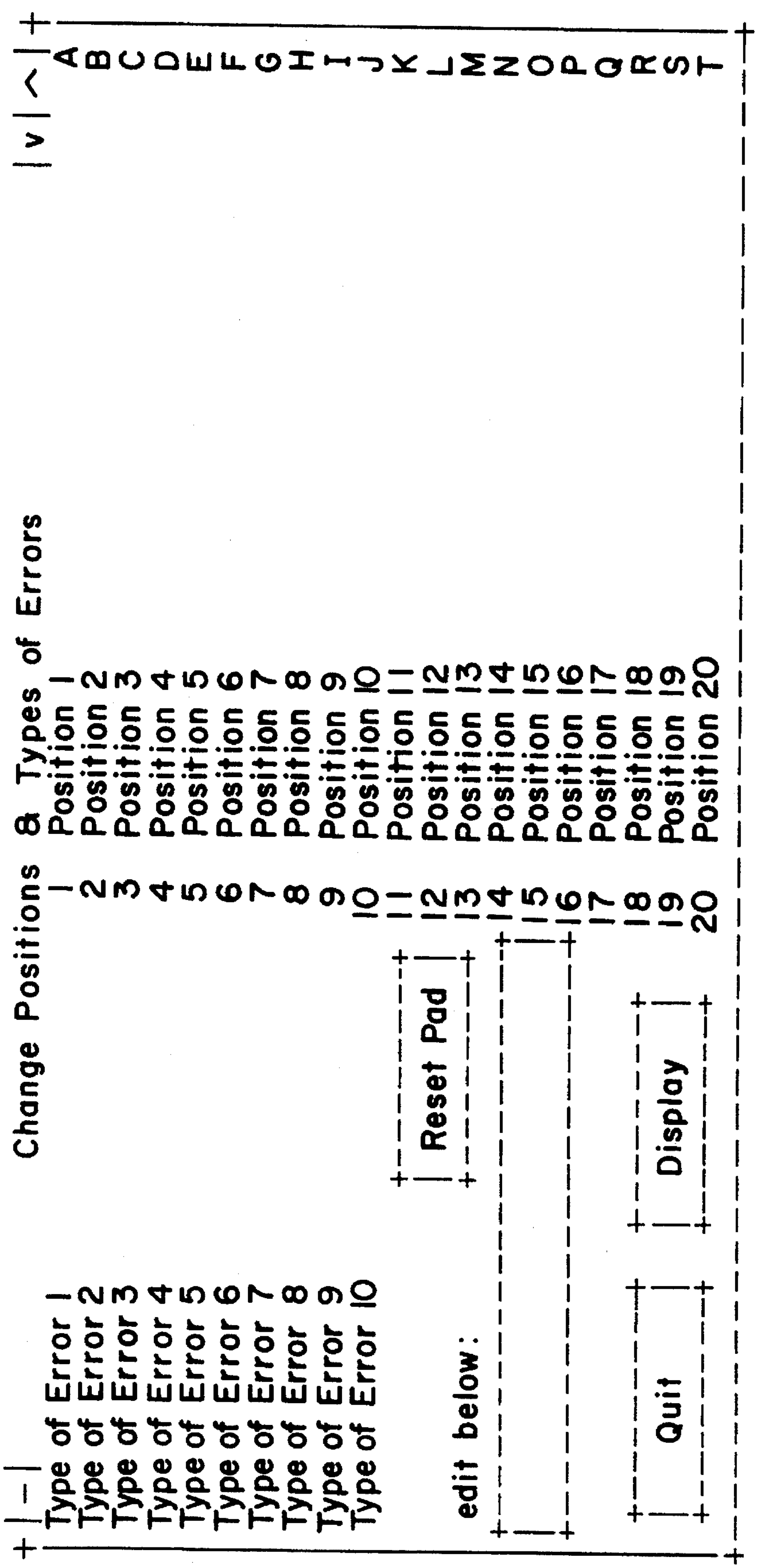
FIG. 13 is a change-position-or-error form.
Figure 14A:
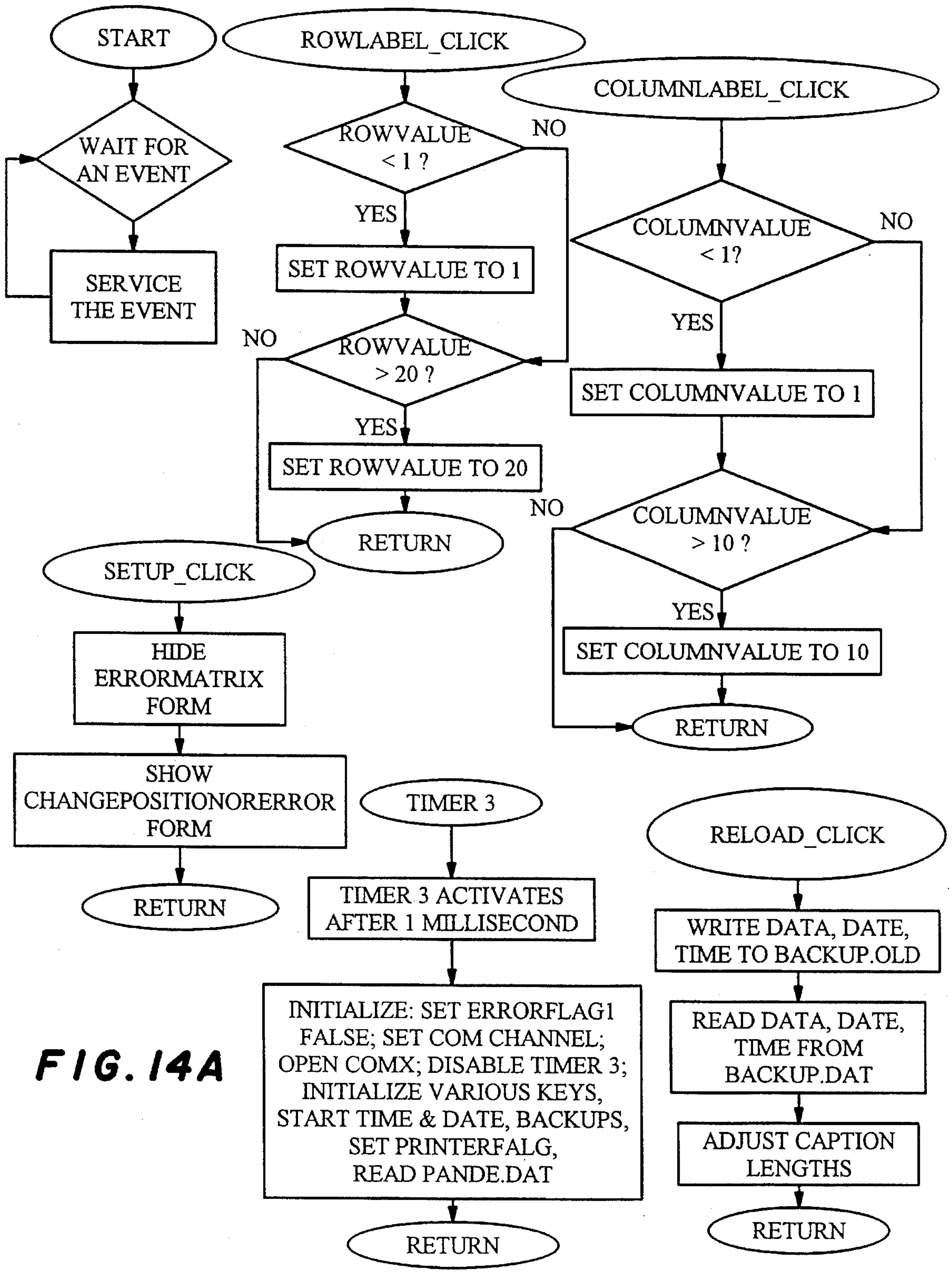
FIGS. 14A, 14B, 14C and 14D are flowcharts of the MATRIXP& MATRIXP programs.
Figure 14B:
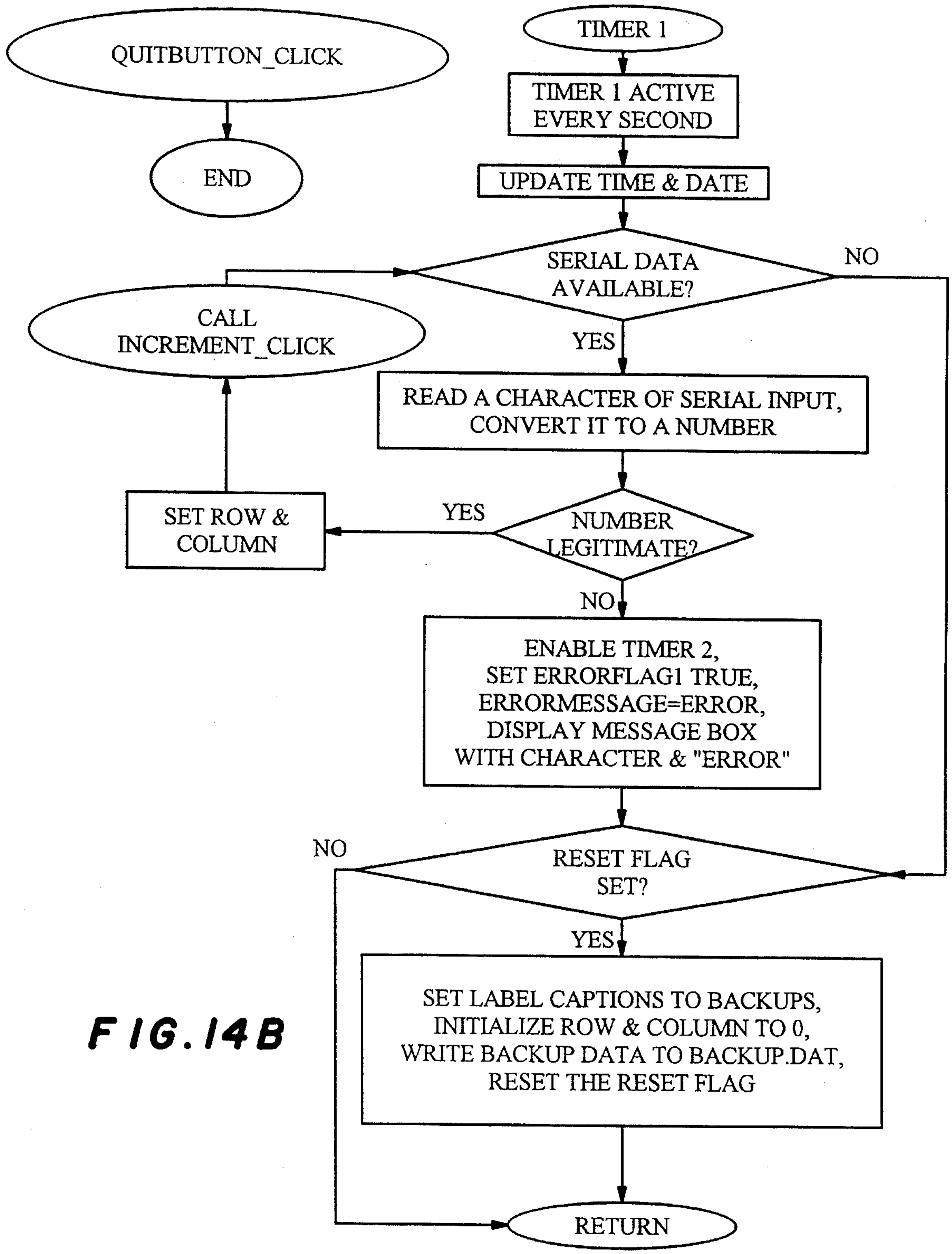
Figure 14C:
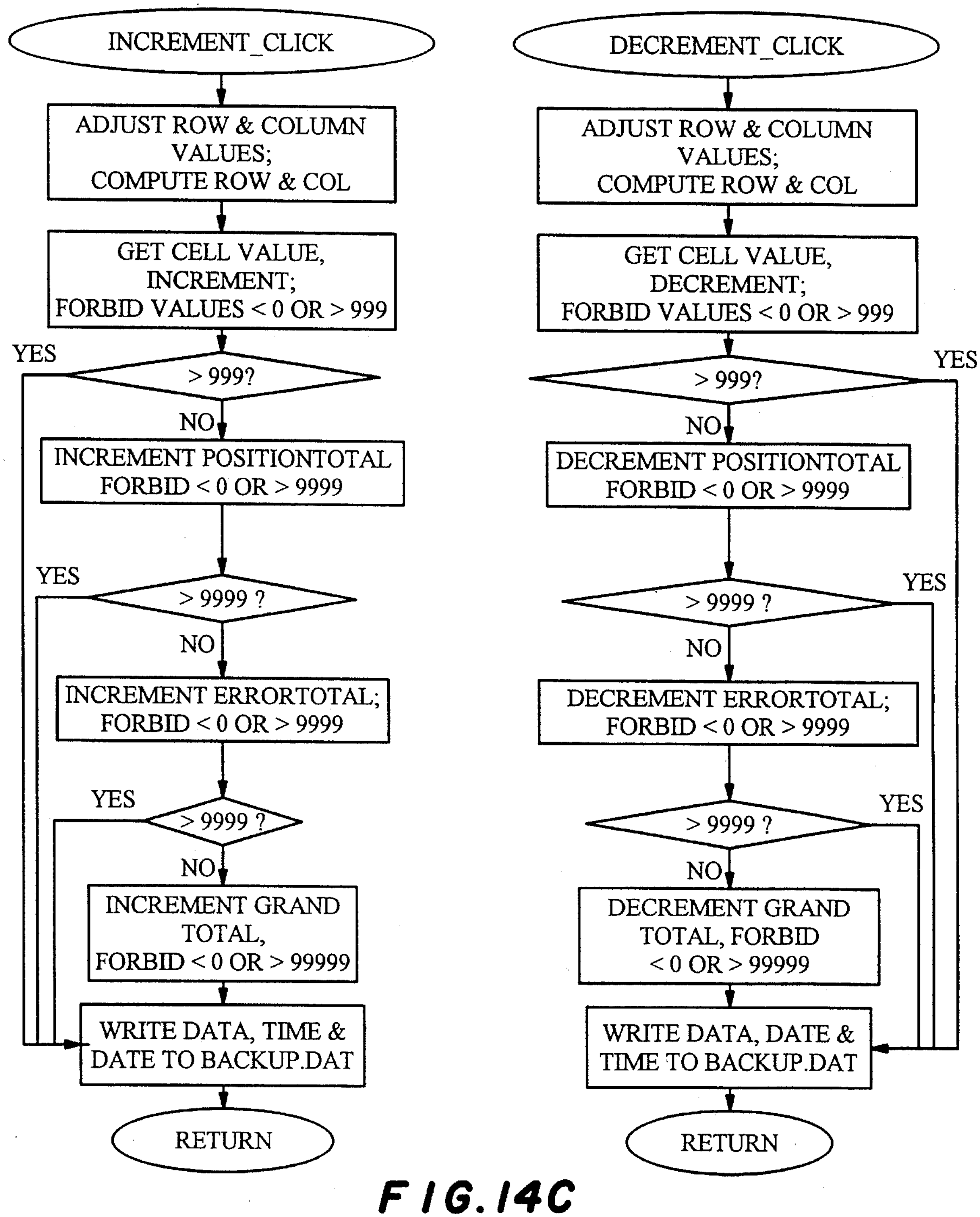
Figure 14D:
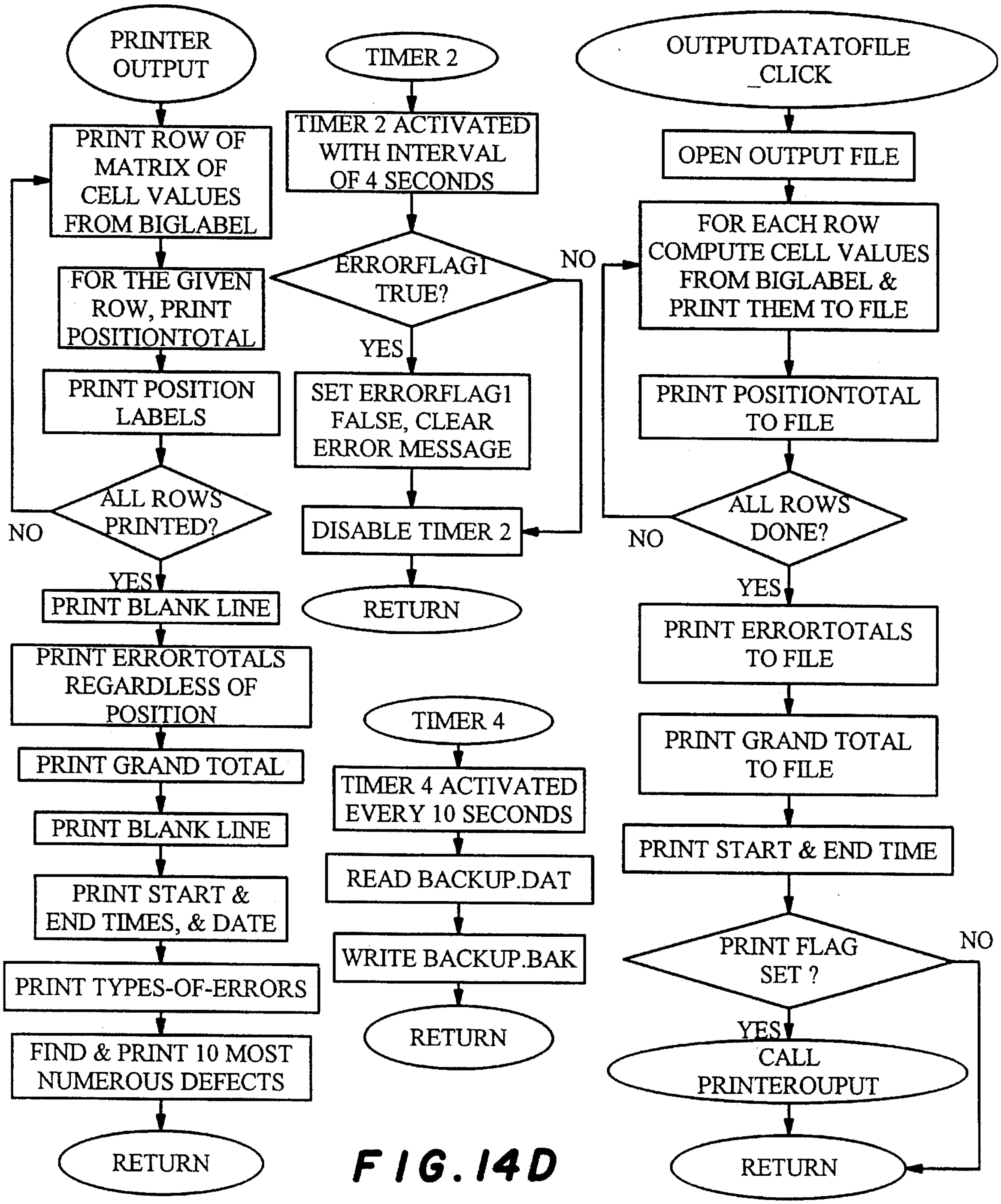

Clicking the Setup button hides the DefectMatrix form (FIG. 12) and shows the ChangePositionOrError form (FIG. 13).

The date and time are displayed in the date and time labels respectively. They are updated every second by the one (1) second timer (Timer 1).

Clicking the Reload button saves current defect data and start time and date to BACKUP.OLD, and reloads defect data, and start date and time from BACKUP.DAT. This button, and BACKUP.DAT, provide the means to recover from power failure, because BACKUP.DAT is updated every time the defect matrix changes. In case the Reload button is activated unintentionally, BACKUP.OLD provides the means to recover from such a mistake. This recovery is not automatic. The computer operator (or the quality engineer) must copy BACKUP.OLD to BACKUP.DAT at the DOS command line prompt, execute MULTIP or MULTINP and click the Reload button.

Clicking the Quit button ends the program and returns to the DOS prompt.

Timer 1 invokes an interrupt every second. First the time and date labels are updated. Then, if serial data is available, a character is read from the input serial port. It is converted to a number. If this number is within the legitimate range, then the Row and Column for the defect are computed and the appropriate defect is incremented. Otherwise, Timer 2, the error message timer, is activated, ErrorFlag1 is set true, the ErrorMessage is set to "Error," and a message box is displayed with the character and "Error". Next, the reset flag is tested. If it is set, then label captions are set to their backup values (all zeroes), Row and Column are initialized to zeroes, backup data is written to BACKUP.DAT, and the reset flag is reset to zero.

Timer 2 is the error timer that lasts for four (4) seconds. It tests ErrorFlag1. If it is true then it is set false, the ErrorMessage is cleared, and future Timer interrupts are disabled. These actions turn off an error message, that had been turned on in the Timer 1 subroutine, after four (4) seconds.

Timer 3 is activated once, one millisecond after initiation of the program. Its purpose is to set default and initial values. It is never executed again.

Timer 4 interrupts every ten (10) seconds. It writes BACKUP.DAT to BACKUP.BAK as a safety precaution in case power should be lost while BACKUP.DAT is being written by Increment-Click or Decrement-Click, for instance.

The main defect matrix consisting of ten (10) columns and twenty (20) rows is displayed as one big label (FIG. 12).

The twenty (20) sums to the right of the twenty (20) rows are the sums of defects for each row regardless of the type-of-error. They are incorporated into one label.

The ten (10) sums below the defect matrix are the sums of defects for each column regardless of the defect position. They are incorporated into one label.

Finally, the grand total is a label below the twenty (20) sums regardless of type-of-error and right of the ten (10) sums regardless of positions.

Referring to FIGS. 14A, 14B, 14C, 14D and Appendixes E and F, MATRIXP and MATRIXNP are printing and non-printing versions of programs for single data entry means 1 systems that require the computer 11 to be connected only when data is dumped by pressing the DUMP key 53 on the data entry means 1.

MATRIXP and MATRIXNP are event driven programs.

The displayed form, shown in FIG. 12, is the same for both programs, and is the same as the displayed form for MULTIP and MULTINP as well.

The principal differences between MULTIP and MATRIXP, and MULTINP and MATRIXNP, are to be found in the Timer 1 subroutine.

Timer 1 invokes an interrupt every second. First the time and date labels are updated. Then, if serial data is available, a character is read from the input serial port. If it is within the legitimate range then the Row and Column for the defect are computed. Otherwise, Timer 2, the error message timer, is activated, ErrorFlag 1 is set true, the ErrorMessage is set to "Error", and a message box is displayed with the character and "Error" and the subroutine returns. After Row and Column are computed, a determination is made to see if this keypress is a type-of-error. If it is then a determination is made to see if this key is not equal to the LastErrorKey or if the LastKey was a Position. If so, then the ErrorKey is computed, LastKey is set to Error, and LastErrorKey is set to this ErrorKey. If not, then ErrorKey is set to 0 and LastKey is set to Error. If this keypress is a position, then a determination is made to see if this key is not equal to the LastPositionKey or if the LastKey was an Error. If so, then the Position Key is computed, LastKey is set to Position, and LastPositionKey is set to Position. If not, then PositionKey is set to 0 and LastKey is set to Position. Next, the reset flag is tested. If it is set, then label captions are set to their backup values (all zeroes), Row and Column are initialized to zeroes, backup data is written to BACKUP.DAT, and the reset flag is reset to zero.

Just as in MULTIP and MULTINP, MATRIXP and MATRIXNP allow for recovery from a mistake caused by inadvertently activating the Reload button. The computer operator (or the quality engineer) must quit MATRIXP (or MATRIXNP), copy BACKUP.OLD to BACKUP.DAT at the DOS command line prompt, execute MATRIXP (or MATRIXNP) again, and click the Reload button. This restores the original defect matrix (FIG.12).

An example printout from MATRIXP or MULTIP is shown in FIG. 5A. FIG. 15B shows the ten (10) most numerous defects.

Figure 16:
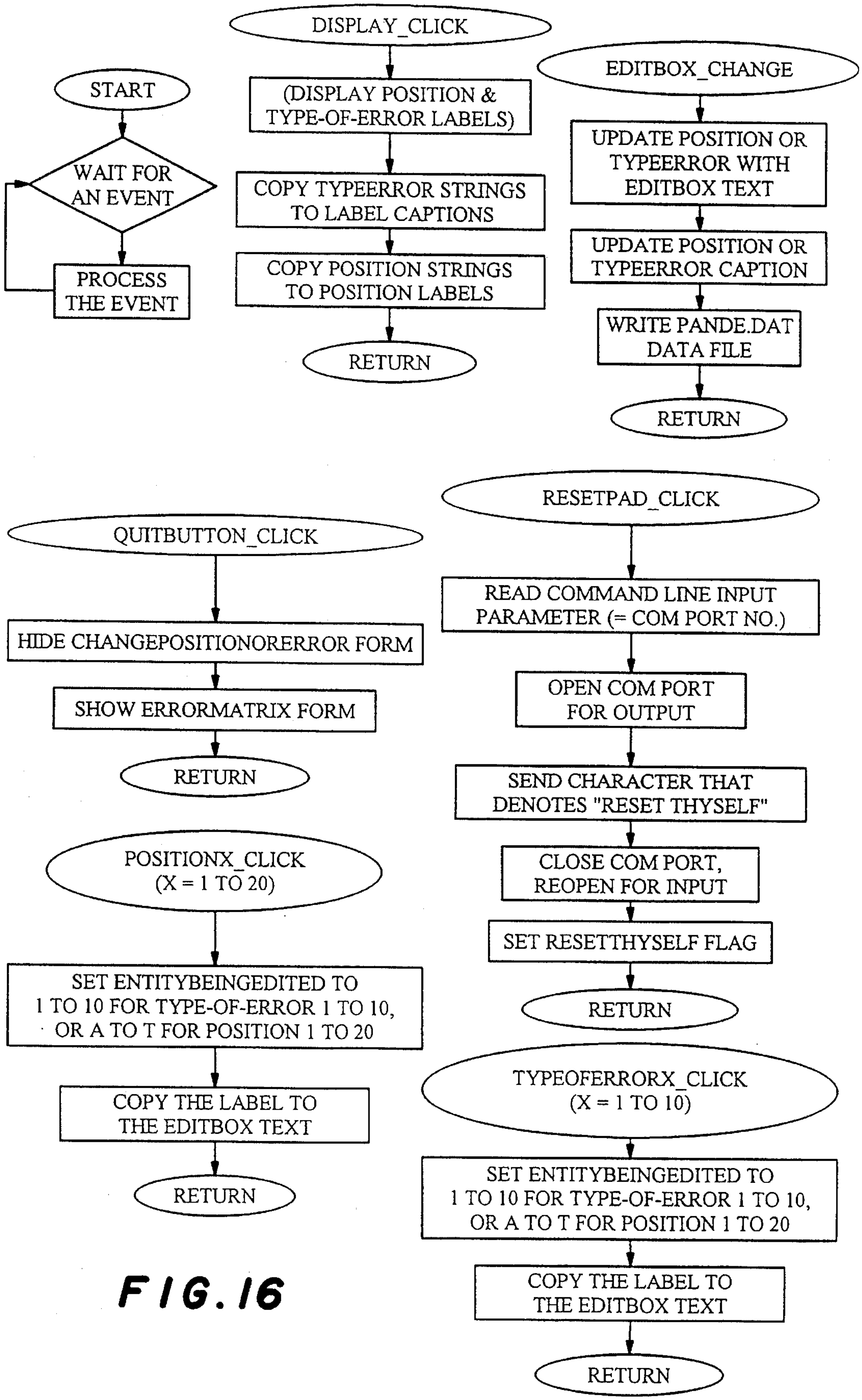
FIG. 16 is a flowchart of CHANGE&P program.

Referring to FIG. 16 and Appendix G, CHANGE&P is a Visual Basic form, used by MULTIP, MULTINP, MATRIXP, and MATRIXNP, to examine and edit the twenty (20) position and ten (10) type-of-defect labels, and to effect a reset of the display means 1 and the defect matrix displayed on the computer display 14 (shown in FIG. 12).

It contains a Display button, a Reset Pad button, a Quit button, an Edit Box, ten (10) Type-of-error labels, and twenty (20) Position labels.

Upon clicking the Display button with the mouse, the ten (10) TypeError strings are copied to the type-of-error label captions, and the twenty (20) Position strings are copied to the position label captions. Then execution returns to await another event.

Clicking any Position label or TypeOfError label sets the EntityBeingEdited variable to the appropriate value, and copies that label to the Edit Box.

Clicking on the EditBox allows keyboard 55 edits to change the corresponding label, and updates the position and type-of-error label data file, PANDE.DAT.

Clicking the Reset Pad button reads the command line input parameter, opens the appropriate COM port on the computer 11 if it was legitimate, sends the "reset thyself" character out the serial port to any data entry means 1 connected to the computer 11, closes that COM port, reopens it for input, and finally sets the ResetThyself flag.

Clicking the Quit button hides the ChangePositionOrError form (FIG. 13), and shows the DefectMatrix form, that displays the defect matrix (FIG. 12).

Figure 17:
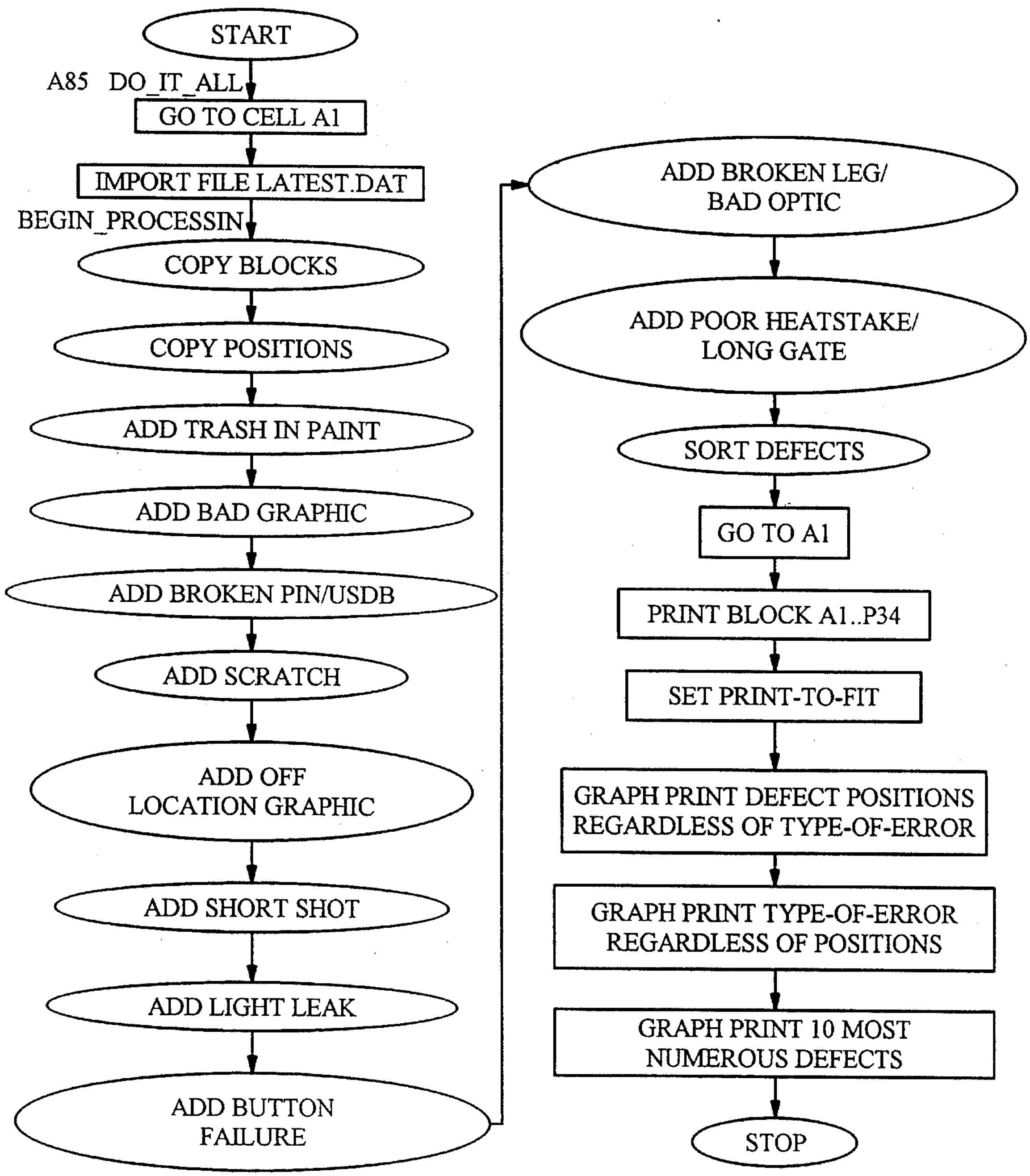
FIG. 17 is a flowchart of PRTDSCHR.WQ2.

Referring to FIG. 17, PRTDSCHR.WQ2 is an example of a spreadsheet, designed for the commercial program Quattro® Pro. It summarizes and plots the data output called LATEST.DAT (shown in FIG. 23). This data is generated when a computer operator actuates the OUTPUT button within the program MULTINP, MULTIP, MATRIXNP, or MATRIXP, and is an exact copy of the same output data stored in a file with a name that incorporates the date and time. One of these four programs is used to capture data from the data entry means 1.

First, PRTDSCHR.WQ2 imports the latest data file, designated LATEST.DAT, beginning at spreadsheet cell location A1.

Next it copies the data columns to a work space beginning at A101 and ending at A300. Then it copies the position names to B101 through B300. It will be appreciated by those skilled in the art that each cell is designated by a letter and a number, wherein the letter corresponds to a respective column, and a number corresponds to a respective row.

Now the types-of-errors can be appended to those positions in B101 through B300.

Next, sorting can commence, leaving the most numerous defect at A101, the next most numerous at A102, and so on.

Then the original data can be printed. It resides in spreadsheet cells A1 through P32.

Figure 18:
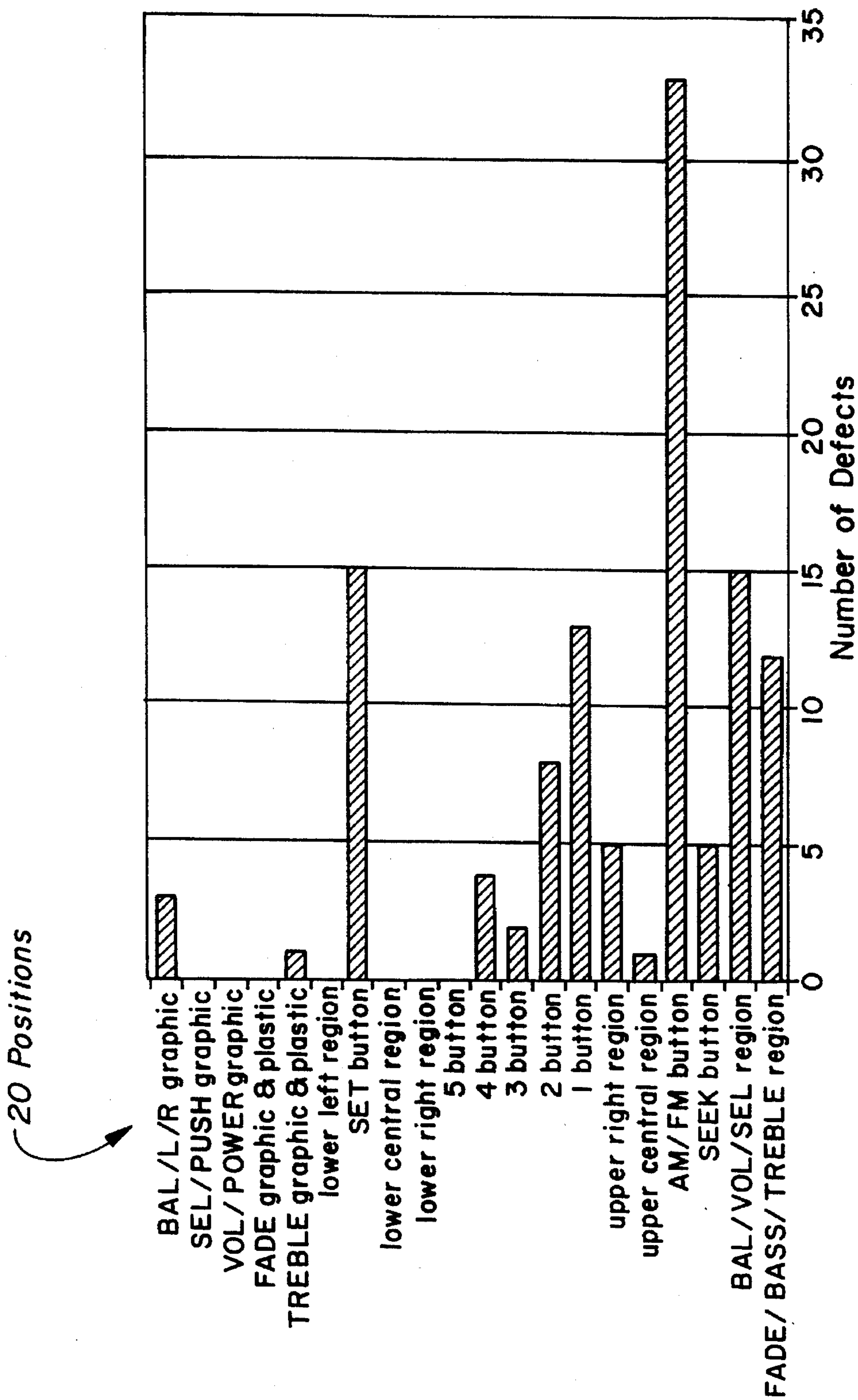
FIG. 18 is a Pareto chart of all defect positions regardless of type-of-error.
Figure 19:
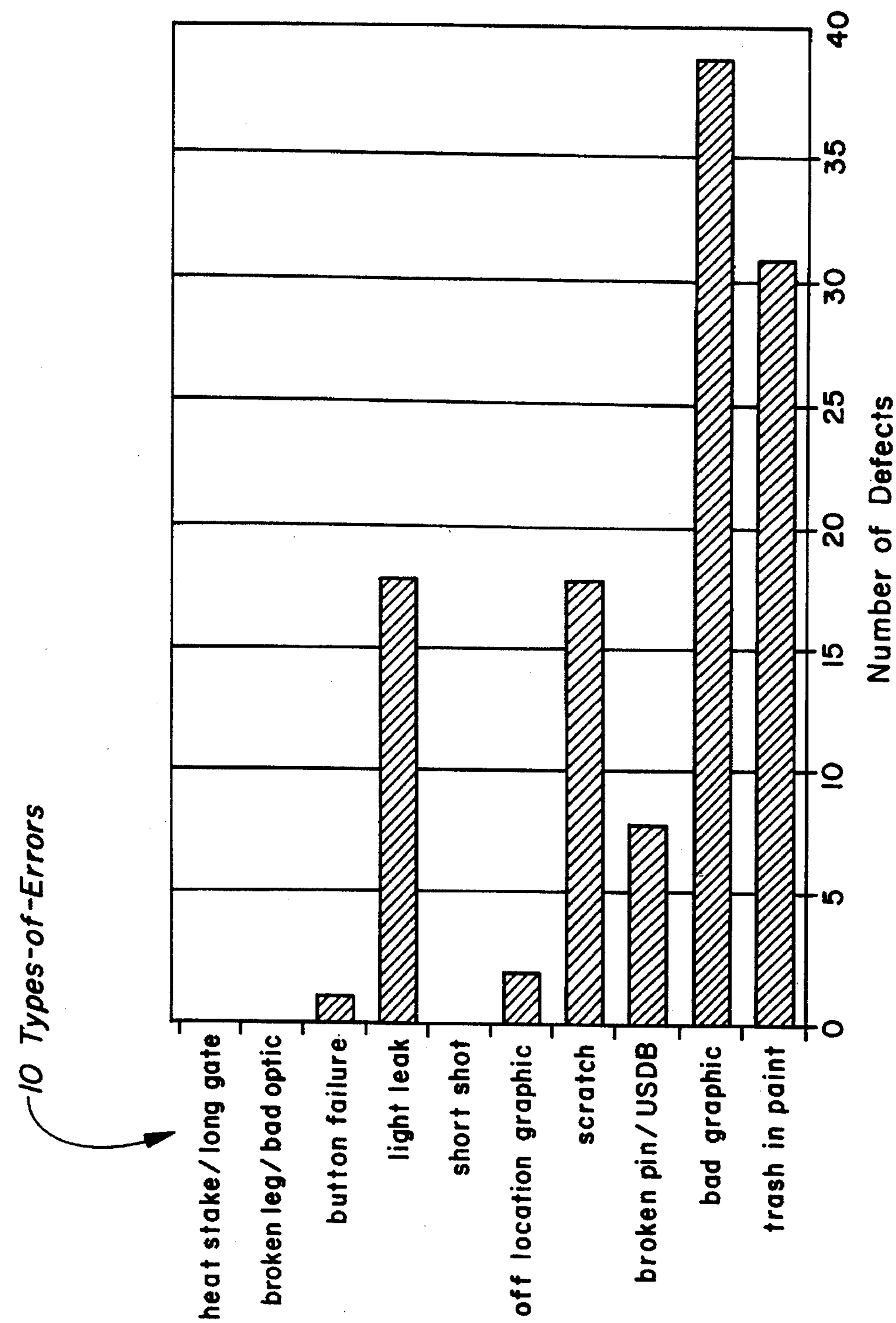
FIG. 19 is a Pareto chart of all defect types-of-errors regardless of defect positions.
Figure 20:
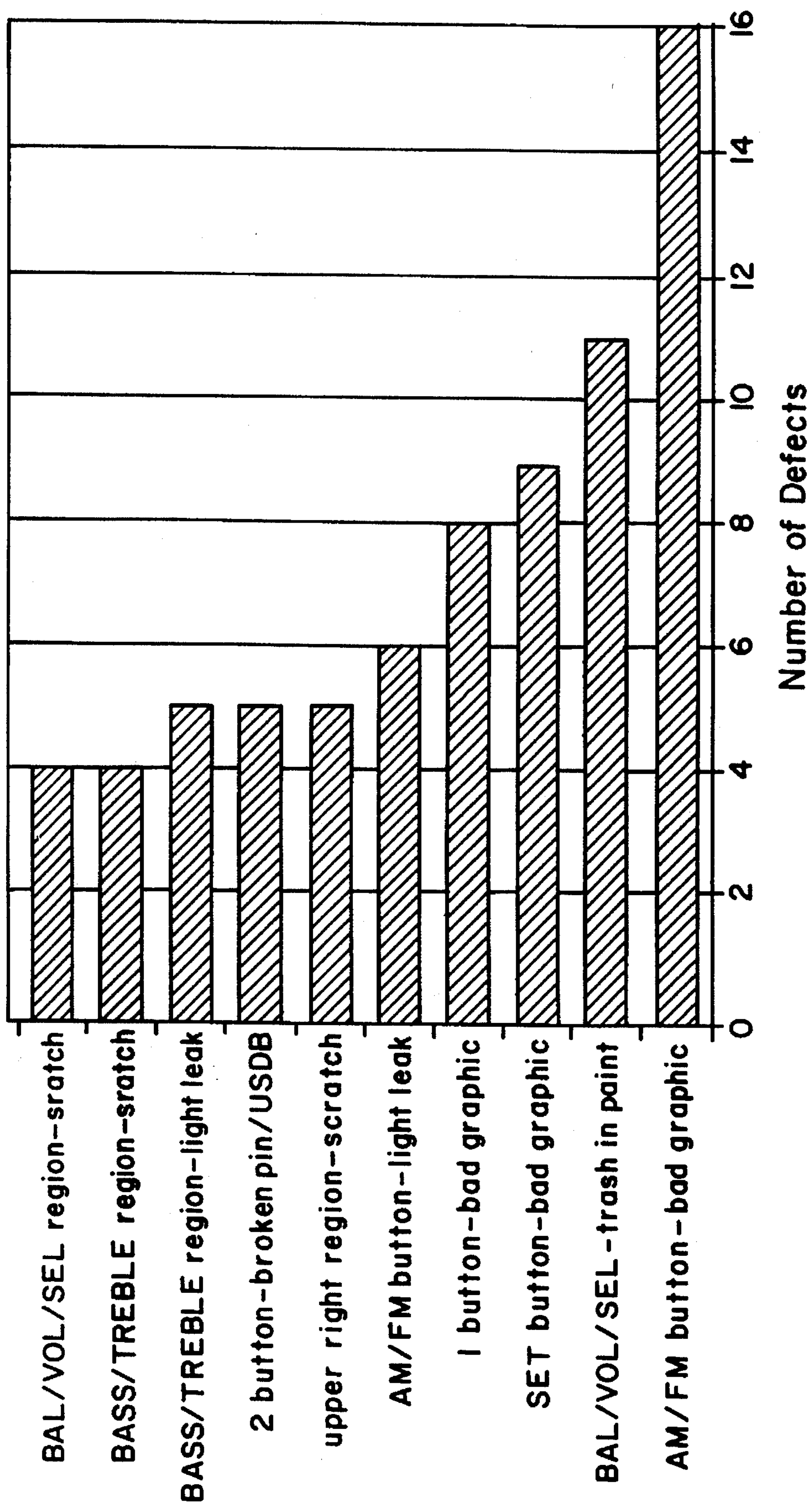
FIG. 20 is a Pareto chart of the ten most numerous defects.

Now three, predefined plots are printed. The first (FIG. 18) is the Pareto chart of all defect positions regardless of type-of-error. Then the Pareto chart of all types-of-errors regardless of position, is printed (FIG. 19). Lastly, the Pareto chart of the ten (10) most numerous defects is printed (FIG. 20).

This concludes the execution of the example spreadsheet PRTDSCHR.WQ2.

As described above, programs MULTINP, MULTIP, MATRIXP, and MATRIXNP produce output files which serve two purposes. The first purpose is that of recording the defect data for subsequent printing, analysis, and plotting. The second purpose is that of recovering from a power failure.

In the first instance, the defect data, and the start and end time and date, are recorded twice, with two different file names, in an easily read format. An example of such a file is shown in FIG. 23.

The first line consists of the counts for ten defects, each one representing one of the ten types-of-errors, separated by commas and followed by their sum. This first line represents all the defects for the first of twenty positions. The second line consists of the counts for ten defects, each one representing one of the ten types-of-errors (in the same sequence as for line one above), separated by commas and followed by their sum. This second line represents all the defects for the second of twenty positions. Lines three through twenty follow the pattern of lines one and two above. Line twenty-one is a blank line. Line twenty-two consists of the sums of the counts for the ten defects, each one representing one of the ten types-of-errors (in the same sequence as for lines one through twenty above) for all lines one through twenty above, separated by commas and followed by their sum. Line twenty-three is a blank line. Line twenty-four contains the words "Start" and "End". Line twenty-five contains the start date and the end date, expressed in a numerical format such that the two-digit month occurs first, separated by a hyphen from the two-digit day of the month, separated by a hyphen from the four-digit year. Line twenty-five contains the start time and the end time, expressed in a numerical format such that the hour is the two-digit number of whole hours past midnight, separated by a colon from the two-digit number of minutes past the hour, separated by a colon from the number of seconds past the minute.

The first recording is assigned a file name that reflects the date and time at the moment the OUTPUT button was activated. The first two characters of the filename are the last two digits of the year, like 94 for the year 1994. The second pair of characters of the filename are two digits which represent the month, like 05 for the month of May. The third pair of characters in the file name are two digits which represent the day of the month, like 03 for the third day of the month.

The extension of the file name is the time. The first two characters represent the hour in military time, like 15 for 3:00 pm and 06 for 6:00 am. The third and last character represents the tens of minutes past the hour, like 1 for the period 3:10 through 3:19.

Thus the file name, recorded on May the third, 1994, at 3:09 pm, would be 940503.150.

The second recording of the data is assigned to a file with the name LATEST.DAT (FIG. 23). This generic file name is used by the spreadsheet PRTDSCHR.WQ2 to import the defect data for the purpose of printing, analysis, and plotting.

The two recordings contain exactly the same information, but have different file names.

Output files for recovering from a power failure, as mentioned above, are named BACKUP.DAT, BACKUP.OLD, and BACKUP.BAK. They all have the same format and appearance as shown in FIGS. 24A, B, C.

The first four characters of BACKUP.DAT represent the defect count of the first type-of-error and the first position. In FIGS. 24A, B, C it is represented by 20 20 20 30, which constitutes three blank spaces followed by a zero. In a different example, a defect count of ninety-nine would be represented by 20 20 39 39, two blank spaces followed by the digit nine followed by another digit nine. Continuing with FIGS. 24A, B, C the second group of four characters, 20 20 20 30, represent the defect count of the second type-of-error and the first position, and, again, they constitute three blank spaces followed by a zero. The third group of four characters represent the defect count of the third type-of-error and the first position. The fourth group of four characters represent the defect count of the fourth type-of-error and the first position. This pattern continues until the tenth group of four characters, which represent the tenth type-of-error and the first position. This ends all defects which are specified by the first position.

Now an addition blank space character, a 20, is included before the next four characters, which represent the defect count of the first type-of-error and the second position.

Groups of four characters represent the types-of-errors through the tenth type-of-error, which concludes all defects which are specified by the second position.

Before beginning defects specified by the third position, a single blank space character, a 20, is appended. Then groups of four characters represent the ten types-of-errors for the third position.

This pattern continues, with a single blank space character, a 20, before the first type-of-error on a new position. It concludes with the group of four characters which represent the tenth type-of-error and the twentieth position. After this last defect, two characters, OD OA, represent a carriage return and a linefeed.

The next ten groups of four characters, like 20 20 20 30, represent the ten sums of the counts of all defects with the ten types-of-errors, but any position. These ten sums are in the same sequence as the ten types-of-errors described above.

After the tenth sum, three characters 20 OD OA, represent a blank space, a carriage return, and a linefeed.

The next group of four characters, like 20 20 20 30, represent the sum of the counts of defects of the first position, but any type-of-error. The next nineteen groups of five characters, like 20 20 20 20 30, represent the twenty sums of the counts of defects of the twenty positions, but any type-of-error. These twenty sums are in the same sequence as the twenty positions described above. After the last sum, two characters, OD OA, represent a carriage return and a linefeed.

The next five characters, like 20 20 20 20 30, represent the grand total of all defects. After the grand total, two characters, OD OA, represent a carriage return and a linefeed.

Then the next ten characters, like 30 35 2D 31 30 2D 31 39 39 34, represent the starting date May 10, 1994, in this case May 10th, 1994. The next two characters OD OA, represent a carriage return and a linefeed.

The next eight characters, like 31 34 3A 33 35 3A 31 37, represent the starting time 14:35:17, in this case 2:35 pm and 17 seconds. The last two characters, OD OA, represent a carriage return and a linefeed.

One other data file, PANDE,DAT, is generally used as an input. It contains the names of the twenty (20) positions and ten (10) types-of-errors used in the printing of the defect matrix, FIG. 15A, and the ten (10) most numerous defects, FIG. 15B. These names are displayed on the ChangePositionOrError form (FIG. 13) when the DISPLAY button is activated. These names can be edited by first clicking on the desired name, and then editing that name in the edit box on the screen. As a name is edited, it appears in its proper display position, and the file PANDE.DAT is written with the new name.

This file contains the information needed by MULTIP, MULTINP, MATRIXP, and MATRIXNP, that is specific to a particular production line. An example of this file is listed in FIG. 25.

Table 1 (below) shows possible combinations of displays and computer connections, along with the programs executing in the computer 11 and the microcontroller 38.

TABLE 1

| | No Display | Stand-alone Display | Computer Display |
|---|---|---|---|
| computer connected continually PADD&MULTINP or PADD&MULTIP | possible, not preferred | example described herein | example described herein |
| dump of data periodically PAD8&MATRIXP or PAD8&MATRIXNP | possible, not preferred | example described herein | example described herein |
| computer never connected PADD | no output; no data collected | V/F&LCD display units | not applicable |

Obviously, many modifications may be made without departing from the basic spirit of the present invention. The invention is herein described with particular reference to a defect occurring on a workpiece, and, even more particularly, to entering and analysis of data relating to position and type-of-error. However, the principles of the invention are applicable to any physical event occurring in any physical object. Then, the sketch board will contain a pictorial image of said object, and the indicia 8 will identify the position of said attribute in the object. The indicia 9 will be used to identify any chosen qualitative or quantitative characteristic of the attribute. For example, for a water supply system the attribute may be a place of water leakage. The position of the water leakage place will be identified by the indicia 8, then indicia 9 may identify a nature of this damage, for instance, size, shape, rate of flow through this damage, possible reason, etc.

If the object is a geographical area, and the attribute (or event) is a disease of animals, then the indicia 8 will identify location of sick animals, and the indicia 9 will identify either number of sick animals, or severity of illness, or special symptoms of said disease for this particular location, source of water, level of radiation, etc.

Figure 21:
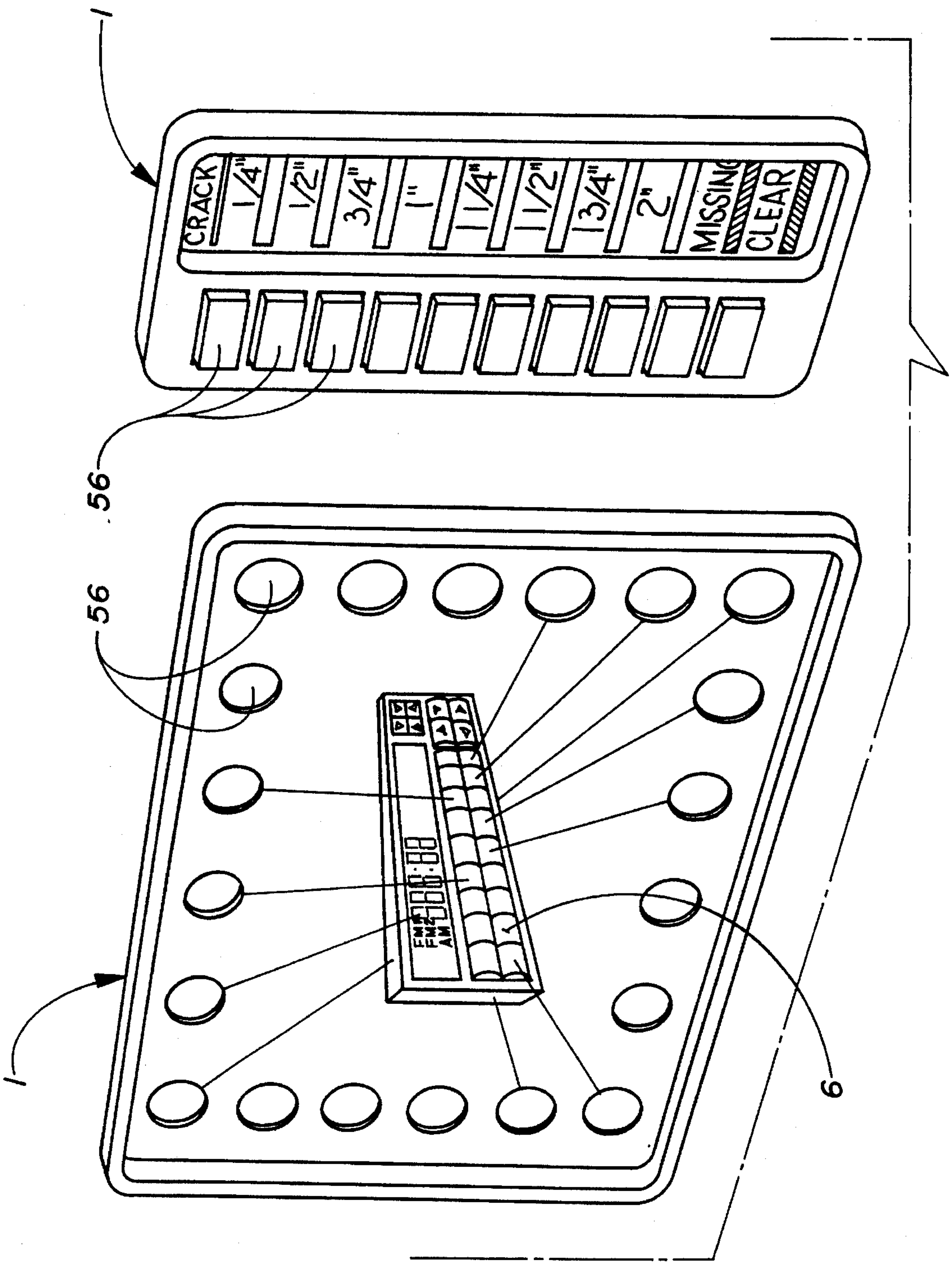
FIG. 21 is a perspective view of one of the modifications of data entry means, according to the present invention.

Referring to FIG. 21, another modification of the system of present invention includes sensing members 56 disposed on the front screen 16 to identify one type of parameter. The key board 18 includes electronic circuitry 37 adapted for this design. For example, this system may be employed for entering data relating to size of cracks occurring in certain area of a workpiece. Then, each sensing members 56 will be associated with certain size and activating the respective sensing member 56, the parameter will be entered in the system for further processing. The system can be also utilized for multiple-choice examination.

Figure 22:
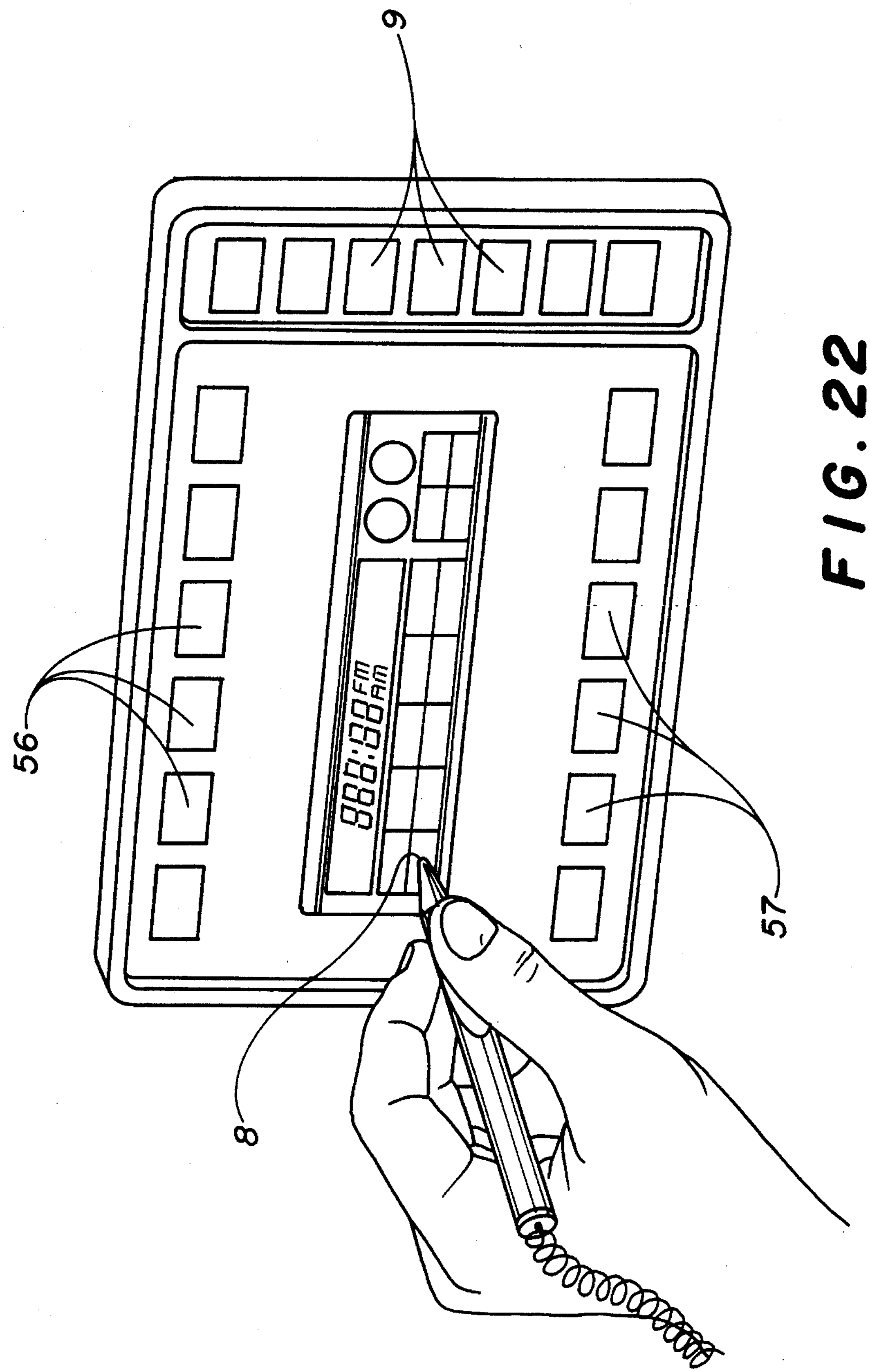
FIG. 22 is a perspective view of another modification of data entry means, according to the present invention.

Referring to FIG. 22, another modification of the data entry means 1 display a pictorial image of an object, and indicia 8 are located directly on the pictorial image, such that indicia 8 can be activated by simply touching the respective area of the pictorial image. Indicia 9 can be used for defining a first type-of-attribute (event), while sensing members 56 can be employed for entering data identifying a second type-of-attribute like production line, shift, operator, etc. Another sensing members 57 can be used for entering a third type-of-attribute like color, or model, serial number, disposition, etc. In principle, the present invention is not limited to the number of types-of-attributes described herein.

Actually, the system of present invention and the data entry means itself may find a plurality of applications in any industry where data are to be entered and analyzed by means of easy-to-use, inexpensive, flexible and effective electronic systems affordable and adaptable to any process.

Accordingly, it will be appreciated by those skilled in the art that within the scope of the appended claims, the invention may be practiced other than has been specifically described herein.

```
0000                  CPU      "DS5000.TBL"
0000                  HOF      "INT8"

                      ; define variable names for Special Function Registers
00F0 =      B_reg:    EQU      0F0H     ; B register for MUL & DIV, 00
00E0 =      ACC:      EQU      0E0H     ; accumulator, 00
00D0 =      PSW:      EQU      0D0H     ; program status word, 00
00C7 =      TA:       EQU      0C7H     ; timed access, ??
00C6 =      MCON:     EQU      0C6H     ; memory control, RT
00C5 =      EK4:      EQU      0C5H     ; encryption key 4, RT
00C4 =      EK3:      EQU      0C4H     ; encryption key 3, RT
00C3 =      EK2:      EQU      0C3H     ; encryption key 2, RT
00C2 =      EK1:      EQU      0C2H     ; encryption key 1, RT
00C1 =      EK0:      EQU      0C1H     ; encryption key 0, RT
00B8 =      IPC:      EQU      0B8H     ; interrupt priority control, 00
00B0 =      P3:       EQU      0B0H     ; port 3 latch, FF
00A8 =      IEC:      EQU      0A8H     ; interrupt enable control, 00
00A0 =      P2:       EQU      0A0H     ; port 2 latch, FF
0099 =      SBUF:     EQU      099H     ; serial data buffer, ??
0098 =      SCON:     EQU      098H     ; serial control, 00
0090 =      P1:       EQU      090H     ; port 1 latch, FF
008D =      TH1:      EQU      08DH     ; timer 1 high byte, 00
008C =      TH0:      EQU      08CH     ; timer 0 high byte, 00
008B =      TL1:      EQU      08BH     ; timer 1 low byte, 00
008A =      TL0:      EQU      08AH     ; timer 0 low byte, 00
0089 =      TMOD:     EQU      089H     ; timer mode select, 00
0088 =      TCON:     EQU      088H     ; timer control, 00
0087 =      PCON:     EQU      087H     ; power control, RT
0083 =      DPH:      EQU      083H     ; data pointer high byte, 00
0082 =      DPL:      EQU      082H     ; data pointer low byte, 00
0081 =      SP:       EQU      081H     ; stack pointer, 07
0080 =      P0:       EQU      080H     ; port 0 latch, FF

0000 =      R0:       EQU      000H     ; addr of each ROW-COLUMN combination
0001 =      R1:       EQU      001H     ; base addr of each row
0002 =      R2:       EQU      002H     ; contents of Port 0
0003 =      R3:       EQU      003H     ; timing delay loop counter
0004 =      R4:       EQU      004H     ; timing delay loop counter
0005 =      R5:       EQU      005H     ; timing loop counter
0006 =      R6:       EQU      006H     ; beep length flag
0007 =      R7:       EQU      007H     ; row 3 or 4 flag
0008 =      R8:       EQU      008H     ; previous value of R7
0009 =      R9:       EQU      009H     ; flag signifying defect XMIT owns transmitter.
            ;RA:      EQU      00AH     ; flag signifying pass-thru XMIT owns transmitter.
000B =      RB:       EQU      00BH     ; previously transmitted character
000C =      RC:       EQU      00CH     ; second previously transmitted character
000D =      RD:       EQU      00DH     ; FILL_MATRIX error number, 1 to 10
                                        ; DISPLAY_COUNT least significant character
```

```
000E =     RE:     EQU    00EH     ; FILL_MATRIX position number, 1 to 19
                                   ; DISPLAY_COUNT middle character
000F =     RF:     EQU    00FH     ; FILL_MATRIX loop counter for number of defects
                                   ; DISPLAY_COUNT most significant character
           ;       R10h   R16d     ; used in WAT4MS as a loop counter
           ;       R11h   R17d     ; used in WAT100MS as a loop counter
           ;       R12h   R18d     ; "reset thyself" flag
           ;       R13h   R19d     ; defect number in FILL_MATRIX
           ;       R14h   R20d     ; SERIAL input character, temporary storage
           ;       R15h   R21d     ; biggest offender, location
           ;       R16h   R22d     ; 2nd biggest offender, location
           ;       R17h   R23d     ; 3rd biggest offender, location
           ;       R18h   R24d     ; 4th biggest offender, location
           ;       R19h   R25d     ; loop counter for number of defects, 200d
           ;       R1Ah   R26d     ; DPTR shadow
           ;       R1Bh   R27d     ; biggest offender, count
           ;       R1Ch   R28d     ; 2nd biggest offender, count
           ;       R1Dh   R29d     ; 3rd biggest offender, count
           ;       R1Eh   R30d     ; 4th biggest offender, count
           ;       R1Fh   R31d     ; LCD/VF* switch; 1=LCD, 0=VF

00E0 =     RESET_CHAR:    EQU    224      ; "reset thyself" command character
00EA =     OMEGA:         EQU    234      ; "send me your data" command character
                                          ; OMEGA unused in this program
0080 =     P0_0:   EQU    080H
0081 =     P0_1:   EQU    081H
0082 =     P0_2:   EQU    082H
0083 =     P0_3:   EQU    083H
0084 =     P0_4:   EQU    084H
0085 =     P0_5:   EQU    085H
0085 =     RS:     EQU    085H            ; LCD register select, 1=data, 0=instruction
0085 =     TEST_:  EQU    085H            ; V/F NOT(self test)
0086 =     P0_6:   EQU    086H
0086 =     RW:     EQU    086H            ; LCD read/write
0087 =     P0_7:   EQU    087H
0087 =     ENABLE: EQU    087H            ; LCD enable, active on falling edge
0087 =     WR_:    EQU    087H            ; V/F NOT(write)

0088 =     TCON_0: EQU    088H
0089 =     TCON_1: EQU    089H
008A =     TCON_2: EQU    08AH
008B =     TCON_3: EQU    08BH
008C =     TCON_4: EQU    08CH
008D =     TCON_5: EQU    08DH
008E =     TCON_6: EQU    08EH
008F =     TCON_7: EQU    08FH

0090 =     P1_0:   EQU    090H
```

Page 3
04-19-94
08:23:48
PADD.LST

```
0091 =          P1_1:    EQU      091H
0092 =          P1_2:    EQU      092H
0093 =          P1_3:    EQU      093H
0094 =          P1_4:    EQU      094H
0095 =          P1_5:    EQU      095H
0096 =          P1_6:    EQU      096H
0097 =          P1_7:    EQU      097H

0098 =          SCON_0:  EQU      098H
0099 =          SCON_1:  EQU      099H
009A =          SCON_2:  EQU      09AH
009B =          SCON_3:  EQU      09BH
009C =          SCON_4:  EQU      09CH
009D =          SCON_5:  EQU      09DH
009E =          SCON_6:  EQU      09EH
009F =          SCON_7:  EQU      09FH

00A0 =          P2_0:    EQU      0A0H
00A1 =          P2_1:    EQU      0A1H
00A2 =          P2_2:    EQU      0A2H
00A3 =          P2_3:    EQU      0A3H
00A4 =          P2_4:    EQU      0A4H
00A5 =          P2_5:    EQU      0A5H
00A6 =          P2_6:    EQU      0A6H
00A6 =          LED:     EQU      0A6H
00A7 =          P2_7:    EQU      0A7H

00A8 =          IEC_0:   EQU      0A8H
00A9 =          IEC_1:   EQU      0A9H
00AA =          IEC_2:   EQU      0AAH
00AB =          IEC_3:   EQU      0ABH
00AC =          IEC_4:   EQU      0ACH
00AF =          IEC_7:   EQU      0AFH

00B0 =          P3_0:    EQU      0B0H
00B1 =          P3_1:    EQU      0B1H
00B2 =          P3_2:    EQU      0B2H
00B3 =          P3_3:    EQU      0B3H
00B4 =          P3_4:    EQU      0B4H
00B5 =          P3_5:    EQU      0B5H
00B6 =          P3_6:    EQU      0B6H
00B7 =          P3_7:    EQU      0B7H

00B8 =          IPC_0:   EQU      0B8H
00B9 =          IPC_1:   EQU      0B9H
00BA =          IPC_2:   EQU      0BAH
00BB =          IPC_3:   EQU      0BBH
00BC =          IPC_4:   EQU      0BCH
```

```
00BD =       IPC_5:  EQU     0BDH
00BE =       IPC_6:  EQU     0BEH
00BF =       IPC_7:  EQU     0BFH

00D0 =       PSW_0:  EQU     0D0H
00D1 =       PSW_1:  EQU     0D1H
00D2 =       PSW_2:  EQU     0D2H
00D3 =       PSW_3:  EQU     0D3H
00D4 =       PSW_4:  EQU     0D4H
00D5 =       PSW_5:  EQU     0D5H
00D6 =       PSW_6:  EQU     0D6H
00D7 =       PSW_7:  EQU     0D7H

00E0 =       ACC_0:  EQU     0E0H
00E1 =       ACC_1:  EQU     0E1H
00E2 =       ACC_2:  EQU     0E2H
00E3 =       ACC_3:  EQU     0E3H
00E4 =       ACC_4:  EQU     0E4H
00E5 =       ACC_5:  EQU     0E5H
00E6 =       ACC_6:  EQU     0E6H
00E7 =       ACC_7:  EQU     0E7H

00F0 =       B_reg_0: EQU    0F0H
00F1 =       B_reg_1: EQU    0F1H
00F2 =       B_reg_2: EQU    0F2H
00F3 =       B_reg_3: EQU    0F3H
00F4 =       B_reg_4: EQU    0F4H
00F5 =       B_reg_5: EQU    0F5H
00F6 =       B_reg_6: EQU    0F6H
00F7 =       B_reg_7: EQU    0F7H


0000                  ORG     0000H   ; start at addr 0000H
0000 020100           JMP     HERE    ; jump ahead to begin program.
0003                  ORG     0003H
0003 020050  EXT0:    JMP     STOP    ; external interrupt 0 starting addr
000B                  ORG     000BH
000B 02057C  TC0:     JMP     TIMER0  ; timer/counter 0 interrupt start addr
0013                  ORG     0013H
0013 020050  EXT1:    JMP     STOP    ; external interrupt 1 starting addr
001B                  ORG     001BH
001B 020050  TC1:     JMP     STOP    ; timer/counter 1 interrupt start addr
0023                  ORG     0023H
0023 020585  SER:     JMP     SERIAL  ; serial port interrupt starting addr

0050                  ORG     0050H
0050 1205D6  STOP:    CALL    WAT4MS
0053 1205D6           CALL    WAT4MS
```

```
0056 1205D6          CALL    WAT4MS
0059 1205D6          CALL    WAT4MS
005C 1205D6          CALL    WAT4MS
005F C2A6            BCLR    LED
0061 1205D6          CALL    WAT4MS
0064 1205D6          CALL    WAT4MS
0067 1205D6          CALL    WAT4MS
006A 1205D6          CALL    WAT4MS
006D 1205D6          CALL    WAT4MS
0070 D2A6            BSET    LED
0072 80DC            BRA     STOP

               ;       COL 1   COL 2   COL 3   COL 4   COL 5

               ;       30 0    31 1    32 2    33 3    34 4
               ; ROW 1  S1      S7      S13     S19     S25
               ;          T       S       R       Q       P

               ;       35 5    36 6    37 7    38 8    39 9
               ; ROW 2  S2      S8      S14     S20     S26
               ;          O       N       M       L       K

               ;       3A :    3B ;    3C <    3D =    3E >
               ; ROW 3  S3      S9      S15     S21     S27
               ;         10       9       8       7       6

               ;       3F ?    40 @    41 A    42 B    43 C
               ; ROW 4  S4      S10     S16     S22     S28
               ;          5       4       3       2       1

               ;       44 D    45 E    46 F    47 G    48 H
               ; ROW 5  S5      S11     S17     S23     S29
               ;          J       I       H       G       F

               ;       49 I    4A J    4B K    4C L    4D M
               ; ROW 6  S6      S12     S18     S24     S30
               ;          E       D       C       B       A

               ; ***************************************************************************
0100                 ORG     0100H
0100           HERE:
0100 75814E          LDR     SP,#4EH         ; set Stack Pointer to MEM above last good
                                             ; "character" = addr.
0103 7580FF          LDR     P0,#0FFH        ; initialize port 0 to FFh.
0106 75A040          LDR     P2,#40H         ; turn LED off, other bits to zeroes
0109 75B0FF          LDR     P3.#0FFH        ; write all 1's to Port 3.
010C 759878          LDR     SCON, #78H      ; enable 8-bit UART, 01xx xxxx.
                                             ; frame error rejection enabled, xxx1x xxxx.
```

```
                                        ; receive shift register enabled, xxx1 xxxx.
                                        ; force 9th serial bit to 1 always, xxxx 1xxx.
010F 75A880         LDR    IEC,#80H     ; interrupts to be individually set, 1xxx xxxx.
                                        ; timer 1 interrupts disabled,
                                        ; which is required for baud generation.
                                        ; timer 0 interrupts will be set later.
0112 758921         LDR    TMOD,#21H    ; set timer 1 to 8-bit soft reload mode,
                                        ; xx10 xx1 & timer 0 to 16-bit mode.
0115 758DE8         LDR    TH1, #0E8H   ; load timer 1 with reload value for 1200 baud
0118 758850         LDR    TCON, #50H   ; enable timer 1, enable timer 0.


011B 901F00         LDR    DPTR,#1F00H  ; set data pointer to minimum, ie bot of stack.
                                        ; for the matrix memory.
                                        ; This requires the Partition be set to 1000h.
011E 7400           LDR    A,#00H       ; load the accumulator with 00h.
0120 F0             LDX    @DPTR,A      ; load memory pointed to by DPTR with 00h.
0121 7F1F           LDR    R7,#1FH      ; use R7,R6 to simulate DPTR
0123 7E00           LDR    R6,#00H
0125 A3        H0:  INC    DPTR         ; highest key character memory is 1EFF .
0126 0E             INC    R6           ; 1F00 to 1FFF is matrix memory.
0127 EE             LDR    A,R6         ; zero the whole page of memory.
0128 B40007         CBNE   A,#00H,H1    ; if low byte not zero, branch ahead.

012B 0F             INC    R7
012C EF             LDR    A,R7
012D B42002         CBNE   A,#20H,H1    ; if high byte not #20h, branch ahead.

0130 8005           BRA    H2           ; otherwise, data memory initialized to 00h
                                        ; so branch ahead to continue with rest.
0132 7400      H1:  LDR    A,#000H      ; else load 00h into data memory via accum.
0134 F0             LDX    @DPTR,A
0135 80EE           BRA    H0           ; loop back & continue intializing data mem.

0137           H2:
0137 7EFF           LDR    R6,#0FFH     ; Register 6 is the single/double beep flag,
                                        ; initialized to single beep.
0139 7508FF         LDR    R8,#0FFH     ; initialize R8 with "no previous key" value.
013C 750BFF         LDR    RB,#0FFH
013F 750CFF         LDR    RC,#0FFH     ; set RB & RC to "no previous character".
0142 750900         LDR    R9,#0        ; reset defect XMIT flag to zero.
0145 750A00         LDR    0AH,#0       ; reset pass-thru XMIT flag to zero.
0148 7513FF         LDR    19,#0FFH     ; initial defect number.


014B           H:
                    ;LDR   31,#1        ; set LCD/VF* flag to LCD
014B E5B0           LDR    A,P3
```

```
014D 5410            AND    A,#10H
014F 03              RRA
0150 03              RRA
0151 03              RRA
0152 03              RRA
0153 F51F            LDR    31,A          ; set R31 by the value of P3.4, pin 14.
0155 E51F            LDR    A,31
0157 B40111          CBNE   A,#1,H_VF
015A 120613          CALL   INIT_LCD      ; initialize display.
015D 75900F          LDR    P1,#0FH       ; display ON, with cursor, & blink.
0160 12060B          CALL   INSTRUCT
0163 759080          LDR    P1,#80H       ; set display data RAM to addr 00h
0166 12060B          CALL   INSTRUCT
0169 8003            BRA    H_INITD
016B          H_VF:
016B 1206A1          CALL   INIT_VF
016E          H_INITD:
016E 751200          LDR    18,#0         ; reset the "reset thyself" flag.


0171          HERE2:
0171 D2AC            BSET   IEC_4         ; enable serial interrupts.
0173 794D            LDR    R1,#4DH       ; initialize R1 to max memory addr needed.

0175 D2A5            BSET   P2_5          ; read row 6
0177 7F00            LDR    R7,#00H       ; reset flag to signal rows 1,2,5,6.
0179 1201B3          CALL   DELAY_READ
017C C2A5            BCLR   P2_5

017E D2A4            BSET   P2_4          ; read row 5
0180 7F00            LDR    R7,#00H       ; reset flag to signal rows 1,2,5,6.
0182 1201B3          CALL   DELAY_READ
0185 C2A4            BCLR   P2_4

0187 D2A3            BSET   P2_3          ; read row 4
0189 7F01            LDR    R7,#01H       ; set flag that signals row 3 or 4.
018B 1201B3          CALL   DELAY_READ
018E C2A3            BCLR   P2_3

0190 D2A2            BSET   P2_2          ; read row 3
0192 7F01            LDR    R7,#01H       ; set flag that signals row 3 or 4.
0194 1201B3          CALL   DELAY_READ
0197 C2A2            BCLR   P2_2

0199 D2A1            BSET   P2_1          ; read row 2
019B 7F00            LDR    R7,#00H       ; reset flag to signal rows 1,2,5,6.
019D 1201B3          CALL   DELAY_READ
01A0 C2A1            BCLR   P2_1
```

```
01A2 D2A0            BSET   P2_0           ; read row 1
01A4 7F00            LDR    R7,#00H        ; reset flag to signal rows 1,2,5,6.
01A6 1201B3          CALL   DELAY_READ
01A9 C2A0            BCLR   P2_0

01AB E512            LDR    A,18           ; get the "reset thyself" flag.
01AD B4FFC1          CBNE   A,#0FFH,HERE2  ; if it's not FFh then loop back to HERE2.
01B0 020100          JMP    HERE           ; else start over at HERE.
                ; ************************************************************************
01B3            DELAY_READ:                ; Delay & Read subroutine.
01B3 7B04            LDR    R3,#04H        ;R3 is a timing loop constant.

01B5 7C00       ND1: LDR    R4,#00H        ;R4 is another timing loop constant.
01B7 DCFE            DBNZ   R4,*           ; another internal delay loop.
01B9 DBFA            DBNZ   R3,ND1

01BB 19              DEC    R1             ; decrement R1 five times.
01BC 19              DEC    R1
01BD 19              DEC    R1
01BE 19              DEC    R1
01BF 19              DEC    R1             ; R1 now contains the base addr, less 1.
01C0 7580FF          LDR    P0,#0FFH       ; write 1's to Port 0.
01C3 AA80            LDR    R2,P0          ; read Port 0 into R2.
01C5 53021F          AND    R2,#1FH        ; mask out unconnected bits.
01C8 BA0018          CBNE   R2,#00H,ND2    ; if remaining bits not all 0, branch ahead.

01CB A801            LDR    R0,R1          ; else enter a zero bit for this sampling.
                                           ; now R0 has the base address.
01CD 1201DD          CALL   ROT_0          ; call the rotation subroutine.
                                           ; to record closed & open switches.
01D0 1201DD          CALL   ROT_0

01D3 1201DD          CALL   ROT_0

01D6 1201DD          CALL   ROT_0

01D9 1201DD          CALL   ROT_0

01DC 22              RET                   ; return from Delay & Read subroutine.

                ; ************************************************************************
01DD 08         ROT_0: INC  R0             ; Rotation subroutine.
01DE E6              LDR    A,@R0          ; load M(R0) into accumulator A.
01DF C3              CLR    C              ; clear the carry bit.
01E0 13              RRC    A              ; rotate right with carry going into MSB.
01E1 F6              LDR    @R0,A          ; load accumulator A back into M(R0).
01E2 22              RET
```

```
                 ; ************************************************************************
01E3 E9          ND2:    LDR     A,R1            ; load accumulator with R1, the base addr.
01E4 2405                ADD     A,#5            ; add 5 to R1 in accumulator.
01E6 F8                  LDR     R0,A
01E7 E6                  LDR     A,@R0           ; load accumulator with M(R1+5).
01E8 BA0103              CBNE    R2,#01H,ND25    ; branch ahead if R2 isn't 01, column 5.
01EB D3                  BSET    C               ; if it is, set the carry bit.
01EC 8001                BRA     ND27            ; then branch ahead.
01EE C3          ND25:   CLR     C               ; if it isn't, then clear the carry bit.
01EF 13          ND27:   RRC     A               ; now rotate the carry bit into the cell.
01F0 F6                  LDR     @R0,A           ; save accumulator to M(R1+5).

01F1 E9          ND3:    LDR     A,R1            ; do it all again for M(R1+4).
01F2 2404                ADD     A,#4            ; add 4 to R1 in accumulator.
01F4 F8                  LDR     R0,A
01F5 E6                  LDR     A,@R0
01F6 BA0203              CBNE    R2,#02H,ND35    ; branch ahead if R2 isn't 02, column 4.
01F9 D3                  BSET    C
01FA 8001                BRA     ND37
01FC C3          ND35:   CLR     C
01FD 13          ND37:   RRC     A
01FE F6                  LDR     @R0,A

01FF E9          ND4:    LDR     A,R1
0200 2403                ADD     A,#3            ; add 3 to R1
0202 F8                  LDR     R0,A
0203 E6                  LDR     A,@R0
0204 BA0403              CBNE    R2,#04H,ND45    ; branch ahead if R2 isn't 04, column 3.
0207 D3                  BSET    C
0208 8001                BRA     ND47
020A C3          ND45:   CLR     C
020B 13          ND47:   RRC     A
020C F6                  LDR     @R0,A

020D E9          ND5:    LDR     A,R1
020E 2402                ADD     A,#2            ; add 2 to R1
0210 F8                  LDR     R0,A
0211 E6                  LDR     A,@R0
0212 BA0803              CBNE    R2,#08H,ND55    ; branch ahead if R2 isn't 08, column 2.
0215 D3                  BSET    C
0216 8001                BRA     ND57
0218 C3          ND55:   CLR     C
0219 13          ND57:   RRC     A
021A F6                  LDR     @R0,A

021B E9          ND6:    LDR     A,R1
021C 2401                ADD     A,#1            ; add 1 to R1
```

```
021E F8              LDR    R0,A
021F E6              LDR    A,@R0
0220 BA1003          CBNE   R2,#10H,ND65    ; branch ahead if R2 isn't 10, column 1.
0223 D3              BSET   C
0224 8001            BRA    ND67
0226 C3     ND65:    CLR    C
0227 13     ND67:    RRC    A
0228 F6              LDR    @R0,A
                                            ; now test all memory cells for a good key.
0229 A801            LDR    R0,R1           ; R1 is base address for the row.

022B 08              INC    R0              ; column 1.
022C E6              LDR    A,@R0
022D B4F002          CBNE   A,#0F0H,ND7
0230 801D            BRA    BEEPER

0232 08     ND7:     INC    R0              ; column 2.
0233 E6              LDR    A,@R0
0234 B4F002          CBNE   A,#0F0H,ND8
0237 8016            BRA    BEEPER

0239 08     ND8:     INC    R0              ; column 3.
023A E6              LDR    A,@R0
023B B4F002          CBNE   A,#0F0H,ND9
023E 800F            BRA    BEEPER

0240 08     ND9:     INC    R0              ; column 4.
0241 E6              LDR    A,@R0
0242 B4F002          CBNE   A,#0F0H,ND10
0245 8008            BRA    BEEPER

0247 08     ND10:    INC    R0              ; column 5.
0248 E6              LDR    A,@R0
0249 B4F002          CBNE   A,#0F0H,ND11
024C 8001            BRA    BEEPER
024E 22     ND11:    RET                    ; return

            ; ***************************************************************************
024F 758C80 BEEPER:  LDR    TH0,#80H        ; pattern is good (i.e.#0F0H), so
0252 758A00          LDR    TL0,#00H        ; load timer 0 with a timing constant.
0255 7D02            LDR    R5,#02H         ; load R5 with a timing constant loop counter.
0257 BF0003          CBNE   R7,#00H,BEEPC   ; see if single length beep requested.
025A ED              LDR    A,R5            ; load accumulator with R5.
025B 23              RL     A               ; shift up one time.
025C FD              LDR    R5,A            ; load accumulator back into R5.
025D D2A7   BEEPC:   BSET   P2_7            ; turn on the beeper.
025F D2A9            BSET   IEC_1           ; enable timer 0 interrupts.
0261 63A040          XOR    P2,#40H         ; toggle LED
```

```
0264 850B0C             LDR    RC,RB          ; copy previous key to 2nd previous key.
0267 880B               LDR    RB,R0          ; copy this key to previous key.

                                              ; R7 is row 3 or 4 flag.
0269 E508      BEEPEX:  LDR    A,R8           ; R8 is previous value of R7; FFh on startup.
026B B4FF02             CBNE   A,#0FFH,BP3    ; if R8 <> initial value, branch to next test.
026E 8010               BRA    BP8            ; else branch to BP8.
0270 EF        BP3:     LDR    A,R7           ; get row 3 or 4 flag for comparison.
0271 B50802             CBNE   A,R8,BP7       ; if R8 <> R7 then branch to BP7.
0274 800A               BRA    BP8            ; else branch to BP8.
0276 E5A0      BP7:     LDR    A,P2           ; read current state of LED.
0278 5440               AND    A,#40H         ; mask out all but LED bit.
027A B44003             CBNE   A,#40H,BP8     ; if LED ON (P2_6=0) then branch ahead.
027D 120283             CALL   FILL_MATRIX    ; decode key pair & update one matrix element.
0280 8F08      BP8:     LDR    R8,R7          ; save "previous" R7 in R8

0282 22                 RET                   ; return from subroutine.

               ; ************************************************************************
0283           FILL_MATRIX:    ; previous two keys were a position & type of error (or vice
                               ; versa), so now let us decode them into a defect.
0283 E50C               LDR    A,RC           ; get 2nd previous key.
0285 B4FF01             CBNE   A,#0FFH,F0     ; if it's not the initial value, continue.
0288 22                 RET
0289           F0:
0289 BF011C             CBNE   R7,#01H,F2     ; if R7<>1 then RB is a position, branch F2.

028C 7444               LDR    A,#44H         ; else RB is a type of error; subtract it
028E C3                 CLR    C              ; from #44h to get error number.
028F 950B               SBC    A,RB           ; get previous key.
0291 F50D               LDR    RD,A           ; save error number in RD, 1 to 10.

0293 744D               LDR    A,#4DH         ; now subtract position character from #4Dh.
0295 C3                 CLR    C              ; to get position number.
0296 950C               SBC    A,RC           ; subtract 2nd previous key.
0298 F50E               LDR    RE,A           ; temporarily save position number in RE
                                              ; 0 to 19 for A to T (skip over errors below).
029A C3                 CLR    C
029B 940B               SBC    A,#11          ; subtract 11d from position number.
029D 4007               BC     F1             ; branch ahead if carry set for borrow;

029F C3                 CLR    C
02A0 E50E               LDR    A,RE           ; retrieve position number from RE.
02A2 940A               SBC    A,#10          ; subtract 10d from character to get position
02A4 F50E               LDR    RE,A           ; number.

02A6 801A      F1:      BRA    F3
```

```
02A8              F2:
02A8 7444               LDR    A,#44H         ; else RB is a type of error; subtract it
02AA C3                 CLR    C              ; from #44h to get error number.
02AB 950C               SBC    A,RC           ; get 2nd previous key.
02AD F50D               LDR    RD,A           ; save error number in RD.

02AF 744D               LDR    A,#4DH         ; now subtract position character from #4Dh
02B1 C3                 CLR    C              ; to get position number.
02B2 950B               SBC    A,RB           ; subtract previous key.
02B4 F50E               LDR    RE,A           ; save position number in RE.

02B6 C3                 CLR    C
02B7 940B               SBC    A,#11          ; subtract 11d from position number.
02B9 4007               BC     F3             ; branch ahead if carry set for borrow;

02BB C3                 CLR    C
02BC E50E               LDR    A,RE
02BE 940A               SBC    A,#10          ; subtract 10d from character to get position
02C0 F50E               LDR    RE,A           ; number, temporarily saving results in RE.

02C2 75F00A       F3:   LDR    B_reg,#10      ; for each position there are 10 errors.
02C5 E50E               LDR    A,RE           ; retrieve position number from RE, 0 to 19.
02C7 A4                 MUL    AB             ; multiply number of errors times position #.
02C8 250D               ADD    A,RD           ; add the type-of-error number, 1 to 10.
                                              ; now accumulator A has the addr to increment.
02CA F50F               LDR    RF,A           ; save it in RF.
02CC F513               LDR    19,A           ; register 19 holds defect number, 1 to 200.
                                              ; defect initialization = FFh.
02CE              F640:
02CE E50A               LDR    A,0AH          ; test the pass-thru XMIT flag.
02D0 B400FB             CBNE   A,#0,F640      ; wait for it to clear.
02D3 7509FF             LDR    R9,#0FFH       ; set defect XMIT flag to non-zero
                                              ; claiming transmitter resources.
02D6 851399             LDR    SBUF,19        ; transmit the defect number.



02D9 901F00             LDR    DPTR,#1F00H    ; preset DPTR to #1F00h.

02DC A3           F64:  INC    DPTR           ; increment DPTR in matrix memory
02DD D50FFC             DBNZ   RF,F64         ; to the correct element; RF now zero.

02E0              F65:
02E0 E0                 LDX    A,@DPTR        ; get current count.
02E1 B4FF02             CBNE   A,#0FFH,F66    ; branch to increment if it's not #FFh.
02E4 8002               BRA    F67            ; else branch to F67.
02E6 04           F66:  INC    A              ; increment the count.
```

```
02E7 F0                 LDX     @DPTR,A         ; store count back into last page of dat mem.
02E8          F67:


                                                ; seek 4 biggest offenders.
02E8 901F01             LDR     DPTR,#1F01H     ; initialize DPTR to first defect cell.
02EB 751601             LDR     22,#1
02EE E0                 LDX     A,@DPTR
02EF F51B               LDR     27,A            ; initialize R27 to contents of M(R21).

02F1 901F00             LDR     DPTR,#1F00H
02F4 7519C8             LDR     25,#200         ; initialize R25 with number of defects.
02F7 751A00             LDR     26,#0           ; shadow the DPTR.

                                                ; now increment thru defect memory cells.
02FA A3       F68:      INC     DPTR            ; increment the DPTR.
02FB 051A               INC     26              ; increment the shadow.
02FD E0                 LDX     A,@DPTR         ; get the count in this cell.
02FE C3                 CLR     C               ; clear carry as a prerequisite to subtraction
02FF 951B               SBC     A,27            ; subtract from it the biggest so far (in R21)
0301 4006               BC      F69             ; if R21 > A, there was a carry so jump ahead
0303 851A15             LDR     21,26           ; addr's updated.
0306 E0                 LDX     A,@DPTR
0307 F51B               LDR     27,A            ; counts updated.
0309 D519EE   F69:      DBNZ    25,F68          ; decrement counter register, branch back<>0.
                                                ; now R27 has the count, R21 the location.
                                                ; now load that location with zero count.
030C 901F00             LDR     DPTR,#1F00H
030F 851519             LDR     25,21
0312 A3       F6901:    INC     DPTR
0313 D519FC             DBNZ    25,F6901
0316 7400               LDR     A,#0
0318 F0                 LDX     @DPTR,A

0319 901F01             LDR     DPTR,#1F01H     ; initialize DPTR to first defect cell.
031C 751601             LDR     22,#1
031F E0                 LDX     A,@DPTR
0320 F51C               LDR     28,A

0322 901F00             LDR     DPTR,#1F00H     ; initialize DPTR to first defect cell minus 1
0325 7519C8             LDR     25,#200         ; initialize R25 with number of defects.
0328 751A00             LDR     26,#0           ; shadow the DPTR.
032B          F691:
032B A3                 INC     DPTR
032C 051A               INC     26
032E E0                 LDX     A,@DPTR
032F C3                 CLR     C
0330 951C               SBC     A,28
```

```
0332 4006               BC     F6912
0334 851A16             LDR    22,26
0337 E0                 LDX    A,@DPTR
0338 F51C               LDR    28,A
033A D519EE   F6912:   DBNZ   25,F691       ; finished 2nd offender.

                                           ; now R28 has the count, R22 the location.
                                           ; now load that location with zero count.
033D 901F00             LDR    DPTR,#1F00H
0340 851619             LDR    25,22
0343 A3       F6913:   INC    DPTR
0344 D519FC             DBNZ   25,F6913
0347 7400               LDR    A,#0
0349 F0                 LDX    @DPTR,A

034A 901F01             LDR    DPTR,#1F01H  ; initialize DPTR to first defect cell.
034D 751701             LDR    23,#1
0350 E0                 LDX    A,@DPTR
0351 F51D               LDR    29,A

0353 901F00             LDR    DPTR,#1F00H  ; initialize DPTR to first defect cell minus 1
0356 7519C8             LDR    25,#200      ; initialize R25 with number of defects
0359 751A00             LDR    26,#0        ; shadow the DPTR.
035C          F692:
035C A3                 INC    DPTR
035D 051A               INC    26
035F E0                 LDX    A,@DPTR
0360 C3                 CLR    C
0361 951D               SBC    A,29
0363 4006               BC     F6928
0365 851A17             LDR    23,26
0368 E0                 LDX    A,@DPTR
0369 F51D               LDR    29,A
036B D519EE   F6928:   DBNZ   25,F692       ; finished 3rd offender.

                                           ; now R29 has the count, R23 the location.
                                           ; now load that location with zero count.
036E 901F00             LDR    DPTR,#1F00H
0371 851719             LDR    25,23
0374 A3       F6929:   INC    DPTR
0375 D519FC             DBNZ   25,F6929
0378 7400               LDR    A,#0
037A F0                 LDX    @DPTR,A

037B 901F01             LDR    DPTR,#1F01H  ; initialize DPTR to first defect cell.
037E 751801             LDR    24,#1
0381 E0                 LDX    A,@DPTR
0382 F51E               LDR    30,A
```

```
0384 901F00          LDR    DPTR,#1F00H    ; initialize DPTR to first defect cell minus 1
0387 7519C8          LDR    25,#200        ; initialize R25 with number of defects
038A 751A00          LDR    26,#0          ; shadow the DPTR.
038D        F693:
038D A3              INC    DPTR
038E 051A            INC    26
0390 E0              LDX    A,@DPTR
0391 C3              CLR    C
0392 951E            SBC    A,30
0394 4006            BC     F6938
0396 851A18          LDR    24,26
0399 E0              LDX    A,@DPTR
039A F51E            LDR    30,A
039C D519EE  F6938:  DBNZ   25,F693        ; finished 4th offender.

                                           ; now restore the counts in top 3 offenders
039F 901F00          LDR    DPTR,#1F00H
03A2 851719          LDR    25,23
03A5 A3      F695:   INC    DPTR
03A6 D519FC          DBNZ   25,F695
03A9 E51D            LDR    A,29
03AB F0              LDX    @DPTR,A

03AC 901F00          LDR    DPTR,#1F00H
03AF 851619          LDR    25,22
03B2 A3      F696:   INC    DPTR
03B3 D519FC          DBNZ   25,F696
03B6 E51C            LDR    A,28
03B8 F0              LDX    @DPTR,A

03B9 901F00          LDR    DPTR,#1F00H
03BC 851519          LDR    25,21
03BF A3      F697:   INC    DPTR
03C0 D519FC          DBNZ   25,F697
03C3 E51B            LDR    A,27
03C5 F0              LDX    @DPTR,A

03C6 E51F            LDR    A,31
03C8 B40108          CBNE   A,#1,F697V
03CB 1204BF          CALL   CLEAR_LCD
03CE 1204B1          CALL   HOME_LCD
03D1 8006            BRA    F698
03D3        F697V:
03D3 1204C6          CALL   CLEAR_VF
03D6 1204B8          CALL   HOME_VF
03D9        F698:
03D9 E515            LDR    A,21
```

```
03DB 851B1A          LDR     26,27
03DE 1204CD          CALL    DECODE        ; decode RE & RD from Accumulator
03E1 1204E4          CALL    DISPLAY       ; RE is position #, RD is type of error #.
                                           ; R3, R4, RD, RE, RF get used.
03E4 E51F            LDR     A,31
03E6 B40108          CBNE    A,#1,F698V
03E9 7590C0          LDR     P1,#0C0H      ; set cursor to 1st space, 2nd line.
03EC 12060B          CALL    INSTRUCT
03EF 8003            BRA     F698Z
03F1         F698V:
03F1 120734          CALL    CRLF
03F4         F698Z:
03F4 E516            LDR     A,22
03F6 851C1A          LDR     26,28
03F9 1204CD          CALL    DECODE
03FC 1204E4          CALL    DISPLAY

03FF E51F            LDR     A,31
0401 B40108          CBNE    A,#1,F698V2
0404 759090          LDR     P1,#90H       ; set cursor to 1st space, 3rd line.
0407 12060B          CALL    INSTRUCT
040A 8003            BRA     F698Z2
040C         F698V2:
040C 120734          CALL    CRLF
040F         F698Z2:
040F E517            LDR     A,23
0411 851D1A          LDR     26,29
0414 1204CD          CALL    DECODE
0417 1204E4          CALL    DISPLAY

041A E51F            LDR     A,31
041C B40108          CBNE    A,#1,F698V3
041F 7590D0          LDR     P1,#0D0H      ; set cursor to 1st space, 4th line.
0422 12060B          CALL    INSTRUCT
0425 8003            BRA     F698Z3
0427         F698V3:
0427 120734          CALL    CRLF
042A         F698Z3:
042A E518            LDR     A,24
042C 851E1A          LDR     26,30
042F 1204CD          CALL    DECODE
0432 1204E4          CALL    DISPLAY
0435         F9:
                     ;now totalize all the defects & display it on the 4th line.
0435 901F00          LDR     DPTR,#1F00H
0438 751A00          LDR     26,#0         ; R26 will hold the total.
043B 751900          LDR     25,#0         ; R25 will shadow the DPTR, & test for done.
043E A3      F99:    INC     DPTR          ; increment the DPTR and its shadow
```

```
043F 0519              INC    25
0441 E0                LDX    A,@DPTR        ; else get the defect count pointed by DPTR
0442 C3                CLR    C              ; clear carry bit for ADC to come below.
0443 351A              ADC    A,26           ; add current grand total to it
0445 5002              BNC    F991           ; if no overflow, continue at F991
0447 74FF              LDR    A,#255         ; else set grand total to 255
0449 F51A      F991:   LDR    26,A           ; store current grand total back to R26
044B E519              LDR    A,25           ; get shadow to test for done
044D B4C8EE            CBNE   A,#0C8H,F99    ; branch back if not done

0450 E51F              LDR    A,31
0452 B40128            CBNE   A,#1,F992V
0455 759020            LDR    P1,#" "
0458 1205FA            CALL   DATA
045B 759054            LDR    P1,#"T"
045E 1205FA            CALL   DATA
0461 75904F            LDR    P1,#"O"
0464 1205FA            CALL   DATA
0467 759054            LDR    P1,#"T"
046A 1205FA            CALL   DATA
046D 75902E            LDR    P1,#"."
0470 1205FA            CALL   DATA
0473 759020            LDR    P1,#" "
0476 1205FA            CALL   DATA
0479 120518            CALL   DISPLAY_COUNT
047C 22                RET                   ; return.
047D           F992V:
047D 759020            LDR    P1,#" "
0480 1205F2            CALL   E_TOGL_VF
0483 759020            LDR    P1,#" "
0486 1205F2            CALL   E_TOGL_VF
0489 759054            LDR    P1,#"T"
048C 1205F2            CALL   E_TOGL_VF
048F 75904F            LDR    P1,#"O"
0492 1205F2            CALL   E_TOGL_VF
0495 759054            LDR    P1,#"T"
0498 1205F2            CALL   E_TOGL_VF
049B 759041            LDR    P1,#"A"
049E 1205F2            CALL   E_TOGL_VF
04A1 75904C            LDR    P1,#"L"
04A4 1205F2            CALL   E_TOGL_VF
04A7 759020            LDR    P1,#" "
04AA 1205F2            CALL   E_TOGL_VF
04AD 120518            CALL   DISPLAY_COUNT
04B0 22                RET
               ; ****************************************************************************
04B1           HOME_LCD:
04B1 759080            LDR    P1,#80H        ; set cursor to 1st space, 1st line.
```

```
04B4 12060B             CALL    INSTRUCT
04B7 22                 RET
                ; ************************************************************************
04B8            HOME_VF:
04B8 759016             LDR     P1,#16H          ; cursor home.
04BB 1205F2             CALL    E_TOGL_VF
04BE 22                 RET
                ; ************************************************************************
04BF            CLEAR_LCD:
04BF 759001             LDR     P1,#01H
04C2 12060B             CALL    INSTRUCT
04C5 22                 RET
                ; ************************************************************************
04C6            CLEAR_VF:
04C6 759015             LDR     P1,#15H          ; clear display.
04C9 1205F2             CALL    E_TOGL_VF
04CC 22                 RET
                ; ************************************************************************
04CD            DECODE: ;Begin with A, uses R3&4, puts position # into RE, error # into RD.
                        ; Count up from zero. Every time the type of error increments past
                        ; 10, reset it to 1, and increment the position.  When the defect
                        ; number is decremented to zero, then the error & position are good.
04CD FB                 LDR     R3,A             ; put it in R3.
04CE FC                 LDR     R4,A
04CF 750E00             LDR     RE,#0
04D2 750D00             LDR     RD,#0            ; load results registers with zeroes.
04D5            D7:
04D5 050D               INC     RD               ; increment type of error.
04D7 E50D               LDR     A,RD
04D9 B40B05             CBNE    A,#0BH,D75       ; test it for > 10.
04DC 750D01             LDR     RD,#01H          ; if >, then reset to 1.
04DF 050E               INC     RE               ; increment position number.
04E1            D75:
04E1 DBF2               DBNZ    R3,D7            ; decrement the count & test to see if more.

04E3 22                 RET
                ; ************************************************************************
04E4            DISPLAY:                 ; RE has position, RD has type of error.
                                         ; R3, R4, RD, RE, RF all used by this routine.
04E4 E50E               LDR     A,RE             ; get the position (0 to 19d for A to T).
04E6 2441               ADD     A,#41H
04E8 F590               LDR     P1,A
04EA 1205FA             CALL    DATA             ; display the position letter.
04ED E50D               LDR     A,RD             ; get the type of error (1 to 10).
04EF 2430               ADD     A,#30H
04F1 F50D               LDR     RD,A
04F3 C3                 CLR     C
04F4 943A               SBC     A,#3AH
```

```
04F6 400E            BC     F62

04F8 759031          LDR    P1,#"1"
04FB 1205FA          CALL   DATA
04FE 759030          LDR    P1,#"0"
0501 1205FA          CALL   DATA          ; display a "10" if type of error is 10.
0504 800C            BRA    F63

0506 850D90   F62:   LDR    P1,RD
0509 1205FA          CALL   DATA          ; display type of error if 0 to 9.
050C 759020          LDR    P1,#" "
050F 1205FA          CALL   DATA          ; display a space.
0512 759020   F63:   LDR    P1,#" "
0515 1205FA          CALL   DATA          ; display a space.
              ; ***********************************************************************
0518          DISPLAY_COUNT:
                                          ; convert from binary to ASCII.
0518 AB1A            LDR    R3,26         ; get the count.
051A 7C00            LDR    R4,#0         ; reset leading zero flag, R4.
051C 750F30          LDR    RF,#30H
051F 750E30          LDR    RE,#30H
0522 750D30          LDR    RD,#30H       ; load results registers with ASCII zeroes.
0525 E51A            LDR    A,26
0527 B40008          CBNE   A,#0,F7
052A 759020          LDR    P1,#" "
052D 1205FA          CALL   DATA
0530 8040            BRA    F85
0532          F7:
0532 050D            INC    RD            ; increment LSD.
0534 E50D            LDR    A,RD
0536 B43A0F          CBNE   A,#3AH,F75    ; test it for > "9".
0539 750D30          LDR    RD,#30H       ; if >, then reset to "0".
053C 050E            INC    RE            ; increment middle digit.
053E E50E            LDR    A,RE
0540 B43A05          CBNE   A,#3AH,F75    ; test it for > "9".
0543 750E30          LDR    RE,#30H       ; if >, then reset to "0".
0546 050F            INC    RF            ; and increment MSD.
0548          F75:
0548 DBE8            DBNZ   R3,F7         ; decrement the count & test to see if more.

054A          F8:
054A E50F            LDR    A,RF          ; get the MSD.
054C B43007          CBNE   A,#30H,F81    ; is it "0"?
054F 759020          LDR    P1,#" "       ; then display a space.
0552 7C01            LDR    R4,#1         ; set leading zero flag, R4.
0554 8003            BRA    F82
0556          F81:
0556 850F90          LDR    P1,RF         ; else display the ASCII character.
```

```
0559            F82:
0559 1205FA            CALL    DATA

055C E50E              LDR     A,RE            ; get middle digit.
055E B4300E            CBNE    A,#30H,F84      ; test it for "0", branch ahead if not.
0561 EC                LDR     A,R4            ; get leading zero flag.
0562 B40105            CBNE    A,#1,F83        ; test MSD equal to "0", branch ahead if not.
0565 759020            LDR     P1,#" "         ; load a blank since 0 and RF = 0.
0568 8008              BRA     F85             ; branch ahead to display.
056A 759030     F83:   LDR     P1,#"0"         ; load "0" since 0 and RF <> 0.
056D 8003              BRA     F85             ; branch ahead to display.
056F 850E90     F84:   LDR     P1,RE           ; not 0, so load middle digit.
0572 1205FA     F85:   CALL    DATA              ; display ASCII character.

0575 850D90            LDR     P1,RD           ; display LSD; never 0, never undisplayable.
0578 1205FA            CALL    DATA

057B 22                RET
                ; ************************************************************************
                                               ; interrupt service.
057C 1D         TIMER0: DEC    R5              ; decrement timing loop counter.
057D BD0004            CBNE    R5,#0,TIMERX    ; if loop counter not 0, then return.
0580 C2A7              BCLR    P2_7            ; else clear the beeper.
0582 C2A9              BCLR    IEC_1           ; clear timer 0 interrupt enable.
0584 32         TIMERX: RETI                   ; return from interrupt service.
                ; ************************************************************************
0585            SERIAL:                        ; serial interrupt service.
                                               ; push certain registers onto the stack.
0585 C0E0              PUSH    ACC             ; used throughout interrupt service.

0587 E598       S1:    LDR     A,SCON          ; get serial control register.
0589 5402              AND     A,#02H
058B B4020F            CBNE    A,#02H,S2       ; if it's the transmit interrupt
                                               ; then clear it and test R9 & RA.
058E C299              BCLR    SCON_1
0590 E50A              LDR     A,0AH           ; get pass-thru XMIT flag, RA.
0592 B4FF05            CBNE    A,#0FFH,S15     ; if it's reset, jump ahead to reset R9.
0595 750A00            LDR     0AH,#0          ; otherwise, reset RA.
0598 8003              BRA     S2              ; then return from interrupt.
059A            S15:
059A 750900            LDR     R9,#0           ; reset defect XMIT flag, R9.

059D            S2:                            ; this must be a received serial interrupt.
059D E598              LDR     A,SCON
059F 5401              AND     A,#01H
05A1 B40002            CBNE    A,#00H,S25
05A4 801C              BRA     S10
05A6            S25:
```

```
05A6 859914             LDR     20,SBUF          ; read the character.
05A9 E514               LDR     A,20
05AB B4E005             CBNE    A,#RESET_CHAR,S3; if not the "reset thyself" character, go on.
05AE 7512FF             LDR     18,#0FFH         ; set the "reset thyself" flag.
05B1 8000               BRA     S4
05B3            S3:
                ;       CBNE    A,#13,S4         ; if it's a carriage return, skip it & return.
                ;       BRA     S10
05B3            S4:
05B3 E509               LDR     A,R9             ; get the defect XMIT flag.
05B5 B4FF02             CBNE    A,#0FFH,S5       ; if it's not set, then set the pass-thru flag
05B8 8008               BRA     S10              ; else return from interrupt service w/o XMIT.

05BA 750AFF     S5:     LDR     0AH,#0FFH        ; set the pass-thru flag.
05BD 851499             LDR     SBUF,20          ; retransmit the character out the ser. port.
05C0 C298               BCLR    SCON_0           ; clear the received serial interrupt bit.
05C2            S10:
05C2 D0E0               PULL    ACC              ; restore accumulator.
05C4 32                 RETI                     ; return.

                ; ************************************************************************
05C5            WAT200MS:
05C5 1205CC             CALL    WAT100MS
05C8 1205CC             CALL    WAT100MS
05CB 22                 RET
                ; ************************************************************************
05CC            WAT100MS:
05CC 751119             LDR     17,#19H
05CF 1205D6     W101:   CALL    WAT4MS
05D2 D511FA             DBNZ    17,W101
05D5 22                 RET
                ; ************************************************************************
05D6 7510FF     WAT4MS: LDR     16,#0FFH
05D9 00         WAT1:   NOP
05DA 00                 NOP
05DB 00                 NOP
05DC 00                 NOP
05DD 00                 NOP
05DE 00                 NOP
05DF 00                 NOP
05E0 00                 NOP
05E1 00                 NOP
05E2 00                 NOP
05E3 00                 NOP
05E4 00                 NOP
05E5 00                 NOP
05E6 D510F0             DBNZ    16,WAT1
05E9 22                 RET
```

```
                ; ************************************************************************
05EA            E_TOGL_LCD:
05EA D287               BSET    ENABLE
05EC 1205D6             CALL    WAT4MS
05EF C287               BCLR    ENABLE
05F1 22                 RET
                ; ************************************************************************
05F2            E_TOGL_VF:
05F2 1205D6             CALL    WAT4MS
05F5 C287               BCLR    ENABLE
05F7 D287               BSET    ENABLE
05F9 22                 RET
                ; ************************************************************************
05FA            DATA:
05FA D285               BSET    RS              ;*****
05FC C286               BCLR    RW
05FE E51F               LDR     A,31
0600 B40104             CBNE    A,#1,DATAV
0603 1205EA             CALL    E_TOGL_LCD
0606 22                 RET
0607            DATAV:
0607 1205F2             CALL    E_TOGL_VF
060A 22                 RET
                ; ************************************************************************
060B            INSTRUCT:
060B C285               BCLR    RS
060D C286               BCLR    RW
060F 1205EA             CALL    E_TOGL_LCD
0612 22                 RET
                ; ************************************************************************
0613            INIT_LCD:
0613 1205CC             CALL    WAT100MS
0616 C287               BCLR    ENABLE
0618 C285               BCLR    RS
061A C286               BCLR    RW
061C 759030             LDR     P1,#30H         ; set 8-bit, 1 line, 5x7
061F 1205D6             CALL    WAT4MS

0622 1205EA             CALL    E_TOGL_LCD
0625 1205D6             CALL    WAT4MS
0628 1205EA             CALL    E_TOGL_LCD
062B 12060B             CALL    INSTRUCT

062E 759038             LDR     P1,#38H         ; set 8-bit, 2 line, 5x7
0631 12060B             CALL    INSTRUCT

0634 759008             LDR     P1,#08H         ; set display off, no cursor, no blink
0637 12060B             CALL    INSTRUCT
```

```
063A 759001          LDR     P1,#01H        ; set display clear
063D 12060B          CALL    INSTRUCT

0640 759006          LDR     P1,#06H        ; set increment +1, no shift
0643 12060B          CALL    INSTRUCT

0646 759020          LDR     P1,#" "        ; cursor visible & blinking.
0649 1205FA          CALL    DATA
064C          READY:
064C 759052          LDR     P1,#"R"
064F 1205FA          CALL    DATA
0652 759045          LDR     P1,#"E"
0655 1205FA          CALL    DATA
0658 759041          LDR     P1,#"A"
065B 1205FA          CALL    DATA
065E 759044          LDR     P1,#"D"
0661 1205FA          CALL    DATA
0664 759059          LDR     P1,#"Y"
0667 1205FA          CALL    DATA
066A 759020          LDR     P1,#" "
066D 1205FA          CALL    DATA
0670 759054          LDR     P1,#"T"
0673 1205FA          CALL    DATA
0676 75904F          LDR     P1,#"O"
0679 1205FA          CALL    DATA
067C 759020          LDR     P1,#" "
067F 1205FA          CALL    DATA
0682 759042          LDR     P1,#"B"
0685 1205FA          CALL    DATA
0688 759045          LDR     P1,#"E"
068B 1205FA          CALL    DATA
068E 759047          LDR     P1,#"G"
0691 1205FA          CALL    DATA
0694 759049          LDR     P1,#"I"
0697 1205FA          CALL    DATA
069A 75904E          LDR     P1,#"N"
069D 1205FA          CALL    DATA
06A0 22              RET
              ; ****************************************************************************
06A1          INIT_VF:
06A1 D287            BSET    WR_
06A3 D285            BSET    TEST_
06A5 1205CC          CALL    WAT100MS
06A8 1205CC          CALL    WAT100MS
06AB 1205CC          CALL    WAT100MS
06AE 1205CC          CALL    WAT100MS
06B1 1205CC          CALL    WAT100MS
```

```
06B4 D287              BSET   WR_
06B6 D285              BSET   TEST_
06B8 759014            LDR    P1,#14H         ; software reset display.
06BB 1205F2            CALL   E_TOGL_VF
06BE 759015            LDR    P1,#15H         ; clear display.
06C1 1205F2            CALL   E_TOGL_VF
06C4 759016            LDR    P1,#16H         ; cursor home.
06C7 1205F2            CALL   E_TOGL_VF
06CA 75900E            LDR    P1,#0EH         ; cursor invisible.
06CD 1205F2            CALL   E_TOGL_VF
06D0 02064C            JMP    READY

06D3 759052            LDR    P1,#"R"         ; this code never executed.
06D6 1205F2            CALL   E_TOGL_VF       ; delete it in next assembly.
06D9 759045            LDR    P1,#"E"
06DC 1205F2            CALL   E_TOGL_VF
06DF 759041            LDR    P1,#"A"
06E2 1205F2            CALL   E_TOGL_VF
06E5 759044            LDR    P1,#"D"
06E8 1205F2            CALL   E_TOGL_VF
06EB 759059            LDR    P1,#"Y"
06EE 1205F2            CALL   E_TOGL_VF
06F1 75902C            LDR    P1,#" "
06F4 1205F2            CALL   E_TOGL_VF
06F7 759054            LDR    P1,#"T"
06FA 1205F2            CALL   E_TOGL_VF
06FD 75904F            LDR    P1,#"O"
0700 1205F2            CALL   E_TOGL_VF
0703 759020            LDR    P1,#" "
0706 1205F2            CALL   E_TOGL_VF
0709 759042            LDR    P1,#"B"
070C 1205F2            CALL   E_TOGL_VF
070F 759045            LDR    P1,#"E"
0712 1205F2            CALL   E_TOGL_VF
0715 759047            LDR    P1,#"G"
0718 1205F2            CALL   E_TOGL_VF
071B 759049            LDR    P1,#"I"
071E 1205F2            CALL   E_TOGL_VF
0721 75904E            LDR    P1,#"N"
0724 1205F2            CALL   E_TOGL_VF
0727 22                RET
                ; ***************************************************************************
0728 C2A6       BLINK2: BCLR   LED
072A 1205CC            CALL   WAT100MS
072D D2A6              BSET   LED
072F 1205CC            CALL   WAT100MS
0732 80F4              BRA    BLINK2
                ; ***************************************************************************
```

```
0734                CRLF:
0734 75900D                 LDR     P1,#0DH         ; carriage return.
0737 1205F2                 CALL    E_TOGL_VF
073A 75900A                 LDR     P1,#0AH         ; linefeed.
073D 1205F2                 CALL    E_TOGL_VF
0740 22                     RET
                    ; ****************************************************************************
0000                        END
```

| | | | | | |
|---|---|---|---|---|---|
| 00E0 | ACC | 00E0 | ACC_0 | 00E1 | ACC_1 |
| 00E2 | ACC_2 | 00E3 | ACC_3 | 00E4 | ACC_4 |
| 00E5 | ACC_5 | 00E6 | ACC_6 | 00E7 | ACC_7 |
| 025D | BEEPC | 024F | BEEPER | 0269 | BEEPEX |
| 0728 | BLINK2 | 0270 | BP3 | 0276 | BP7 |
| 0280 | BP8 | 00F0 | B_REG | 00F0 | B_REG_0 |
| 00F1 | B_REG_1 | 00F2 | B_REG_2 | 00F3 | B_REG_3 |
| 00F4 | B_REG_4 | 00F5 | B_REG_5 | 00F6 | B_REG_6 |
| 00F7 | B_REG_7 | 04BF | CLEAR_LCD | 04C6 | CLEAR_VF |
| 0734 | CRLF | 04D5 | D7 | 04E1 | D75 |
| 05FA | DATA | 0607 | DATAV | 04CD | DECODE |
| 01B3 | DELAY_READ | 04E4 | DISPLAY | 0518 | DISPLAY_COUNT |
| 0083 | DPH | 0082 | DPL | 00C1 | EK0 |
| 00C2 | EK1 | 00C3 | EK2 | 00C4 | EK3 |
| 00C5 | EK4 | 0087 | ENABLE | 0003 | EXT0 |
| 0013 | EXT1 | 05EA | E_TOGL_LCD | 05F2 | E_TOGL_VF |
| 0289 | F0 | 02A6 | F1 | 02A8 | F2 |
| 02C2 | F3 | 0506 | F62 | 0512 | F63 |
| 02DC | F64 | 02CE | F640 | 02E0 | F65 |
| 02E6 | F66 | 02E8 | F67 | 02FA | F68 |
| 0309 | F69 | 0312 | F6901 | 032B | F691 |
| 033A | F6912 | 0343 | F6913 | 035C | F692 |
| 036B | F6928 | 0374 | F6929 | 038D | F693 |
| 039C | F6938 | 03A5 | F695 | 03B2 | F696 |
| 03BF | F697 | 03D3 | F697V | 03D9 | F698 |
| 03F1 | F698V | 040C | F698V2 | 0427 | F698V3 |
| 03F4 | F698Z | 040F | F698Z2 | 042A | F698Z3 |
| 0532 | F7 | 0548 | F75 | 054A | F8 |
| 0556 | F81 | 0559 | F82 | 056A | F83 |
| 056F | F84 | 0572 | F85 | 0435 | F9 |
| 043E | F99 | 0449 | F991 | 047D | F992V |
| 0283 | FILL_MATRIX | 014B | H | 0125 | H0 |
| 0132 | H1 | 0137 | H2 | 0100 | HERE |
| 0171 | HERE2 | 04B1 | HOME_LCD | 04B8 | HOME_VF |
| 016E | H_INITD | 016B | H_VF | 00A8 | IEC |
| 00A8 | IEC_0 | 00A9 | IEC_1 | 00AA | IEC_2 |
| 00AB | IEC_3 | 00AC | IEC_4 | 00AF | IEC_7 |
| 0613 | INIT_LCD | 06A1 | INIT_VF | 06CB | INSTRUCT |
| 00B8 | IPC | 00B8 | IPC_0 | 00B9 | IPC_1 |

Page 26
04-19-94
08:24:19
PADD.LST

| | | | | | |
|---|---|---|---|---|---|
| 00BA | IPC_2 | 00BB | IPC_3 | 00BC | IPC_4 |
| 00BD | IPC_5 | 00BE | IPC_6 | 00BF | IPC_7 |
| 00A6 | LED | 00C6 | MCON | 01B5 | ND1 |
| 0247 | ND10 | 024E | ND11 | 01E3 | ND2 |
| 01EE | ND25 | 01EF | ND27 | 01F1 | ND3 |
| 01FC | ND35 | 01FD | ND37 | 01FF | ND4 |
| 020A | ND45 | 020B | ND47 | 020D | ND5 |
| 0218 | ND55 | 0219 | ND57 | 021B | ND6 |
| 0226 | ND65 | 0227 | ND67 | 0232 | ND7 |
| 0239 | ND8 | 0240 | ND9 | 00EA | OMEGA |
| 0080 | P0 | 0080 | P0_0 | 0081 | P0_1 |
| 0082 | P0_2 | 0083 | P0_3 | 0084 | P0_4 |
| 0085 | P0_5 | 0086 | P0_6 | 0087 | P0_7 |
| 0090 | P1 | 0090 | P1_0 | 0091 | P1_1 |
| 0092 | P1_2 | 0093 | P1_3 | 0094 | P1_4 |
| 0095 | P1_5 | 0096 | P1_6 | 0097 | P1_7 |
| 00A0 | P2 | 00A0 | P2_0 | 00A1 | P2_1 |
| 00A2 | P2_2 | 00A3 | P2_3 | 00A4 | P2_4 |
| 00A5 | P2_5 | 00A6 | P2_6 | 00A7 | P2_7 |
| 00B0 | P3 | 00B0 | P3_0 | 00B1 | P3_1 |
| 00B2 | P3_2 | 00B3 | P3_3 | 00B4 | P3_4 |
| 00B5 | P3_5 | 00B6 | P3_6 | 00B7 | P3_7 |
| 0087 | PCON | 00D0 | PSW | 00D0 | PSW_0 |
| 00D1 | PSW_1 | 00D2 | PSW_2 | 00D3 | PSW_3 |
| 00D4 | PSW_4 | 00D5 | PSW_5 | 00D6 | PSW_6 |
| 00D7 | PSW_7 | 0000 | R0 | 0001 | R1 |
| 0002 | R2 | 0003 | R3 | 0004 | R4 |
| 0005 | R5 | 0006 | R6 | 0007 | R7 |
| 0008 | R8 | 0009 | R9 | 000B | RB |
| 000C | RC | 000D | RD | 000E | RE |
| 064C | READY | 00E0 | RESET_CHAR | 000F | RF |
| 01DD | ROT_0 | 0085 | RS | 0086 | RW |
| 0587 | S1 | 05C2 | S10 | 059A | S15 |
| 059D | S2 | 05A6 | S25 | 05B3 | S3 |
| 05B3 | S4 | 05BA | S5 | 0099 | SBUF |
| 0098 | SCON | 0098 | SCON_0 | 0099 | SCON_1 |
| 009A | SCON_2 | 009B | SCON_3 | 009C | SCON_4 |
| 009D | SCON_5 | 009E | SCON_6 | 009F | SCON_7 |
| 0023 | SER | 0585 | SERIAL | 0081 | SP |
| 0050 | STOP | 00C7 | TA | 000B | TC0 |
| 001B | TC1 | 0088 | TCON | 0088 | TCON_0 |
| 0089 | TCON_1 | 008A | TCON_2 | 008B | TCON_3 |
| 008C | TCON_4 | 008D | TCON_5 | 008E | TCON_6 |
| 008F | TCON_7 | 0085 | TEST_ | 008C | TH0 |
| 008D | TH1 | 057C | TIMER0 | 0584 | TIMERX |
| 008A | TL0 | 008B | TL1 | 0089 | TMOD |
| 05CF | W101 | 05D9 | WAT1 | 05CC | WAT100MS |
| 05C5 | WAT200MS | 05D6 | WAT4MS | 0087 | WR_ |

APPENDIX B
TO FIG. 10A & 10B

Page 1
04-19-94
08:47:19
PAD8.LST

```
0000                CPU     "DS5000.TBL"
0000                HOF     "INT8"

                    ; define variable names for Special Function Registers
00F0 =     B_reg:   EQU     0F0H    ; B register for MUL & DIV, 00
00E0 =     ACC:     EQU     0E0H    ; accumulator, 00
00D0 =     PSW:     EQU     0D0H    ; program status word, 00
00C7 =     TA:      EQU     0C7H    ; timed access, ??
00C6 =     MCON:    EQU     0C6H    ; memory control, RT
00C5 =     EK4:     EQU     0C5H    ; encryption key 4, RT
00C4 =     EK3:     EQU     0C4H    ; encryption key 3, RT
00C3 =     EK2:     EQU     0C3H    ; encryption key 2, RT
00C2 =     EK1:     EQU     0C2H    ; encryption key 1, RT
00C1 =     EK0:     EQU     0C1H    ; encryption key 0, RT
00B8 =     IPC:     EQU     0B8H    ; interrupt priority control, 00
00B0 =     P3:      EQU     0B0H    ; port 3 latch, FF
00A8 =     IEC:     EQU     0A8H    ; interrupt enable control, 00
00A0 =     P2:      EQU     0A0H    ; port 2 latch, FF
0099 =     SBUF:    EQU     099H    ; serial data buffer, ??
0098 =     SCON:    EQU     098H    ; serial control, 00
0090 =     P1:      EQU     090H    ; port 1 latch, FF
008D =     TH1:     EQU     08DH    ; timer 1 high byte, 00
008C =     TH0:     EQU     08CH    ; timer 0 high byte, 00
008B =     TL1:     EQU     08BH    ; timer 1 low byte, 00
008A =     TL0:     EQU     08AH    ; timer 0 low byte, 00
0089 =     TMOD:    EQU     089H    ; timer mode select, 00
0088 =     TCON:    EQU     088H    ; timer control, 00
0087 =     PCON:    EQU     087H    ; power control, RT
0083 =     DPH:     EQU     083H    ; data pointer high byte, 00
0082 =     DPL:     EQU     082H    ; data pointer low byte, 00
0081 =     SP:      EQU     081H    ; stack pointer, 07
0080 =     P0:      EQU     080H    ; port 0 latch, FF

0000 =     R0:      EQU     000H
0001 =     R1:      EQU     001H
0002 =     R2:      EQU     002H
0003 =     R3:      EQU     003H
0004 =     R4:      EQU     004H
0005 =     R5:      EQU     005H
0006 =     R6:      EQU     006H
0007 =     R7:      EQU     007H
0008 =     R8:      EQU     008H
0009 =     R9:      EQU     009H
000A =     RA:      EQU     00AH
000B =     RB:      EQU     00BH
000C =     RC:      EQU     00CH
000D =     RD:      EQU     00DH
000E =     RE:      EQU     00EH
```

```
000F =          RF:     EQU     00FH

0080 =          P0_0:   EQU     080H
0081 =          P0_1:   EQU     081H
0082 =          P0_2:   EQU     082H
0083 =          P0_3:   EQU     083H
0084 =          P0_4:   EQU     084H
0085 =          P0_5:   EQU     085H
0086 =          P0_6:   EQU     086H
0087 =          P0_7:   EQU     087H

0088 =          TCON_0: EQU     088H
0089 =          TCON_1: EQU     089H
008A =          TCON_2: EQU     08AH
008B =          TCON_3: EQU     08BH
008C =          TCON_4: EQU     08CH
008D =          TCON_5: EQU     08DH
008E =          TCON_6: EQU     08EH
008F =          TCON_7: EQU     08FH

0090 =          P1_0:   EQU     090H
0091 =          P1_1:   EQU     091H
0092 =          P1_2:   EQU     092H
0093 =          P1_3:   EQU     093H
0094 =          P1_4:   EQU     094H
0095 =          P1_5:   EQU     095H
0096 =          P1_6:   EQU     096H
0097 =          P1_7:   EQU     097H

0098 =          SCON_0: EQU     098H
0099 =          SCON_1: EQU     099H
009A =          SCON_2: EQU     09AH
009B =          SCON_3: EQU     09BH
009C =          SCON_4: EQU     09CH
009D =          SCON_5: EQU     09DH
009E =          SCON_6: EQU     09EH
009F =          SCON_7: EQU     09FH

00A0 =          P2_0:   EQU     0A0H
00A1 =          P2_1:   EQU     0A1H
00A2 =          P2_2:   EQU     0A2H
00A3 =          P2_3:   EQU     0A3H
00A4 =          P2_4:   EQU     0A4H
00A5 =          P2_5:   EQU     0A5H
00A6 =          P2_6:   EQU     0A6H
00A7 =          P2_7:   EQU     0A7H

00A8 =          IEC_0:  EQU     0A8H
```

```
00A9 =     IEC_1:  EQU    0A9H
00AA =     IEC_2:  EQU    0AAH
00AB =     IEC_3:  EQU    0ABH
00AC =     IEC_4:  EQU    0ACH
00AF =     IEC_7:  EQU    0AFH

00B0 =     P3_0:   EQU    0B0H
00B1 =     P3_1:   EQU    0B1H
00B2 =     P3_2:   EQU    0B2H
00B3 =     P3_3:   EQU    0B3H
00B4 =     P3_4:   EQU    0B4H
00B5 =     P3_5:   EQU    0B5H
00B6 =     P3_6:   EQU    0B6H
00B7 =     P3_7:   EQU    0B7H

00B8 =     IPC_0:  EQU    0B8H
00B9 =     IPC_1:  EQU    0B9H
00BA =     IPC_2:  EQU    0BAH
00BB =     IPC_3:  EQU    0BBH
00BC =     IPC_4:  EQU    0BCH
00BD =     IPC_5:  EQU    0BDH
00BE =     IPC_6:  EQU    0BEH
00BF =     IPC_7:  EQU    0BFH

00D0 =     PSW_0:  EQU    0D0H
00D1 =     PSW_1:  EQU    0D1H
00D2 =     PSW_2:  EQU    0D2H
00D3 =     PSW_3:  EQU    0D3H
00D4 =     PSW_4:  EQU    0D4H
00D5 =     PSW_5:  EQU    0D5H
00D6 =     PSW_6:  EQU    0D6H
00D7 =     PSW_7:  EQU    0D7H

00E0 =     ACC_0:  EQU    0E0H
00E1 =     ACC_1:  EQU    0E1H
00E2 =     ACC_2:  EQU    0E2H
00E3 =     ACC_3:  EQU    0E3H
00E4 =     ACC_4:  EQU    0E4H
00E5 =     ACC_5:  EQU    0E5H
00E6 =     ACC_6:  EQU    0E6H
00E7 =     ACC_7:  EQU    0E7H

00F0 =     B_reg_0: EQU   0F0H
00F1 =     B_reg_1: EQU   0F1H
00F2 =     B_reg_2: EQU   0F2H
00F3 =     B_reg_3: EQU   0F3H
00F4 =     B_reg_4: EQU   0F4H
00F5 =     B_reg_5: EQU   0F5H
```

```
00F6 =          B_reg_6: EQU    0F6H
00F7 =          B_reg_7: EQU    0F7H


0000                    ORG     0000H   ; start at addr 0000H
0000 020700             JMP     HERE    ; jump ahead to begin program.
0003                    ORG     0003H
0003 021000     EXT0:   JMP     STOP    ; external interrupt 0 starting addr
000B                    ORG     000BH
000B 02084F     TC0:    JMP     TIMER0  ; timer/counter 0 interrupt start addr
0013                    ORG     0013H
0013 021000     EXT1:   JMP     STOP    ; external interrupt 1 starting addr
001B                    ORG     001BH
001B 021000     TC1:    JMP     STOP    ; timer/counter 1 interrupt start addr
0023                    ORG     0023H
0023 021000     SER:    JMP     STOP    ; serial port interrupt starting addr

1000                    ORG     1000H
1000 80FE       STOP:   BRA     *       ; the Stack Pointer is not set to 030h
                                        ; because 30h to 4Dh is used to map the keys.

                                                ; 30h="0" is row 1, col 1
                                                ; 31h="1" is row 1, col 2
                                                ; 32h="2" is row 1, col 3
                                                ; 33h="3" is row 1, col 4
                                                ; 34h="4" is row 1, col 5
                                                ; 35h="5" is row 2, col 1
                                                ; 36h="6" is row 2, col 2
                                                ; 37h="7" is row 2, col 3
                                                ; 38h="8" is row 2, col 4
                                                ; 39h="9" is row 2, col 5
                                                ; 3Ah=":" is row 3, col 1
                                                ; 3Bh=";" is row 3, col 2
                                                ; 3Ch="<" is row 3, col 3
                                                ; 3Dh="=" is row 3, col 4
                                                ; 3Eh=">" is row 3, col 5
                                                ; 3Fh="?" is row 4, col 1
                                                ; 40h="@" is row 4, col 2
                                                ; 41h="A" is row 4, col 3
                                                ; 42h="B" is row 4, col 4
                                                ; 43h="C" is row 4, col 5
                                                ; 44h="D" is row 5, col 1
                                                ; 45h="E" is row 5, col 2
                                                ; 46h="F" is row 5, col 3
                                                ; 47h="G" is row 5, col 4
                                                ; 48h="H" is row 5, col 5
                                                ; 49h="I" is row 6, col 1
                                                ; 4Ah="J" is row 6, col 2
```

Page 5
04-19-94
08:47:23
PAD8.LST

```
                                         ; 4Bh="K" is row 6, col 3
                                         ; 4Ch="L" is row 6, col 4
                                         ; 4Dh="M" is row 6, col 5

0700                  ORG    0700H
0700 7580FF   HERE:   LDR    P0,#0FFH
0703 75A040           LDR    P2,#40H     ; turn LED off, other bits to zeroes
0706 759848           LDR    SCON, #48H  ; enable 8-bit UART, 01xx xxxx.
                                         ; force 9th serial bit to 1 always, xxxx 1xxx.
0709 75A880           LDR    IEC,#80H    ; disable all interrupts, 1xxx xxxx.
                                         ; but especially timer 1 interrupt.
                                         ; which is required for baud generation.
070C 758921           LDR    TMOD,#21H   ; set timer 1 to 8-bit soft reload mode,
                                         ; xx10 xx1 & timer 0 to 16-bit mode.
070F 758DE8           LDR    TH1, #0E8H  ; load timer 1 with reload value for 1200 baud
0712 758850           LDR    TCON, #50H  ; enable timer 1, enable timer 0.
0715 901000           LDR    DPTR,#1000H ; set data pointer to minimum, ie bot of stack.
                                         ; for the data buffer.
                                         ; This requirese the Partition be set to 1000h.
0718 7400             LDR    A,#00H      ; load the accumulator with 00h.
071A F0               LDX    @DPTR,A     ; load memory pointered to by DPTR with 00h.
071B 7F10             LDR    R7,#10H     ; use R7,R6 to simulate DPTR
071D 7E00             LDR    R6,#00H
071F A3       H0:     INC    DPTR
0720 0E               INC    R6
0721 BE0006           CBNE   R6,#00H,H1  ; if low byte not zero, branch ahead.

0724 0F               INC    R7
0725 BF2002           CBNE   R7,#20H,H1  ; if high byte not #20h, branch ahead.

0728 8005             BRA    H2          ; otherwise, data memory initialized to 00h
                                         ; so branch ahead to continue with rest.
072A 7400     H1:     LDR    A,#000H      ; else load 00h into data memory via accum.
072C F0               LDX    @DPTR,A
072D 80F0             BRA    H0          ; loop back & continue intializing data mem.

072F 901000   H2:     LDR    DPTR,#1000H ; re-initialize data pointer.
0732 7EFF             LDR    R6,#0FFH    ; Register 6 is the single/double beep flag,
                                         ; initialized to single beep.

0734 794D     HERE2:  LDR    R1,#4DH     ; initialize R1 to max memory addr needed.
0736 D2A5             BSET   P2_5        ; read row 6
0738 7F00             LDR    R7,#00H     ; reset flag that signals rows 1,2,5,6.
073A 12076F           CALL   DELAY_READ
073D C2A5             BCLR   P2_5

073F D2A4             BSET   P2_4        ; read row 5
```

```
0741 7F00           LDR    R7,#00H       ; reset flag that signals rows 1,2,5,6.
0743 12076F         CALL   DELAY_READ
0746 C2A4           BCLR   P2_4

0748 D2A3           BSET   P2_3          ; read row 4
074A 7F01           LDR    R7,#01H       ; set flag that signals row 3 or 4.
074C 12076F         CALL   DELAY_READ
074F C2A3           BCLR   P2_3

0751 D2A2           BSET   P2_2          ; read row 3
0753 7F01           LDR    R7,#01H       ; set flag that signals row 3 or 4.
0755 12076F         CALL   DELAY_READ
0758 C2A2           BCLR   P2_2

075A D2A1           BSET   P2_1          ; read row 2
075C 7F00           LDR    R7,#00H       ; reset flag that signals rows 1,2,5,6.
075E 12076F         CALL   DELAY_READ
0761 C2A1           BCLR   P2_1

0763 D2A0           BSET   P2_0          ; read row 1
0765 7F00           LDR    R7,#00H       ; reset flag that signals rows 1,2,5,6.
0767 12076F         CALL   DELAY_READ
076A C2A0           BCLR   P2_0

076C 020734         JMP    HERE2

076F       DELAY_READ:                   ; Delay & Read subroutine.
076F 7B04           LDR    R3,#04H       ;R3 is a timing loop constant.

0771 7C00  ND1:     LDR    R4,#00H       ;R4 is another timing loop constant.
0773 DCFE           DBNZ   R4,*          ; another internal delay loop.
0775 DBFA           DBNZ   R3,ND1

0777 19             DEC    R1            ; decrement R1 five times.
0778 19             DEC    R1
0779 19             DEC    R1
077A 19             DEC    R1
077B 19             DEC    R1            ; R1 now contains the base addr, less 1.
077C 7580FF         LDR    P0,#0FFH      ; write 1's to Port 0.
077F AA80           LDR    R2,P0         ; read Port 0 into R2.
0781 53021F         AND    R2,#1FH       ; mask out unconnected bits.
0784 BA0018         CBNE   R2,#00H,ND2   ; if remaining bits not all 0, branch ahead.

0787 AB01           LDR    R0,R1         ; else enter a zero bit for this sampling.
                                         ; now R0 has the base address.
0789 120799         CALL   ROT_0         ; call the rotation subroutine.
                                         ; to record closed & open switches.
078C 120799         CALL   ROT_0
```

```
078F 120799            CALL  ROT_0

0792 120799            CALL  ROT_0

0795 120799            CALL  ROT_0

0798 22                RET                      ; return from Delay & Read subroutine.

0799 08      ROT_0:    INC   R0                 ; Rotation subroutine.
079A E6                LDR   A,@R0              ; load M(R0) into accumulator A.
079B C3                CLR   C                  ; clear the carry bit.
079C 13                RRC   A                  ; rotate right with carry going into MSB.
079D F6                LDR   @R0,A              ; load accumulator A back into M(R0).
079E 22                RET

079F E9      ND2:      LDR   A,R1               ; load accumulator with R1, the base addr.
07A0 2405              ADD   A,#5               ; add 5 to R1 in accumulator.
07A2 F8                LDR   R0,A
07A3 E6                LDR   A,@R0              ; load accumulator with M(R1+5).
07A4 BA0103            CBNE  R2,#01H,ND25       ; branch ahead if R2 isn't 01, column 5.
07A7 D3                BSET  C                  ; if it is, set the carry bit.
07A8 8001              BRA   ND27               ; then branch ahead.
07AA C3      ND25:     CLR   C                  ; if it isn't, then clear the carry bit.
07AB 13      ND27:     RRC   A                  ; now rotate the carry bit into the cell.
07AC F6                LDR   @R0,A              ; save accumulator to M(R1+5).

07AD E9      ND3:      LDR   A,R1               ; do it all again for M(R1+4).
07AE 2404              ADD   A,#4               ; add 4 to R1 in accumulator.
07B0 F8                LDR   R0,A
07B1 E6                LDR   A,@R0
07B2 BA0203            CBNE  R2,#02H,ND35       ; branch ahead if R2 isn't 02, column 4.
07B5 D3                BSET  C
07B6 8001              BRA   ND37
07B8 C3      ND35:     CLR   C
07B9 13      ND37:     RRC   A
07BA F6                LDR   @R0,A

07BB E9      ND4:      LDR   A,R1
07BC 2403              ADD   A,#3               ; add 3 to R1
07BE F8                LDR   R0,A
07BF E6                LDR   A,@R0
07C0 BA0403            CBNE  R2,#04H,ND45       ; branch ahead if R2 isn't 04, column 3.
07C3 D3                BSET  C
07C4 8001              BRA   ND47
07C6 C3      ND45:     CLR   C
07C7 13      ND47:     RRC   A
07C8 F6                LDR   @R0,A
```

```
07C9 E9        ND5:    LDR    A,R1
07CA 2402              ADD    A,#2           ; add 2 to R1
07CC F8                LDR    R0,A
07CD E6                LDR    A,@R0
07CE BA0803            CBNE   R2,#08H,ND55   ; branch ahead if R2 isn't 08, column 2.
07D1 D3                BSET   C
07D2 8001              BRA    ND57
07D4 C3        ND55:   CLR    C
07D5 13        ND57:   RRC    A
07D6 F6                LDR    @R0,A

07D7 E9        ND6:    LDR    A,R1
07D8 2401              ADD    A,#1           ; add 1 to R1
07DA F8                LDR    R0,A
07DB E6                LDR    A,@R0
07DC BA1003            CBNE   R2,#10H,ND65   ; branch ahead if R2 isn't 10, column 1.
07DF D3                BSET   C
07E0 8001              BRA    ND67
07E2 C3        ND65:   CLR    C
07E3 13        ND67:   RRC    A
07E4 F6                LDR    @R0,A
                                             ; now test all memory cells for a good key.
07E5 A801              LDR    R0,R1          ; R1 is base address for the row.
07E7 08                INC    R0             ; column 1.
07E8 E6                LDR    A,@R0
07E9 B4F002            CBNE   A,#0F0H,ND7
07EC 801D              BRA    BEEPER

07EE 08        ND7:    INC    R0             ; column 2.
07EF E6                LDR    A,@R0
07F0 B4F002            CBNE   A,#0F0H,ND8
07F3 8016              BRA    BEEPER

07F5 08        ND8:    INC    R0             ; column 3.
07F6 E6                LDR    A,@R0
07F7 B4F002            CBNE   A,#0F0H,ND9
07FA 800F              BRA    BEEPER

07FC 08        ND9:    INC    R0             ; column 4.
07FD E6                LDR    A,@R0
07FE B4F002            CBNE   A,#0F0H,ND10
0801 8008              BRA    BEEPER

0803 08        ND10:   INC    R0             ; column 5.
0804 E6                LDR    A,@R0
0805 B4F002            CBNE   A,#0F0H,ND11
0808 8001              BRA    BEEPER
```

```
080A 22       ND11:   RET                      ; return

080B 758C80   BEEPER: LDR    TH0,#80H          ; if pattern is good (i.e.#0F0H), then
080E 758A00           LDR    TL0,#00H          ; load timer 0 with a timing constant.
0811 7D02             LDR    R5,#02H           ; load R5 with a timing constant loop counter.
0813 AE07             LDR    R6,R7
0815 BE0003           CBNE   R6,#00H,BEEPC     ; see if single length beep requested.
0818 ED               LDR    A,R5              ; load accumulator with R5.
0819 23               RL     A                 ; shift up one time.
081A FD               LDR    R5,A              ; load accumulator back into R5.
081B D2A7     BEEPC:  BSET   P2_7              ; turn on the beeper.
081D D2A9             BSET   IEC_1             ; enable timer 0 interrupts.
081F 63A040           XOR    P2,#40H           ; toggle LED
              ;        LDR    SBUF,R0           ; send out the serial character=addr in R0.
0822 E8               LDR    A,R0              ; copy the character to the accumulator.
0823 F0               LDX    @DPTR,A           ; save the character onto the stack.
0824 A3               INC    DPTR              ; increment DPTR.

0825 B83926           CBNE   R0,#39H,BEEPEX    ; test key pressed for Position K.

0828 901000           LDR    DPTR,#1000H       ; initialize DPTR to 1000h.
082B E0       BP22:   LDX    A,@DPTR           ; load accum with data from data memory.
082C B43902           CBNE   A,#39H,BP23       ; branch to output the character.
082F 801A             BRA    BP29              ; branch ahead if it's the download character.

0831 E0       BP23:   LDX    A,@DPTR           ; else, get the data from data memory.
0832 F599             LDR    SBUF,A            ; copy the data from accum to serial buffer.
0834 A3               INC    DPTR              ; increment DPTR to next data.
                                               ; now delay to allow PC program to catch up.
0835 750880   BP26:   LDR    R8,#80H           ; load R8 with 01h.
0838 750900   BP27:   LDR    R9,#00H           ; load R9 with 00h.
083B 00       BP28:   NOP
083C 00               NOP
083D 00               NOP
083E 00               NOP
083F 00               NOP
0840 00               NOP
0841 00               NOP
0842 00               NOP
0843 D509F5           DBNZ   R9,BP28
0846 D508EF           DBNZ   R8,BP27

0849 80E0             BRA    BP22              ; loop back for more.

084B 901000   BP29:   LDR    DPTR,#1000H       ; re-initialize DPTR for next download.

084E 22       BEEPEX: RET                      ; return from subroutine.
```

```
                                         ; interrupt service.
084F 1D        TIMER0: DEC     R5        ; decrement timing constant loop counter.
0850 BD0004            CBNE    R5,#0,TIMERX ; if loop counter not 0, then return.
0853 C2A7              BCLR    P2_7      ; else clear the beeper.
0855 C2A9              BCLR    IEC_1     ; clear timer 0 interrupt enable.
0857 32        TIMERX: RETI              ; return from interrupt service.

0000                   END
```

| | | | | | |
|---|---|---|---|---|---|
| 00E0 | ACC | 00E0 | ACC_0 | 00E1 | ACC_1 |
| 00E2 | ACC_2 | 00E3 | ACC_3 | 00E4 | ACC_4 |
| 00E5 | ACC_5 | 00E6 | ACC_6 | 00E7 | ACC_7 |
| 081B | BEEPC | 080B | BEEPER | 084E | BEEPEX |
| 082B | BP22 | 0831 | BP23 | 0835 | BP26 |
| 0838 | BP27 | 083B | BP28 | 084B | BP29 |
| 00F0 | B_REG | 00F0 | B_REG_0 | 00F1 | B_REG_1 |
| 00F2 | B_REG_2 | 00F3 | B_REG_3 | 00F4 | B_REG_4 |
| 00F5 | B_REG_5 | 00F6 | B_REG_6 | 00F7 | B_REG_7 |
| 076F | DELAY_READ | 0083 | DPH | 0082 | DPL |
| 00C1 | EK0 | 00C2 | EK1 | 00C3 | EK2 |
| 00C4 | EK3 | 00C5 | EK4 | 0003 | EXT0 |
| 0013 | EXT1 | 071F | H0 | 072A | H1 |
| 072F | H2 | 0700 | HERE | 0734 | HERE2 |
| 00A8 | IEC | 00A8 | IEC_0 | 00A9 | IEC_1 |
| 00AA | IEC_2 | 00AB | IEC_3 | 00AC | IEC_4 |
| 00AF | IEC_7 | 00B8 | IPC | 00B8 | IPC_0 |
| 00B9 | IPC_1 | 00BA | IPC_2 | 00BB | IPC_3 |
| 00BC | IPC_4 | 00BD | IPC_5 | 00BE | IPC_6 |
| 00BF | IPC_7 | 00C6 | MCON | 0771 | ND1 |
| 0803 | ND10 | 080A | ND11 | 079F | ND2 |
| 07AA | ND25 | 07AB | ND27 | 07AD | ND3 |
| 07B8 | ND35 | 07B9 | ND37 | 07BB | ND4 |
| 07C6 | ND45 | 07C7 | ND47 | 07C9 | ND5 |
| 07D4 | ND55 | 07D5 | ND57 | 07D7 | ND6 |
| 07E2 | ND65 | 07E3 | ND67 | 07EE | ND7 |
| 07F5 | ND8 | 07FC | ND9 | 0080 | P0 |
| 0080 | P0_0 | 0081 | P0_1 | 0082 | P0_2 |
| 0083 | P0_3 | 0084 | P0_4 | 0085 | P0_5 |
| 0086 | P0_6 | 0087 | P0_7 | 0090 | P1 |
| 0090 | P1_0 | 0091 | P1_1 | 0092 | P1_2 |
| 0093 | P1_3 | 0094 | P1_4 | 0095 | P1_5 |
| 0096 | P1_6 | 0097 | P1_7 | 00A0 | P2 |
| 00A0 | P2_0 | 00A1 | P2_1 | 00A2 | P2_2 |
| 00A3 | P2_3 | 00A4 | P2_4 | 00A5 | P2_5 |
| 00A6 | P2_6 | 00A7 | P2_7 | 00B0 | P3 |
| 00B0 | P3_0 | 00B1 | P3_1 | 00B2 | P3_2 |
| 00B3 | P3_3 | 00B4 | P3_4 | 00B5 | P3_5 |
| 00B6 | P3_6 | 00B7 | P3_7 | 0087 | PCON |

| | | | | | |
|---|---|---|---|---|---|
| 00D0 | PSW | 00D0 | PSW_0 | 00D1 | PSW_1 |
| 00D2 | PSW_2 | 00D3 | PSW_3 | 00D4 | PSW_4 |
| 00D5 | PSW_5 | 00D6 | PSW_6 | 00D7 | PSW_7 |
| 0000 | R0 | 0001 | R1 | 0002 | R2 |
| 0003 | R3 | 0004 | R4 | 0005 | R5 |
| 0006 | R6 | 0007 | R7 | 0008 | R8 |
| 0009 | R9 | 000A | RA | 000B | RB |
| 000C | RC | 000D | RD | 000E | RE |
| 000F | RF | 0799 | ROT_0 | 0099 | SBUF |
| 0098 | SCON | 0098 | SCON_0 | 0099 | SCON_1 |
| 009A | SCON_2 | 009B | SCON_3 | 009C | SCON_4 |
| 009D | SCON_5 | 009E | SCON_6 | 009F | SCON_7 |
| 0023 | SER | 0081 | SP | 1000 | STOP |
| 00C7 | TA | 000B | TC0 | 001B | TC1 |
| 0088 | TCON | 0088 | TCON_0 | 0089 | TCON_1 |
| 008A | TCON_2 | 008B | TCON_3 | 008C | TCON_4 |
| 008D | TCON_5 | 008E | TCON_6 | 008F | TCON_7 |
| 008C | TH0 | 008D | TH1 | 084F | TIMER0 |
| 0857 | TIMERX | 008A | TL0 | 008B | TL1 |
| 0089 | TMOD | | | | |

APPENDIX C
TO FIG. 11A-11D

Page 1
04-19-94
09:07:18
MULTIP.LST

```
Version 1.00
BEGIN Form ErrorMatrix
   AutoRedraw   = 0
   BackColor    = QBColor(7)
   BorderStyle  = 2
   Caption      = "Defect Matrix - 20 rows (positions), 10 columns (types of errors)"
   ControlBox   = -1
   Enabled      = -1
   ForeColor    = QBColor(0)
   Height       = Char(24)
   Left         = Char(1)
   MaxButton    = -1
   MinButton    = -1
   MousePointer = 0
   Tag          = ""
   Top          = Char(1)
   Visible      = -1
   Width        = Char(78)
   WindowState  = 0
   BEGIN Label ErrorMessage
      Alignment    = 0
      AutoSize     = 0
      BackColor    = QBColor(7)
      BorderStyle  = 0
      Caption      = ""
      DragMode     = 0
      Enabled      = -1
      ForeColor    = QBColor(0)
      Height       = Char(1)
      Left         = Char(62)
      MousePointer = 0
      TabIndex     = 13
      Tag          = ""
      Top          = Char(14)
      Visible      = -1
      Width        = Char(13)
   END
   BEGIN Label TotalofTotals
      Alignment    = 0
      AutoSize     = 0
      BackColor    = QBColor(7)
      BorderStyle  = 0
      Caption      = "     0"
      DragMode     = 0
      Enabled      = -1
      ForeColor    = QBColor(0)
      Height       = Char(1)
      Left         = Char(54)
```

```
    MousePointer = 0
    TabIndex     = 10
    Tag          = ""
    Top          = Char(21)
    Visible      = -1
    Width        = Char(5)
END
BEGIN Label ErrorTotals
    Alignment    = 0
    AutoSize     = 0
    BackColor    = QBColor(7)
    BorderStyle  = 0
    Caption      = "   0   0   0   0   0   0   0   0   0   0 "
    DragMode     = 0
    Enabled      = -1
    ForeColor    = QBColor(0)
    Height       = Char(1)
    Left         = Char(6)
    MousePointer = 0
    TabIndex     = 9
    Tag          = ""
    Top          = Char(21)
    Visible      = -1
    Width        = Char(40)
END
BEGIN Label PositionTotals
    Alignment    = 0
    AutoSize     = 0
    BackColor    = QBColor(7)
    BorderStyle  = 0
    Caption      = "   0   0   0   0   0   0   0   0   0   0   0   0   0   0   0   0   0   0   0
 0"
    DragMode     = 0
    Enabled      = -1
    ForeColor    = QBColor(0)
    Height       = Char(20)
    Left         = Char(55)
    MousePointer = 0
    TabIndex     = 8
    Tag          = ""
    Top          = Char(0)
    Visible      = -1
    Width        = Char(4)
END
BEGIN Label TimeLabel
    Alignment    = 0
    AutoSize     = 0
    BackColor    = QBColor(7)
```

```
   BorderStyle  = 0
   Caption      = "time:"
   DragMode     = 0
   Enabled      = -1
   ForeColor    = QBColor(0)
   Height       = Char(1)
   Left         = Char(61)
   MousePointer = 0
   TabIndex     = 15
   Tag          = ""
   Top          = Char(17)
   Visible      = -1
   Width        = Char(7)
END
BEGIN Label CurrentDate
   Alignment    = 0
   AutoSize     = 0
   BackColor    = QBColor(7)
   BorderStyle  = 0
   Caption      = "date"
   DragMode     = 0
   Enabled      = -1
   ForeColor    = QBColor(0)
   Height       = Char(1)
   Left         = Char(62)
   MousePointer = 0
   TabIndex     = 11
   Tag          = ""
   Top          = Char(16)
   Visible      = -1
   Width        = Char(12)
END
BEGIN Label DateLabel
   Alignment    = 0
   AutoSize     = 0
   BackColor    = QBColor(7)
   BorderStyle  = 0
   Caption      = "date:"
   DragMode     = 0
   Enabled      = -1
   ForeColor    = QBColor(0)
   Height       = Char(1)
   Left         = Char(61)
   MousePointer = 0
   TabIndex     = 14
   Tag          = ""
   Top          = Char(15)
   Visible      = -1
```

```
    Width        = Char(7)
END
BEGIN Label CurrentTime
    Alignment    = 0
    AutoSize     = 0
    BackColor    = QBColor(7)
    BorderStyle  = 0
    Caption      = "time"
    DragMode     = 0
    Enabled      = -1
    ForeColor    = QBColor(0)
    Height       = Char(1)
    Left         = Char(62)
    MousePointer = 0
    TabIndex     = 12
    Tag          = ""
    Top          = Char(18)
    Visible      = -1
    Width        = Char(12)
END
BEGIN Label ErrorMesage
    Alignment    = 0
    AutoSize     = 0
    BackColor    = QBColor(7)
    BorderStyle  = 0
    Caption      = ""
    DragMode     = 0
    Enabled      = -1
    ForeColor    = QBColor(0)
    Height       = Char(1)
    Left         = Char(49)
    MousePointer = 0
    TabIndex     = 19
    Tag          = ""
    Top          = Char(20)
    Visible      = -1
    Width        = Char(6)
END
BEGIN Label BigLabel
    Alignment    = 0
    AutoSize     = 0
    BackColor    = QBColor(7)
    BorderStyle  = 0
    Caption      = " 0 0 0 0 0 0 0 0 0 0  0 0 0 0 0 0 0 0 0 0  0 0 0
  0 0 0 0 0 0 0  0 0 0 0 0 0 0 0 0 0  0 0 0 0 0 0 0 0 0 0  0
 0 0 0 0 0 0 0 0 0  0 0 0 0 0 0 0 0 0 0  0 0 0 0 0 0 0 0 0
0  0 0 0 0 0 0 0 0 0 0  0 0 0 0 0 0 0 0 0 0  0 0 0 0 0 0 0 0
  0 0  0 0 0 0 0 0 0 0 0 0  0 0 0 0 0 0 0 0 0 0  0 0 0 0 0 0
```

```
 0  0  0  0   0  0  0  0  0  0  0  0  0  0   0  0  0  0  0  0  0  0  0  0   0  0  0  0
0  0  0  0  0  0   0  0  0  0  0  0  0  0  0  0   0  0  0  0  0  0  0  0  0  0   0  0
0  0  0  0  0  0  0  0"
      DragMode     = 0
      Enabled      = -1
      ForeColor    = QBColor(0)
      Height       = Char(20)
      Left         = Char(6)
      MousePointer = 0
      TabIndex     = 7
      Tag          = ""
      Top          = Char(0)
      Visible      = -1
      Width        = Char(40)
   END
   BEGIN Timer Timer3
      Enabled      = -1
      Interval     = 1
      Left         = Char(47)
      Tag          = ""
      Top          = Char(5)
   END
   BEGIN Timer Timer4
      Enabled      = -1
      Interval     = 10000
      Left         = Char(47)
      Tag          = ""
      Top          = Char(0)
   END
   BEGIN Timer Timer2
      Enabled      = -1
      Interval     = 4000
      Left         = Char(47)
      Tag          = ""
      Top          = Char(11)
   END
   BEGIN Timer Timer1
      Enabled      = -1
      Interval     = 1000
      Left         = Char(47)
      Tag          = ""
      Top          = Char(17)
   END
   BEGIN Label RowLabel
      Alignment    = 0
      AutoSize     = 0
      BackColor    = QBColor(7)
      BorderStyle  = 0
```

```
      Caption      = "Position  (row)"
      DragMode     = 0
      Enabled      = -1
      ForeColor    = QBColor(0)
      Height       = Char(2)
      Left         = Char(60)
      MousePointer = 0
      TabIndex     = 3
      Tag          = ""
      Top          = Char(1)
      Visible      = -1
      Width        = Char(8)
   END
   BEGIN Label ColumnLabel
      Alignment    = 0
      AutoSize     = 0
      BackColor    = QBColor(7)
      BorderStyle  = 0
      Caption      = "Error (column)"
      DragMode     = 0
      Enabled      = -1
      ForeColor    = QBColor(0)
      Height       = Char(2)
      Left         = Char(60)
      MousePointer = 0
      TabIndex     = 4
      Tag          = ""
      Top          = Char(4)
      Visible      = -1
      Width        = Char(8)
   END
   BEGIN TextBox RowValue
      BackColor    = QBColor(7)
      BorderStyle  = 1
      DragMode     = 0
      Enabled      = -1
      ForeColor    = QBColor(0)
      Height       = Char(3)
      Left         = Char(68)
      MousePointer = 0
      MultiLine    = 0
      ScrollBars   = 0
      TabIndex     = 0
      TabStop      = -1
      Tag          = ""
      Text         = "  0"
      Top          = Char(0)
      Visible      = -1
```

```
   Width        = Char(7)
END
BEGIN TextBox ColumnValue
   BackColor    = QBColor(7)
   BorderStyle  = 1
   DragMode     = 0
   Enabled      = -1
   ForeColor    = QBColor(0)
   Height       = Char(3)
   Left         = Char(68)
   MousePointer = 0
   MultiLine    = 0
   ScrollBars   = 0
   TabIndex     = 1
   TabStop      = -1
   Tag          = ""
   Text         = "  0"
   Top          = Char(3)
   Visible      = -1
   Width        = Char(7)
END
BEGIN CommandButton QuitButton
   BackColor    = QBColor(12)
   Cancel       = 0
   Caption      = "Quit"
   Default      = 0
   DragMode     = 0
   Enabled      = -1
   Height       = Char(3)
   Left         = Char(69)
   MousePointer = 0
   TabIndex     = 2
   TabStop      = -1
   Tag          = ""
   Top          = Char(19)
   Visible      = -1
   Width        = Char(6)
END
BEGIN CommandButton Reload
   BackColor    = QBColor(5)
   Cancel       = 0
   Caption      = "Reload"
   Default      = 0
   DragMode     = 0
   Enabled      = -1
   Height       = Char(3)
   Left         = Char(60)
   MousePointer = 0
```

```
    TabIndex     = 18
    TabStop      = -1
    Tag          = ""
    Top          = Char(19)
    Visible      = -1
    Width        = Char(8)
END
BEGIN CommandButton Decrement
    BackColor    = QBColor(3)
    Cancel       = 0
    Caption      = "Decrement"
    Default      = 0
    DragMode     = 0
    Enabled      = -1
    Height       = Char(3)
    Left         = Char(64)
    MousePointer = 0
    TabIndex     = 6
    TabStop      = -1
    Tag          = ""
    Top          = Char(9)
    Visible      = -1
    Width        = Char(11)
END
BEGIN CommandButton Increment
    BackColor    = QBColor(2)
    Cancel       = 0
    Caption      = "Increment"
    Default      = 0
    DragMode     = 0
    Enabled      = -1
    Height       = Char(3)
    Left         = Char(64)
    MousePointer = 0
    TabIndex     = 5
    TabStop      = -1
    Tag          = ""
    Top          = Char(6)
    Visible      = -1
    Width        = Char(11)
END
BEGIN CommandButton OutputDataToFile
    BackColor    = QBColor(14)
    Cancel       = 0
    Caption      = "Output"
    Default      = 0
    DragMode     = 0
    Enabled      = -1
```

```
      Height      = Char(3)
      Left        = Char(60)
      MousePointer = 0
      TabIndex    = 17
      TabStop     = -1
      Tag         = ""
      Top         = Char(12)
      Visible     = -1
      Width       = Char(8)
   END
   BEGIN CommandButton Setup
      BackColor   = QBColor(6)
      Cancel      = 0
      Caption     = "Setup"
      Default     = 0
      DragMode    = 0
      Enabled     = -1
      Height      = Char(3)
      Left        = Char(68)
      MousePointer = 0
      TabIndex    = 16
      TabStop     = -1
      Tag         = ""
      Top         = Char(12)
      Visible     = -1
      Width       = Char(7)
   END
END
'$FORM ChangePositionOrError
DECLARE SUB PrinterOutput ()
DECLARE SUB Increment_Click ()
DIM SHARED LastErrorKey%
DIM SHARED LastPositionKey%
DIM SHARED ErrorKey%
DIM SHARED PositionKey%
DIM SHARED LastKey$
DIM SHARED StartDate$
DIM SHARED StartTime$
DIM SHARED ValueOfInputParameter%
DIM SHARED PrinterFlag$
DIM SHARED Position(20) AS STRING
DIM SHARED TypeError(10) AS STRING
DIM SHARED BigLabelBackup$
DIM SHARED PositionTotalsBackup$
DIM SHARED ErrorTotalsBackup$
DIM SHARED TotalOfTotalsBackup$
COMMON SHARED TypeError() AS STRING
COMMON SHARED Position() AS STRING
```

```
COMMON SHARED ResetThyself AS INTEGER

SUB ColumnLabel_Click ()
    IF VAL(ColumnValue.Text) < 1 THEN ColumnValue.Text = "  1"
    IF VAL(ColumnValue.Text) > 10 THEN ColumnValue.Text = " 10"
END SUB

SUB Decrement_Click ()
    IF VAL(RowValue.Text) < 1 THEN RowValue.Text = "  1"
    IF VAL(RowValue.Text) > 20 THEN RowValue.Text = " 20"
    IF VAL(ColumnValue.Text) < 1 THEN ColumnValue.Text = "  1"
    IF VAL(ColumnValue.Text) > 10 THEN ColumnValue.Text = " 10"
    Row% = VAL(RowValue.Text)
    Col% = VAL(ColumnValue.Text)
    HaltDecrementFlag$ = "go"
    HaltIncrementFlag$ = "go"

    'work on cell values in the big label
    'get the CellValue$, subtract 1 from it
    CellValue$ = STR$(VAL(MID$(BigLabel.Caption, 4 * (Col% - 1) + 41 * (Row% - 1) + 1, 4)) - 1)
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    DO WHILE LEN(CellValue$) <> 4
        CellValue$ = " " + CellValue$ 'pad CellValue$ with leading blanks until it is 4 characters long
    LOOP
    IF VAL(CellValue$) < 0 THEN
        CellValue$ = "   0"           'forbid CellValue$ less than 0
        HaltDecrementFlag$ = "stop"
    END IF
    IF VAL(CellValue$) > 999 THEN     'forbid CellValue$ greater than 999
        CellValue$ = " 999"
        HaltIncrementFlag$ = "stop"
    END IF
    'insert new CelValue$
    BigLabel.Caption = MID$(BigLabel.Caption, 1, 4 * (Col% - 1) + 41 * (Row% - 1)) + CellValue$ + MID$(BigLabel.Capt
ion, 4 * (Col% - 1) + 41 * (Row% - 1) + 5)

    'work on the sum of all kinds of errors for each position (column right of big matrix)
    IF HaltDecrementFlag$ <> "stop" THEN
        CellValue$ = STR$(VAL(MID$(PositionTotals.Caption, 5 * (Row% - 1) + 1, 4)) - 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
```

```
        IF VAL(CellValue$) < 0 THEN
            CellValue$ = "   0"            'forbid CellValue$ less than 0
            HaltDecrementFlag$ = "stop"
        END IF
        IF VAL(CellValue$) > 9999 THEN
            CellValue$ = "9999"            'forbid CellValue$ greater than 9999
            HaltIncrementFlag$ = "stop"
        END IF
        'insert new CellValue$
        PositionTotals.Caption = MID$(PositionTotals.Caption, 1, 5 * (Row% - 1)) + CellValue$ + " " + MID$(PositionT
otals.Caption, 5 * Row% + 1)
    END IF

    'work on the sum of the errors of each kind for all positions (row below big matrix)
    IF HaltDecrementFlag$ <> "stop" THEN
        CellValue$ = STR$(VAL(MID$(ErrorTotals.Caption, 4 * (Col% - 1) + 1, 4)) - 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
        IF VAL(CellValue$) < 0 THEN
            CellValue$ = "   0"            'forbid CellValue$ less than 0
            HaltDecrementFlag$ = "stop"
        END IF
        IF VAL(CellValue$) > 9999 THEN
            CellValue$ = "9999"            'forbid CellValue$ greater than 9999
            HaltIncrementFlag$ = "stop"
        END IF
        'insert new CellValue$
        ErrorTotals.Caption = MID$(ErrorTotals.Caption, 1, 4 * (Col% - 1)) + CellValue$ + MID$(ErrorTotals.Caption,
4 * Col% + 1)
    END IF

    'work on the totals of all errors of all kinds and all positions
    IF HaltDecrementFlag$ <> "stop" THEN
        CellValue$ = STR$(VAL(TotalOfTotals.Caption) - 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 5
            CellValue$ = " " + CellValue$ 'pad CellValue$ with leading blanks until it is 5 characters long
        LOOP
        IF VAL(CellValue$) < 0 THEN CellValue$ = "    0"     'forbid CellValue$ less than 0
        IF VAL(CellValue$) > 99999 THEN CellValue$ = "99999" 'forbid CellValue$ greater than 99999
        'insert new CellValue$
        TotalOfTotals.Caption = CellValue$
```

```
    END IF
    OPEN "backup.dat" FOR OUTPUT AS #3
    PRINT #3, BigLabel.Caption
    PRINT #3, ErrorTotals.Caption
    PRINT #3, PositionTotals.Caption
    PRINT #3, TotalOfTotals.Caption
    PRINT #3, StartDate$
    PRINT #3, StartTime$
    CLOSE #3

END SUB

SUB Demo_Click ()
    FOR Row% = 1 TO 20
        FOR Col% = 1 TO 10
            RowValue.Text = STR$(Row%)
            ColumnValue.Text = STR$(Col%)
            'FOR i% = 1 TO Row% + Col%
                IF Row% >= Col% THEN CALL Increment_Click
            'NEXT i%
        NEXT Col%
    NEXT Row%
END SUB

SUB Increment_Click ()
    IF VAL(RowValue.Text) < 1 THEN RowValue.Text = "  1"
    IF VAL(RowValue.Text) > 20 THEN RowValue.Text = " 20"
    IF VAL(ColumnValue.Text) < 1 THEN ColumnValue.Text = "  1"
    IF VAL(ColumnValue.Text) > 10 THEN ColumnValue.Text = " 10"
    Row% = VAL(RowValue.Text)
    Col% = VAL(ColumnValue.Text)
    HaltDecrementFlag$ = "go"
    HaltIncrementFlag$ = "go"

    'work on cell values in the big label
    'get the CellValue$, add 1 to it
    CellValue$ = STR$(VAL(MID$(BigLabel.Caption, 4 * (Col% - 1) + 41 * (Row% - 1) + 1, 4)) + 1)
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    DO WHILE LEN(CellValue$) <> 4
        CellValue$ = " " + CellValue$ 'pad CellValue$ with leading blanks until it is 4 characters long
    LOOP
    IF VAL(CellValue$) < 0 THEN
        CellValue$ = "   0"          'forbid CellValue$ less than 0
        HaltDecrementFlag$ = "stop"
    END IF
```

```
    IF VAL(CellValue$) > 999 THEN
        CellValue$ = " 999"          'forbid CellValue$ greater than 999
        HaltIncrementFlag$ = "stop"
    END IF
    'insert new CelValue$
    BigLabel.Caption = MID$(BigLabel.Caption, 1, 4 * (Col% - 1) + 41 * (Row% - 1)) + CellValue$ + MID$(BigLabel.Capt
ion, 4 * (Col% - 1) + 41 * (Row% - 1) + 5)

    'work on the sum of all kinds of errors for each position (column right of big matrix)
    IF HaltIncrementFlag$ <> "stop" THEN
        CellValue$ = STR$(VAL(MID$(PositionTotals.Caption, 5 * (Row% - 1) + 1, 4)) + 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
        IF VAL(CellValue$) < 0 THEN
            CellValue$ = "   0"          'forbid CellValue$ less than 0
            HaltDecrementFlag$ = "stop"
        END IF
        IF VAL(CellValue$) > 9999 THEN
            CellValue$ = "9999"          'forbid CellValue$ greater than 9999
            HaltIncrementFlag$ = "stop"
        END IF
        'insert new CelValue$
        PositionTotals.Caption = MID$(PositionTotals.Caption, 1, 5 * (Row% - 1)) + CellValue$ + " " + MID$(PositionT
otals.Caption, 5 * Row% + 1)
    END IF

    'work on the sum of the errors of each kind for all positions (row below big matrix)
    IF HaltIncrementFlag$ <> "stop" THEN
        CellValue$ = STR$(VAL(MID$(ErrorTotals.Caption, 4 * (Col% - 1) + 1, 4)) + 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
        IF VAL(CellValue$) < 0 THEN
            CellValue$ = "   0"          'forbid CellValue$ less than 0
            HaltDecrementFlag$ = "stop"
        END IF
        IF VAL(CellValue$) > 9999 THEN
            CellValue$ = "9999"          'forbid CellValue$ greater than 9999
            HaltIncrementFlag$ = "stop"
        END IF
        'insert new CelValue$
```

```
        ErrorTotals.Caption = MID$(ErrorTotals.Caption, 1, 4 * (Col% - 1)) + CellValue$ + MID$(ErrorTotals.Caption,
4 * Col% + 1)
    END IF

    'work on the totals of all errors of all kinds and all positions
    IF HaltIncrementFlag$ <> "stop" THEN
        CellValue$ = STR$(VAL(TotalOfTotals.Caption) + 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 5
            CellValue$ = " " + CellValue$    'pad CellValue$ with leading blanks until it is 4 characters long
        LOOP
        IF VAL(CellValue$) < 0 THEN CellValue$ = "    0"     'forbid CellValue$ less than 0
        IF VAL(CellValue$) > 99999 THEN CellValue$ = "99999" 'forbid CellValue$ greater than 9999
        'insert new CelValue$
        TotalOfTotals.Caption = CellValue$
    END IF
    OPEN "backup.dat" FOR OUTPUT AS #3
    PRINT #3, BigLabel.Caption
    PRINT #3, ErrorTotals.Caption
    PRINT #3, PositionTotals.Caption
    PRINT #3, TotalOfTotals.Caption
    PRINT #3, StartDate$
    PRINT #3, StartTime$
    CLOSE #3
END SUB

SUB OutputDataToFile_Click ()
    FileName$ = MID$(DATE$, 9, 2) + MID$(DATE$, 1, 2) + MID$(DATE$, 4, 2) + "." + MID$(TIME$, 1, 2) + MID$(TIME$, 4,
1)
    OPEN FileName$ FOR OUTPUT AS #2
    FOR Row% = 1 TO 20
        FOR Col% = 1 TO 10
            CellValue$ = STR$(VAL(MID$(BigLabel.Caption, 4 * (Col% - 1) + 41 * (Row% - 1) + 1, 4)))
            'remove leading blanks
            DO WHILE MID$(CellValue$, 1, 1) = CHR$(32) 'do while 1st character is a blank
                CellValue$ = MID$(CellValue$, 2) 'remove 1 leading blank from CellValue$
            LOOP
            'PRINT #2, CHR$(34) + CellValue$ + CHR$(34) + ",";
            PRINT #2, CellValue$ + ",";
        NEXT Col%
        CellValue$ = STR$(VAL(MID$(PositionTotals.Caption, 5 * (Row% - 1) + 1, 4)))
        'remove leading blanks
        DO WHILE MID$(CellValue$, 1, 1) = CHR$(32) 'do while 1st character is a blank
            CellValue$ = MID$(CellValue$, 2) 'remove 1 leading blank from CellValue$
        LOOP
        PRINT #2, "          " + "," + CellValue$
```

```
    NEXT Row%
    PRINT #2,
    FOR Col% = 1 TO 10
        CellValue$ = STR$(VAL(MID$(ErrorTotals.Caption, 4 * (Col% - 1) + 1, 4)))
        'remove leading blanks
        DO WHILE MID$(CellValue$, 1, 1) = CHR$(32) 'do while 1st character is a blank
            CellValue$ = MID$(CellValue$, 2) 'remove 1 leading blank from CellValue$
        LOOP
        PRINT #2, CellValue$ + ",";
    NEXT Col%
    CellValue$ = TotalOfTotals.Caption
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    PRINT #2, "          " + "," + CellValue$
    PRINT #2,
    PRINT #2, CHR$(34) + "Start,,,End" + CHR$(34)
    PRINT #2, CHR$(34) + StartDate$ + CHR$(34) + ",,," + CHR$(34) + DATE$ + CHR$(34)
    PRINT #2, CHR$(34) + StartTime$ + CHR$(34) + ",,," + CHR$(34) + TIME$ + CHR$(34)
    CLOSE #2
    SHELL "copy " + FileName$ + " LATEST.DAT"
    IF PrinterFlag$ = "p" THEN CALL PrinterOutput
END SUB

SUB PrinterOutput ()
    DIM MostNumerousDefects(10) AS STRING
    DIM MostNumerousDefectsRow(10) AS INTEGER
    DIM MostNumerousDefectsCol(10) AS INTEGER
    DIM MatrixOfCellValues(20, 10) AS STRING
    FOR Row% = 1 TO 20
        FOR Col% = 1 TO 10
            CellValue$ = STR$(VAL(MID$(BigLabel.Caption, 4 * (Col% - 1) + 41 * (Row% - 1) + 1, 4)))
            'remove leading blanks
            DO WHILE MID$(CellValue$, 1, 1) = CHR$(32) 'do while 1st character is a blank
                CellValue$ = MID$(CellValue$, 2) 'remove 1 leading blank from CellValue$
            LOOP
            MatrixOfCellValues(Row%, Col%) = CellValue$
            LPRINT CellValue$; TAB(Col% * 4 + 1);
        NEXT Col%
        CellValue$ = STR$(VAL(MID$(PositionTotals.Caption, 5 * (Row% - 1) + 1, 4)))
        'remove leading blanks
        DO WHILE MID$(CellValue$, 1, 1) = CHR$(32) 'do while 1st character is a blank
            CellValue$ = MID$(CellValue$, 2) 'remove 1 leading blank from CellValue$
        LOOP
        LPRINT "  " + CellValue$; "  " + Position(Row%)
        'LPRINT   'this makes the matrix print out in doublespace
    NEXT Row%
```

```
    LPRINT
    FOR Col% = 1 TO 10
        CellValue$ = STR$(VAL(MID$(ErrorTotals.Caption, 4 * (Col% - 1) + 1, 4)))
        'remove leading blanks
        DO WHILE MID$(CellValue$, 1, 1) = CHR$(32) 'do while 1st character is a blank
            CellValue$ = MID$(CellValue$, 2) 'remove 1 leading blank from CellValue$
        LOOP
        LPRINT CellValue$; TAB(Col% * 4 + 1);
    NEXT Col%
    CellValue$ = TotalOfTotals.Caption
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    LPRINT "  " + CellValue$; "  GRAND TOTAL"
    LPRINT
    LPRINT CHR$(32) + "Start           End" + CHR$(32)
    LPRINT CHR$(32) + StartDate$ + CHR$(32) + "   " + CHR$(32) + DATE$ + CHR$(32)
    LPRINT CHR$(32) + StartTime$ + CHR$(32) + "     " + CHR$(32) + TIME$ + CHR$(32)
    LPRINT TAB(62 - 12); TypeError(10)' "                                         poor heat stake/USDB/long
gate"
    LPRINT TypeError(1); TAB(56 - 12); TypeError(9)      '   "trash in paint                         broken leg
/bad optic"
    LPRINT TAB(4); TypeError(2); TAB(48 - 12); TypeError(8) ' "  bad graphic                    button failure"
    LPRINT TAB(20 - 12); TypeError(3); TAB(42 - 12); TypeError(7)' "      broken pin           light leak"
    LPRINT TAB(24 - 12); TypeError(4); TAB(36 - 12); TypeError(6)' "           scratch     short shot"
    LPRINT TAB(28 - 12); TypeError(5)' "               off location graphic"

    FOR i% = 1 TO 10
        MostNumerousDefectsRow(i%) = 0
        MostNumerousDefectsCol(i%) = 0
    NEXT i%
    ' now find the 10 most numerous defects
    FOR NumberOfMostNumerousDefects% = 1 TO 10
        i% = NumberOfMostNumerousDefects%
        MaxValue$ = "-1"
        FOR Row% = 1 TO 20
            FOR Col% = 1 TO 10
                IF VAL(MatrixOfCellValues(Row%, Col%)) > VAL(MaxValue$) THEN
                    MostNumerousDefectsRow(i%) = Row%
                    MostNumerousDefectsCol(i%) = Col%
                    MaxValue$ = MatrixOfCellValues(Row%, Col%)
                END IF
            NEXT Col%
        NEXT Row%
        MostNumerousDefects(i%) = MatrixOfCellValues(MostNumerousDefectsRow(i%), MostNumerousDefectsCol(i%))
        MatrixOfCellValues(MostNumerousDefectsRow(i%), MostNumerousDefectsCol(i%)) = "0"
    NEXT NumberOfMostNumerousDefects%
```

```
    LPRINT
    LPRINT
    LPRINT
    LPRINT
    LPRINT
    LPRINT "                              10 MOST NUMEROUS DEFECTS"
    LPRINT
    LPRINT "  position                    type of error                      number"
    LPRINT
    FOR NumberOfMostNumerousDefects% = 1 TO 10
        i% = NumberOfMostNumerousDefects%
        LPRINT Position(MostNumerousDefectsRow(i%)); TAB(30);
        LPRINT TypeError(MostNumerousDefectsCol(i%)); TAB(65);
        LPRINT MostNumerousDefects(i%)
    NEXT
    LPRINT CHR$(12)
END SUB

SUB QuitButton_Click ()
    END
END SUB

SUB Reload_Click ()
    OPEN "backup.old" FOR OUTPUT AS #3
    PRINT #3, BigLabel.Caption
    PRINT #3, ErrorTotals.Caption
    PRINT #3, PositionTotals.Caption
    PRINT #3, TotalOfTotals.Caption
    PRINT #3, StartDate$
    PRINT #3, StartTime$
    CLOSE #3

    OPEN "backup.dat" FOR INPUT AS #3
    INPUT #3, A$, B$, C$, D$, StartDate$, StartTime$
    CLOSE #3

    IF MID$(A$, 2, 1) = " " THEN
        BigLabel.Caption = "   " + A$
    ELSEIF MID$(A$, 3, 1) = " " THEN
        BigLabel.Caption = "  " + A$
    ELSEIF MID$(A$, 4, 1) = " " THEN
        BigLabel.Caption = " " + A$
    ELSE
        BigLabel.Caption = A$
    END IF

    IF MID$(B$, 2, 1) = " " THEN
        ErrorTotals.Caption = "   " + B$
```

```
    ELSEIF MID$(B$, 3, 1) = " " THEN
        ErrorTotals.Caption = "  " + B$
    ELSEIF MID$(B$, 4, 1) = " " THEN
        ErrorTotals.Caption = " " + B$
    ELSE
        ErrorTotals.Caption = B$
    END IF

    IF MID$(C$, 2, 1) = " " THEN
        PositionTotals.Caption = "   " + C$
    ELSEIF MID$(C$, 3, 1) = " " THEN
        PositionTotals.Caption = "  " + C$
    ELSEIF MID$(C$, 4, 1) = " " THEN
        PositionTotals.Caption = " " + C$
    ELSE
        PositionTotals.Caption = C$
    END IF

    IF LEN(D$) = 1 THEN
        TotalOfTotals.Caption = "    " + D$
    ELSEIF LEN(D$) = 2 THEN
        TotalOfTotals.Caption = "   " + D$
    ELSEIF LEN(D$) = 3 THEN
        TotalOfTotals.Caption = "  " + D$
    ELSEIF LEN(D$) = 4 THEN
        TotalOfTotals.Caption = " " + D$
    ELSE
        TotalOfTotals.Caption = D$
    END IF
END SUB

SUB RowLabel_Click ()
    IF VAL(RowValue.Text) < 1 THEN RowValue.Text = "  1"
    IF VAL(RowValue.Text) > 20 THEN RowValue.Text = " 20"
END SUB

SUB Setup_Click ()
    'TypeOfError1.Caption1 = TypeError$(1)
    ErrorMatrix.HIDE
    ChangePositionOrError.SHOW
END SUB

SUB Timer1_Timer () ' 1 second timer
    ON LOCAL ERROR RESUME NEXT
    CurrentTime.Caption = TIME$
    CurrentDate.Caption = DATE$
    IF ValueOfInputParameter% > 0 AND ValueOfInputParameter% < 3 THEN
        DO WHILE NOT EOF(1)
```

```
            Acharacter$ = INPUT$(1, #1)
            NumericalValue% = ASC(Acharacter$)
            IF (NumericalValue% > 200 AND NumericalValue% <> 224) OR NumericalValue% = 0 THEN
                Timer2.Enabled = True
                ErrorFlag1 = True
                ErrorMessage.Caption = "ERROR"
                MSGBOX "character = CHR$(" + STR$(NumericalValue%) + ")", 0, "ERROR"
            ELSEIF NumericalValue% > 0 AND NumericalValue% <= 200 THEN
                DefectMatrixRow% = (NumericalValue% - 1) \ 10 + 1
                DefectMatrixColumn% = ((NumericalValue% - 1) MOD 10) + 1
                RowValue.Text = STR$(DefectMatrixRow%)
                ColumnValue.Text = STR$(DefectMatrixColumn%)
                CALL Increment_Click
'            ELSEIF NumericalValue% = 224 THEN ' reset thyself, nothing to do
            END IF
        LOOP
    END IF

'    CLOSE #1

    IF ResetThyself = 1 THEN
                BigLabel.Caption = BigLabelBackup$
                PositionTotals.Caption = PositionTotalsBackup$
                ErrorTotals.Caption = ErrorTotalsBackup$
                TotalOfTotals.Caption = TotalOfTotalsBackup$
                RowValue.Text = " 0"
                ColumnValue.Text = " 0"
                OPEN "backup.dat" FOR OUTPUT AS #3
                PRINT #3, BigLabel.Caption
                PRINT #3, ErrorTotals.Caption
                PRINT #3, PositionTotals.Caption
                PRINT #3, TotalOfTotals.Caption
                PRINT #3, StartDate$
                PRINT #3, StartTime$
                CLOSE #3
                ResetThyself = 0
    END IF

END SUB

SUB Timer2_Timer () ' 4 second timer
    IF ErrorFlag1 = True THEN
        ErrorFlag1 = False
        ErrorMessage.Caption = ""
    END IF
    Timer2.Enabled = False
END SUB
```

```
SUB Timer3_Timer ()
    'This timer has a short interval, like 1 millisecond.
    'It is executed once, and not again because it disables itself.

    ErrorFlag1 = False
    BigLabelBackup$ = BigLabel.Caption
    PositionTotalsBackup$ = PositionTotals.Caption
    ErrorTotalsBackup$ = ErrorTotals.Caption
    TotalOfTotalsBackup$ = TotalOfTotals.Caption
    PrinterFlag$ = "p"

    ValueOfInputParameter% = VAL(COMMAND$)
    SELECT CASE ValueOfInputParameter%
        CASE 1: OPEN "COM1:1200,n,8,1" FOR INPUT AS #1
        CASE 2: OPEN "COM2:1200,n,8,1" FOR INPUT AS #1
        CASE 3: MSGBOX "Visual Basic and DOS do not support COM3", 0, "Operation will continue without COM"
        CASE 4: MSGBOX "Visual Basic and DOS do not support COM4", 0, "Operation will continue without COM"
        CASE ELSE: ' do nothing
    END SELECT

    Timer3.Enabled = False
    LastErrorKey% = 0
    LastPositionKey% = 0
    ErrorKey% = 0
    PositionKey% = 0
    LastKey$ = ""
    StartTime$ = TIME$
    StartDate$ = DATE$
    NextFileFree% = FREEFILE
    OPEN "PandE.dat" FOR INPUT AS NextFileFree%
    FOR i% = 1 TO 10
        INPUT #NextFileFree%, TypeError(i%)
    NEXT i%
    FOR i% = 1 TO 20
        INPUT #NextFileFree%, Position(i%)
    NEXT i%
    CLOSE #NextFileFree%
    ResetThyself = 0
END SUB

SUB Timer4_Timer ()      ' 10 second timer

    OPEN "backup.dat" FOR INPUT AS #3
    INPUT #3, A$, B$, C$, D$, E$, F$
    CLOSE #3

    OPEN "backup.bak" FOR OUTPUT AS #4
    PRINT #4, A$
```

```
    PRINT #4, B$
    PRINT #4, C$
    PRINT #4, D$
    PRINT #4, E$
    PRINT #4, F$
    CLOSE #4

END SUB
```

APPENDIX D
TO FIG. 11A-11D

Page 1
04-19-94
08:56:00
MULTINP.LST

```
Version 1.00
BEGIN Form ErrorMatrix
   AutoRedraw   = 0
   BackColor    = QBColor(7)
   BorderStyle  = 2
   Caption      = "Defect Matrix - 20 rows (positions), 10 columns (types of errors)"
   ControlBox   = -1
   Enabled      = -1
   ForeColor    = QBColor(0)
   Height       = Char(24)
   Left         = Char(1)
   MaxButton    = -1
   MinButton    = -1
   MousePointer = 0
   Tag          = ""
   Top          = Char(1)
   Visible      = -1
   Width        = Char(78)
   WindowState  = 0
   BEGIN Label ErrorMessage
      Alignment    = 0
      AutoSize     = 0
      BackColor    = QBColor(7)
      BorderStyle  = 0
      Caption      = ""
      DragMode     = 0
      Enabled      = -1
      ForeColor    = QBColor(0)
      Height       = Char(1)
      Left         = Char(62)
      MousePointer = 0
      TabIndex     = 13
      Tag          = ""
      Top          = Char(14)
      Visible      = -1
      Width        = Char(13)
   END
   BEGIN Label TotalofTotals
      Alignment    = 0
      AutoSize     = 0
      BackColor    = QBColor(7)
      BorderStyle  = 0
      Caption      = "     0"
      DragMode     = 0
      Enabled      = -1
      ForeColor    = QBColor(0)
      Height       = Char(1)
      Left         = Char(54)
```

```
   MousePointer = 0
   TabIndex     = 10
   Tag          = ""
   Top          = Char(21)
   Visible      = -1
   Width        = Char(5)
END
BEGIN Label ErrorTotals
   Alignment    = 0
   AutoSize     = 0
   BackColor    = QBColor(7)
   BorderStyle  = 0
   Caption      = "  0   0   0   0   0   0   0   0   0   0 "
   DragMode     = 0
   Enabled      = -1
   ForeColor    = QBColor(0)
   Height       = Char(1)
   Left         = Char(6)
   MousePointer = 0
   TabIndex     = 9
   Tag          = ""
   Top          = Char(21)
   Visible      = -1
   Width        = Char(40)
END
BEGIN Label PositionTotals
   Alignment    = 0
   AutoSize     = 0
   BackColor    = QBColor(7)
   BorderStyle  = 0
   Caption      = "  0   0   0   0   0   0   0   0   0   0   0   0   0   0   0   0   0   0   0
 0"
   DragMode     = 0
   Enabled      = -1
   ForeColor    = QBColor(0)
   Height       = Char(20)
   Left         = Char(55)
   MousePointer = 0
   TabIndex     = 8
   Tag          = ""
   Top          = Char(0)
   Visible      = -1
   Width        = Char(4)
END
BEGIN Label TimeLabel
   Alignment    = 0
   AutoSize     = 0
   BackColor    = QBColor(7)
```

Page 3
04-19-94
08:56:02
MULTINP.LST

```
   BorderStyle  = 0
   Caption      = "time:"
   DragMode     = 0
   Enabled      = -1
   ForeColor    = QBColor(0)
   Height       = Char(1)
   Left         = Char(61)
   MousePointer = 0
   TabIndex     = 15
   Tag          = ""
   Top          = Char(17)
   Visible      = -1
   Width        = Char(7)
END
BEGIN Label CurrentDate
   Alignment    = 0
   AutoSize     = 0
   BackColor    = QBColor(7)
   BorderStyle  = 0
   Caption      = "date"
   DragMode     = 0
   Enabled      = -1
   ForeColor    = QBColor(0)
   Height       = Char(1)
   Left         = Char(62)
   MousePointer = 0
   TabIndex     = 11
   Tag          = ""
   Top          = Char(16)
   Visible      = -1
   Width        = Char(12)
END
BEGIN Label DateLabel
   Alignment    = 0
   AutoSize     = 0
   BackColor    = QBColor(7)
   BorderStyle  = 0
   Caption      = "date:"
   DragMode     = 0
   Enabled      = -1
   ForeColor    = QBColor(0)
   Height       = Char(1)
   Left         = Char(61)
   MousePointer = 0
   TabIndex     = 14
   Tag          = ""
   Top          = Char(15)
   Visible      = -1
```

```
   Width        = Char(7)
END
BEGIN Label CurrentTime
   Alignment    = 0
   AutoSize     = 0
   BackColor    = QBColor(7)
   BorderStyle  = 0
   Caption      = "time"
   DragMode     = 0
   Enabled      = -1
   ForeColor    = QBColor(0)
   Height       = Char(1)
   Left         = Char(62)
   MousePointer = 0
   TabIndex     = 12
   Tag          = ""
   Top          = Char(18)
   Visible      = -1
   Width        = Char(12)
END
BEGIN Label ErrorMesage
   Alignment    = 0
   AutoSize     = 0
   BackColor    = QBColor(7)
   BorderStyle  = 0
   Caption      = ""
   DragMode     = 0
   Enabled      = -1
   ForeColor    = QBColor(0)
   Height       = Char(1)
   Left         = Char(49)
   MousePointer = 0
   TabIndex     = 19
   Tag          = ""
   Top          = Char(20)
   Visible      = -1
   Width        = Char(6)
END
BEGIN Label BigLabel
   Alignment    = 0
   AutoSize     = 0
   BackColor    = QBColor(7)
   BorderStyle  = 0
   Caption      = "  0  0  0  0  0  0  0  0  0  0  0  0  0  0  0  0  0  0  0  0  0  0  0
  0  0  0  0  0  0  0  0  0  0  0  0  0  0  0  0  0  0  0  0  0  0  0  0  0  0  0  0
 0  0  0  0  0  0  0  0  0  0  0  0  0  0  0  0  0  0  0  0  0  0  0  0  0  0  0  0
0  0  0  0  0  0  0  0  0  0  0  0  0  0  0  0  0  0  0  0  0  0  0  0  0  0  0  0  0
  0  0  0  0  0  0  0  0  0  0  0  0  0  0  0  0  0  0  0  0  0  0  0  0  0  0  0  0
```

```
0   0   0   0   0   0   0   0   0   0   0   0   0   0   0   0   0   0   0   0   0   0   0   0   0   0   0   0
0   0   0   0   0   0   0   0   0   0   0   0   0   0   0   0   0   0   0   0   0   0   0   0   0   0   0   0
0   0   0   0   0   0   0   0"
    DragMode     = 0
    Enabled      = -1
    ForeColor    = QBColor(0)
    Height       = Char(20)
    Left         = Char(6)
    MousePointer = 0
    TabIndex     = 7
    Tag          = ""
    Top          = Char(0)
    Visible      = -1
    Width        = Char(40)
 END
 BEGIN Timer Timer3
    Enabled      = -1
    Interval     = 1
    Left         = Char(47)
    Tag          = ""
    Top          = Char(5)
 END
 BEGIN Timer Timer4
    Enabled      = -1
    Interval     = 10000
    Left         = Char(47)
    Tag          = ""
    Top          = Char(0)
 END
 BEGIN Timer Timer2
    Enabled      = -1
    Interval     = 4000
    Left         = Char(47)
    Tag          = ""
    Top          = Char(11)
 END
 BEGIN Timer Timer1
    Enabled      = -1
    Interval     = 1000
    Left         = Char(47)
    Tag          = ""
    Top          = Char(17)
 END
 BEGIN Label RowLabel
    Alignment    = 0
    AutoSize     = 0
    BackColor    = QBColor(7)
    BorderStyle  = 0
```

```
    Caption      = "Position  (row)"
    DragMode     = 0
    Enabled      = -1
    ForeColor    = QBColor(0)
    Height       = Char(2)
    Left         = Char(60)
    MousePointer = 0
    TabIndex     = 3
    Tag          = ""
    Top          = Char(1)
    Visible      = -1
    Width        = Char(8)
 END
 BEGIN Label ColumnLabel
    Alignment    = 0
    AutoSize     = 0
    BackColor    = QBColor(7)
    BorderStyle  = 0
    Caption      = "Error (column)"
    DragMode     = 0
    Enabled      = -1
    ForeColor    = QBColor(0)
    Height       = Char(2)
    Left         = Char(60)
    MousePointer = 0
    TabIndex     = 4
    Tag          = ""
    Top          = Char(4)
    Visible      = -1
    Width        = Char(8)
 END
 BEGIN TextBox RowValue
    BackColor    = QBColor(7)
    BorderStyle  = 1
    DragMode     = 0
    Enabled      = -1
    ForeColor    = QBColor(0)
    Height       = Char(3)
    Left         = Char(68)
    MousePointer = 0
    MultiLine    = 0
    ScrollBars   = 0
    TabIndex     = 0
    TabStop      = -1
    Tag          = ""
    Text         = "  0"
    Top          = Char(0)
    Visible      = -1
```

```
   Width        = Char(7)
END
BEGIN TextBox ColumnValue
   BackColor    = QBColor(7)
   BorderStyle  = 1
   DragMode     = 0
   Enabled      = -1
   ForeColor    = QBColor(0)
   Height       = Char(3)
   Left         = Char(68)
   MousePointer = 0
   MultiLine    = 0
   ScrollBars   = 0
   TabIndex     = 1
   TabStop      = -1
   Tag          = ""
   Text         = "  0"
   Top          = Char(3)
   Visible      = -1
   Width        = Char(7)
END
BEGIN CommandButton QuitButton
   BackColor    = QBColor(12)
   Cancel       = 0
   Caption      = "Quit"
   Default      = 0
   DragMode     = 0
   Enabled      = -1
   Height       = Char(3)
   Left         = Char(69)
   MousePointer = 0
   TabIndex     = 2
   TabStop      = -1
   Tag          = ""
   Top          = Char(19)
   Visible      = -1
   Width        = Char(6)
END
BEGIN CommandButton Reload
   BackColor    = QBColor(5)
   Cancel       = 0
   Caption      = "Reload"
   Default      = 0
   DragMode     = 0
   Enabled      = -1
   Height       = Char(3)
   Left         = Char(60)
   MousePointer = 0
```

```
   TabIndex      = 18
   TabStop       = -1
   Tag           = ""
   Top           = Char(19)
   Visible       = -1
   Width         = Char(8)
END
BEGIN CommandButton Decrement
   BackColor     = QBColor(3)
   Cancel        = 0
   Caption       = "Decrement"
   Default       = 0
   DragMode      = 0
   Enabled       = -1
   Height        = Char(3)
   Left          = Char(64)
   MousePointer  = 0
   TabIndex      = 6
   TabStop       = -1
   Tag           = ""
   Top           = Char(9)
   Visible       = -1
   Width         = Char(11)
END
BEGIN CommandButton Increment
   BackColor     = QBColor(2)
   Cancel        = 0
   Caption       = "Increment"
   Default       = 0
   DragMode      = 0
   Enabled       = -1
   Height        = Char(3)
   Left          = Char(64)
   MousePointer  = 0
   TabIndex      = 5
   TabStop       = -1
   Tag           = ""
   Top           = Char(6)
   Visible       = -1
   Width         = Char(11)
END
BEGIN CommandButton OutputDataToFile
   BackColor     = QBColor(14)
   Cancel        = 0
   Caption       = "Output"
   Default       = 0
   DragMode      = 0
   Enabled       = -1
```

```
    Height       = Char(3)
    Left         = Char(60)
    MousePointer = 0
    TabIndex     = 17
    TabStop      = -1
    Tag          = ""
    Top          = Char(12)
    Visible      = -1
    Width        = Char(8)
  END
  BEGIN CommandButton Setup
    BackColor    = QBColor(6)
    Cancel       = 0
    Caption      = "Setup"
    Default      = 0
    DragMode     = 0
    Enabled      = -1
    Height       = Char(3)
    Left         = Char(68)
    MousePointer = 0
    TabIndex     = 16
    TabStop      = -1
    Tag          = ""
    Top          = Char(12)
    Visible      = -1
    Width        = Char(7)
  END
END
'$FORM ChangePositionOrError
DECLARE SUB PrinterOutput ()
DECLARE SUB Increment_Click ()
DIM SHARED LastErrorKey%
DIM SHARED LastPositionKey%
DIM SHARED ErrorKey%
DIM SHARED PositionKey%
DIM SHARED LastKey$
DIM SHARED StartDate$
DIM SHARED StartTime$
DIM SHARED ValueOfInputParameter%
DIM SHARED PrinterFlag$
DIM SHARED Position(20) AS STRING
DIM SHARED TypeError(10) AS STRING
DIM SHARED BigLabelBackup$
DIM SHARED PositionTotalsBackup$
DIM SHARED ErrorTotalsBackup$
DIM SHARED TotalOfTotalsBackup$
COMMON SHARED TypeError() AS STRING
COMMON SHARED Position() AS STRING
```

```
COMMON SHARED ResetThyself AS INTEGER

SUB ColumnLabel_Click ()
    IF VAL(ColumnValue.Text) < 1 THEN ColumnValue.Text = "  1"
    IF VAL(ColumnValue.Text) > 10 THEN ColumnValue.Text = " 10"
END SUB

SUB Decrement_Click ()
    IF VAL(RowValue.Text) < 1 THEN RowValue.Text = "  1"
    IF VAL(RowValue.Text) > 20 THEN RowValue.Text = " 20"
    IF VAL(ColumnValue.Text) < 1 THEN ColumnValue.Text = "  1"
    IF VAL(ColumnValue.Text) > 10 THEN ColumnValue.Text = " 10"
    Row% = VAL(RowValue.Text)
    Col% = VAL(ColumnValue.Text)
    HaltDecrementFlag$ = "go"
    HaltIncrementFlag$ = "go"

    'work on cell values in the big label
    'get the CellValue$, subtract 1 from it
    CellValue$ = STR$(VAL(MID$(BigLabel.Caption, 4 * (Col% - 1) + 41 * (Row% - 1) + 1, 4)) - 1)
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    DO WHILE LEN(CellValue$) <> 4
        CellValue$ = " " + CellValue$ 'pad CellValue$ with leading blanks until it is 4 characters long
    LOOP
    IF VAL(CellValue$) < 0 THEN
        CellValue$ = "   0"          'forbid CellValue$ less than 0
        HaltDecrementFlag$ = "stop"
    END IF
    IF VAL(CellValue$) > 999 THEN    'forbid CellValue$ greater than 999
        CellValue$ = " 999"
        HaltIncrementFlag$ = "stop"
    END IF
    'insert new CelValue$
    BigLabel.Caption = MID$(BigLabel.Caption, 1, 4 * (Col% - 1) + 41 * (Row% - 1)) + CellValue$ + MID$(BigLabel.Capt
ion, 4 * (Col% - 1) + 41 * (Row% - 1) + 5)

    'work on the sum of all kinds of errors for each position (column right of big matrix)
    IF HaltDecrementFlag$ <> "stop" THEN
        CellValue$ = STR$(VAL(MID$(PositionTotals.Caption, 5 * (Row% - 1) + 1, 4)) - 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
```

```
        IF VAL(CellValue$) < 0 THEN
            CellValue$ = "   0"          'forbid CellValue$ less than 0
            HaltDecrementFlag$ = "stop"
        END IF
        IF VAL(CellValue$) > 9999 THEN
            CellValue$ = "9999"          'forbid CellValue$ greater than 9999
            HaltIncrementFlag$ = "stop"
        END IF
        'insert new CellValue$
        PositionTotals.Caption = MID$(PositionTotals.Caption, 1, 5 * (Row% - 1)) + CellValue$ + " " + MID$(PositionT
otals.Caption, 5 * Row% + 1)
    END IF

    'work on the sum of the errors of each kind for all positions (row below big matrix)
    IF HaltDecrementFlag$ <> "stop" THEN
        CellValue$ = STR$(VAL(MID$(ErrorTotals.Caption, 4 * (Col% - 1) + 1, 4)) - 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
        IF VAL(CellValue$) < 0 THEN
            CellValue$ = "   0"          'forbid CellValue$ less than 0
            HaltDecrementFlag$ = "stop"
        END IF
        IF VAL(CellValue$) > 9999 THEN
            CellValue$ = "9999"          'forbid CellValue$ greater than 9999
            HaltIncrementFlag$ = "stop"
        END IF
        'insert new CellValue$
        ErrorTotals.Caption = MID$(ErrorTotals.Caption, 1, 4 * (Col% - 1)) + CellValue$ + MID$(ErrorTotals.Caption,
4 * Col% + 1)
    END IF

    'work on the totals of all errors of all kinds and all positions
    IF HaltDecrementFlag$ <> "stop" THEN
        CellValue$ = STR$(VAL(TotalOfTotals.Caption) - 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 5
            CellValue$ = " " + CellValue$ 'pad CellValue$ with leading blanks until it is 5 characters long
        LOOP
        IF VAL(CellValue$) < 0 THEN CellValue$ = "    0"     'forbid CellValue$ less than 0
        IF VAL(CellValue$) > 99999 THEN CellValue$ = "99999" 'forbid CellValue$ greater than 99999
        'insert new CellValue$
        TotalOfTotals.Caption = CellValue$
```

```
    END IF
    OPEN "backup.dat" FOR OUTPUT AS #3
    PRINT #3, BigLabel.Caption
    PRINT #3, ErrorTotals.Caption
    PRINT #3, PositionTotals.Caption
    PRINT #3, TotalOfTotals.Caption
    PRINT #3, StartDate$
    PRINT #3, StartTime$
    CLOSE #3

END SUB

SUB Demo_Click ()
    FOR Row% = 1 TO 20
        FOR Col% = 1 TO 10
            RowValue.Text = STR$(Row%)
            ColumnValue.Text = STR$(Col%)
            'FOR i% = 1 TO Row% + Col%
                IF Row% >= Col% THEN CALL Increment_Click
            'NEXT i%
        NEXT Col%
    NEXT Row%
END SUB

SUB Increment_Click ()
    IF VAL(RowValue.Text) < 1 THEN RowValue.Text = "  1"
    IF VAL(RowValue.Text) > 20 THEN RowValue.Text = " 20"
    IF VAL(ColumnValue.Text) < 1 THEN ColumnValue.Text = "  1"
    IF VAL(ColumnValue.Text) > 10 THEN ColumnValue.Text = " 10"
    Row% = VAL(RowValue.Text)
    Col% = VAL(ColumnValue.Text)
    HaltDecrementFlag$ = "go"
    HaltIncrementFlag$ = "go"

    'work on cell values in the big label
    'get the CellValue$, add 1 to it
    CellValue$ = STR$(VAL(MID$(BigLabel.Caption, 4 * (Col% - 1) + 41 * (Row% - 1) + 1, 4)) + 1)
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    DO WHILE LEN(CellValue$) <> 4
        CellValue$ = " " + CellValue$ 'pad CellValue$ with leading blanks until it is 4 characters long
    LOOP
    IF VAL(CellValue$) < 0 THEN
        CellValue$ = "   0"          'forbid CellValue$ less than 0
        HaltDecrementFlag$ = "stop"
    END IF
```

```
    IF VAL(CellValue$) > 999 THEN
        CellValue$ = " 999"           'forbid CellValue$ greater than 999
        HaltIncrementFlag$ = "stop"
    END IF
    'insert new CelValue$
    BigLabel.Caption = MID$(BigLabel.Caption, 1, 4 * (Col% - 1) + 41 * (Row% - 1)) + CellValue$ + MID$(BigLabel.Capt
ion, 4 * (Col% - 1) + 41 * (Row% - 1) + 5)

    'work on the sum of all kinds of errors for each position (column right of big matrix)
    IF HaltIncrementFlag$ <> "stop" THEN
        CellValue$ = STR$(VAL(MID$(PositionTotals.Caption, 5 * (Row% - 1) + 1, 4)) + 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
        IF VAL(CellValue$) < 0 THEN
            CellValue$ = "   0"           'forbid CellValue$ less than 0
            HaltDecrementFlag$ = "stop"
        END IF
        IF VAL(CellValue$) > 9999 THEN
            CellValue$ = "9999"           'forbid CellValue$ greater than 9999
            HaltIncrementFlag$ = "stop"
        END IF
        'insert new CelValue$
        PositionTotals.Caption = MID$(PositionTotals.Caption, 1, 5 * (Row% - 1)) + CellValue$ + " " + MID$(PositionT
otals.Caption, 5 * Row% + 1)
    END IF

    'work on the sum of the errors of each kind for all positions (row below big matrix)
    IF HaltIncrementFlag$ <> "stop" THEN
        CellValue$ = STR$(VAL(MID$(ErrorTotals.Caption, 4 * (Col% - 1) + 1, 4)) + 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
        IF VAL(CellValue$) < 0 THEN
            CellValue$ = "   0"           'forbid CellValue$ less than 0
            HaltDecrementFlag$ = "stop"
        END IF
        IF VAL(CellValue$) > 9999 THEN
            CellValue$ = "9999"           'forbid CellValue$ greater than 9999
            HaltIncrementFlag$ = "stop"
        END IF
        'insert new CelValue$
```

```
        ErrorTotals.Caption = MID$(ErrorTotals.Caption, 1, 4 * (Col% - 1)) + CellValue$ + MID$(ErrorTotals.Caption,
4 * Col% + 1)
    END IF

    'work on the totals of all errors of all kinds and all positions
    IF HaltIncrementFlag$ <> "stop" THEN
        CellValue$ = STR$(VAL(TotalOfTotals.Caption) + 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 5
            CellValue$ = " " + CellValue$    'pad CellValue$ with leading blanks until it is 4 characters long
        LOOP
        IF VAL(CellValue$) < 0 THEN CellValue$ = "    0"     'forbid CellValue$ less than 0
        IF VAL(CellValue$) > 99999 THEN CellValue$ = "99999" 'forbid CellValue$ greater than 9999
        'insert new CelValue$
        TotalOfTotals.Caption = CellValue$
    END IF
    OPEN "backup.dat" FOR OUTPUT AS #3
    PRINT #3, BigLabel.Caption
    PRINT #3, ErrorTotals.Caption
    PRINT #3, PositionTotals.Caption
    PRINT #3, TotalOfTotals.Caption
    PRINT #3, StartDate$
    PRINT #3, StartTime$
    CLOSE #3
END SUB

SUB OutputDataToFile_Click ()
    FileName$ = MID$(DATE$, 9, 2) + MID$(DATE$, 1, 2) + MID$(DATE$, 4, 2) + "." + MID$(TIME$, 1, 2) + MID$(TIME$, 4,
1)
    OPEN FileName$ FOR OUTPUT AS #2
    FOR Row% = 1 TO 20
        FOR Col% = 1 TO 10
            CellValue$ = STR$(VAL(MID$(BigLabel.Caption, 4 * (Col% - 1) + 41 * (Row% - 1) + 1, 4)))
            'remove leading blanks
            DO WHILE MID$(CellValue$, 1, 1) = CHR$(32) 'do while 1st character is a blank
                CellValue$ = MID$(CellValue$, 2) 'remove 1 leading blank from CellValue$
            LOOP
            'PRINT #2, CHR$(34) + CellValue$ + CHR$(34) + ",";
            PRINT #2, CellValue$ + ",";
        NEXT Col%
        CellValue$ = STR$(VAL(MID$(PositionTotals.Caption, 5 * (Row% - 1) + 1, 4)))
        'remove leading blanks
        DO WHILE MID$(CellValue$, 1, 1) = CHR$(32) 'do while 1st character is a blank
            CellValue$ = MID$(CellValue$, 2) 'remove 1 leading blank from CellValue$
        LOOP
        PRINT #2, "          " + "," + CellValue$
```

```
    NEXT Row%
    PRINT #2,
    FOR Col% = 1 TO 10
        CellValue$ = STR$(VAL(MID$(ErrorTotals.Caption, 4 * (Col% - 1) + 1, 4)))
        'remove leading blanks
        DO WHILE MID$(CellValue$, 1, 1) = CHR$(32) 'do while 1st character is a blank
            CellValue$ = MID$(CellValue$, 2) 'remove 1 leading blank from CellValue$
        LOOP
        PRINT #2, CellValue$ + ",";
    NEXT Col%
    CellValue$ = TotalOfTotals.Caption
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    PRINT #2, "         " + "," + CellValue$
    PRINT #2,
    PRINT #2, CHR$(34) + "Start,,,End" + CHR$(34)
    PRINT #2, CHR$(34) + StartDate$ + CHR$(34) + ",,," + CHR$(34) + DATE$ + CHR$(34)
    PRINT #2, CHR$(34) + StartTime$ + CHR$(34) + ",,," + CHR$(34) + TIME$ + CHR$(34)
    CLOSE #2
    SHELL "copy " + FileName$ + " LATEST.DAT"
'    IF PrinterFlag$ = "p" THEN CALL PrinterOutput
END SUB

SUB PrinterOutput ()
    DIM MostNumerousDefects(10) AS STRING
    DIM MostNumerousDefectsRow(10) AS INTEGER
    DIM MostNumerousDefectsCol(10) AS INTEGER
    DIM MatrixOfCellValues(20, 10) AS STRING
    FOR Row% = 1 TO 20
        FOR Col% = 1 TO 10
            CellValue$ = STR$(VAL(MID$(BigLabel.Caption, 4 * (Col% - 1) + 41 * (Row% - 1) + 1, 4)))
            'remove leading blanks
            DO WHILE MID$(CellValue$, 1, 1) = CHR$(32) 'do while 1st character is a blank
                CellValue$ = MID$(CellValue$, 2) 'remove 1 leading blank from CellValue$
            LOOP
            MatrixOfCellValues(Row%, Col%) = CellValue$
            LPRINT CellValue$; TAB(Col% * 4 + 1);
        NEXT Col%
        CellValue$ = STR$(VAL(MID$(PositionTotals.Caption, 5 * (Row% - 1) + 1, 4)))
        'remove leading blanks
        DO WHILE MID$(CellValue$, 1, 1) = CHR$(32) 'do while 1st character is a blank
            CellValue$ = MID$(CellValue$, 2) 'remove 1 leading blank from CellValue$
        LOOP
        LPRINT "  " + CellValue$; "  " + Position(Row%)
        'LPRINT  'this makes the matrix print out in doublespace
    NEXT Row%
```

```
LPRINT
FOR Col% = 1 TO 10
    CellValue$ = STR$(VAL(MID$(ErrorTotals.Caption, 4 * (Col% - 1) + 1, 4)))
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    LPRINT CellValue$; TAB(Col% * 4 + 1);
NEXT Col%
CellValue$ = TotalOfTotals.Caption
'remove leading blanks
DO WHILE MID$(CellValue$, 1, 1) = CHR$(32) 'do while 1st character is a blank
    CellValue$ = MID$(CellValue$, 2) 'remove 1 leading blank from CellValue$
LOOP
LPRINT "  " + CellValue$; "  GRAND TOTAL"
LPRINT
LPRINT CHR$(32) + "Start          End" + CHR$(32)
LPRINT CHR$(32) + StartDate$ + CHR$(32) + "   " + CHR$(32) + DATE$ + CHR$(32)
LPRINT CHR$(32) + StartTime$ + CHR$(32) + "     " + CHR$(32) + TIME$ + CHR$(32)
LPRINT TAB(62 - 12); TypeError(10)' "                                        poor heat stake/USDB/long
gate"
LPRINT TypeError(1); TAB(56 - 12); TypeError(9)       '   "trash in paint                     broken leg
/bad optic"
LPRINT TAB(4); TypeError(2); TAB(48 - 12); TypeError(8) ' "   bad graphic                 button failure"
LPRINT TAB(20 - 12); TypeError(3); TAB(42 - 12); TypeError(7)' "      broken pin           light leak"
LPRINT TAB(24 - 12); TypeError(4); TAB(36 - 12); TypeError(6)' "          scratch    short shot"
LPRINT TAB(28 - 12); TypeError(5)' "                off location graphic"

FOR i% = 1 TO 10
    MostNumerousDefectsRow(i%) = 0
    MostNumerousDefectsCol(i%) = 0
NEXT i%
' now find the 10 most numerous defects
FOR NumberOfMostNumerousDefects% = 1 TO 10
    i% = NumberOfMostNumerousDefects%
    MaxValue$ = "-1"
    FOR Row% = 1 TO 20
        FOR Col% = 1 TO 10
            IF VAL(MatrixOfCellValues(Row%, Col%)) > VAL(MaxValue$) THEN
                MostNumerousDefectsRow(i%) = Row%
                MostNumerousDefectsCol(i%) = Col%
                MaxValue$ = MatrixOfCellValues(Row%, Col%)
            END IF
        NEXT Col%
    NEXT Row%
    MostNumerousDefects(i%) = MatrixOfCellValues(MostNumerousDefectsRow(i%), MostNumerousDefectsCol(i%))
    MatrixOfCellValues(MostNumerousDefectsRow(i%), MostNumerousDefectsCol(i%)) = "0"
NEXT NumberOfMostNumerousDefects%
```

```
    LPRINT
    LPRINT
    LPRINT
    LPRINT
    LPRINT
    LPRINT "                              10 MOST NUMEROUS DEFECTS"
    LPRINT
    LPRINT "  position                    type of error                    number"
    LPRINT
    FOR NumberOfMostNumerousDefects% = 1 TO 10
        i% = NumberOfMostNumerousDefects%
        LPRINT Position(MostNumerousDefectsRow(i%)); TAB(30);
        LPRINT TypeError(MostNumerousDefectsCol(i%)); TAB(65);
        LPRINT MostNumerousDefects(i%)
    NEXT
    LPRINT CHR$(12)
END SUB

SUB QuitButton_Click ()
    END
END SUB

SUB Reload_Click ()
    OPEN "backup.old" FOR OUTPUT AS #3
    PRINT #3, BigLabel.Caption
    PRINT #3, ErrorTotals.Caption
    PRINT #3, PositionTotals.Caption
    PRINT #3, TotalOfTotals.Caption
    PRINT #3, StartDate$
    PRINT #3, StartTime$
    CLOSE #3

    OPEN "backup.dat" FOR INPUT AS #3
    INPUT #3, A$, B$, C$, D$, StartDate$, StartTime$
    CLOSE #3

    IF MID$(A$, 2, 1) = " " THEN
        BigLabel.Caption = "   " + A$
    ELSEIF MID$(A$, 3, 1) = " " THEN
        BigLabel.Caption = "  " + A$
    ELSEIF MID$(A$, 4, 1) = " " THEN
        BigLabel.Caption = " " + A$
    ELSE
        BigLabel.Caption = A$
    END IF

    IF MID$(B$, 2, 1) = " " THEN
        ErrorTotals.Caption = "   " + B$
```

```
    ELSEIF MID$(B$, 3, 1) = " " THEN
        ErrorTotals.Caption = "  " + B$
    ELSEIF MID$(B$, 4, 1) = " " THEN
        ErrorTotals.Caption = " " + B$
    ELSE
        ErrorTotals.Caption = B$
    END IF

    IF MID$(C$, 2, 1) = " " THEN
        PositionTotals.Caption = "   " + C$
    ELSEIF MID$(C$, 3, 1) = " " THEN
        PositionTotals.Caption = "  " + C$
    ELSEIF MID$(C$, 4, 1) = " " THEN
        PositionTotals.Caption = " " + C$
    ELSE
        PositionTotals.Caption = C$
    END IF

    IF LEN(D$) = 1 THEN
        TotalOfTotals.Caption = "    " + D$
    ELSEIF LEN(D$) = 2 THEN
        TotalOfTotals.Caption = "   " + D$
    ELSEIF LEN(D$) = 3 THEN
        TotalOfTotals.Caption = "  " + D$
    ELSEIF LEN(D$) = 4 THEN
        TotalOfTotals.Caption = " " + D$
    ELSE
        TotalOfTotals.Caption = D$
    END IF
END SUB

SUB RowLabel_Click ()
    IF VAL(RowValue.Text) < 1 THEN RowValue.Text = "  1"
    IF VAL(RowValue.Text) > 20 THEN RowValue.Text = " 20"
END SUB

SUB Setup_Click ()
    'TypeOfError1.Caption1 = TypeError$(1)
    ErrorMatrix.HIDE
    ChangePositionOrError.SHOW
END SUB

SUB Timer1_Timer () ' 1 second timer
    ON LOCAL ERROR RESUME NEXT
    CurrentTime.Caption = TIME$
    CurrentDate.Caption = DATE$
    IF ValueOfInputParameter% > 0 AND ValueOfInputParameter% < 3 THEN
        DO WHILE NOT EOF(1)
```

```
            Acharacter$ = INPUT$(1, #1)
            NumericalValue% = ASC(Acharacter$)
            IF (NumericalValue% > 200 AND NumericalValue% <> 224) OR NumericalValue% = 0 THEN
                Timer2.Enabled = True
                ErrorFlag1 = True
                ErrorMessage.Caption = "ERROR"
                MSGBOX "character = CHR$(" + STR$(NumericalValue%) + ")", 0, "ERROR"
            ELSEIF NumericalValue% > 0 AND NumericalValue% <= 200 THEN
                DefectMatrixRow% = (NumericalValue% - 1) \ 10 + 1
                DefectMatrixColumn% = ((NumericalValue% - 1) MOD 10) + 1
                RowValue.Text = STR$(DefectMatrixRow%)
                ColumnValue.Text = STR$(DefectMatrixColumn%)
                CALL Increment_Click
'            ELSEIF NumericalValue% = 224 THEN ' reset thyself, nothing to do
            END IF
        LOOP
    END IF

'   CLOSE #1

    IF ResetThyself = 1 THEN
                BigLabel.Caption = BigLabelBackup$
                PositionTotals.Caption = PositionTotalsBackup$
                ErrorTotals.Caption = ErrorTotalsBackup$
                TotalOfTotals.Caption = TotalOfTotalsBackup$
                RowValue.Text = " 0"
                ColumnValue.Text = " 0"
                OPEN "backup.dat" FOR OUTPUT AS #3
                PRINT #3, BigLabel.Caption
                PRINT #3, ErrorTotals.Caption
                PRINT #3, PositionTotals.Caption
                PRINT #3, TotalOfTotals.Caption
                PRINT #3, StartDate$
                PRINT #3, StartTime$
                CLOSE #3
                ResetThyself = 0
    END IF

END SUB

SUB Timer2_Timer () ' 4 second timer
    IF ErrorFlag1 = True THEN
        ErrorFlag1 = False
        ErrorMessage.Caption = ""
    END IF
    Timer2.Enabled = False
END SUB
```

```
SUB Timer3_Timer ()
    'This timer has a short interval, like 1 millisecond.
    'It is executed once, and not again because it disables itself.

    ErrorFlag1 = False
    BigLabelBackup$ = BigLabel.Caption
    PositionTotalsBackup$ = PositionTotals.Caption
    ErrorTotalsBackup$ = ErrorTotals.Caption
    TotalOfTotalsBackup$ = TotalOfTotals.Caption
    PrinterFlag$ = "p"

    ValueOfInputParameter% = VAL(COMMAND$)
    SELECT CASE ValueOfInputParameter%
        CASE 1: OPEN "COM1:1200,n,8,1" FOR INPUT AS #1
        CASE 2: OPEN "COM2:1200,n,8,1" FOR INPUT AS #1
        CASE 3: MSGBOX "Visual Basic and DOS do not support COM3", 0, "Operation will continue without COM"
        CASE 4: MSGBOX "Visual Basic and DOS do not support COM4", 0, "Operation will continue without COM"
        CASE ELSE: ' do nothing
    END SELECT

    Timer3.Enabled = False
    LastErrorKey% = 0
    LastPositionKey% = 0
    ErrorKey% = 0
    PositionKey% = 0
    LastKey$ = ""
    StartTime$ = TIME$
    StartDate$ = DATE$
    NextFileFree% = FREEFILE
    OPEN "PandE.dat" FOR INPUT AS NextFileFree%
    FOR i% = 1 TO 10
        INPUT #NextFileFree%, TypeError(i%)
    NEXT i%
    FOR i% = 1 TO 20
        INPUT #NextFileFree%, Position(i%)
    NEXT i%
    CLOSE #NextFileFree%
    ResetThyself = 0
END SUB

SUB Timer4_Timer ()      ' 10 second timer

    OPEN "backup.dat" FOR INPUT AS #3
    INPUT #3, A$, B$, C$, D$, E$, F$
    CLOSE #3

    OPEN "backup.bak" FOR OUTPUT AS #4
    PRINT #4, A$
```

```
    PRINT #4, B$
    PRINT #4, C$
    PRINT #4, D$
    PRINT #4, E$
    PRINT #4, F$
    CLOSE #4

END SUB
```

APPENDIX E
TO FIG. 14A-14D

Page 1
04-19-94
09:10:39
MATRIXP.LST

```
Version 1.00
BEGIN Form ErrorMatrix
   AutoRedraw   = 0
   BackColor    = QBColor(7)
   BorderStyle  = 2
   Caption      = "Defect Matrix - 20 rows (positions), 10 columns (types of errors)"
   ControlBox   = -1
   Enabled      = -1
   ForeColor    = QBColor(0)
   Height       = Char(24)
   Left         = Char(1)
   MaxButton    = -1
   MinButton    = -1
   MousePointer = 0
   Tag          = ""
   Top          = Char(1)
   Visible      = -1
   Width        = Char(78)
   WindowState  = 0
   BEGIN Label ErrorMessage
      Alignment    = 0
      AutoSize     = 0
      BackColor    = QBColor(7)
      BorderStyle  = 0
      Caption      = ""
      DragMode     = 0
      Enabled      = -1
      ForeColor    = QBColor(0)
      Height       = Char(1)
      Left         = Char(62)
      MousePointer = 0
      TabIndex     = 13
      Tag          = ""
      Top          = Char(14)
      Visible      = -1
      Width        = Char(13)
   END
   BEGIN Label TotalofTotals
      Alignment    = 0
      AutoSize     = 0
      BackColor    = QBColor(7)
      BorderStyle  = 0
      Caption      = "     0"
      DragMode     = 0
      Enabled      = -1
      ForeColor    = QBColor(0)
      Height       = Char(1)
      Left         = Char(54)
```

```
   MousePointer = 0
   TabIndex     = 10
   Tag          = ""
   Top          = Char(21)
   Visible      = -1
   Width        = Char(5)
END
BEGIN Label ErrorTotals
   Alignment    = 0
   AutoSize     = 0
   BackColor    = QBColor(7)
   BorderStyle  = 0
   Caption      = "   0    0    0    0    0    0    0    0    0    0 "
   DragMode     = 0
   Enabled      = -1
   ForeColor    = QBColor(0)
   Height       = Char(1)
   Left         = Char(6)
   MousePointer = 0
   TabIndex     = 9
   Tag          = ""
   Top          = Char(21)
   Visible      = -1
   Width        = Char(40)
END
BEGIN Label PositionTotals
   Alignment    = 0
   AutoSize     = 0
   BackColor    = QBColor(7)
   BorderStyle  = 0
   Caption      = "   0    0    0    0    0    0    0    0    0    0    0    0    0    0    0    0    0    0    0
 0"
   DragMode     = 0
   Enabled      = -1
   ForeColor    = QBColor(0)
   Height       = Char(20)
   Left         = Char(55)
   MousePointer = 0
   TabIndex     = 8
   Tag          = ""
   Top          = Char(0)
   Visible      = -1
   Width        = Char(4)
END
BEGIN Label TimeLabel
   Alignment    = 0
   AutoSize     = 0
   BackColor    = QBColor(7)
```

```
   BorderStyle  = 0
   Caption      = "time:"
   DragMode     = 0
   Enabled      = -1
   ForeColor    = QBColor(0)
   Height       = Char(1)
   Left         = Char(61)
   MousePointer = 0
   TabIndex     = 15
   Tag          = ""
   Top          = Char(17)
   Visible      = -1
   Width        = Char(7)
END
BEGIN Label CurrentDate
   Alignment    = 0
   AutoSize     = 0
   BackColor    = QBColor(7)
   BorderStyle  = 0
   Caption      = "date"
   DragMode     = 0
   Enabled      = -1
   ForeColor    = QBColor(0)
   Height       = Char(1)
   Left         = Char(62)
   MousePointer = 0
   TabIndex     = 11
   Tag          = ""
   Top          = Char(16)
   Visible      = -1
   Width        = Char(12)
END
BEGIN Label DateLabel
   Alignment    = 0
   AutoSize     = 0
   BackColor    = QBColor(7)
   BorderStyle  = 0
   Caption      = "date:"
   DragMode     = 0
   Enabled      = -1
   ForeColor    = QBColor(0)
   Height       = Char(1)
   Left         = Char(61)
   MousePointer = 0
   TabIndex     = 14
   Tag          = ""
   Top          = Char(15)
   Visible      = -1
```

```
      Width          = Char(7)
   END
   BEGIN Label CurrentTime
      Alignment      = 0
      AutoSize       = 0
      BackColor      = QBColor(7)
      BorderStyle    = 0
      Caption        = "time"
      DragMode       = 0
      Enabled        = -1
      ForeColor      = QBColor(0)
      Height         = Char(1)
      Left           = Char(62)
      MousePointer   = 0
      TabIndex       = 12
      Tag            = ""
      Top            = Char(18)
      Visible        = -1
      Width          = Char(12)
   END
   BEGIN Label ErrorMesage
      Alignment      = 0
      AutoSize       = 0
      BackColor      = QBColor(7)
      BorderStyle    = 0
      Caption        = ""
      DragMode       = 0
      Enabled        = -1
      ForeColor      = QBColor(0)
      Height         = Char(1)
      Left           = Char(49)
      MousePointer   = 0
      TabIndex       = 19
      Tag            = ""
      Top            = Char(20)
      Visible        = -1
      Width          = Char(6)
   END
   BEGIN Label BigLabel
      Alignment      = 0
      AutoSize       = 0
      BackColor      = QBColor(7)
      BorderStyle    = 0
      Caption        = "  0 0 0 0 0 0 0 0 0 0  0 0 0 0 0 0 0 0 0 0  0 0 0
   0 0 0 0 0 0 0  0 0 0 0 0 0 0 0 0 0  0 0 0 0 0 0 0 0 0 0  0
  0 0 0 0 0 0 0 0 0  0 0 0 0 0 0 0 0 0 0  0 0 0 0 0 0 0 0 0
 0  0 0 0 0 0 0 0 0 0 0  0 0 0 0 0 0 0 0 0 0  0 0 0 0 0 0 0 0
   0 0  0 0 0 0 0 0 0 0 0 0  0 0 0 0 0 0 0 0 0 0  0 0 0 0 0 0
```

```
0  0  0  0  0  0  0  0  0  0  0  0  0  0  0  0  0  0  0  0  0  0  0  0  0  0  0  0  0
0  0  0  0  0  0  0  0  0  0  0  0  0  0  0  0  0  0  0  0  0  0  0  0  0  0  0  0
0  0  0  0  0  0  0  0"
      DragMode     = 0
      Enabled      = -1
      ForeColor    = QBColor(0)
      Height       = Char(20)
      Left         = Char(6)
      MousePointer = 0
      TabIndex     = 7
      Tag          = ""
      Top          = Char(0)
      Visible      = -1
      Width        = Char(40)
   END
   BEGIN Timer Timer3
      Enabled      = -1
      Interval     = 1
      Left         = Char(47)
      Tag          = ""
      Top          = Char(5)
   END
   BEGIN Timer Timer4
      Enabled      = -1
      Interval     = 10000
      Left         = Char(47)
      Tag          = ""
      Top          = Char(0)
   END
   BEGIN Timer Timer2
      Enabled      = -1
      Interval     = 4000
      Left         = Char(47)
      Tag          = ""
      Top          = Char(11)
   END
   BEGIN Timer Timer1
      Enabled      = -1
      Interval     = 1000
      Left         = Char(47)
      Tag          = ""
      Top          = Char(17)
   END
   BEGIN Label RowLabel
      Alignment    = 0
      AutoSize     = 0
      BackColor    = QBColor(7)
      BorderStyle  = 0
```

```
   Caption      = "Position  (row)"
   DragMode     = 0
   Enabled      = -1
   ForeColor    = QBColor(0)
   Height       = Char(2)
   Left         = Char(60)
   MousePointer = 0
   TabIndex     = 3
   Tag          = ""
   Top          = Char(1)
   Visible      = -1
   Width        = Char(8)
END
BEGIN Label ColumnLabel
   Alignment    = 0
   AutoSize     = 0
   BackColor    = QBColor(7)
   BorderStyle  = 0
   Caption      = "Error (column)"
   DragMode     = 0
   Enabled      = -1
   ForeColor    = QBColor(0)
   Height       = Char(2)
   Left         = Char(60)
   MousePointer = 0
   TabIndex     = 4
   Tag          = ""
   Top          = Char(4)
   Visible      = -1
   Width        = Char(8)
END
BEGIN TextBox RowValue
   BackColor    = QBColor(7)
   BorderStyle  = 1
   DragMode     = 0
   Enabled      = -1
   ForeColor    = QBColor(0)
   Height       = Char(3)
   Left         = Char(68)
   MousePointer = 0
   MultiLine    = 0
   ScrollBars   = 0
   TabIndex     = 0
   TabStop      = -1
   Tag          = ""
   Text         = "  0"
   Top          = Char(0)
   Visible      = -1
```

```
   Width        = Char(7)
END
BEGIN TextBox ColumnValue
   BackColor    = QBColor(7)
   BorderStyle  = 1
   DragMode     = 0
   Enabled      = -1
   ForeColor    = QBColor(0)
   Height       = Char(3)
   Left         = Char(68)
   MousePointer = 0
   MultiLine    = 0
   ScrollBars   = 0
   TabIndex     = 1
   TabStop      = -1
   Tag          = ""
   Text         = "  0"
   Top          = Char(3)
   Visible      = -1
   Width        = Char(7)
END
BEGIN CommandButton QuitButton
   BackColor    = QBColor(12)
   Cancel       = 0
   Caption      = "Quit"
   Default      = 0
   DragMode     = 0
   Enabled      = -1
   Height       = Char(3)
   Left         = Char(69)
   MousePointer = 0
   TabIndex     = 2
   TabStop      = -1
   Tag          = ""
   Top          = Char(19)
   Visible      = -1
   Width        = Char(6)
END
BEGIN CommandButton Reload
   BackColor    = QBColor(5)
   Cancel       = 0
   Caption      = "Reload"
   Default      = 0
   DragMode     = 0
   Enabled      = -1
   Height       = Char(3)
   Left         = Char(60)
   MousePointer = 0
```

```
   TabIndex     = 18
   TabStop      = -1
   Tag          = ""
   Top          = Char(19)
   Visible      = -1
   Width        = Char(8)
END
BEGIN CommandButton Decrement
   BackColor    = QBColor(3)
   Cancel       = 0
   Caption      = "Decrement"
   Default      = 0
   DragMode     = 0
   Enabled      = -1
   Height       = Char(3)
   Left         = Char(64)
   MousePointer = 0
   TabIndex     = 6
   TabStop      = -1
   Tag          = ""
   Top          = Char(9)
   Visible      = -1
   Width        = Char(11)
END
BEGIN CommandButton Increment
   BackColor    = QBColor(2)
   Cancel       = 0
   Caption      = "Increment"
   Default      = 0
   DragMode     = 0
   Enabled      = -1
   Height       = Char(3)
   Left         = Char(64)
   MousePointer = 0
   TabIndex     = 5
   TabStop      = -1
   Tag          = ""
   Top          = Char(6)
   Visible      = -1
   Width        = Char(11)
END
BEGIN CommandButton OutputDataToFile
   BackColor    = QBColor(14)
   Cancel       = 0
   Caption      = "Output"
   Default      = 0
   DragMode     = 0
   Enabled      = -1
```

```
      Height        = Char(3)
      Left          = Char(60)
      MousePointer  = 0
      TabIndex      = 17
      TabStop       = -1
      Tag           = ""
      Top           = Char(12)
      Visible       = -1
      Width         = Char(8)
   END
   BEGIN CommandButton Setup
      BackColor     = QBColor(6)
      Cancel        = 0
      Caption       = "Setup"
      Default       = 0
      DragMode      = 0
      Enabled       = -1
      Height        = Char(3)
      Left          = Char(68)
      MousePointer  = 0
      TabIndex      = 16
      TabStop       = -1
      Tag           = ""
      Top           = Char(12)
      Visible       = -1
      Width         = Char(7)
   END
END
'$FORM ChangePositionOrError
DECLARE SUB PrinterOutput ()
DECLARE SUB Increment_Click ()
DIM SHARED LastErrorKey%
DIM SHARED LastPositionKey%
DIM SHARED ErrorKey%
DIM SHARED PositionKey%
DIM SHARED LastKey$
DIM SHARED StartDate$
DIM SHARED StartTime$
DIM SHARED ValueOfInputParameter%
DIM SHARED PrinterFlag$
DIM SHARED Position(20) AS STRING
DIM SHARED TypeError(10) AS STRING
COMMON SHARED TypeError() AS STRING
COMMON SHARED Position() AS STRING

SUB ColumnLabel_Click ()
    IF VAL(ColumnValue.Text) < 1 THEN ColumnValue.Text = "  1"
    IF VAL(ColumnValue.Text) > 10 THEN ColumnValue.Text = " 10"
```

```
END SUB

SUB Decrement_Click ()
    IF VAL(RowValue.Text) < 1 THEN RowValue.Text = "  1"
    IF VAL(RowValue.Text) > 20 THEN RowValue.Text = " 20"
    IF VAL(ColumnValue.Text) < 1 THEN ColumnValue.Text = "  1"
    IF VAL(ColumnValue.Text) > 10 THEN ColumnValue.Text = " 10"
    Row% = VAL(RowValue.Text)
    Col% = VAL(ColumnValue.Text)
    HaltDecrementFlag$ = "go"
    HaltIncrementFlag$ = "go"

    'work on cell values in the big label
    'get the CellValue$, subtract 1 from it
    CellValue$ = STR$(VAL(MID$(BigLabel.Caption, 4 * (Col% - 1) + 41 * (Row% - 1) + 1, 4)) - 1)
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    DO WHILE LEN(CellValue$) <> 4
        CellValue$ = " " + CellValue$ 'pad CellValue$ with leading blanks until it is 4 characters long
    LOOP
    IF VAL(CellValue$) < 0 THEN
        CellValue$ = "   0"           'forbid CellValue$ less than 0
        HaltDecrementFlag$ = "stop"
    END IF
    IF VAL(CellValue$) > 999 THEN     'forbid CellValue$ greater than 999
        CellValue$ = " 999"
        HaltIncrementFlag$ = "stop"
    END IF
    'insert new CelValue$
    BigLabel.Caption = MID$(BigLabel.Caption, 1, 4 * (Col% - 1) + 41 * (Row% - 1)) + CellValue$ + MID$(BigLabel.Capt
ion, 4 * (Col% - 1) + 41 * (Row% - 1) + 5)

    'work on the sum of all kinds of errors for each position (column right of big matrix)
    IF HaltDecrementFlag$ <> "stop" THEN
        CellValue$ = STR$(VAL(MID$(PositionTotals.Caption, 5 * (Row% - 1) + 1, 4)) - 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
        IF VAL(CellValue$) < 0 THEN
            CellValue$ = "   0"           'forbid CellValue$ less than 0
            HaltDecrementFlag$ = "stop"
        END IF
        IF VAL(CellValue$) > 9999 THEN
```

```
        CellValue$ = "9999"          'forbid CellValue$ greater than 9999
        HaltIncrementFlag$ = "stop"
    END IF
    'insert new CellValue$
    PositionTotals.Caption = MID$(PositionTotals.Caption, 1, 5 * (Row% - 1)) + CellValue$ + " " + MID$(PositionT
otals.Caption, 5 * Row% + 1)
END IF

'work on the sum of the errors of each kind for all positions (row below big matrix)
IF HaltDecrementFlag$ <> "stop" THEN
    CellValue$ = STR$(VAL(MID$(ErrorTotals.Caption, 4 * (Col% - 1) + 1, 4)) - 1)
    DO WHILE MID$(CellValue$, 1, 1) = CHR$(32)
        CellValue$ = MID$(CellValue$, 2) 'remove 1 leading blank from CellValue$
    LOOP
    DO WHILE LEN(CellValue$) <> 4
        CellValue$ = " " + CellValue$ 'pad CellValue$ with leading blanks until it is 4 characters long
    LOOP
    IF VAL(CellValue$) < 0 THEN
        CellValue$ = "   0"          'forbid CellValue$ less than 0
        HaltDecrementFlag$ = "stop"
    END IF
    IF VAL(CellValue$) > 9999 THEN
        CellValue$ = "9999"          'forbid CellValue$ greater than 9999
        HaltIncrementFlag$ = "stop"
    END IF
    'insert new CellValue$
    ErrorTotals.Caption = MID$(ErrorTotals.Caption, 1, 4 * (Col% - 1)) + CellValue$ + MID$(ErrorTotals.Caption,
4 * Col% + 1)
END IF

'work on the totals of all errors of all kinds and all positions
IF HaltDecrementFlag$ <> "stop" THEN
    CellValue$ = STR$(VAL(TotalofTotals.Caption) - 1)
    DO WHILE MID$(CellValue$, 1, 1) = CHR$(32)
        CellValue$ = MID$(CellValue$, 2) 'remove 1 leading blank from CellValue$
    LOOP
    DO WHILE LEN(CellValue$) <> 5
        CellValue$ = " " + CellValue$ 'pad CellValue$ with leading blanks until it is 5 characters long
    LOOP
    IF VAL(CellValue$) < 0 THEN CellValue$ = "    0"     'forbid CellValue$ less than 0
    IF VAL(CellValue$) > 99999 THEN CellValue$ = "99999" 'forbid CellValue$ greater than 99999
    'insert new CellValue$
    TotalofTotals.Caption = CellValue$
END IF
OPEN "backup.dat" FOR OUTPUT AS #3
PRINT #3, BigLabel.Caption
PRINT #3, ErrorTotals.Caption
PRINT #3, PositionTotals.Caption
```

```
    PRINT #3, TotalofTotals.Caption
    PRINT #3, StartDate$
    PRINT #3, StartTime$
    CLOSE #3

END SUB

SUB Demo_Click ()
    FOR Row% = 1 TO 20
        FOR Col% = 1 TO 10
            RowValue.Text = STR$(Row%)
            ColumnValue.Text = STR$(Col%)
            'FOR i% = 1 TO Row% + Col%
                IF Row% >= Col% THEN CALL Increment_Click
            'NEXT i%
        NEXT Col%
    NEXT Row%
END SUB

SUB Increment_Click ()
    IF VAL(RowValue.Text) < 1 THEN RowValue.Text = "  1"
    IF VAL(RowValue.Text) > 20 THEN RowValue.Text = " 20"
    IF VAL(ColumnValue.Text) < 1 THEN ColumnValue.Text = "  1"
    IF VAL(ColumnValue.Text) > 10 THEN ColumnValue.Text = " 10"
    Row% = VAL(RowValue.Text)
    Col% = VAL(ColumnValue.Text)
    HaltDecrementFlag$ = "go"
    HaltIncrementFlag$ = "go"

    'work on cell values in the big label
    'get the CellValue$, add 1 to it
    CellValue$ = STR$(VAL(MID$(BigLabel.Caption, 4 * (Col% - 1) + 41 * (Row% - 1) + 1, 4)) + 1)
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    DO WHILE LEN(CellValue$) <> 4
        CellValue$ = " " + CellValue$ 'pad CellValue$ with leading blanks until it is 4 characters long
    LOOP
    IF VAL(CellValue$) < 0 THEN
        CellValue$ = "   0"           'forbid CellValue$ less than 0
        HaltDecrementFlag$ = "stop"
    END IF
    IF VAL(CellValue$) > 999 THEN
        CellValue$ = " 999"           'forbid CellValue$ greater than 999
        HaltIncrementFlag$ = "stop"
    END IF
    'insert new CelValue$
```

```
    BigLabel.Caption = MID$(BigLabel.Caption, 1, 4 * (Col% - 1) + 41 * (Row% - 1)) + CellValue$ + MID$(BigLabel.Capt
ion, 4 * (Col% - 1) + 41 * (Row% - 1) + 5)

    'work on the sum of all kinds of errors for each position (column right of big matrix)
    IF HaltIncrementFlag$ <> "stop" THEN
        CellValue$ = STR$(VAL(MID$(PositionTotals.Caption, 5 * (Row% - 1) + 1, 4)) + 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
        IF VAL(CellValue$) < 0 THEN
            CellValue$ = "   0"          'forbid CellValue$ less than 0
            HaltDecrementFlag$ = "stop"
        END IF
        IF VAL(CellValue$) > 9999 THEN
            CellValue$ = "9999"          'forbid CellValue$ greater than 9999
            HaltIncrementFlag$ = "stop"
        END IF
        'insert new CelValue$
        PositionTotals.Caption = MID$(PositionTotals.Caption, 1, 5 * (Row% - 1)) + CellValue$ + " " + MID$(PositionT
otals.Caption, 5 * Row% + 1)
    END IF

    'work on the sum of the errors of each kind for all positions (row below big matrix)
    IF HaltIncrementFlag$ <> "stop" THEN
        CellValue$ = STR$(VAL(MID$(ErrorTotals.Caption, 4 * (Col% - 1) + 1, 4)) + 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
        IF VAL(CellValue$) < 0 THEN
            CellValue$ = "   0"          'forbid CellValue$ less than 0
            HaltDecrementFlag$ = "stop"
        END IF
        IF VAL(CellValue$) > 9999 THEN
            CellValue$ = "9999"          'forbid CellValue$ greater than 9999
            HaltIncrementFlag$ = "stop"
        END IF
        'insert new CelValue$
        ErrorTotals.Caption = MID$(ErrorTotals.Caption, 1, 4 * (Col% - 1)) + CellValue$ + MID$(ErrorTotals.Caption,
4 * Col% + 1)
    END IF

    'work on the totals of all errors of all kinds and all positions
```

```
    IF HaltIncrementFlag$ <> "stop" THEN
        CellValue$ = STR$(VAL(TotalofTotals.Caption) + 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 5
            CellValue$ = " " + CellValue$    'pad CellValue$ with leading blanks until it is 4 characters long
        LOOP
        IF VAL(CellValue$) < 0 THEN CellValue$ = "    0"    'forbid CellValue$ less than 0
        IF VAL(CellValue$) > 99999 THEN CellValue$ = "99999" 'forbid CellValue$ greater than 9999
        'insert new CelValue$
        TotalofTotals.Caption = CellValue$
    END IF
    OPEN "backup.dat" FOR OUTPUT AS #3
    PRINT #3, BigLabel.Caption
    PRINT #3, ErrorTotals.Caption
    PRINT #3, PositionTotals.Caption
    PRINT #3, TotalofTotals.Caption
    PRINT #3, StartDate$
    PRINT #3, StartTime$
    CLOSE #3
END SUB

SUB OutputDataToFile_Click ()
    FileName$ = MID$(DATE$, 9, 2) + MID$(DATE$, 1, 2) + MID$(DATE$, 4, 2) + "." + MID$(TIME$, 1, 2) + MID$(TIME$, 4,
 1)
    OPEN FileName$ FOR OUTPUT AS #2
    FOR Row% = 1 TO 20
        FOR Col% = 1 TO 10
            CellValue$ = STR$(VAL(MID$(BigLabel.Caption, 4 * (Col% - 1) + 41 * (Row% - 1) + 1, 4)))
            'remove leading blanks
            DO WHILE MID$(CellValue$, 1, 1) = CHR$(32) 'do while 1st character is a blank
                CellValue$ = MID$(CellValue$, 2) 'remove 1 leading blank from CellValue$
            LOOP
            'PRINT #2, CHR$(34) + CellValue$ + CHR$(34) + ",";
            PRINT #2, CellValue$ + ",";
        NEXT Col%
        CellValue$ = STR$(VAL(MID$(PositionTotals.Caption, 5 * (Row% - 1) + 1, 4)))
        'remove leading blanks
        DO WHILE MID$(CellValue$, 1, 1) = CHR$(32) 'do while 1st character is a blank
            CellValue$ = MID$(CellValue$, 2) 'remove 1 leading blank from CellValue$
        LOOP
        PRINT #2, "          " + "," + CellValue$
    NEXT Row%
    PRINT #2,
    FOR Col% = 1 TO 10
        CellValue$ = STR$(VAL(MID$(ErrorTotals.Caption, 4 * (Col% - 1) + 1, 4)))
        'remove leading blanks
```

```
        DO WHILE MID$(CellValue$, 1, 1) = CHR$(32) 'do while 1st character is a blank
            CellValue$ = MID$(CellValue$, 2) 'remove 1 leading blank from CellValue$
        LOOP
        PRINT #2, CellValue$ + ",";
    NEXT Col%
    CellValue$ = TotalofTotals.Caption
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    PRINT #2, "           " + "," + CellValue$
    PRINT #2,
    PRINT #2, CHR$(34) + "Start,,,End" + CHR$(34)
    PRINT #2, CHR$(34) + StartDate$ + CHR$(34) + ",,," + CHR$(34) + DATE$ + CHR$(34)
    PRINT #2, CHR$(34) + StartTime$ + CHR$(34) + ",,," + CHR$(34) + TIME$ + CHR$(34)
    CLOSE #2
    SHELL "copy " + FileName$ + " LATEST.DAT"
    IF PrinterFlag$ = "p" THEN CALL PrinterOutput
END SUB

SUB PrinterOutput ()
    DIM MostNumerousDefects(10) AS STRING
    DIM MostNumerousDefectsRow(10) AS INTEGER
    DIM MostNumerousDefectsCol(10) AS INTEGER
    DIM MatrixOfCellValues(20, 10) AS STRING
    FOR Row% = 1 TO 20
        FOR Col% = 1 TO 10
            CellValue$ = STR$(VAL(MID$(BigLabel.Caption, 4 * (Col% - 1) + 41 * (Row% - 1) + 1, 4)))
            'remove leading blanks
            DO WHILE MID$(CellValue$, 1, 1) = CHR$(32) 'do while 1st character is a blank
                CellValue$ = MID$(CellValue$, 2) 'remove 1 leading blank from CellValue$
            LOOP
            MatrixOfCellValues(Row%, Col%) = CellValue$
            LPRINT CellValue$; TAB(Col% * 4 + 1);
        NEXT Col%
        CellValue$ = STR$(VAL(MID$(PositionTotals.Caption, 5 * (Row% - 1) + 1, 4)))
        'remove leading blanks
        DO WHILE MID$(CellValue$, 1, 1) = CHR$(32) 'do while 1st character is a blank
            CellValue$ = MID$(CellValue$, 2) 'remove 1 leading blank from CellValue$
        LOOP
        LPRINT "  " + CellValue$; "  " + Position(Row%)
        'LPRINT   'this makes the matrix print out in doublespace
    NEXT Row%
    LPRINT
    FOR Col% = 1 TO 10
        CellValue$ = STR$(VAL(MID$(ErrorTotals.Caption, 4 * (Col% - 1) + 1, 4)))
        'remove leading blanks
        DO WHILE MID$(CellValue$, 1, 1) = CHR$(32) 'do while 1st character is a blank
```

```
        CellValue$ = MID$(CellValue$, 2) 'remove 1 leading blank from CellValue$
      LOOP
      LPRINT CellValue$; TAB(Col% * 4 + 1);
    NEXT Col%
    CellValue$ = TotalofTotals.Caption
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    LPRINT "  " + CellValue$; "  GRAND TOTAL"
    LPRINT
    LPRINT CHR$(32) + "Start          End" + CHR$(32)
    LPRINT CHR$(32) + StartDate$ + CHR$(32) + "   " + CHR$(32) + DATE$ + CHR$(32)
    LPRINT CHR$(32) + StartTime$ + CHR$(32) + "     " + CHR$(32) + TIME$ + CHR$(32)
    LPRINT TAB(62 - 12); TypeError(10)' "                                        poor heat stake/USDB/long
gate"
    LPRINT TypeError(1); TAB(56 - 12); TypeError(9)       '  "trash in paint                            broken leg
/bad optic"
    LPRINT TAB(4); TypeError(2); TAB(48 - 12); TypeError(8) ' "  bad graphic                     button failure"
    LPRINT TAB(20 - 12); TypeError(3); TAB(42 - 12); TypeError(7)' "      broken pin           light leak"
    LPRINT TAB(24 - 12); TypeError(4); TAB(36 - 12); TypeError(6)' "          scratch     short shot"
    LPRINT TAB(28 - 12); TypeError(5)' "                off location graphic"

    'LPRINT CHR$(12)
    'LPRINT
    'FOR Row% = 1 TO 20
    '    FOR Col% = 1 TO 10
    '        LPRINT MatrixOfCellValues(Row%, Col%);
    '    NEXT Col%
    '    LPRINT
     'NEXT Row%
    'LPRINT
    FOR i% = 1 TO 10
        MostNumerousDefectsRow(i%) = 0
        MostNumerousDefectsCol(i%) = 0
    NEXT i%
    ' now find the 10 most numerous defects
    FOR NumberOfMostNumerousDefects% = 1 TO 10
        i% = NumberOfMostNumerousDefects%
        MaxValue$ = "-1"
        FOR Row% = 1 TO 20
            FOR Col% = 1 TO 10
                IF VAL(MatrixOfCellValues(Row%, Col%)) > VAL(MaxValue$) THEN
                    MostNumerousDefectsRow(i%) = Row%
                    MostNumerousDefectsCol(i%) = Col%
                    MaxValue$ = MatrixOfCellValues(Row%, Col%)
                END IF
            NEXT Col%
```

```
        NEXT Row%
        MostNumerousDefects(i%) = MatrixOfCellValues(MostNumerousDefectsRow(i%), MostNumerousDefectsCol(i%))
        MatrixOfCellValues(MostNumerousDefectsRow(i%), MostNumerousDefectsCol(i%)) = "0"
    NEXT NumberOfMostNumerousDefects%
    LPRINT
    LPRINT
    LPRINT
    LPRINT
    LPRINT
    LPRINT "                              10 MOST NUMEROUS DEFECTS"
    LPRINT
    LPRINT "  position                    type of error                      number"
    LPRINT
    FOR NumberOfMostNumerousDefects% = 1 TO 10
        i% = NumberOfMostNumerousDefects%
        LPRINT Position(MostNumerousDefectsRow(i%)); TAB(30);
        LPRINT TypeError(MostNumerousDefectsCol(i%)); TAB(65);
        LPRINT MostNumerousDefects(i%)
    NEXT
    LPRINT CHR$(12)
    'LPRINT
    'FOR Row% = 1 TO 20
    '    FOR Col% = 1 TO 10
    '        LPRINT MatrixOfCellValues(Row%, Col%);
    '    NEXT Col%
    '    LPRINT
    'NEXT Row%
    'LPRINT
END SUB

SUB QuitButton_Click ()
    END
END SUB

SUB Reload_Click ()
    OPEN "backup.old" FOR OUTPUT AS #3
    PRINT #3, BigLabel.Caption
    PRINT #3, ErrorTotals.Caption
    PRINT #3, PositionTotals.Caption
    PRINT #3, TotalofTotals.Caption
    PRINT #3, StartDate$
    PRINT #3, StartTime$
    CLOSE #3

    OPEN "backup.dat" FOR INPUT AS #3
    INPUT #3, A$, B$, C$, D$, StartDate$, StartTime$
    CLOSE #3
```

```
IF MID$(A$, 2, 1) = " " THEN
    BigLabel.Caption = "   " + A$
ELSEIF MID$(A$, 3, 1) = " " THEN
    BigLabel.Caption = "  " + A$
ELSEIF MID$(A$, 4, 1) = " " THEN
    BigLabel.Caption = " " + A$
ELSE
    BigLabel.Caption = A$
END IF

IF MID$(B$, 2, 1) = " " THEN
    ErrorTotals.Caption = "   " + B$
ELSEIF MID$(B$, 3, 1) = " " THEN
    ErrorTotals.Caption = "  " + B$
ELSEIF MID$(B$, 4, 1) = " " THEN
    ErrorTotals.Caption = " " + B$
ELSE
    ErrorTotals.Caption = B$
END IF

IF MID$(C$, 2, 1) = " " THEN
    PositionTotals.Caption = "   " + C$
ELSEIF MID$(C$, 3, 1) = " " THEN
    PositionT
```

APPENDIX F
TO FIG. 14A-14D

Page 1
04-19-94
08:58:53
MATRIXNP.LST

```
Version 1.00
BEGIN Form ErrorMatrix
   AutoRedraw   = 0
   BackColor    = QBColor(7)
   BorderStyle  = 2
   Caption      = "Defect Matrix - 20 rows (positions), 10 columns (types of errors)"
   ControlBox   = -1
   Enabled      = -1
   ForeColor    = QBColor(0)
   Height       = Char(24)
   Left         = Char(1)
   MaxButton    = -1
   MinButton    = -1
   MousePointer = 0
   Tag          = ""
   Top          = Char(1)
   Visible      = -1
   Width        = Char(78)
   WindowState  = 0
   BEGIN Label ErrorMessage
      Alignment    = 0
      AutoSize     = 0
      BackColor    = QBColor(7)
      BorderStyle  = 0
      Caption      = ""
      DragMode     = 0
      Enabled      = -1
      ForeColor    = QBColor(0)
      Height       = Char(1)
      Left         = Char(62)
      MousePointer = 0
      TabIndex     = 13
      Tag          = ""
      Top          = Char(14)
      Visible      = -1
      Width        = Char(13)
   END
   BEGIN Label TotalofTotals
      Alignment    = 0
      AutoSize     = 0
      BackColor    = QBColor(7)
      BorderStyle  = 0
      Caption      = "     0"
      DragMode     = 0
      Enabled      = -1
      ForeColor    = QBColor(0)
      Height       = Char(1)
      Left         = Char(54)
```

```
   MousePointer = 0
   TabIndex     = 10
   Tag          = ""
   Top          = Char(21)
   Visible      = -1
   Width        = Char(5)
END
BEGIN Label ErrorTotals
   Alignment    = 0
   AutoSize     = 0
   BackColor    = QBColor(7)
   BorderStyle  = 0
   Caption      = "  0   0   0   0   0   0   0   0   0 "
   DragMode     = 0
   Enabled      = -1
   ForeColor    = QBColor(0)
   Height       = Char(1)
   Left         = Char(6)
   MousePointer = 0
   TabIndex     = 9
   Tag          = ""
   Top          = Char(21)
   Visible      = -1
   Width        = Char(40)
END
BEGIN Label PositionTotals
   Alignment    = 0
   AutoSize     = 0
   BackColor    = QBColor(7)
   BorderStyle  = 0
   Caption      = "  0   0   0   0   0   0   0   0   0   0   0   0   0   0   0   0   0   0   0
 0"
   DragMode     = 0
   Enabled      = -1
   ForeColor    = QBColor(0)
   Height       = Char(20)
   Left         = Char(55)
   MousePointer = 0
   TabIndex     = 8
   Tag          = ""
   Top          = Char(0)
   Visible      = -1
   Width        = Char(4)
END
BEGIN Label TimeLabel
   Alignment    = 0
   AutoSize     = 0
   BackColor    = QBColor(7)
```

Page 3
04-19-94
08:58:54
MATRIXNP.LST

```
   BorderStyle  = 0
   Caption      = "time:"
   DragMode     = 0
   Enabled      = -1
   ForeColor    = QBColor(0)
   Height       = Char(1)
   Left         = Char(61)
   MousePointer = 0
   TabIndex     = 15
   Tag          = ""
   Top          = Char(17)
   Visible      = -1
   Width        = Char(7)
END
BEGIN Label CurrentDate
   Alignment    = 0
   AutoSize     = 0
   BackColor    = QBColor(7)
   BorderStyle  = 0
   Caption      = "date"
   DragMode     = 0
   Enabled      = -1
   ForeColor    = QBColor(0)
   Height       = Char(1)
   Left         = Char(62)
   MousePointer = 0
   TabIndex     = 11
   Tag          = ""
   Top          = Char(16)
   Visible      = -1
   Width        = Char(12)
END
BEGIN Label DateLabel
   Alignment    = 0
   AutoSize     = 0
   BackColor    = QBColor(7)
   BorderStyle  = 0
   Caption      = "date:"
   DragMode     = 0
   Enabled      = -1
   ForeColor    = QBColor(0)
   Height       = Char(1)
   Left         = Char(61)
   MousePointer = 0
   TabIndex     = 14
   Tag          = ""
   Top          = Char(15)
   Visible      = -1
```

```
   Width        = Char(7)
END
BEGIN Label CurrentTime
   Alignment    = 0
   AutoSize     = 0
   BackColor    = QBColor(7)
   BorderStyle  = 0
   Caption      = "time"
   DragMode     = 0
   Enabled      = -1
   ForeColor    = QBColor(0)
   Height       = Char(1)
   Left         = Char(62)
   MousePointer = 0
   TabIndex     = 12
   Tag          = ""
   Top          = Char(18)
   Visible      = -1
   Width        = Char(12)
END
BEGIN Label ErrorMesage
   Alignment    = 0
   AutoSize     = 0
   BackColor    = QBColor(7)
   BorderStyle  = 0
   Caption      = ""
   DragMode     = 0
   Enabled      = -1
   ForeColor    = QBColor(0)
   Height       = Char(1)
   Left         = Char(49)
   MousePointer = 0
   TabIndex     = 19
   Tag          = ""
   Top          = Char(20)
   Visible      = -1
   Width        = Char(6)
END
BEGIN Label BigLabel
   Alignment    = 0
   AutoSize     = 0
   BackColor    = QBColor(7)
   BorderStyle  = 0
   Caption      = "  0  0  0  0  0  0  0  0  0  0   0  0  0  0  0  0  0  0  0  0   0  0  0
 0  0  0  0  0  0  0   0  0  0  0  0  0  0  0  0  0   0  0  0  0  0  0  0  0  0   0
0  0  0  0  0  0  0  0  0   0  0  0  0  0  0  0  0  0  0   0  0  0  0  0  0  0  0  0
0   0  0  0  0  0  0  0  0  0  0   0  0  0  0  0  0  0  0  0  0   0  0  0  0  0. 0  0  0
 0  0   0  0  0  0  0  0  0  0  0  0   0  0  0  0  0  0  0  0  0  0   0  0  0  0  0  0
```

```
 0  0  0  0   0  0  0  0  0  0  0  0  0  0   0  0  0  0  0  0  0  0  0  0   0  0  0  0
0  0  0  0  0  0   0  0  0  0  0  0  0  0  0  0   0  0  0  0  0  0  0  0  0  0   0  0
0  0  0  0  0  0  0  0"
     DragMode     = 0
     Enabled      = -1
     ForeColor    = QBColor(0)
     Height       = Char(20)
     Left         = Char(6)
     MousePointer = 0
     TabIndex     = 7
     Tag          = ""
     Top          = Char(0)
     Visible      = -1
     Width        = Char(40)
  END
  BEGIN Timer Timer3
     Enabled      = -1
     Interval     = 1
     Left         = Char(47)
     Tag          = ""
     Top          = Char(5)
  END
  BEGIN Timer Timer4
     Enabled      = -1
     Interval     = 10000
     Left         = Char(47)
     Tag          = ""
     Top          = Char(0)
  END
  BEGIN Timer Timer2
     Enabled      = -1
     Interval     = 4000
     Left         = Char(47)
     Tag          = ""
     Top          = Char(11)
  END
  BEGIN Timer Timer1
     Enabled      = -1
     Interval     = 1000
     Left         = Char(47)
     Tag          = ""
     Top          = Char(17)
  END
  BEGIN Label RowLabel
     Alignment    = 0
     AutoSize     = 0
     BackColor    = QBColor(7)
     BorderStyle  = 0
```

```
   Caption        = "Position  (row)"
   DragMode       = 0
   Enabled        = -1
   ForeColor      = QBColor(0)
   Height         = Char(2)
   Left           = Char(60)
   MousePointer   = 0
   TabIndex       = 3
   Tag            = ""
   Top            = Char(1)
   Visible        = -1
   Width          = Char(8)
END
BEGIN Label ColumnLabel
   Alignment      = 0
   AutoSize       = 0
   BackColor      = QBColor(7)
   BorderStyle    = 0
   Caption        = "Error (column)"
   DragMode       = 0
   Enabled        = -1
   ForeColor      = QBColor(0)
   Height         = Char(2)
   Left           = Char(60)
   MousePointer   = 0
   TabIndex       = 4
   Tag            = ""
   Top            = Char(4)
   Visible        = -1
   Width          = Char(8)
END
BEGIN TextBox RowValue
   BackColor      = QBColor(7)
   BorderStyle    = 1
   DragMode       = 0
   Enabled        = -1
   ForeColor      = QBColor(0)
   Height         = Char(3)
   Left           = Char(68)
   MousePointer   = 0
   MultiLine      = 0
   ScrollBars     = 0
   TabIndex       = 0
   TabStop        = -1
   Tag            = ""
   Text           = "  0"
   Top            = Char(0)
   Visible        = -1
```

```
   Width        = Char(7)
END
BEGIN TextBox ColumnValue
   BackColor    = QBColor(7)
   BorderStyle  = 1
   DragMode     = 0
   Enabled      = -1
   ForeColor    = QBColor(0)
   Height       = Char(3)
   Left         = Char(68)
   MousePointer = 0
   MultiLine    = 0
   ScrollBars   = 0
   TabIndex     = 1
   TabStop      = -1
   Tag          = ""
   Text         = "  0"
   Top          = Char(3)
   Visible      = -1
   Width        = Char(7)
END
BEGIN CommandButton QuitButton
   BackColor    = QBColor(12)
   Cancel       = 0
   Caption      = "Quit"
   Default      = 0
   DragMode     = 0
   Enabled      = -1
   Height       = Char(3)
   Left         = Char(69)
   MousePointer = 0
   TabIndex     = 2
   TabStop      = -1
   Tag          = ""
   Top          = Char(19)
   Visible      = -1
   Width        = Char(6)
END
BEGIN CommandButton Reload
   BackColor    = QBColor(5)
   Cancel       = 0
   Caption      = "Reload"
   Default      = 0
   DragMode     = 0
   Enabled      = -1
   Height       = Char(3)
   Left         = Char(60)
   MousePointer = 0
```

```
   TabIndex      = 18
   TabStop       = -1
   Tag           = ""
   Top           = Char(19)
   Visible       = -1
   Width         = Char(8)
END
BEGIN CommandButton Decrement
   BackColor     = QBColor(3)
   Cancel        = 0
   Caption       = "Decrement"
   Default       = 0
   DragMode      = 0
   Enabled       = -1
   Height        = Char(3)
   Left          = Char(64)
   MousePointer  = 0
   TabIndex      = 6
   TabStop       = -1
   Tag           = ""
   Top           = Char(9)
   Visible       = -1
   Width         = Char(11)
END
BEGIN CommandButton Increment
   BackColor     = QBColor(2)
   Cancel        = 0
   Caption       = "Increment"
   Default       = 0
   DragMode      = 0
   Enabled       = -1
   Height        = Char(3)
   Left          = Char(64)
   MousePointer  = 0
   TabIndex      = 5
   TabStop       = -1
   Tag           = ""
   Top           = Char(6)
   Visible       = -1
   Width         = Char(11)
END
BEGIN CommandButton OutputDataToFile
   BackColor     = QBColor(14)
   Cancel        = 0
   Caption       = "Output"
   Default       = 0
   DragMode      = 0
   Enabled       = -1
```

```
      Height   .    = Char(3)
      Left          = Char(60)
      MousePointer  = 0
      TabIndex      = 17
      TabStop       = -1
      Tag           = ""
      Top           = Char(12)
      Visible       = -1
      Width         = Char(8)
   END
   BEGIN CommandButton Setup
      BackColor     = QBColor(6)
      Cancel        = 0
      Caption       = "Setup"
      Default       = 0
      DragMode      = 0
      Enabled       = -1
      Height        = Char(3)
      Left          = Char(68)
      MousePointer  = 0
      TabIndex      = 16
      TabStop       = -1
      Tag           = ""
      Top           = Char(12)
      Visible       = -1
      Width         = Char(7)
   END
END
'$FORM ChangePositionOrError
DECLARE SUB PrinterOutput ()
DECLARE SUB Increment_Click ()
DIM SHARED LastErrorKey%
DIM SHARED LastPositionKey%
DIM SHARED ErrorKey%
DIM SHARED PositionKey%
DIM SHARED LastKey$
DIM SHARED StartDate$
DIM SHARED StartTime$
DIM SHARED ValueOfInputParameter%
DIM SHARED PrinterFlag$
DIM SHARED Position(20) AS STRING
DIM SHARED TypeError(10) AS STRING
COMMON SHARED TypeError() AS STRING
COMMON SHARED Position() AS STRING

SUB ColumnLabel_Click ()
    IF VAL(ColumnValue.Text) < 1 THEN ColumnValue.Text = "  1"
    IF VAL(ColumnValue.Text) > 10 THEN ColumnValue.Text = " 10"
```

```
END SUB

SUB Decrement_Click ()
    IF VAL(RowValue.Text) < 1 THEN RowValue.Text = "  1"
    IF VAL(RowValue.Text) > 20 THEN RowValue.Text = " 20"
    IF VAL(ColumnValue.Text) < 1 THEN ColumnValue.Text = "  1"
    IF VAL(ColumnValue.Text) > 10 THEN ColumnValue.Text = " 10"
    Row% = VAL(RowValue.Text)
    Col% = VAL(ColumnValue.Text)
    HaltDecrementFlag$ = "go"
    HaltIncrementFlag$ = "go"

    'work on cell values in the big label
    'get the CellValue$, subtract 1 from it
    CellValue$ = STR$(VAL(MID$(BigLabel.Caption, 4 * (Col% - 1) + 41 * (Row% - 1) + 1, 4)) - 1)
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    DO WHILE LEN(CellValue$) <> 4
        CellValue$ = " " + CellValue$ 'pad CellValue$ with leading blanks until it is 4 characters long
    LOOP
    IF VAL(CellValue$) < 0 THEN
        CellValue$ = "   0"            'forbid CellValue$ less than 0
        HaltDecrementFlag$ = "stop"
    END IF
    IF VAL(CellValue$) > 999 THEN     'forbid CellValue$ greater than 999
        CellValue$ = " 999"
        HaltIncrementFlag$ = "stop"
    END IF
    'insert new CelValue$
    BigLabel.Caption = MID$(BigLabel.Caption, 1, 4 * (Col% - 1) + 41 * (Row% - 1)) + CellValue$ + MID$(BigLabel.Capt
ion, 4 * (Col% - 1) + 41 * (Row% - 1) + 5)

    'work on the sum of all kinds of errors for each position (column right of big matrix)
    IF HaltDecrementFlag$ <> "stop" THEN
        CellValue$ = STR$(VAL(MID$(PositionTotals.Caption, 5 * (Row% - 1) + 1, 4)) - 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
        IF VAL(CellValue$) < 0 THEN
            CellValue$ = "   0"            'forbid CellValue$ less than 0
            HaltDecrementFlag$ = "stop"
        END IF
        IF VAL(CellValue$) > 9999 THEN
```

```
            CellValue$ = "9999"          'forbid CellValue$ greater than 9999
            HaltIncrementFlag$ = "stop"
        END IF
        'insert new CellValue$
        PositionTotals.Caption = MID$(PositionTotals.Caption, 1, 5 * (Row% - 1)) + CellValue$ + " " + MID$(PositionT
otals.Caption, 5 * Row% + 1)
    END IF

    'work on the sum of the errors of each kind for all positions (row below big matrix)
    IF HaltDecrementFlag$ <> "stop" THEN
        CellValue$ = STR$(VAL(MID$(ErrorTotals.Caption, 4 * (Col% - 1) + 1, 4)) - 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
        IF VAL(CellValue$) < 0 THEN
            CellValue$ = "   0"          'forbid CellValue$ less than 0
            HaltDecrementFlag$ = "stop"
        END IF
        IF VAL(CellValue$) > 9999 THEN
            CellValue$ = "9999"          'forbid CellValue$ greater than 9999
            HaltIncrementFlag$ = "stop"
        END IF
        'insert new CellValue$
        ErrorTotals.Caption = MID$(ErrorTotals.Caption, 1, 4 * (Col% - 1)) + CellValue$ + MID$(ErrorTotals.Caption,
4 * Col% + 1)
    END IF

    'work on the totals of all errors of all kinds and all positions
    IF HaltDecrementFlag$ <> "stop" THEN
        CellValue$ = STR$(VAL(TotalofTotals.Caption) - 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 5
            CellValue$ = " " + CellValue$ 'pad CellValue$ with leading blanks until it is 5 characters long
        LOOP
        IF VAL(CellValue$) < 0 THEN CellValue$ = "    0"     'forbid CellValue$ less than 0
        IF VAL(CellValue$) > 99999 THEN CellValue$ = "99999" 'forbid CellValue$ greater than 99999
        'insert new CellValue$
        TotalofTotals.Caption = CellValue$
    END IF
    OPEN "backup.dat" FOR OUTPUT AS #3
    PRINT #3, BigLabel.Caption
    PRINT #3, ErrorTotals.Caption
    PRINT #3, PositionTotals.Caption
```

```
    PRINT #3, TotalofTotals.Caption
    PRINT #3, StartDate$
    PRINT #3, StartTime$
    CLOSE #3

END SUB

SUB Demo_Click ()
    FOR Row% = 1 TO 20
        FOR Col% = 1 TO 10
            RowValue.Text = STR$(Row%)
            ColumnValue.Text = STR$(Col%)
            'FOR i% = 1 TO Row% + Col%
                IF Row% >= Col% THEN CALL Increment_Click
            'NEXT i%
        NEXT Col%
    NEXT Row%
END SUB

SUB Increment_Click ()
    IF VAL(RowValue.Text) < 1 THEN RowValue.Text = "  1"
    IF VAL(RowValue.Text) > 20 THEN RowValue.Text = " 20"
    IF VAL(ColumnValue.Text) < 1 THEN ColumnValue.Text = "  1"
    IF VAL(ColumnValue.Text) > 10 THEN ColumnValue.Text = " 10"
    Row% = VAL(RowValue.Text)
    Col% = VAL(ColumnValue.Text)
    HaltDecrementFlag$ = "go"
    HaltIncrementFlag$ = "go"

    'work on cell values in the big label
    'get the CellValue$, add 1 to it
    CellValue$ = STR$(VAL(MID$(BigLabel.Caption, 4 * (Col% - 1) + 41 * (Row% - 1) + 1, 4)) + 1)
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    DO WHILE LEN(CellValue$) <> 4
        CellValue$ = " " + CellValue$ 'pad CellValue$ with leading blanks until it is 4 characters long
    LOOP
    IF VAL(CellValue$) < 0 THEN
        CellValue$ = "   0"          'forbid CellValue$ less than 0
        HaltDecrementFlag$ = "stop"
    END IF
    IF VAL(CellValue$) > 999 THEN
        CellValue$ = " 999"          'forbid CellValue$ greater than 999
        HaltIncrementFlag$ = "stop"
    END IF
    'insert new CelValue$
```

```
    BigLabel.Caption = MID$(BigLabel.Caption, 1, 4 * (Col% - 1) + 41 * (Row% - 1)) + CellValue$ + MID$(BigLabel.Capt
ion, 4 * (Col% - 1) + 41 * (Row% - 1) + 5)

    'work on the sum of all kinds of errors for each position (column right of big matrix)
    IF HaltIncrementFlag$ <> "stop" THEN
        CellValue$ = STR$(VAL(MID$(PositionTotals.Caption, 5 * (Row% - 1) + 1, 4)) + 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
        IF VAL(CellValue$) < 0 THEN
            CellValue$ = "   0"           'forbid CellValue$ less than 0
            HaltDecrementFlag$ = "stop"
        END IF
        IF VAL(CellValue$) > 9999 THEN
            CellValue$ = "9999"           'forbid CellValue$ greater than 9999
            HaltIncrementFlag$ = "stop"
        END IF
        'insert new CelValue$
        PositionTotals.Caption = MID$(PositionTotals.Caption, 1, 5 * (Row% - 1)) + CellValue$ + " " + MID$(PositionT
otals.Caption, 5 * Row% + 1)
    END IF

    'work on the sum of the errors of each kind for all positions (row below big matrix)
    IF HaltIncrementFlag$ <> "stop" THEN
        CellValue$ = STR$(VAL(MID$(ErrorTotals.Caption, 4 * (Col% - 1) + 1, 4)) + 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 4
            CellValue$ = " " + CellValue$ 'pad CellValue$ with leading blanks until it is 4 characters long
        LOOP
        IF VAL(CellValue$) < 0 THEN
            CellValue$ = "   0"           'forbid CellValue$ less than 0
            HaltDecrementFlag$ = "stop"
        END IF
        IF VAL(CellValue$) > 9999 THEN
            CellValue$ = "9999"           'forbid CellValue$ greater than 9999
            HaltIncrementFlag$ = "stop"
        END IF
        'insert new CelValue$
        ErrorTotals.Caption = MID$(ErrorTotals.Caption, 1, 4 * (Col% - 1)) + CellValue$ + MID$(ErrorTotals.Caption,
 4 * Col% + 1)
    END IF

    'work on the totals of all errors of all kinds and all positions
```

```
    IF HaltIncrementFlag$ <> "stop" THEN
        CellValue$ = STR$(VAL(TotalofTotals.Caption) + 1)
        DO WHILE MID$(CellValue$, 1, 1) = CHR$(32)
            CellValue$ = MID$(CellValue$, 2) 'remove 1 leading blank from CellValue$
        LOOP
        DO WHILE LEN(CellValue$) <> 5
            CellValue$ = " " + CellValue$    'pad CellValue$ with leading blanks until it is 4 characters long
        LOOP
        IF VAL(CellValue$) < 0 THEN CellValue$ = "    0"    'forbid CellValue$ less than 0
        IF VAL(CellValue$) > 99999 THEN CellValue$ = "99999" 'forbid CellValue$ greater than 9999
        'insert new CelValue$
        TotalofTotals.Caption = CellValue$
    END IF
    OPEN "backup.dat" FOR OUTPUT AS #3
    PRINT #3, BigLabel.Caption
    PRINT #3, ErrorTotals.Caption
    PRINT #3, PositionTotals.Caption
    PRINT #3, TotalofTotals.Caption
    PRINT #3, StartDate$
    PRINT #3, StartTime$
    CLOSE #3
END SUB

SUB OutputDataToFile_Click ()
    FileName$ = MID$(DATE$, 9, 2) + MID$(DATE$, 1, 2) + MID$(DATE$, 4, 2) + "." + MID$(TIME$, 1, 2) + MID$(TIME$, 4,
 1)
    OPEN FileName$ FOR OUTPUT AS #2
    FOR Row% = 1 TO 20
        FOR Col% = 1 TO 10
            CellValue$ = STR$(VAL(MID$(BigLabel.Caption, 4 * (Col% - 1) + 41 * (Row% - 1) + 1, 4)))
            'remove leading blanks
            DO WHILE MID$(CellValue$, 1, 1) = CHR$(32) 'do while 1st character is a blank
                CellValue$ = MID$(CellValue$, 2) 'remove 1 leading blank from CellValue$
            LOOP
            'PRINT #2, CHR$(34) + CellValue$ + CHR$(34) + ",";
            PRINT #2, CellValue$ + ",";
        NEXT Col%
        CellValue$ = STR$(VAL(MID$(PositionTotals.Caption, 5 * (Row% - 1) + 1, 4)))
        'remove leading blanks
        DO WHILE MID$(CellValue$, 1, 1) = CHR$(32) 'do while 1st character is a blank
            CellValue$ = MID$(CellValue$, 2) 'remove 1 leading blank from CellValue$
        LOOP
        PRINT #2, "          " + "," + CellValue$
    NEXT Row%
    PRINT #2,
    FOR Col% = 1 TO 10
        CellValue$ = STR$(VAL(MID$(ErrorTotals.Caption, 4 * (Col% - 1) + 1, 4)))
        'remove leading blanks
```

```
        DO WHILE MID$(CellValue$, 1, 1) = CHR$(32) 'do while 1st character is a blank
            CellValue$ = MID$(CellValue$, 2) 'remove 1 leading blank from CellValue$
        LOOP
        PRINT #2, CellValue$ + ",";
    NEXT Col%
    CellValue$ = TotalofTotals.Caption
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    PRINT #2, "          " + "," + CellValue$
    PRINT #2,
    PRINT #2, CHR$(34) + "Start,,,End" + CHR$(34)
    PRINT #2, CHR$(34) + StartDate$ + CHR$(34) + ",,," + CHR$(34) + DATE$ + CHR$(34)
    PRINT #2, CHR$(34) + StartTime$ + CHR$(34) + ",,," + CHR$(34) + TIME$ + CHR$(34)
    CLOSE #2
    SHELL "copy " + FileName$ + " LATEST.DAT"
'    IF PrinterFlag$ = "p" THEN CALL PrinterOutput
END SUB

SUB PrinterOutput ()
    DIM MostNumerousDefects(10) AS STRING
    DIM MostNumerousDefectsRow(10) AS INTEGER
    DIM MostNumerousDefectsCol(10) AS INTEGER
    DIM MatrixOfCellValues(20, 10) AS STRING
    FOR Row% = 1 TO 20
        FOR Col% = 1 TO 10
            CellValue$ = STR$(VAL(MID$(BigLabel.Caption, 4 * (Col% - 1) + 41 * (Row% - 1) + 1, 4)))
            'remove leading blanks
            DO WHILE MID$(CellValue$, 1, 1) = CHR$(32) 'do while 1st character is a blank
                CellValue$ = MID$(CellValue$, 2) 'remove 1 leading blank from CellValue$
            LOOP
            MatrixOfCellValues(Row%, Col%) = CellValue$
            LPRINT CellValue$; TAB(Col% * 4 + 1);
        NEXT Col%
        CellValue$ = STR$(VAL(MID$(PositionTotals.Caption, 5 * (Row% - 1) + 1, 4)))
        'remove leading blanks
        DO WHILE MID$(CellValue$, 1, 1) = CHR$(32) 'do while 1st character is a blank
            CellValue$ = MID$(CellValue$, 2) 'remove 1 leading blank from CellValue$
        LOOP
        LPRINT "  " + CellValue$; "  " + Position(Row%)
        'LPRINT  'this makes the matrix print out in doublespace
    NEXT Row%
    LPRINT
    FOR Col% = 1 TO 10
        CellValue$ = STR$(VAL(MID$(ErrorTotals.Caption, 4 * (Col% - 1) + 1, 4)))
        'remove leading blanks
        DO WHILE MID$(CellValue$, 1, 1) = CHR$(32) 'do while 1st character is a blank
```

```
            CellValue$ = MID$(CellValue$, 2) 'remove 1 leading blank from CellValue$
        LOOP
        LPRINT CellValue$; TAB(Col% * 4 + 1);
    NEXT Col%
    CellValue$ = TotalofTotals.Caption
    'remove leading blanks
    DO WHILE MID$(CellValue$, 1, 1) = CHR$(32) 'do while 1st character is a blank
        CellValue$ = MID$(CellValue$, 2) 'remove 1 leading blank from CellValue$
    LOOP
    LPRINT "  " + CellValue$; "  GRAND TOTAL"
    LPRINT
    LPRINT CHR$(32) + "Start          End" + CHR$(32)
    LPRINT CHR$(32) + StartDate$ + CHR$(32) + "   " + CHR$(32) + DATE$ + CHR$(32)
    LPRINT CHR$(32) + StartTime$ + CHR$(32) + "     " + CHR$(32) + TIME$ + CHR$(32)
    LPRINT TAB(62 - 12); TypeError(10)' "                                        poor heat stake/USDB/long
gate"
    LPRINT TypeError(1); TAB(56 - 12); TypeError(9)        '   "trash in paint                         broken leg
/bad optic"
    LPRINT TAB(4); TypeError(2); TAB(48 - 12); TypeError(8) ' "   bad graphic                    button failure"
    LPRINT TAB(20 - 12); TypeError(3); TAB(42 - 12); TypeError(7)' "       broken pin           light leak"
    LPRINT TAB(24 - 12); TypeError(4); TAB(36 - 12); TypeError(6)' "          scratch     short shot"
    LPRINT TAB(28 - 12); TypeError(5)' "               off location graphic"

    'LPRINT CHR$(12)
    'LPRINT
    'FOR Row% = 1 TO 20
    '    FOR Col% = 1 TO 10
    '        LPRINT MatrixOfCellValues(Row%, Col%);
    '    NEXT Col%
    '    LPRINT
     'NEXT Row%
    'LPRINT
    FOR i% = 1 TO 10
        MostNumerousDefectsRow(i%) = 0
        MostNumerousDefectsCol(i%) = 0
    NEXT i%
    ' now find the 10 most numerous defects
    FOR NumberOfMostNumerousDefects% = 1 TO 10
        i% = NumberOfMostNumerousDefects%
        MaxValue$ = "-1"
        FOR Row% = 1 TO 20
            FOR Col% = 1 TO 10
                IF VAL(MatrixOfCellValues(Row%, Col%)) > VAL(MaxValue$) THEN
                    MostNumerousDefectsRow(i%) = Row%
                    MostNumerousDefectsCol(i%) = Col%
                    MaxValue$ = MatrixOfCellValues(Row%, Col%)
                END IF
            NEXT Col%
```

```
        NEXT Row%
        MostNumerousDefects(i%) = MatrixOfCellValues(MostNumerousDefectsRow(i%), MostNumerousDefectsCol(i%))
        MatrixOfCellValues(MostNumerousDefectsRow(i%), MostNumerousDefectsCol(i%)) = "0"
    NEXT NumberOfMostNumerousDefects%
    LPRINT
    LPRINT
    LPRINT
    LPRINT
    LPRINT
    LPRINT "                              10 MOST NUMEROUS DEFECTS"
    LPRINT
    LPRINT "  position                    type of error                     number"
    LPRINT
    FOR NumberOfMostNumerousDefects% = 1 TO 10
        i% = NumberOfMostNumerousDefects%
        LPRINT Position(MostNumerousDefectsRow(i%)); TAB(30);
        LPRINT TypeError(MostNumerousDefectsCol(i%)); TAB(65);
        LPRINT MostNumerousDefects(i%)
    NEXT
    LPRINT CHR$(12)
    'LPRINT
    'FOR Row% = 1 TO 20
    '    FOR Col% = 1 TO 10
    '        LPRINT MatrixOfCellValues(Row%, Col%);
    '    NEXT Col%
    '    LPRINT
    'NEXT Row%
    'LPRINT
END SUB

SUB QuitButton_Click ()
    END
END SUB

SUB Reload_Click ()
    OPEN "backup.old" FOR OUTPUT AS #3
    PRINT #3, BigLabel.Caption
    PRINT #3, ErrorTotals.Caption
    PRINT #3, PositionTotals.Caption
    PRINT #3, TotalofTotals.Caption
    PRINT #3, StartDate$
    PRINT #3, StartTime$
    CLOSE #3

    OPEN "backup.dat" FOR INPUT AS #3
    INPUT #3, A$, B$, C$, D$, StartDate$, StartTime$
    CLOSE #3
```

```
    IF MID$(A$, 2, 1) = " " THEN
        BigLabel.Caption = "   " + A$
    ELSEIF MID$(A$, 3, 1) = " " THEN
        BigLabel.Caption = "  " + A$
    ELSEIF MID$(A$, 4, 1) = " " THEN
        BigLabel.Caption = " " + A$
    ELSE
        BigLabel.Caption = A$
    END IF

    IF MID$(B$, 2, 1) = " " THEN
        ErrorTotals.Caption = "   " + B$
    ELSEIF MID$(B$, 3, 1) = " " THEN
        ErrorTotals.Caption = "  " + B$
    ELSEIF MID$(B$, 4, 1) = " " THEN
        ErrorTotals.Caption = " " + B$
    ELSE
        ErrorTotals.Caption = B$
    END IF

    IF MID$(C$, 2, 1) = " " THEN
        PositionTotals.Caption = "   " + C$
    ELSEIF MID$(C$, 3, 1) = " " THEN
        PositionTotals.Caption = "  " + C$
    ELSEIF MID$(C$, 4, 1) = " " THEN
        PositionTotals.Caption = " " + C$
    ELSE
        PositionTotals.Caption = C$
    END IF

    IF LEN(D$) = 1 THEN
        TotalofTotals.Caption = "    " + D$
    ELSEIF LEN(D$) = 2 THEN
        TotalofTotals.Caption = "   " + D$
    ELSEIF LEN(D$) = 3 THEN
        TotalofTotals.Caption = "  " + D$
    ELSEIF LEN(D$) = 4 THEN
        TotalofTotals.Caption = " " + D$
    ELSE
        TotalofTotals.Caption = D$
    END IF
END SUB

SUB RowLabel_Click ()
    IF VAL(RowValue.Text) < 1 THEN RowValue.Text = "  1"
    IF VAL(RowValue.Text) > 20 THEN RowValue.Text = " 20"
END SUB
```

```
SUB Setup_Click ()
    'TypeOfError1.Caption1 = TypeError$(1)
    ErrorMatrix.HIDE
    ChangePositionOrError.SHOW
END SUB

SUB Timer1_Timer () ' 1 second timer
    ON LOCAL ERROR RESUME NEXT
    CurrentTime.Caption = TIME$
    CurrentDate.Caption = DATE$
    IF ValueOfInputParameter% > 0 AND ValueOfInputParameter% < 3 THEN
        DO WHILE NOT EOF(1)
            Acharacter$ = INPUT$(1, #1)
            IF ASC(Acharacter$) < 48 OR ASC(Acharacter$) > 77 THEN
                Timer2.Enabled = True
                ErrorFlag1 = True
                ErrorMessage.Caption = "ERROR"
            ELSE
                NumericalValue% = ASC(Acharacter$) - 48
                Row% = NumericalValue% \ 5 + 1
                Column% = NumericalValue% - 5 * (Row% - 1) + 1
                IF Row% = 3 OR Row% = 4 THEN ' this key is a type-of-error key
                    IF NOT (ErrorKey% = LastErrorKey% AND LastKey$ = "Error") THEN
                        ErrorKey% = 11 - ((Row% - 3) * 5 + Column%)
                        LastKey$ = "Error"
                        LastErrorKey% = ErrorKey%
                    ELSE
                        ErrorKey% = 0
                        LastKey$ = "Error"
                    END IF
                ELSEIF Row% = 5 OR Row% = 6 THEN
                    IF NOT (PositionKey% = LastPositionKey% AND LastKey$ = "Position") THEN
                        PositionKey% = 11 - ((Row% - 5) * 5 + Column%)
                        LastKey$ = "Position"
                        LastPositionKey% = PositionKey%
                    ELSE
                        PositionKey% = 0
                        LastKey$ = "Position"
                    END IF
                ELSE
                    IF NOT (PositionKey% = LastPositionKey% AND LastKey$ = "Position") THEN
                        PositionKey% = 11 - ((Row% - 1) * 5 + Column%) + 10
                        LastKey$ = "Position"
                        LastPositionKey% = PositionKey%
                    ELSE
                        PositionKey% = 0
                        LastKey$ = "Position"
                    END IF
```

```
                END IF
                RowValue.Text = STR$(PositionKey%)
                ColumnValue.Text = STR$(ErrorKey%)
                IF PositionKey% <> 0 AND ErrorKey% <> 0 THEN
                    CALL Increment_Click
                    LastPositionKey% = PositionKey%
                    LastErrorKey% = ErrorKey%
                    PositionKey% = 0
                    ErrorKey% = 0
                END IF
            END IF
        LOOP
    END IF
END SUB

SUB Timer2_Timer () ' 4 second timer
    IF ErrorFlag1 = True THEN
        ErrorFlag1 = False
        ErrorMessage.Caption = ""
    END IF
    Timer2.Enabled = False
END SUB

SUB Timer3_Timer ()
    'This timer has a short interval, like 1 millisecond.
    'It is executed once, and not again because it disables itself.

    ErrorFlag1 = False

        PrinterFlag$ = "p"
    ValueOfInputParameter% = VAL(COMMAND$)
    SELECT CASE ValueOfInputParameter%
        CASE 1: OPEN "COM1:1200,n,8,1" FOR INPUT AS #1
        CASE 2: OPEN "COM2:1200,n,8,1" FOR INPUT AS #1
        CASE 3: MSGBOX "Visual Basic and DOS do not support COM3", 0, "Operation will continue without COM"
        CASE 4: MSGBOX "Visual Basic and DOS do not support COM4", 0, "Operation will continue without COM"
        CASE ELSE: ' do nothing
    END SELECT
    Timer3.Enabled = False
    LastErrorKey% = 0
    LastPositionKey% = 0
    ErrorKey% = 0
    PositionKey% = 0
    LastKey$ = ""
    StartTime$ = TIME$
    StartDate$ = DATE$
    NextFileFree% = FREEFILE
    OPEN "PandE.dat" FOR INPUT AS NextFileFree%
```

```
    FOR i% = 1 TO 10
        INPUT #NextFileFree%, TypeError(i%)
    NEXT i%
    FOR i% = 1 TO 20
        INPUT #NextFileFree%, Position(i%)
    NEXT i%
    CLOSE #NextFileFree%
END SUB

SUB Timer4_Timer ()      ' 10 second timer

    OPEN "backup.dat" FOR INPUT AS #3
    INPUT #3, A$, B$, C$, D$, E$, F$
    CLOSE #3

    OPEN "backup.bak" FOR OUTPUT AS #4
    PRINT #4, A$
    PRINT #4, B$
    PRINT #4, C$
    PRINT #4, D$
    PRINT #4, E$
    PRINT #4, F$
    CLOSE #4

END SUB
```

APPENDIX G
TO FIG. 16

Page 1
04-19-94
08:59:29
CHANGE&P.LST

```
Version 1.00
BEGIN Form ChangePositionOrError
   AutoRedraw    = 0
   BackColor     = QBColor(7)
   BorderStyle   = 2
   Caption       = "Change Positions & Types of Errors"
   ControlBox    = -1
   Enabled       = -1
   ForeColor     = QBColor(0)
   Height        = Char(22)
   Left          = Char(2)
   MaxButton     = -1
   MinButton     = -1
   MousePointer  = 0
   Tag           = ""
   Top           = Char(2)
   Visible       = -1
   Width         = Char(76)
   WindowState   = 0
   BEGIN Label Label1
      Alignment     = 0
      AutoSize      = 0
      BackColor     = QBColor(7)
      BorderStyle   = 0
      Caption       = "1"
      DragMode      = 0
      Enabled       = -1
      ForeColor     = QBColor(0)
      Height        = Char(1)
      Left          = Char(31)
      MousePointer  = 0
      TabIndex      = 2
      Tag           = ""
      Top           = Char(0)
      Visible       = -1
      Width         = Char(2)
   END
   BEGIN Label Label2
      Alignment     = 0
      AutoSize      = 0
      BackColor     = QBColor(7)
      BorderStyle   = 0
      Caption       = "2"
      DragMode      = 0
      Enabled       = -1
      ForeColor     = QBColor(0)
      Height        = Char(1)
      Left          = Char(31)
```

```
   MousePointer = 0
   TabIndex     = 3
   Tag          = ""
   Top          = Char(1)
   Visible      = -1
   Width        = Char(2)
END
BEGIN Label Label3
   Alignment    = 0
   AutoSize     = 0
   BackColor    = QBColor(7)
   BorderStyle  = 0
   Caption      = "3"
   DragMode     = 0
   Enabled      = -1
   ForeColor    = QBColor(0)
   Height       = Char(1)
   Left         = Char(31)
   MousePointer = 0
   TabIndex     = 4
   Tag          = ""
   Top          = Char(2)
   Visible      = -1
   Width        = Char(2)
END
BEGIN Label Label4
   Alignment    = 0
   AutoSize     = 0
   BackColor    = QBColor(7)
   BorderStyle  = 0
   Caption      = "4"
   DragMode     = 0
   Enabled      = -1
   ForeColor    = QBColor(0)
   Height       = Char(1)
   Left         = Char(31)
   MousePointer = 0
   TabIndex     = 5
   Tag          = ""
   Top          = Char(3)
   Visible      = -1
   Width        = Char(2)
END
BEGIN Label Label5
   Alignment    = 0
   AutoSize     = 0
   BackColor    = QBColor(7)
   BorderStyle  = 0
```

```
   Caption       = "5"
   DragMode      = 0
   Enabled       = -1
   ForeColor     = QBColor(0)
   Height        = Char(1)
   Left          = Char(31)
   MousePointer  = 0
   TabIndex      = 6
   Tag           = ""
   Top           = Char(4)
   Visible       = -1
   Width         = Char(2)
END
BEGIN Label Label6
   Alignment     = 0
   AutoSize      = 0
   BackColor     = QBColor(7)
   BorderStyle   = 0
   Caption       = "6"
   DragMode      = 0
   Enabled       = -1
   ForeColor     = QBColor(0)
   Height        = Char(1)
   Left          = Char(31)
   MousePointer  = 0
   TabIndex      = 7
   Tag           = ""
   Top           = Char(5)
   Visible       = -1
   Width         = Char(2)
END
BEGIN Label Label7
   Alignment     = 0
   AutoSize      = 0
   BackColor     = QBColor(7)
   BorderStyle   = 0
   Caption       = "7"
   DragMode      = 0
   Enabled       = -1
   ForeColor     = QBColor(0)
   Height        = Char(1)
   Left          = Char(31)
   MousePointer  = 0
   TabIndex      = 8
   Tag           = ""
   Top           = Char(6)
   Visible       = -1
   Width         = Char(2)
```

```
END
BEGIN Label Label8
   Alignment    = 0
   AutoSize     = 0
   BackColor    = QBColor(7)
   BorderStyle  = 0
   Caption      = "8"
   DragMode     = 0
   Enabled      = -1
   ForeColor    = QBColor(0)
   Height       = Char(1)
   Left         = Char(31)
   MousePointer = 0
   TabIndex     = 9
   Tag          = ""
   Top          = Char(7)
   Visible      = -1
   Width        = Char(2)
END
BEGIN Label Label9
   Alignment    = 0
   AutoSize     = 0
   BackColor    = QBColor(7)
   BorderStyle  = 0
   Caption      = "9"
   DragMode     = 0
   Enabled      = -1
   ForeColor    = QBColor(0)
   Height       = Char(1)
   Left         = Char(31)
   MousePointer = 0
   TabIndex     = 10
   Tag          = ""
   Top          = Char(8)
   Visible      = -1
   Width        = Char(2)
END
BEGIN Label Label10
   Alignment    = 0
   AutoSize     = 0
   BackColor    = QBColor(7)
   BorderStyle  = 0
   Caption      = "10"
   DragMode     = 0
   Enabled      = -1
   ForeColor    = QBColor(0)
   Height       = Char(1)
   Left         = Char(30)
```

```
   MousePointer = 0
   TabIndex     = 11
   Tag          = ""
   Top          = Char(9)
   Visible      = -1
   Width        = Char(3)
END
BEGIN Label Label11
   Alignment    = 0
   AutoSize     = 0
   BackColor    = QBColor(7)
   BorderStyle  = 0
   Caption      = "11"
   DragMode     = 0
   Enabled      = -1
   ForeColor    = QBColor(0)
   Height       = Char(1)
   Left         = Char(30)
   MousePointer = 0
   TabIndex     = 12
   Tag          = ""
   Top          = Char(10)
   Visible      = -1
   Width        = Char(3)
END
BEGIN Label Label12
   Alignment    = 0
   AutoSize     = 0
   BackColor    = QBColor(7)
   BorderStyle  = 0
   Caption      = "12"
   DragMode     = 0
   Enabled      = -1
   ForeColor    = QBColor(0)
   Height       = Char(1)
   Left         = Char(30)
   MousePointer = 0
   TabIndex     = 13
   Tag          = ""
   Top          = Char(11)
   Visible      = -1
   Width        = Char(3)
END
BEGIN Label Label13
   Alignment    = 0
   AutoSize     = 0
   BackColor    = QBColor(7)
   BorderStyle  = 0
```

```
   Caption       = "13"
   DragMode      = 0
   Enabled       = -1
   ForeColor     = QBColor(0)
   Height        = Char(1)
   Left          = Char(30)
   MousePointer  = 0
   TabIndex      = 14
   Tag           = ""
   Top           = Char(12)
   Visible       = -1
   Width         = Char(3)
END
BEGIN Label Label14
   Alignment     = 0
   AutoSize      = 0
   BackColor     = QBColor(7)
   BorderStyle   = 0
   Caption       = "14"
   DragMode      = 0
   Enabled       = -1
   ForeColor     = QBColor(0)
   Height        = Char(1)
   Left          = Char(30)
   MousePointer  = 0
   TabIndex      = 15
   Tag           = ""
   Top           = Char(13)
   Visible       = -1
   Width         = Char(3)
END
BEGIN Label Label15
   Alignment     = 0
   AutoSize      = 0
   BackColor     = QBColor(7)
   BorderStyle   = 0
   Caption       = "15"
   DragMode      = 0
   Enabled       = -1
   ForeColor     = QBColor(0)
   Height        = Char(1)
   Left          = Char(30)
   MousePointer  = 0
   TabIndex      = 16
   Tag           = ""
   Top           = Char(14)
   Visible       = -1
   Width         = Char(3)
```

```
END
BEGIN Label Label16
   Alignment    = 0
   AutoSize     = 0
   BackColor    = QBColor(7)
   BorderStyle  = 0
   Caption      = "16"
   DragMode     = 0
   Enabled      = -1
   ForeColor    = QBColor(0)
   Height       = Char(1)
   Left         = Char(30)
   MousePointer = 0
   TabIndex     = 17
   Tag          = ""
   Top          = Char(15)
   Visible      = -1
   Width        = Char(3)
END
BEGIN Label Label17
   Alignment    = 0
   AutoSize     = 0
   BackColor    = QBColor(7)
   BorderStyle  = 0
   Caption      = "17"
   DragMode     = 0
   Enabled      = -1
   ForeColor    = QBColor(0)
   Height       = Char(1)
   Left         = Char(30)
   MousePointer = 0
   TabIndex     = 18
   Tag          = ""
   Top          = Char(16)
   Visible      = -1
   Width        = Char(3)
END
BEGIN Label Label18
   Alignment    = 0
   AutoSize     = 0
   BackColor    = QBColor(7)
   BorderStyle  = 0
   Caption      = "18"
   DragMode     = 0
   Enabled      = -1
   ForeColor    = QBColor(0)
   Height       = Char(1)
   Left         = Char(30)
```

```
   MousePointer = 0
   TabIndex     = 19
   Tag          = ""
   Top          = Char(17)
   Visible      = -1
   Width        = Char(3)
END
BEGIN Label Label19
   Alignment    = 0
   AutoSize     = 0
   BackColor    = QBColor(7)
   BorderStyle  = 0
   Caption      = "19"
   DragMode     = 0
   Enabled      = -1
   ForeColor    = QBColor(0)
   Height       = Char(1)
   Left         = Char(30)
   MousePointer = 0
   TabIndex     = 20
   Tag          = ""
   Top          = Char(18)
   Visible      = -1
   Width        = Char(3)
END
BEGIN Label Label20
   Alignment    = 0
   AutoSize     = 0
   BackColor    = QBColor(7)
   BorderStyle  = 0
   Caption      = "20"
   DragMode     = 0
   Enabled      = -1
   ForeColor    = QBColor(0)
   Height       = Char(1)
   Left         = Char(30)
   MousePointer = 0
   TabIndex     = 21
   Tag          = ""
   Top          = Char(19)
   Visible      = -1
   Width        = Char(3)
END
BEGIN CommandButton Display
   BackColor    = QBColor(7)
   Cancel       = 0
   Caption      = "Display"
   Default      = 0
```

```
   DragMode      = 0
   Enabled       = -1
   Height        = Char(3)
   Left          = Char(15)
   MousePointer  = 0
   TabIndex      = 1
   TabStop       = -1
   Tag           = ""
   Top           = Char(17)
   Visible       = -1
   Width         = Char(12)
END
BEGIN Label Label21
   Alignment     = 0
   AutoSize      = 0
   BackColor     = QBColor(7)
   BorderStyle   = 0
   Caption       = "edit below:"
   DragMode      = 0
   Enabled       = -1
   ForeColor     = QBColor(0)
   Height        = Char(1)
   Left          = Char(1)
   MousePointer  = 0
   TabIndex      = 53
   Tag           = ""
   Top           = Char(12)
   Visible       = -1
   Width         = Char(12)
END
BEGIN TextBox EditBox
   BackColor     = QBColor(7)
   BorderStyle   = 1
   DragMode      = 0
   Enabled       = -1
   ForeColor     = QBColor(0)
   Height        = Char(3)
   Left          = Char(0)
   MousePointer  = 0
   MultiLine     = 0
   ScrollBars    = 0
   TabIndex      = 52
   TabStop       = -1
   Tag           = ""
   Text          = ""
   Top           = Char(13)
   Visible       = -1
   Width         = Char(30)
```

```
END
BEGIN Label TypeOfError1
   Alignment    = 0
   AutoSize     = 0
   BackColor    = QBColor(7)
   BorderStyle  = 0
   Caption      = "TypeOfError1"
   DragMode     = 0
   Enabled      = -1
   ForeColor    = QBColor(0)
   Height       = Char(1)
   Left         = Char(0)
   MousePointer = 0
   TabIndex     = 42
   Tag          = ""
   Top          = Char(0)
   Visible      = -1
   Width        = Char(30)
END
BEGIN Label TypeOfError2
   Alignment    = 0
   AutoSize     = 0
   BackColor    = QBColor(7)
   BorderStyle  = 0
   Caption      = "TypeOfError2"
   DragMode     = 0
   Enabled      = -1
   ForeColor    = QBColor(0)
   Height       = Char(1)
   Left         = Char(0)
   MousePointer = 0
   TabIndex     = 43
   Tag          = ""
   Top          = Char(1)
   Visible      = -1
   Width        = Char(30)
END
BEGIN Label TypeOfError3
   Alignment    = 0
   AutoSize     = 0
   BackColor    = QBColor(7)
   BorderStyle  = 0
   Caption      = "TypeOfError3"
   DragMode     = 0
   Enabled      = -1
   ForeColor    = QBColor(0)
   Height       = Char(1)
   Left         = Char(0)
```

```
   MousePointer = 0
   TabIndex     = 44
   Tag          = ""
   Top          = Char(2)
   Visible      = -1
   Width        = Char(30)
END
BEGIN Label TypeOfError4
   Alignment    = 0
   AutoSize     = 0
   BackColor    = QBColor(7)
   BorderStyle  = 0
   Caption      = "TypeOfError4"
   DragMode     = 0
   Enabled      = -1
   ForeColor    = QBColor(0)
   Height       = Char(1)
   Left         = Char(0)
   MousePointer = 0
   TabIndex     = 45
   Tag          = ""
   Top          = Char(3)
   Visible      = -1
   Width        = Char(30)
END
BEGIN Label TypeOfError5
   Alignment    = 0
   AutoSize     = 0
   BackColor    = QBColor(7)
   BorderStyle  = 0
   Caption      = "TypeOfError5"
   DragMode     = 0
   Enabled      = -1
   ForeColor    = QBColor(0)
   Height       = Char(1)
   Left         = Char(0)
   MousePointer = 0
   TabIndex     = 46
   Tag          = ""
   Top          = Char(4)
   Visible      = -1
   Width        = Char(30)
END
BEGIN Label TypeOfError6
   Alignment    = 0
   AutoSize     = 0
   BackColor    = QBColor(7)
   BorderStyle  = 0
```

```
   Caption        = "TypeOfError6"
   DragMode       = 0
   Enabled        = -1
   ForeColor      = QBColor(0)
   Height         = Char(1)
   Left           = Char(0)
   MousePointer = 0
   TabIndex       = 47
   Tag            = ""
   Top            = Char(5)
   Visible        = -1
   Width          = Char(30)
END
BEGIN Label TypeOfError7
   Alignment      = 0
   AutoSize       = 0
   BackColor      = QBColor(7)
   BorderStyle    = 0
   Caption        = "TypeOfError7"
   DragMode       = 0
   Enabled        = -1
   ForeColor      = QBColor(0)
   Height         = Char(1)
   Left           = Char(0)
   MousePointer = 0
   TabIndex       = 48
   Tag            = ""
   Top            = Char(6)
   Visible        = -1
   Width          = Char(30)
END
BEGIN Label TypeOfError8
   Alignment      = 0
   AutoSize       = 0
   BackColor      = QBColor(7)
   BorderStyle    = 0
   Caption        = "TypeOfError8"
   DragMode       = 0
   Enabled        = -1
   ForeColor      = QBColor(0)
   Height         = Char(1)
   Left           = Char(0)
   MousePointer = 0
   TabIndex       = 49
   Tag            = ""
   Top            = Char(7)
   Visible        = -1
   Width          = Char(30)
```

```
END
BEGIN Label TypeOfError9
   Alignment    = 0
   AutoSize     = 0
   BackColor    = QBColor(7)
   BorderStyle  = 0
   Caption      = "TypeOfError9"
   DragMode     = 0
   Enabled      = -1
   ForeColor    = QBColor(0)
   Height       = Char(1)
   Left         = Char(0)
   MousePointer = 0
   TabIndex     = 50
   Tag          = ""
   Top          = Char(8)
   Visible      = -1
   Width        = Char(30)
END
BEGIN CommandButton QuitButton
   BackColor    = QBColor(7)
   Cancel       = 0
   Caption      = "Quit"
   Default      = 0
   DragMode     = 0
   Enabled      = -1
   Height       = Char(3)
   Left         = Char(1)
   MousePointer = 0
   TabIndex     = 0
   TabStop      = -1
   Tag          = ""
   Top          = Char(17)
   Visible      = -1
   Width        = Char(12)
END
BEGIN Label TypeOfError10
   Alignment    = 0
   AutoSize     = 0
   BackColor    = QBColor(7)
   BorderStyle  = 0
   Caption      = "TypeOfError10"
   DragMode     = 0
   Enabled      = -1
   ForeColor    = QBColor(0)
   Height       = Char(1)
   Left         = Char(0)
   MousePointer = 0
```

```
   TabIndex     = 51
   Tag          = ""
   Top          = Char(9)
   Visible      = -1
   Width        = Char(30)
END
BEGIN Label Position1
   Alignment    = 0
   AutoSize     = 0
   BackColor    = QBColor(7)
   BorderStyle  = 0
   Caption      = "Position1"
   DragMode     = 0
   Enabled      = -1
   ForeColor    = QBColor(0)
   Height       = Char(1)
   Left         = Char(34)
   MousePointer = 0
   TabIndex     = 22
   Tag          = ""
   Top          = Char(0)
   Visible      = -1
   Width        = Char(37)
END
BEGIN Label Position2
   Alignment    = 0
   AutoSize     = 0
   BackColor    = QBColor(7)
   BorderStyle  = 0
   Caption      = "Position2"
   DragMode     = 0
   Enabled      = -1
   ForeColor    = QBColor(0)
   Height       = Char(1)
   Left         = Char(34)
   MousePointer = 0
   TabIndex     = 23
   Tag          = ""
   Top          = Char(1)
   Visible      = -1
   Width        = Char(37)
END
BEGIN Label Position3
   Alignment    = 0
   AutoSize     = 0
   BackColor    = QBColor(7)
   BorderStyle  = 0
   Caption      = "Position3"
```

```
    DragMode     = 0
    Enabled      = -1
    ForeColor    = QBColor(0)
    Height       = Char(1)
    Left         = Char(34)
    MousePointer = 0
    TabIndex     = 24
    Tag          = ""
    Top          = Char(2)
    Visible      = -1
    Width        = Char(37)
END
BEGIN Label Position4
    Alignment    = 0
    AutoSize     = 0
    BackColor    = QBColor(7)
    BorderStyle  = 0
    Caption      = "Position4"
    DragMode     = 0
    Enabled      = -1
    ForeColor    = QBColor(0)
    Height       = Char(1)
    Left         = Char(34)
    MousePointer = 0
    TabIndex     = 25
    Tag          = ""
    Top          = Char(3)
    Visible      = -1
    Width        = Char(37)
END
BEGIN Label Position5
    Alignment    = 0
    AutoSize     = 0
    BackColor    = QBColor(7)
    BorderStyle  = 0
    Caption      = "Position5"
    DragMode     = 0
    Enabled      = -1
    ForeColor    = QBColor(0)
    Height       = Char(1)
    Left         = Char(34)
    MousePointer = 0
    TabIndex     = 26
    Tag          = ""
    Top          = Char(4)
    Visible      = -1
    Width        = Char(37)
END
```

```
BEGIN Label Position6
   Alignment     = 0
   AutoSize      = 0
   BackColor     = QBColor(7)
   BorderStyle   = 0
   Caption       = "Position6"
   DragMode      = 0
   Enabled       = -1
   ForeColor     = QBColor(0)
   Height        = Char(1)
   Left          = Char(34)
   MousePointer  = 0
   TabIndex      = 27
   Tag           = ""
   Top           = Char(5)
   Visible       = -1
   Width         = Char(37)
END
BEGIN Label Position7
   Alignment     = 0
   AutoSize      = 0
   BackColor     = QBColor(7)
   BorderStyle   = 0
   Caption       = "Position7"
   DragMode      = 0
   Enabled       = -1
   ForeColor     = QBColor(0)
   Height        = Char(1)
   Left          = Char(34)
   MousePointer  = 0
   TabIndex      = 28
   Tag           = ""
   Top           = Char(6)
   Visible       = -1
   Width         = Char(37)
END
BEGIN Label Position8
   Alignment     = 0
   AutoSize      = 0
   BackColor     = QBColor(7)
   BorderStyle   = 0
   Caption       = "Position8"
   DragMode      = 0
   Enabled       = -1
   ForeColor     = QBColor(0)
   Height        = Char(1)
   Left          = Char(34)
   MousePointer  = 0
```

```
   TabIndex     = 29
   Tag          = ""
   Top          = Char(7)
   Visible      = -1
   Width        = Char(37)
END
BEGIN Label Position9
   Alignment    = 0
   AutoSize     = 0
   BackColor    = QBColor(7)
   BorderStyle  = 0
   Caption      = "Position9"
   DragMode     = 0
   Enabled      = -1
   ForeColor    = QBColor(0)
   Height       = Char(1)
   Left         = Char(34)
   MousePointer = 0
   TabIndex     = 30
   Tag          = ""
   Top          = Char(8)
   Visible      = -1
   Width        = Char(37)
END
BEGIN Label Position10
   Alignment    = 0
   AutoSize     = 0
   BackColor    = QBColor(7)
   BorderStyle  = 0
   Caption      = "Position10"
   DragMode     = 0
   Enabled      = -1
   ForeColor    = QBColor(0)
   Height       = Char(1)
   Left         = Char(34)
   MousePointer = 0
   TabIndex     = 31
   Tag          = ""
   Top          = Char(9)
   Visible      = -1
   Width        = Char(37)
END
BEGIN Label Position11
   Alignment    = 0
   AutoSize     = 0
   BackColor    = QBColor(7)
   BorderStyle  = 0
   Caption      = "Position11"
```

```
   DragMode      = 0
   Enabled       = -1
   ForeColor     = QBColor(0)
   Height        = Char(1)
   Left          = Char(34)
   MousePointer  = 0
   TabIndex      = 32
   Tag           = ""
   Top           = Char(10)
   Visible       = -1
   Width         = Char(37)
END
BEGIN Label Position12
   Alignment     = 0
   AutoSize      = 0
   BackColor     = QBColor(7)
   BorderStyle   = 0
   Caption       = "Position12"
   DragMode      = 0
   Enabled       = -1
   ForeColor     = QBColor(0)
   Height        = Char(1)
   Left          = Char(34)
   MousePointer  = 0
   TabIndex      = 33
   Tag           = ""
   Top           = Char(11)
   Visible       = -1
   Width         = Char(37)
END
BEGIN Label Position13
   Alignment     = 0
   AutoSize      = 0
   BackColor     = QBColor(7)
   BorderStyle   = 0
   Caption       = "Position13"
   DragMode      = 0
   Enabled       = -1
   ForeColor     = QBColor(0)
   Height        = Char(1)
   Left          = Char(34)
   MousePointer  = 0
   TabIndex      = 34
   Tag           = ""
   Top           = Char(12)
   Visible       = -1
   Width         = Char(37)
END
```

```
BEGIN Label Position14
   Alignment    = 0
   AutoSize     = 0
   BackColor    = QBColor(7)
   BorderStyle  = 0
   Caption      = "Position14"
   DragMode     = 0
   Enabled      = -1
   ForeColor    = QBColor(0)
   Height       = Char(1)
   Left         = Char(34)
   MousePointer = 0
   TabIndex     = 35
   Tag          = ""
   Top          = Char(13)
   Visible      = -1
   Width        = Char(37)
END
BEGIN Label Position15
   Alignment    = 0
   AutoSize     = 0
   BackColor    = QBColor(7)
   BorderStyle  = 0
   Caption      = "Position15"
   DragMode     = 0
   Enabled      = -1
   ForeColor    = QBColor(0)
   Height       = Char(1)
   Left         = Char(34)
   MousePointer = 0
   TabIndex     = 36
   Tag          = ""
   Top          = Char(14)
   Visible      = -1
   Width        = Char(37)
END
BEGIN Label Position16
   Alignment    = 0
   AutoSize     = 0
   BackColor    = QBColor(7)
   BorderStyle  = 0
   Caption      = "Position16"
   DragMode     = 0
   Enabled      = -1
   ForeColor    = QBColor(0)
   Height       = Char(1)
   Left         = Char(34)
   MousePointer = 0
```

```
   TabIndex     = 37
   Tag          = ""
   Top          = Char(15)
   Visible      = -1
   Width        = Char(37)
END
BEGIN Label Position17
   Alignment    = 0
   AutoSize     = 0
   BackColor    = QBColor(7)
   BorderStyle  = 0
   Caption      = "Position17"
   DragMode     = 0
   Enabled      = -1
   ForeColor    = QBColor(0)
   Height       = Char(1)
   Left         = Char(34)
   MousePointer = 0
   TabIndex     = 38
   Tag          = ""
   Top          = Char(16)
   Visible      = -1
   Width        = Char(37)
END
BEGIN Label Position18
   Alignment    = 0
   AutoSize     = 0
   BackColor    = QBColor(7)
   BorderStyle  = 0
   Caption      = "Position18"
   DragMode     = 0
   Enabled      = -1
   ForeColor    = QBColor(0)
   Height       = Char(1)
   Left         = Char(34)
   MousePointer = 0
   TabIndex     = 39
   Tag          = ""
   Top          = Char(17)
   Visible      = -1
   Width        = Char(37)
END
BEGIN Label Position19
   Alignment    = 0
   AutoSize     = 0
   BackColor    = QBColor(7)
   BorderStyle  = 0
   Caption      = "Position19"
```

```
    DragMode     = 0
    Enabled      = -1
    ForeColor    = QBColor(0)
    Height       = Char(1)
    Left         = Char(34)
    MousePointer = 0
    TabIndex     = 40
    Tag          = ""
    Top          = Char(18)
    Visible      = -1
    Width        = Char(37)
END
BEGIN Label Position20
    Alignment    = 0
    AutoSize     = 0
    BackColor    = QBColor(7)
    BorderStyle  = 0
    Caption      = "Position20"
    DragMode     = 0
    Enabled      = -1
    ForeColor    = QBColor(0)
    Height       = Char(1)
    Left         = Char(34)
    MousePointer = 0
    TabIndex     = 41
    Tag          = ""
    Top          = Char(19)
    Visible      = -1
    Width        = Char(37)
END
BEGIN Label Label22
    Alignment    = 0
    AutoSize     = 0
    BackColor    = QBColor(7)
    BorderStyle  = 0
    Caption      = "Λ"
    DragMode     = 0
    Enabled      = -1
    ForeColor    = QBColor(0)
    Height       = Char(1)
    Left         = Char(72)
    MousePointer = 0
    TabIndex     = 54
    Tag          = ""
    Top          = Char(0)
    Visible      = -1
    Width        = Char(2)
END
```

```
BEGIN Label Label23
    Alignment    = 0
    AutoSize     = 0
    BackColor    = QBColor(7)
    BorderStyle  = 0
    Caption      = "B"
    DragMode     = 0
    Enabled      = -1
    ForeColor    = QBColor(0)
    Height       = Char(1)
    Left         = Char(72)
    MousePointer = 0
    TabIndex     = 55
    Tag          = ""
    Top          = Char(1)
    Visible      = -1
    Width        = Char(2)
END
BEGIN Label Label24
    Alignment    = 0
    AutoSize     = 0
    BackColor    = QBColor(7)
    BorderStyle  = 0
    Caption      = "C"
    DragMode     = 0
    Enabled      = -1
    ForeColor    = QBColor(0)
    Height       = Char(1)
    Left         = Char(72)
    MousePointer = 0
    TabIndex     = 56
    Tag          = ""
    Top          = Char(2)
    Visible      = -1
    Width        = Char(2)
END
BEGIN Label Label25
    Alignment    = 0
    AutoSize     = 0
    BackColor    = QBColor(7)
    BorderStyle  = 0
    Caption      = "D"
    DragMode     = 0
    Enabled      = -1
    ForeColor    = QBColor(0)
    Height       = Char(1)
    Left         = Char(72)
    MousePointer = 0
```

```
    TabIndex     = 57
    Tag          = ""
    Top          = Char(3)
    Visible      = -1
    Width        = Char(2)
END
BEGIN Label Label26
    Alignment    = 0
    AutoSize     = 0
    BackColor    = QBColor(7)
    BorderStyle  = 0
    Caption      = "E"
    DragMode     = 0
    Enabled      = -1
    ForeColor    = QBColor(0)
    Height       = Char(1)
    Left         = Char(72)
    MousePointer = 0
    TabIndex     = 58
    Tag          = ""
    Top          = Char(4)
    Visible      = -1
    Width        = Char(2)
END
BEGIN Label Label27
    Alignment    = 0
    AutoSize     = 0
    BackColor    = QBColor(7)
    BorderStyle  = 0
    Caption      = "F"
    DragMode     = 0
    Enabled      = -1
    ForeColor    = QBColor(0)
    Height       = Char(1)
    Left         = Char(72)
    MousePointer = 0
    TabIndex     = 59
    Tag          = ""
    Top          = Char(5)
    Visible      = -1
    Width        = Char(2)
END
BEGIN Label Label28
    Alignment    = 0
    AutoSize     = 0
    BackColor    = QBColor(7)
    BorderStyle  = 0
    Caption      = "G"
```

```
   DragMode     = 0
   Enabled      = -1
   ForeColor    = QBColor(0)
   Height       = Char(1)
   Left         = Char(72)
   MousePointer = 0
   TabIndex     = 60
   Tag          = ""
   Top          = Char(6)
   Visible      = -1
   Width        = Char(2)
END
BEGIN Label Label29
   Alignment    = 0
   AutoSize     = 0
   BackColor    = QBColor(7)
   BorderStyle  = 0
   Caption      = "H"
   DragMode     = 0
   Enabled      = -1
   ForeColor    = QBColor(0)
   Height       = Char(1)
   Left         = Char(72)
   MousePointer = 0
   TabIndex     = 61
   Tag          = ""
   Top          = Char(7)
   Visible      = -1
   Width        = Char(2)
END
BEGIN Label Label30
   Alignment    = 0
   AutoSize     = 0
   BackColor    = QBColor(7)
   BorderStyle  = 0
   Caption      = "I"
   DragMode     = 0
   Enabled      = -1
   ForeColor    = QBColor(0)
   Height       = Char(1)
   Left         = Char(72)
   MousePointer = 0
   TabIndex     = 62
   Tag          = ""
   Top          = Char(8)
   Visible      = -1
   Width        = Char(2)
END
```

```
BEGIN Label Label31
   Alignment    = 0
   AutoSize     = 0
   BackColor    = QBColor(7)
   BorderStyle  = 0
   Caption      = "J"
   DragMode     = 0
   Enabled      = -1
   ForeColor    = QBColor(0)
   Height       = Char(1)
   Left         = Char(72)
   MousePointer = 0
   TabIndex     = 63
   Tag          = ""
   Top          = Char(9)
   Visible      = -1
   Width        = Char(2)
END
BEGIN Label Label32
   Alignment    = 0
   AutoSize     = 0
   BackColor    = QBColor(7)
   BorderStyle  = 0
   Caption      = "K"
   DragMode     = 0
   Enabled      = -1
   ForeColor    = QBColor(0)
   Height       = Char(1)
   Left         = Char(72)
   MousePointer = 0
   TabIndex     = 64
   Tag          = ""
   Top          = Char(10)
   Visible      = -1
   Width        = Char(2)
END
BEGIN Label Label33
   Alignment    = 0
   AutoSize     = 0
   BackColor    = QBColor(7)
   BorderStyle  = 0
   Caption      = "L"
   DragMode     = 0
   Enabled      = -1
   ForeColor    = QBColor(0)
   Height       = Char(1)
   Left         = Char(72)
   MousePointer = 0
```

```
   TabIndex     = 65
   Tag          = ""
   Top          = Char(11)
   Visible      = -1
   Width        = Char(2)
END
BEGIN Label Label34
   Alignment    = 0
   AutoSize     = 0
   BackColor    = QBColor(7)
   BorderStyle  = 0
   Caption      = "M"
   DragMode     = 0
   Enabled      = -1
   ForeColor    = QBColor(0)
   Height       = Char(1)
   Left         = Char(72)
   MousePointer = 0
   TabIndex     = 66
   Tag          = ""
   Top          = Char(12)
   Visible      = -1
   Width        = Char(2)
END
BEGIN Label Label35
   Alignment    = 0
   AutoSize     = 0
   BackColor    = QBColor(7)
   BorderStyle  = 0
   Caption      = "N"
   DragMode     = 0
   Enabled      = -1
   ForeColor    = QBColor(0)
   Height       = Char(1)
   Left         = Char(72)
   MousePointer = 0
   TabIndex     = 67
   Tag          = ""
   Top          = Char(13)
   Visible      = -1
   Width        = Char(2)
END
BEGIN Label Label36
   Alignment    = 0
   AutoSize     = 0
   BackColor    = QBColor(7)
   BorderStyle  = 0
   Caption      = "O"
```

```
    DragMode      = 0
    Enabled       = -1
    ForeColor     = QBColor(0)
    Height        = Char(1)
    Left          = Char(72)
    MousePointer  = 0
    TabIndex      = 68
    Tag           = ""
    Top           = Char(14)
    Visible       = -1
    Width         = Char(2)
END
BEGIN Label Label37
    Alignment     = 0
    AutoSize      = 0
    BackColor     = QBColor(7)
    BorderStyle   = 0
    Caption       = "P"
    DragMode      = 0
    Enabled       = -1
    ForeColor     = QBColor(0)
    Height        = Char(1)
    Left          = Char(72)
    MousePointer  = 0
    TabIndex      = 69
    Tag           = ""
    Top           = Char(15)
    Visible       = -1
    Width         = Char(2)
END
BEGIN Label Label38
    Alignment     = 0
    AutoSize      = 0
    BackColor     = QBColor(7)
    BorderStyle   = 0
    Caption       = "Q"
    DragMode      = 0
    Enabled       = -1
    ForeColor     = QBColor(0)
    Height        = Char(1)
    Left          = Char(72)
    MousePointer  = 0
    TabIndex      = 70
    Tag           = ""
    Top           = Char(16)
    Visible       = -1
    Width         = Char(2)
END
```

```
BEGIN Label Label39
   Alignment     = 0
   AutoSize      = 0
   BackColor     = QBColor(7)
   BorderStyle   = 0
   Caption       = "R"
   DragMode      = 0
   Enabled       = -1
   ForeColor     = QBColor(0)
   Height        = Char(1)
   Left          = Char(72)
   MousePointer  = 0
   TabIndex      = 71
   Tag           = ""
   Top           = Char(17)
   Visible       = -1
   Width         = Char(2)
END
BEGIN Label Label40
   Alignment     = 0
   AutoSize      = 0
   BackColor     = QBColor(7)
   BorderStyle   = 0
   Caption       = "S"
   DragMode      = 0
   Enabled       = -1
   ForeColor     = QBColor(0)
   Height        = Char(1)
   Left          = Char(72)
   MousePointer  = 0
   TabIndex      = 72
   Tag           = ""
   Top           = Char(18)
   Visible       = -1
   Width         = Char(2)
END
BEGIN Label Label41
   Alignment     = 0
   AutoSize      = 0
   BackColor     = QBColor(7)
   BorderStyle   = 0
   Caption       = "T"
   DragMode      = 0
   Enabled       = -1
   ForeColor     = QBColor(0)
   Height        = Char(1)
   Left          = Char(72)
   MousePointer  = 0
```

```
        TabIndex       = 73
        Tag            = ""
        Top            = Char(19)
        Visible        = -1
        Width          = Char(2)
    END
    BEGIN CommandButton ResetPad
        BackColor      = QBColor(7)
        Cancel         = 0
        Caption        = "Reset Pad"
        Default        = 0
        DragMode       = 0
        Enabled        = -1
        Height         = Char(3)
        Left           = Char(17)
        MousePointer   = 0
        TabIndex       = 74
        TabStop        = -1
        Tag            = ""
        Top            = Char(10)
        Visible        = -1
        Width          = Char(12)
    END
END
'$FORM ErrorMatrix
DIM SHARED Position(20) AS STRING
DIM SHARED TypeError(10) AS STRING
DIM SHARED EntityBeingEdited AS STRING
COMMON SHARED TypeError() AS STRING
COMMON SHARED Position() AS STRING
COMMON SHARED ResetThyself AS INTEGER

SUB Display_Click ()
    TypeOfError1.Caption = TypeError(1)
    TypeOfError2.Caption = TypeError(2)
    TypeOfError3.Caption = TypeError(3)
    TypeOfError4.Caption = TypeError(4)
    TypeOfError5.Caption = TypeError(5)
    TypeOfError6.Caption = TypeError(6)
    TypeOfError7.Caption = TypeError(7)
    TypeOfError8.Caption = TypeError(8)
    TypeOfError9.Caption = TypeError(9)
    TypeOfError10.Caption = TypeError(10)
'    FOR i% = 1 TO 10
'        TypesOfErrors.Text = TypeError(i)
'    NEXT i%
    Position1.Caption = Position(1)
    Position2.Caption = Position(2)
```

```
    Position3.Caption = Position(3)
    Position4.Caption = Position(4)
    Position5.Caption = Position(5)
    Position6.Caption = Position(6)
    Position7.Caption = Position(7)
    Position8.Caption = Position(8)
    Position9.Caption = Position(9)
    Position10.Caption = Position(10)
    Position11.Caption = Position(11)
    Position12.Caption = Position(12)
    Position13.Caption = Position(13)
    Position14.Caption = Position(14)
    Position15.Caption = Position(15)
    Position16.Caption = Position(16)
    Position17.Caption = Position(17)
    Position18.Caption = Position(18)
    Position19.Caption = Position(19)
    Position20.Caption = Position(20)
END SUB

SUB EditBox_Change ()
    SELECT CASE EntityBeingEdited$
        CASE "1": TypeError(1) = EditBox.Text
        CASE "2": TypeError(2) = EditBox.Text
        CASE "3": TypeError(3) = EditBox.Text
        CASE "4": TypeError(4) = EditBox.Text
        CASE "5": TypeError(5) = EditBox.Text
        CASE "6": TypeError(6) = EditBox.Text
        CASE "7": TypeError(7) = EditBox.Text
        CASE "8": TypeError(8) = EditBox.Text
        CASE "9": TypeError(9) = EditBox.Text
        CASE "10": TypeError(10) = EditBox.Text
        CASE "A": Position(1) = EditBox.Text
        CASE "B": Position(2) = EditBox.Text
        CASE "C": Position(3) = EditBox.Text
        CASE "D": Position(4) = EditBox.Text
        CASE "E": Position(5) = EditBox.Text
        CASE "F": Position(6) = EditBox.Text
        CASE "G": Position(7) = EditBox.Text
        CASE "H": Position(8) = EditBox.Text
        CASE "I": Position(9) = EditBox.Text
        CASE "J": Position(10) = EditBox.Text
        CASE "K": Position(11) = EditBox.Text
        CASE "L": Position(12) = EditBox.Text
        CASE "M": Position(13) = EditBox.Text
        CASE "N": Position(14) = EditBox.Text
        CASE "O": Position(15) = EditBox.Text
        CASE "P": Position(16) = EditBox.Text
```

```
        CASE "Q": Position(17) = EditBox.Text
        CASE "R": Position(18) = EditBox.Text
        CASE "S": Position(19) = EditBox.Text
        CASE "T": Position(20) = EditBox.Text
    END SELECT
    TypeOfError1.Caption = TypeError(1)
    TypeOfError2.Caption = TypeError(2)
    TypeOfError3.Caption = TypeError(3)
    TypeOfError4.Caption = TypeError(4)
    TypeOfError5.Caption = TypeError(5)
    TypeOfError6.Caption = TypeError(6)
    TypeOfError7.Caption = TypeError(7)
    TypeOfError8.Caption = TypeError(8)
    TypeOfError9.Caption = TypeError(9)
    TypeOfError10.Caption = TypeError(10)
    Position1.Caption = Position(1)
    Position2.Caption = Position(2)
    Position3.Caption = Position(3)
    Position4.Caption = Position(4)
    Position5.Caption = Position(5)
    Position6.Caption = Position(6)
    Position7.Caption = Position(7)
    Position8.Caption = Position(8)
    Position9.Caption = Position(9)
    Position10.Caption = Position(10)
    Position11.Caption = Position(11)
    Position12.Caption = Position(12)
    Position13.Caption = Position(13)
    Position14.Caption = Position(14)
    Position15.Caption = Position(15)
    Position16.Caption = Position(16)
    Position17.Caption = Position(17)
    Position18.Caption = Position(18)
    Position19.Caption = Position(19)
    Position20.Caption = Position(20)
    NextFileFree% = FREEFILE
    OPEN "PandE.dat" FOR OUTPUT AS NextFileFree%
    FOR i% = 1 TO 10
        PRINT #NextFileFree%, TypeError(i%)
    NEXT i%
    FOR i% = 1 TO 20
        PRINT #NextFileFree%, Position(i%)
    NEXT i%
    CLOSE #NextFileFree%
END SUB

SUB Position10_Click ()
    EntityBeingEdited$ = "J"
```

```
    EditBox.Text = Position(10)

END SUB

SUB Position11_Click ()
    EntityBeingEdited$ = "K"
    EditBox.Text = Position(11)
END SUB

SUB Position12_Click ()
    EntityBeingEdited$ = "L"
    EditBox.Text = Position(12)

END SUB

SUB Position13_Click ()
    EntityBeingEdited$ = "M"
    EditBox.Text = Position(13)

END SUB

SUB Position14_Click ()
    EntityBeingEdited$ = "N"
    EditBox.Text = Position(14)

END SUB

SUB Position15_Click ()
    EntityBeingEdited$ = "O"
    EditBox.Text = Position(15)

END SUB

SUB Position16_Click ()
    EntityBeingEdited$ = "P"
    EditBox.Text = Position(16)

END SUB

SUB Position17_Click ()
    EntityBeingEdited$ = "Q"
    EditBox.Text = Position(17)

END SUB

SUB Position18_Click ()
    EntityBeingEdited$ = "R"
    EditBox.Text = Position(18)
```

```
END SUB

SUB Position19_Click ()
    EntityBeingEdited$ = "S"
    EditBox.Text = Position(19)

END SUB

SUB Position1_Click ()
    EntityBeingEdited$ = "A"
    EditBox.Text = Position(1)
END SUB

SUB Position20_Click ()
    EntityBeingEdited$ = "T"
    EditBox.Text = Position(20)

END SUB

SUB Position2_Click ()
    EntityBeingEdited$ = "B"
    EditBox.Text = Position(2)
END SUB

SUB Position3_Click ()
    EntityBeingEdited$ = "C"
    EditBox.Text = Position(3)
END SUB

SUB Position4_Click ()
    EntityBeingEdited$ = "D"
    EditBox.Text = Position(4)
END SUB

SUB Position5_Click ()
    EntityBeingEdited$ = "E"
    EditBox.Text = Position(5)

END SUB

SUB Position6_Click ()
    EntityBeingEdited$ = "F"
    EditBox.Text = Position(6)

END SUB

SUB Position7_Click ()
```

```
    EntityBeingEdited$ = "G"
    EditBox.Text = Position(7)

END SUB

SUB Position8_Click ()
    EntityBeingEdited$ = "H"
    EditBox.Text = Position(8)

END SUB

SUB Position9_Click ()
    EntityBeingEdited$ = "I"
    EditBox.Text = Position(9)

END SUB

SUB QuitButton_Click ()
    ChangePositionOrError.HIDE
    ErrorMatrix.SHOW
END SUB

SUB ResetPad_Click ()
    NextFileFree% = FREEFILE
    ValueOfInputParameter% = VAL(COMMAND$)
    SELECT CASE ValueOfInputParameter%
        CASE 1: CLOSE #1: OPEN "COM1:1200,n,8,1" FOR OUTPUT AS #1
        CASE 2: CLOSE #1: OPEN "COM2:1200,n,8,1" FOR OUTPUT AS #1
        CASE 3: MSGBOX "Visual Basic and DOS do not support COM3", 0, "Operation will continue without COM"
        CASE 4: MSGBOX "Visual Basic and DOS do not support COM4", 0, "Operation will continue without COM"
        CASE ELSE: ' do nothing
    END SELECT
    IF ValueOfInputParameter% > 0 AND ValueOfInputParameter% < 3 THEN
        PRINT #1, CHR$(224) 'send the alpha character which means "reset thyself"
        CLOSE #1
        SELECT CASE ValueOfInputParameter%
            CASE 1: OPEN "COM1:1200,n,8,1" FOR INPUT AS #1
            CASE 2: OPEN "COM2:1200,n,8,1" FOR INPUT AS #1
        END SELECT
    END IF
    ResetThyself = 1
END SUB

SUB TypeOfError10_Click ()
    EntityBeingEdited$ = "10"
    EditBox.Text = TypeError(10)
END SUB
```

```
SUB TypeOfError1_Click ()
    EntityBeingEdited$ = "1"
    EditBox.Text = TypeError(1)
END SUB

SUB TypeOfError2_Click ()
    EntityBeingEdited$ = "2"
    EditBox.Text = TypeError(2)
END SUB

SUB TypeOfError3_Click ()
    EntityBeingEdited$ = "3"
    EditBox.Text = TypeError(3)
END SUB

SUB TypeOfError4_Click ()
    EntityBeingEdited$ = "4"
    EditBox.Text = TypeError(4)
END SUB

SUB TypeOfError5_Click ()
    EntityBeingEdited$ = "5"
    EditBox.Text = TypeError(5)
END SUB

SUB TypeOfError6_Click ()
    EntityBeingEdited$ = "6"
    EditBox.Text = TypeError(6)
END SUB

SUB TypeOfError7_Click ()
    EntityBeingEdited$ = "7"
    EditBox.Text = TypeError(7)
END SUB

SUB TypeOfError8_Click ()
    EntityBeingEdited$ = "8"
    EditBox.Text = TypeError(8)
END SUB

SUB TypeOfError9_Click ()
    EntityBeingEdited$ = "9"
    EditBox.Text = TypeError(9)
END SUB
```

What is claimed is:

1. A system for entering and analyzing data which identify a defect occurring in a workpiece, the defect being identified by its position in the workpiece and by a type-of-error, said system comprising:

a data entry means for displaying a pictorial image of the workpiece, the data entry means further providing a plurality of first indicia thereon in juxtaposition to the pictorial image of the workpiece, each first indicia for identifying the position of the defect in the workpiece, and the data entry means further providing a plurality of second indicia thereon, each second indicia for identifying the type-of-error in the workpiece, wherein the data identifying the defect are entered in the system when one of the first indicia in combination with one of the second indicia are activated;

a processing means for processing the entered data; and a controlling means controlling said data entry means in response to the entered data.

2. The system of claim 1, wherein said processing means includes a computer, and wherein said controlling means includes means for delivering the entered data to the computer.

3. The system of claim 2, wherein said computer includes a computer display.

4. The system of claim 3, wherein said controlling means further includes means for communicating to the computer from the controlling means continually, and wherein the computer includes means for collecting and displaying on the computer display the delivered data in real time.

5. The system of claim 4, wherein said controlling means further includes means for delivering data to the computer periodically, and wherein the computer includes means for collecting and displaying on the computer display the periodically delivered data.

6. The system of claim 5, wherein said controlling means further includes means for activating the periodical delivery of data to the computer, and wherein said controlling means further includes means for activating said means for continual communication between the computer and said controlling means.

7. The system of claim 2, further including a printing means, and wherein the computer includes means for output of the delivered data to the printing means.

8. The system of claim 7, wherein the computer further includes means for summarizing and printing data on the ten most serious defects.

9. The system of claim 1, further including a stand-alone display, wherein said controlling means includes means for delivering data to said stand-alone display.

10. The system of claim 1, further including a display integral with the data entry means, wherein said controlling means includes means for delivering data to said integral display.

11. The system of claim 1, wherein said one of the first indicia in combination with one of the second indicia are activated in any order.

12. The system of claim 1, further including an audio feedback means controlled by the controlling means.

13. The system of claim 1, further including a visual feedback means controlled by the controlling means.

14. The system of claim 1, further including a printed circuit board for disposing said controlling means thereon.

15. The system of claim 1, wherein the controlling means includes a micro-controller.

16. The system of claim 1, wherein the controlling means are fed from a power supply,further including a power regulating and conditioning means disposed between the power supply and the controlling means.

17. The system of claim 16, wherein the controlling means and the processing means each further includes a safeguard means providing for recovering the entered data in the event a power failure occurs.

18. An apparatus for entering data on at least one defect occurring in a workpiece, the defect being identified by a position in the workpiece and a type-of-error, wherein the workpiece has a plurality of defect positions therein, and wherein there are different types-of-errors occurring in the workpiece, the apparatus comprising a display means for displaying the pictorial image of the workpiece, the display means having a plurality of first indicia thereon in juxtaposition to the workpiece displayed thereon, such that one of the first indicia is associated with the position of the error in the workpiece, and the display means further having a plurality of second indicia thereon indicating the type-of-error.

19. The apparatus of claim 18, wherein the first indicia are disposed around the pictorial image of the workpiece, displayed on the display means.

20. The apparatus of claim 18, wherein the second indicia are arranged in a column on the display means.

21. The apparatus of claim 18, wherein the display means further includes a front screen and a sketch board disposed behind the front screen.

22. The apparatus of claim 21, wherein the sketch board has a perimeter including a plurality of first apertures in precise registration with the respective first indicia, each of the first apertures being connected by a reference line to the respective possible positions of said at least one defect in the workpiece, wherein the sketch board further includes a group of second apertures disposed on the sketch board in precise registration with the respective said second indicia, and wherein each second aperture is associated with the respective type of error of said at least one defect in the workpiece.

23. The apparatus of claim 21, wherein the front screen includes a transparent portion, wherein the pictorial image of the workpiece and a list of possible types of error of said at least one defect in said workpiece being sketched on the sketch board are displayed through the transparent portion, wherein the front screen further includes first apertures and second apertures in precise registration with corresponding first and second apertures of the sketch board.

24. The apparatus of claim 21, further including a plurality of sketch boards, each sketch board for a particular workpiece.

25. The apparatus of claim 24, wherein said sketch boards are in a tear-off arrangement.

26. The apparatus of claim 24, wherein said sketch boards are removably interchangeable, such that each sketch board includes a detailed pictorial description of the particular workpiece, or a portion thereof, along with the list of types of errors possible for this workpiece.

27. The apparatus of claim 21, further including a support board carrying on the sketch board, wherein the support board provides first and second apertures, wherein first and second apertures of the support board correspond to and are in precise registration with the first and second apertures of both the sketch board and the front screen, respectively.

28. The apparatus of claim 21, further including a key board, wherein said key board provides first and second keys, corresponding to first and second indicia, respectively, each first and second key including a contact portion, wherein first and second keys are in precise registration with the first and second apertures of both the sketch board and the front board, respectively, such that the contact portions of each of the first and second keys are protruded through the respective apertures.

29. The apparatus of claim 28, wherein the key board includes at least one printed circuit board with an electronic circuitry thereon.

30. The apparatus of claim 21, wherein the sketch board includes a pre-printed die-cut paper sheet.

31. A method for entering data relating to a defect occurring in a workpiece, wherein the workpiece has a plurality of defect positions therein, and wherein there are different types of errors occurring in the workpiece, the method comprising the steps of:

providing a data entry means, wherein a pictorial image of the workpiece is displayed thereon, providing a plurality of first indicia disposed on the data entry means in juxtaposition to the pictorial image of the workpiece displayed thereon, such that each one of the first indicia is associated with one of said plurality of defect positions in the workpiece, and providing a plurality of second indicia disposed on the data entry means, such that each one of the second indicia is associated with one of said types-of-errors occurring in the workpiece; and activating one of the first indicia corresponding to the position of the defect in combination with one of the second indicia corresponding to the type-of-error, thereby entering data indicating the position and the type-of-error occurring in the workpiece.

32. The method of claim 31, wherein said first and second indicia are activated in any order.

33. The method of claim 31, further including the step of providing an audible feed-back means.

34. The method of claim 31, further including the step of providing a visual feed-back means.

35. The method of claim 31, further including the step of providing the processing means for processing the entered data.

36. A system for data entry and analysis, said data relating to an attribute occurring in an object, said system comprising:

a data entry means for displaying a pictorial image of said object, the data entry means further providing a plurality of first indicia thereon associated with the pictorial image of the object, each first indicia for identifying a location of the attribute in the object, and the data entry means further providing at least one group of additional indicia thereon, each additional indicia for identifying a parameter of the attribute in the object, wherein the data identifying the attribute are entered in the system when one of the first indicia in combination with at least one of the additional indicia are activated;

a processing means for processing the entered data; and a controlling means controlling said data entry means in response to the entered data.

* * * * *